(12) United States Patent
Kawamura et al.

(10) Patent No.: US 10,768,396 B2
(45) Date of Patent: Sep. 8, 2020

(54) ZOOM LENS AND IMAGE PICKUP APPARATUS USING THE SAME

(71) Applicant: OLYMPUS CORPORATION, Hachioji-shi, Tokyo (JP)

(72) Inventors: Kazuteru Kawamura, Hachioji (JP); Takashi Fujikura, Fussa (JP); Kenichi Nagasawa, Hachioji (JP); Masaru Morooka, Akishima (JP)

(73) Assignee: OLYMPUS CORPORATION, Tokyo (JP)

( * ) Notice: Subject to any disclaimer, the term of this patent is extended or adjusted under 35 U.S.C. 154(b) by 156 days.

(21) Appl. No.: 15/927,152

(22) Filed: Mar. 21, 2018

(65) Prior Publication Data

US 2018/0210179 A1 Jul. 26, 2018

Related U.S. Application Data

(60) Division of application No. 15/355,951, filed on Nov. 18, 2016, now Pat. No. 9,958,656, which is a
(Continued)

(30) Foreign Application Priority Data

May 19, 2014 (JP) .................................. 2014-103798
May 19, 2014 (JP) .................................. 2014-103799

(Continued)

(51) Int. Cl.
*G02B 15/177* (2006.01)
*G02B 15/20* (2006.01)
(Continued)

(52) U.S. Cl.
CPC ............ *G02B 15/177* (2013.01); *G02B 5/005* (2013.01); *G02B 15/20* (2013.01); *G02B 27/0025* (2013.01)

(58) Field of Classification Search
CPC ........ G02B 15/177; G02B 5/005; G02B 15/20; G02B 27/0025
(Continued)

(56) References Cited

U.S. PATENT DOCUMENTS 5,663,835 A 9/1997 Shibayama
5,668,668 A 9/1997 Shibayama et al.
(Continued)

FOREIGN PATENT DOCUMENTS

JP 08094935 A 4/1996
JP 2005107036 A 4/2005
(Continued)

OTHER PUBLICATIONS

International Preliminary Report on Patentability (and English translation thereof) dated Dec. 1, 2016, issued in corresponding International Application No. PCT/JP2015/059053.
(Continued)

*Primary Examiner* — James R Greece
(74) *Attorney, Agent, or Firm* — Holtz, Holtz & Volek PC

(57) ABSTRACT

A zoom lens includes a front unit having a negative refractive power; and a rear unit having a positive refractive power, which includes an aperture stop. The front unit includes a first negative refractive power lens, a second negative refractive power lens, and a third positive refractive power lens. The first lens is nearest to an object, and has a meniscus shape with a convex surface directed toward the object side, and the second lens is on an image side of the first lens, and has a meniscus shape with a convex surface directed toward the object side. The rear unit includes a first lens unit A and a second lens unit B, wherein when zooming from a wide angle end to a telephoto end, a distance between the front unit and the rear unit narrows, and a distance between the first lens unit A and the second lens unit B
(Continued)

changes. The first lens unit A includes a first sub-lens unit having a positive refractive power, the aperture stop, and a second sub-lens unit. The second sub-lens unit includes a focusing lens unit, and when focusing, only the focusing lens unit moves along an optical axis, and when zooming, a distance between the first sub-lens unit and the second sub-lens unit changes.

31 Claims, 79 Drawing Sheets

Related U.S. Application Data continuation of application No. PCT/JP2015/059053, filed on Mar. 25, 2015.

(30) Foreign Application Priority Data

| | | | |
|---|---|---|---|
| May 19, 2014 | (JP) | ................................. | 2014-103800 |
| May 30, 2014 | (JP) | ................................. | 2014-111803 |
| Jun. 6, 2014 | (JP) | ................................. | 2014-117156 |

(51) Int. Cl.
  *G02B 5/00* (2006.01)
  *G02B 27/00* (2006.01)

(58) Field of Classification Search
  USPC ................................................. 359/684, 676
  See application file for complete search history.

(56) References Cited

U.S. PATENT DOCUMENTS

| | | | |
|---|---|---|---|
| 7,911,707 B2 | 3/2011 | Okada | |
| 8,085,475 B2 | 12/2011 | Miyazaki et al. | |
| 8,169,718 B2 | 5/2012 | Li et al. | |
| 8,462,440 B2* | 6/2013 | Eguchi | ................. G02B 15/177 359/676 |
| 8,830,592 B2 | 9/2014 | Sato et al. | |
| 2006/0050406 A1* | 3/2006 | Ishii | ....................... G02B 13/06 359/680 |
| 2009/0201590 A1* | 8/2009 | Sugita | ...................... G02B 1/00 359/680 |
| 2010/0142060 A1 | 6/2010 | Nagatoshi et al. | |
| 2012/0019926 A1* | 1/2012 | Yamagami | ........... G02B 15/177 359/680 |
| 2012/0250168 A1* | 10/2012 | Eguchi | ................. G02B 15/177 359/753 |
| 2014/0028891 A1 | 1/2014 | Otake et al. | |
| 2014/0036137 A1 | 2/2014 | Inoue | |
| 2014/0055659 A1 | 2/2014 | Iwamoto | |
| 2014/0152887 A1 | 6/2014 | Hagiwara | |
| 2014/0185143 A1 | 7/2014 | Kubota et al. | |
| 2014/0211082 A1 | 7/2014 | Imaoka | |
| 2014/0355129 A1 | 12/2014 | Sato et al. | |
| 2015/0146085 A1* | 5/2015 | Hatada | ................. G02B 15/177 348/360 |
| 2017/0068079 A1* | 3/2017 | Kawamura | ............ G02B 15/20 |

FOREIGN PATENT DOCUMENTS

| | | |
|---|---|---|
| JP | 2007094174 A | 4/2007 |
| JP | 2010060612 A | 3/2010 |
| JP | 2010176098 A | 8/2010 |
| JP | 2010249959 A | 11/2010 |
| JP | 2012220527 A | 11/2012 |
| JP | 2012220681 A | 11/2012 |
| JP | 2012247453 A | 12/2012 |
| JP | 2014026169 A | 2/2014 |
| JP | 2014032358 A | 2/2014 |
| JP | 2014041222 A | 3/2014 |
| JP | 2014041245 A | 3/2014 |
| JP | 2014109761 A | 6/2014 |
| JP | 2014160229 A | 9/2014 |
| JP | 2015028530 A | 2/2015 |
| JP | 2015087681 A | 5/2015 |

OTHER PUBLICATIONS

International Search Report (ISR) and Written Opinion dated Jun. 30, 2015 issued in International Application No. PCT/JP2015/059053.

* cited by examiner

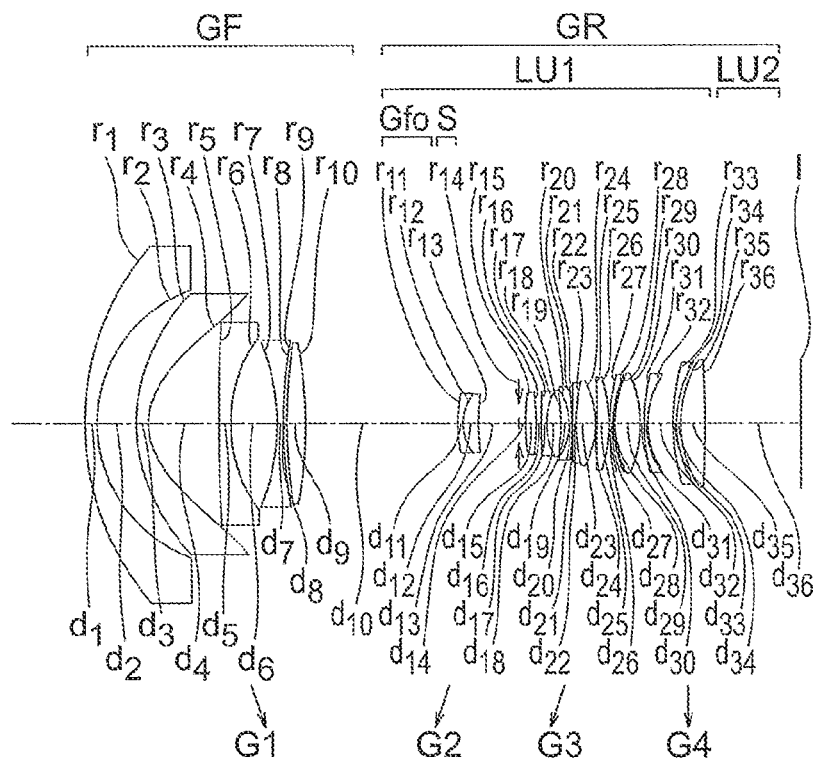
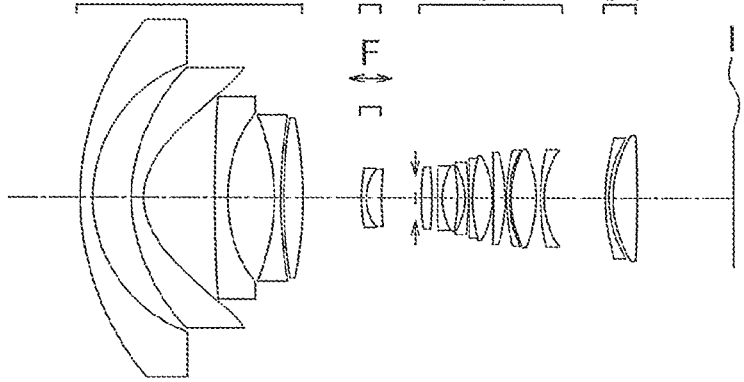
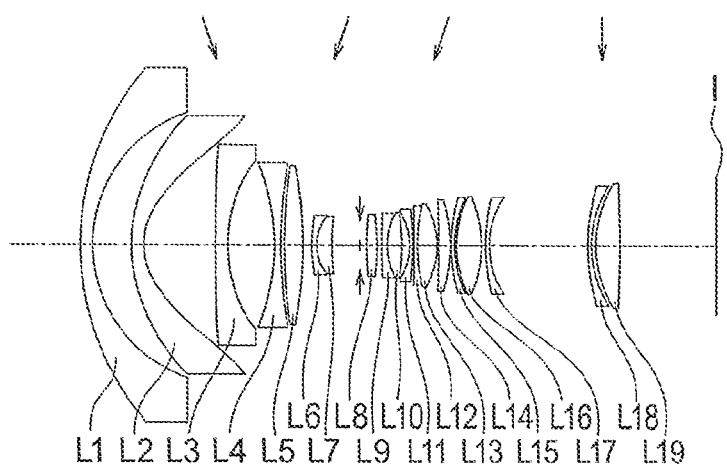

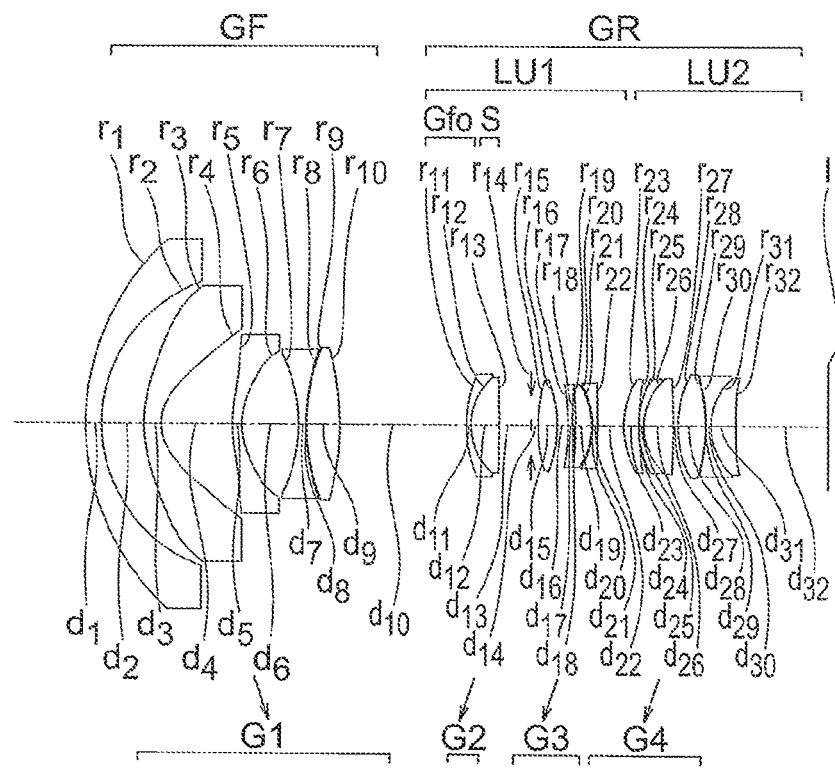
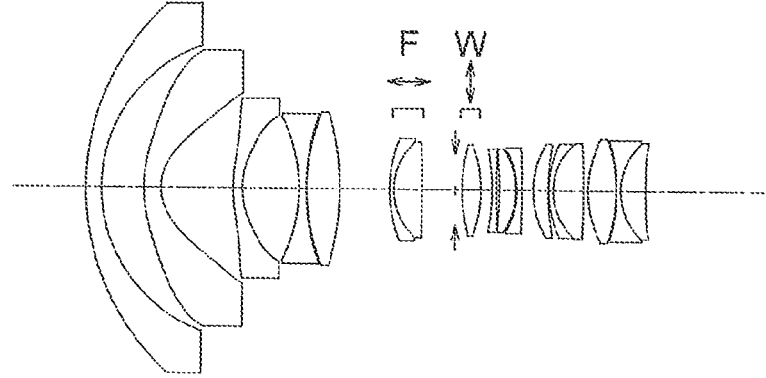
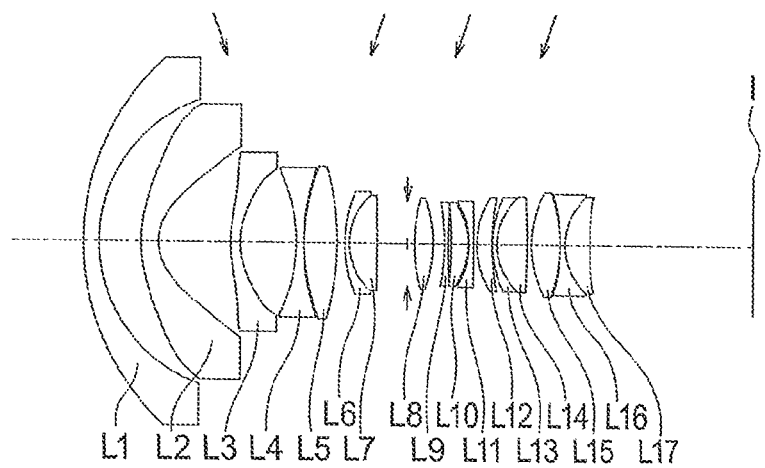
FIG. 2A
FIG. 2B
FIG. 2C

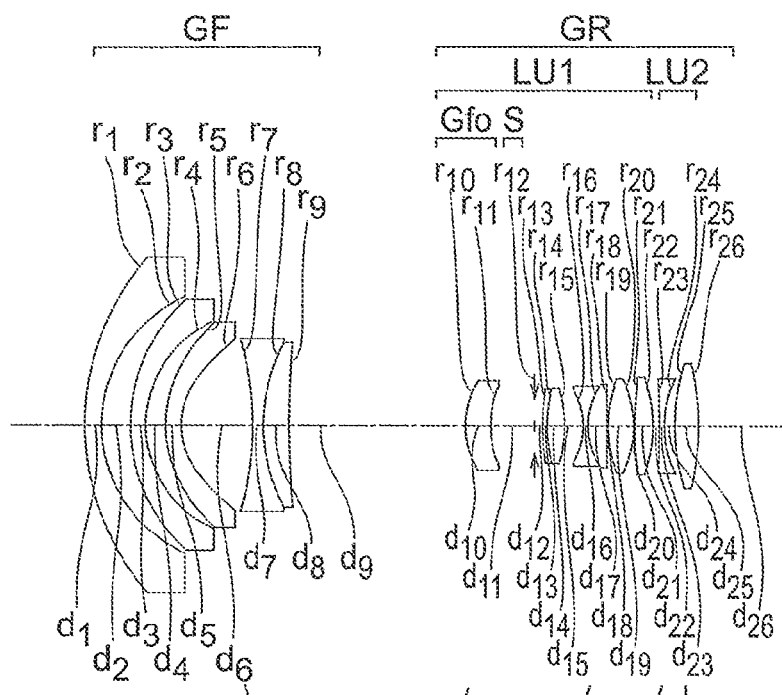
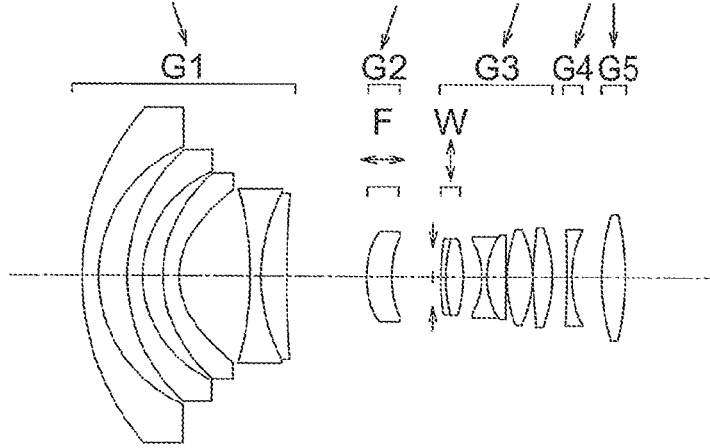
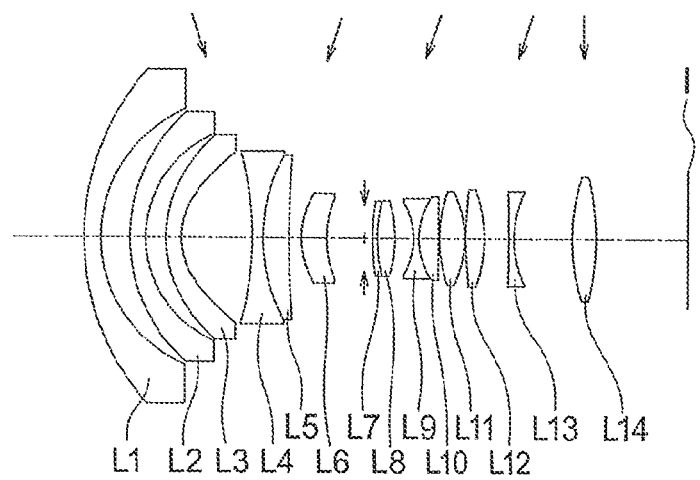
FIG. 3A
FIG. 3B
FIG. 3C

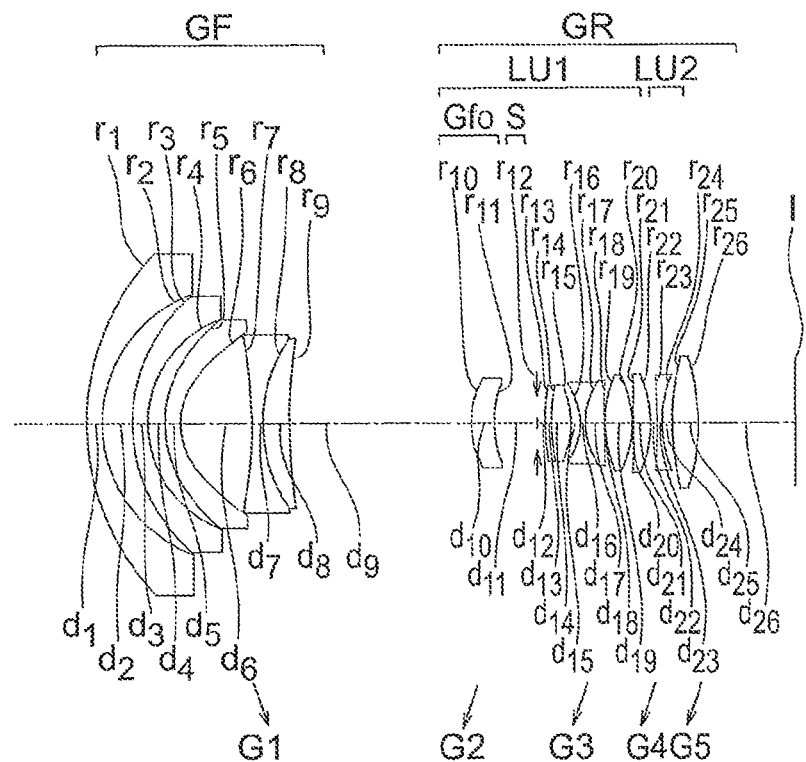
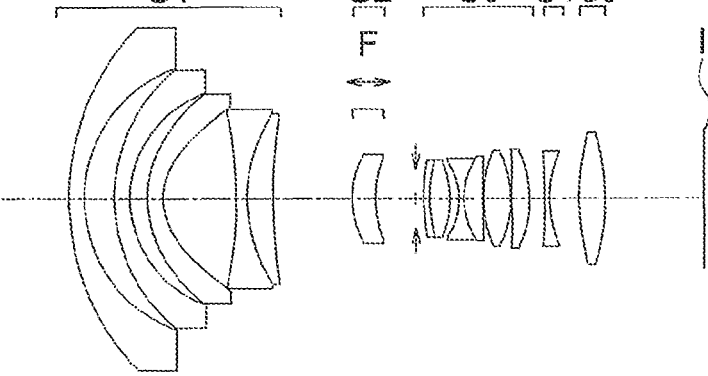
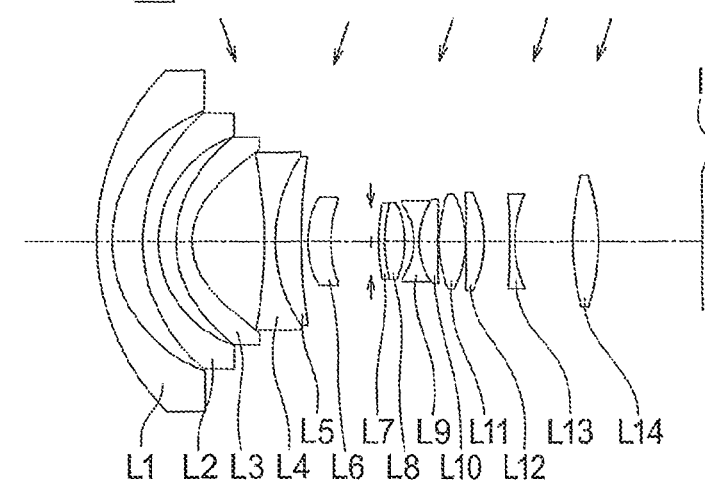
FIG. 13A
FIG. 13B
FIG. 13C

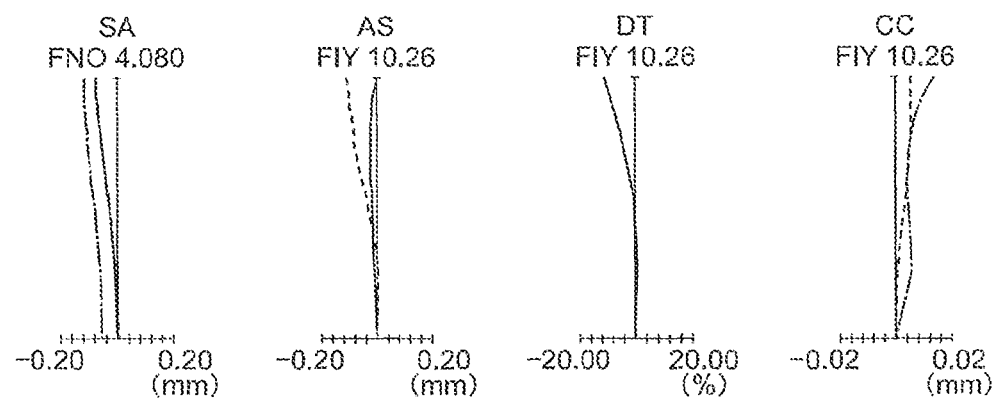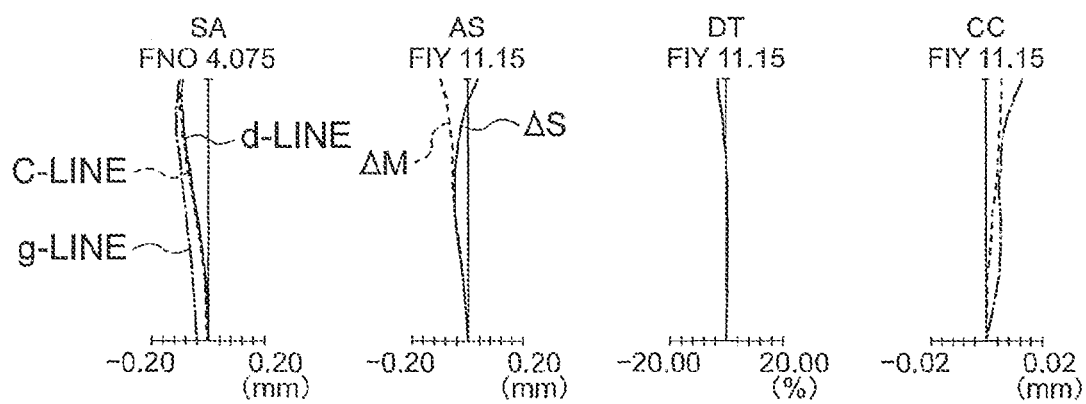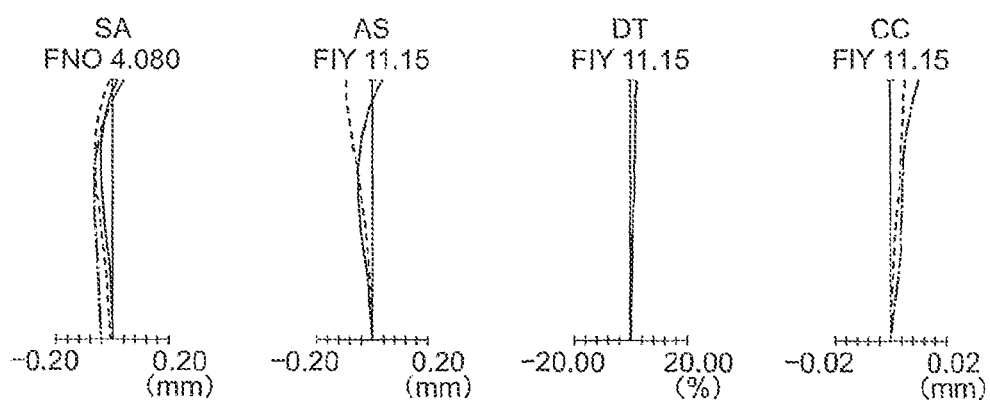

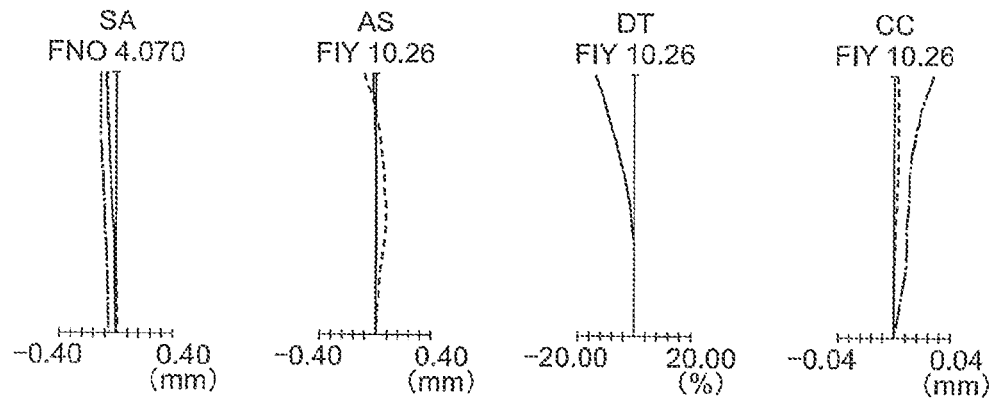
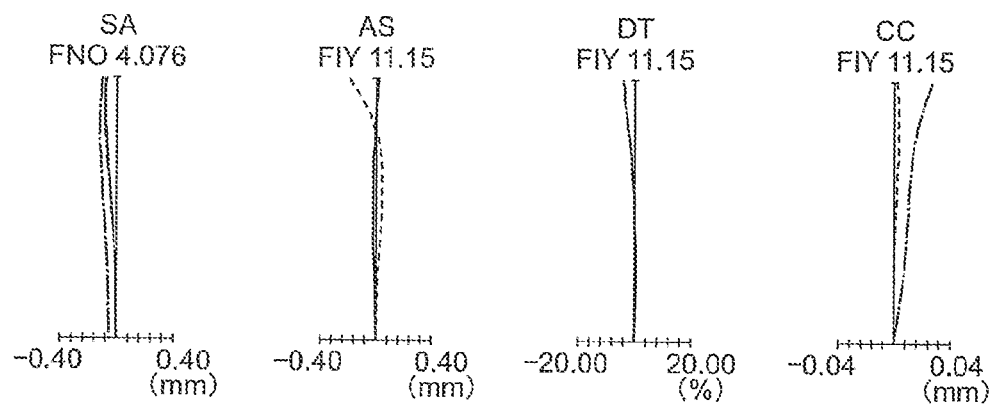
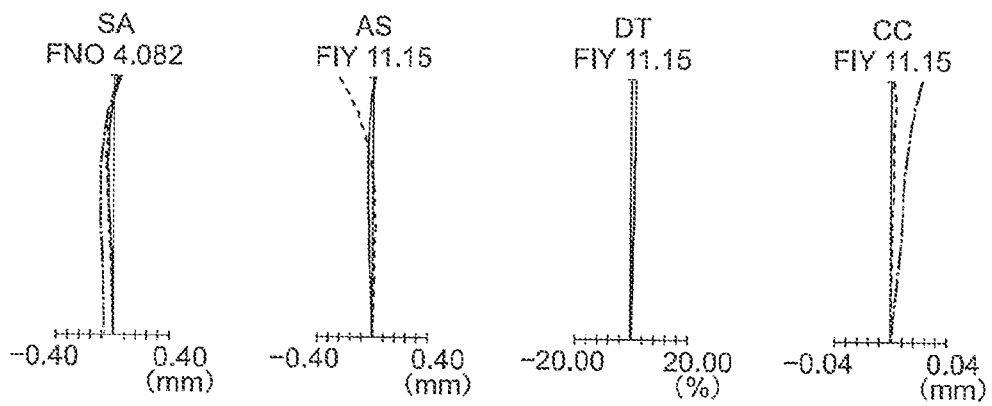

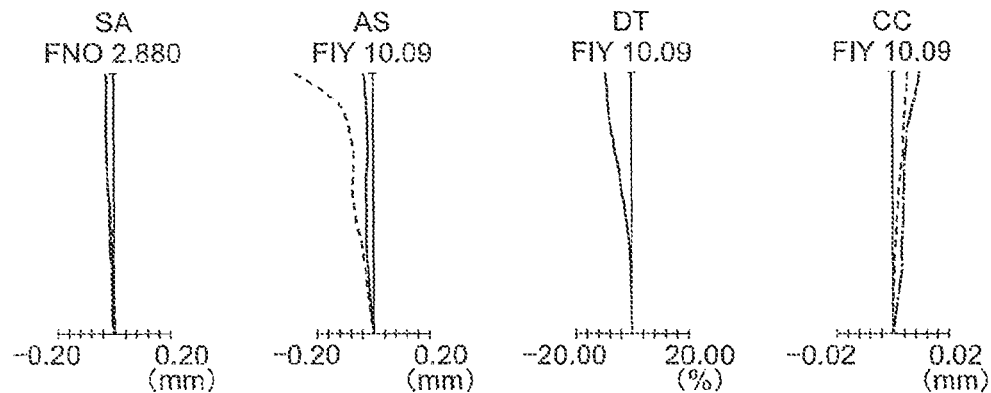
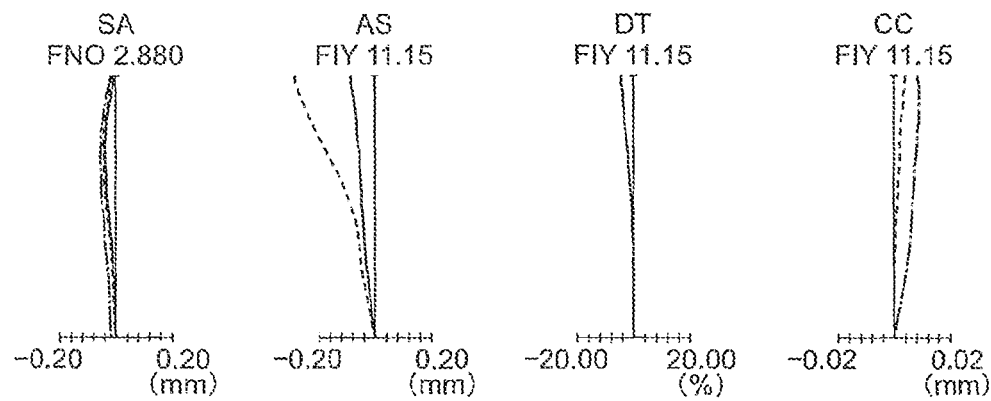
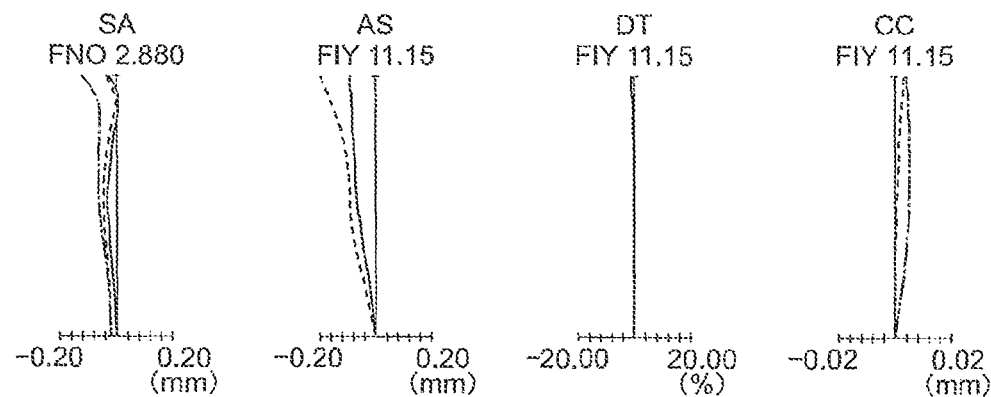

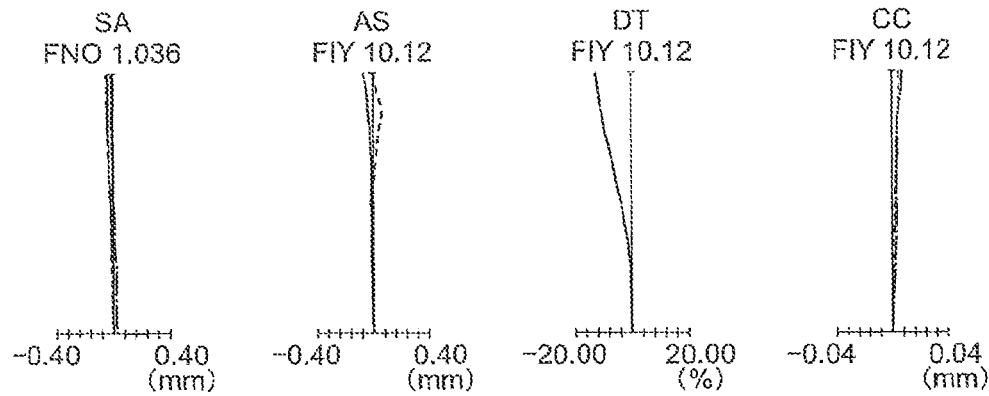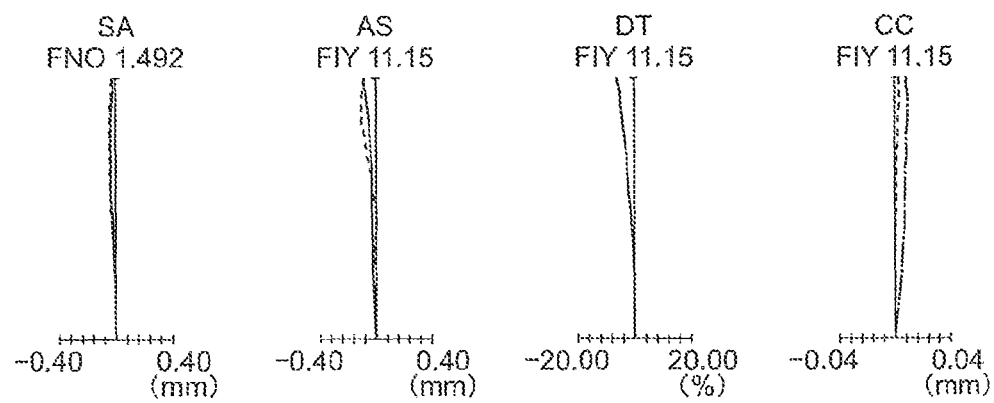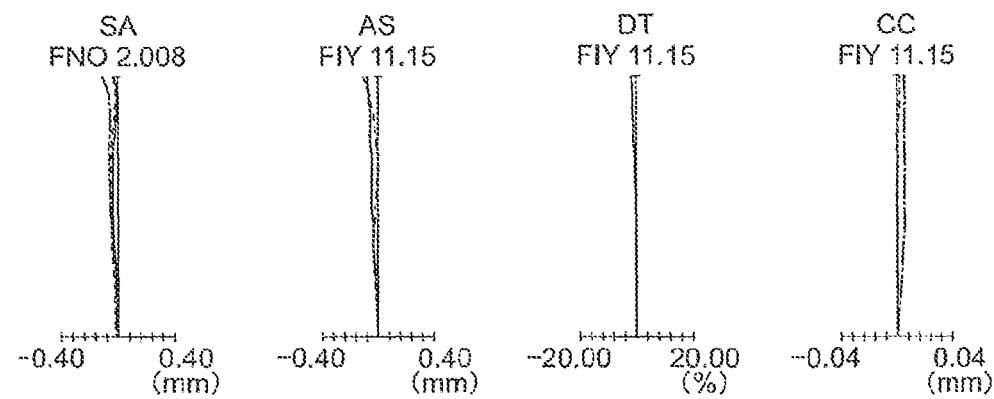

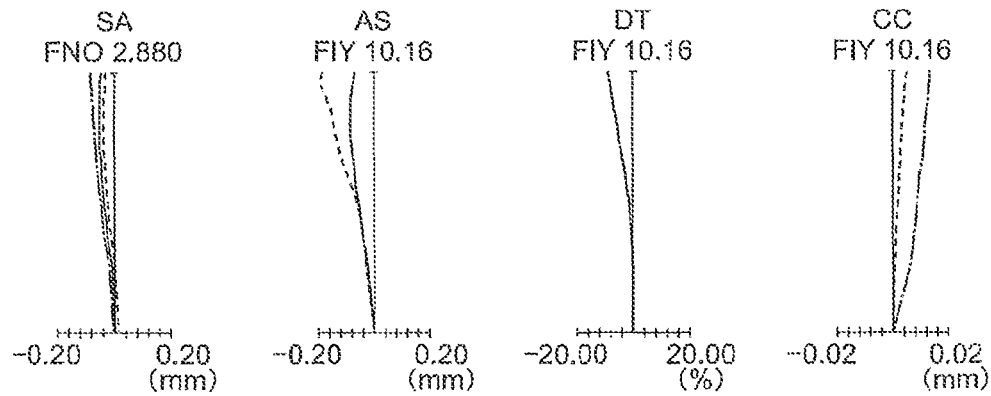
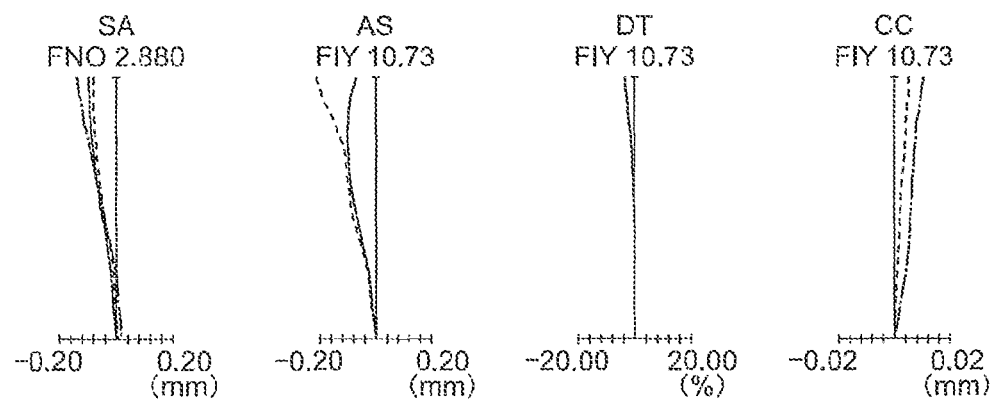
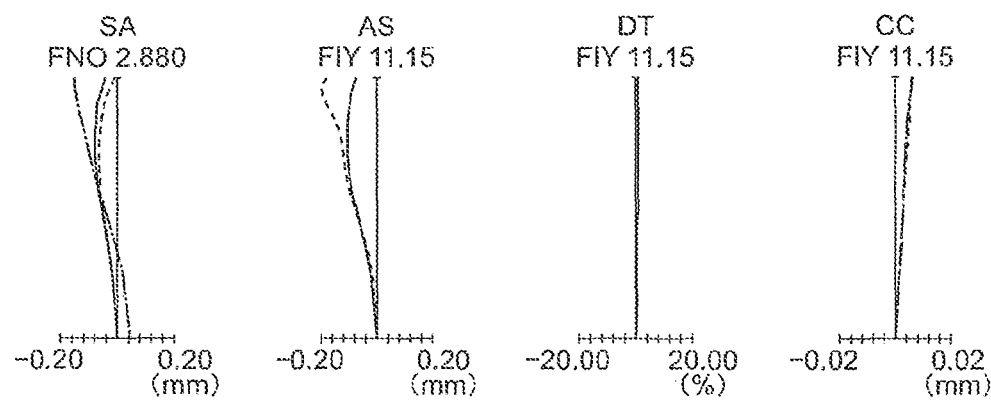

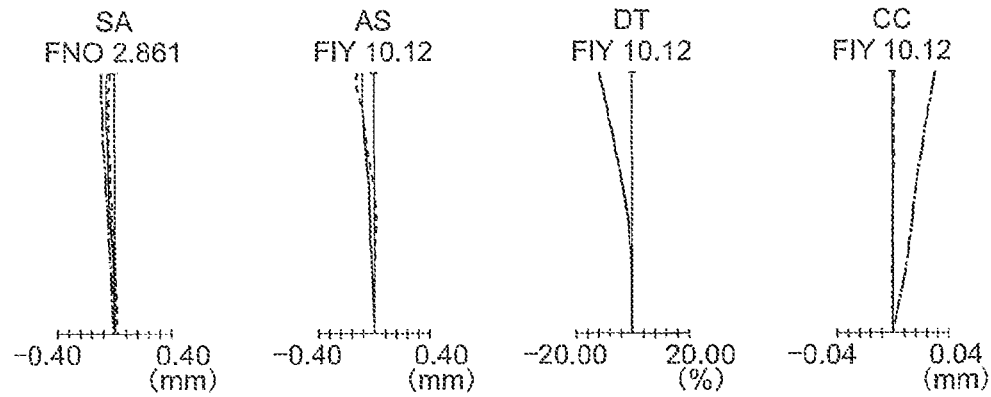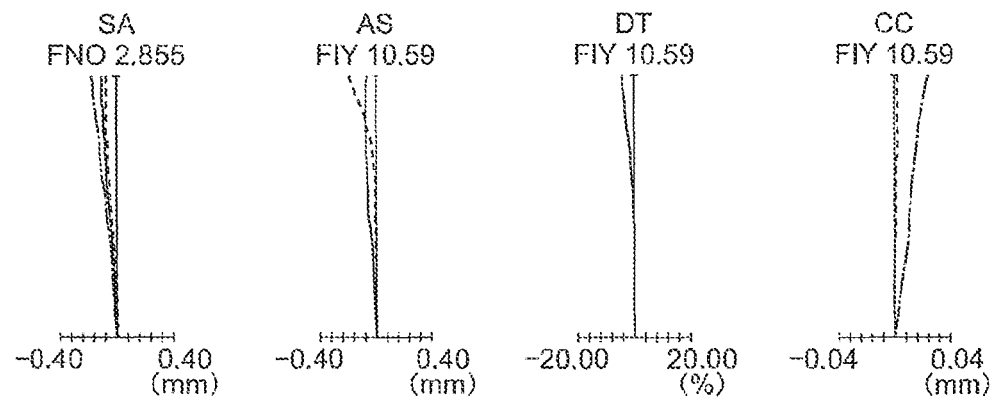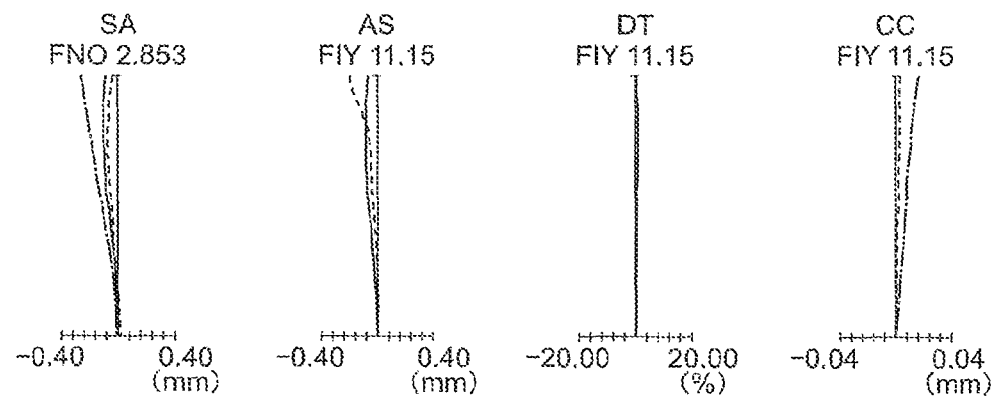

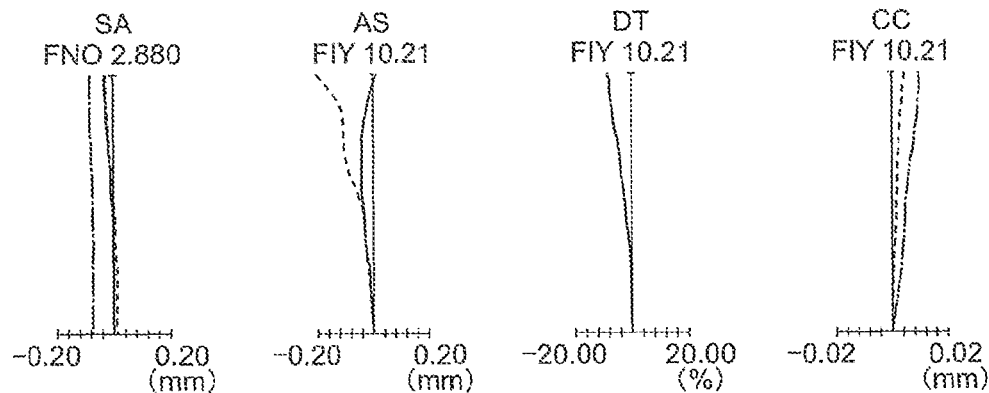
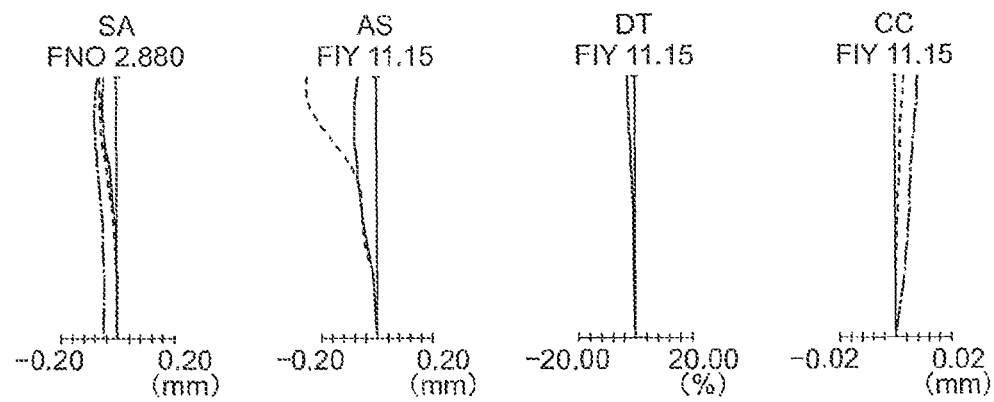
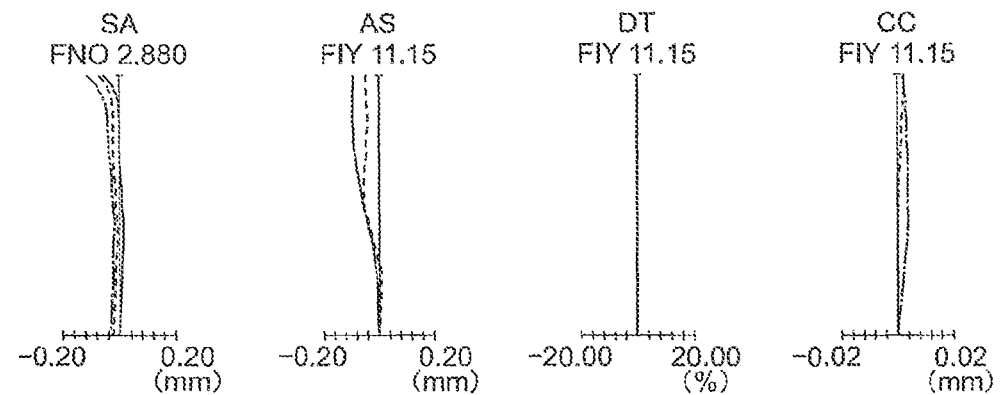

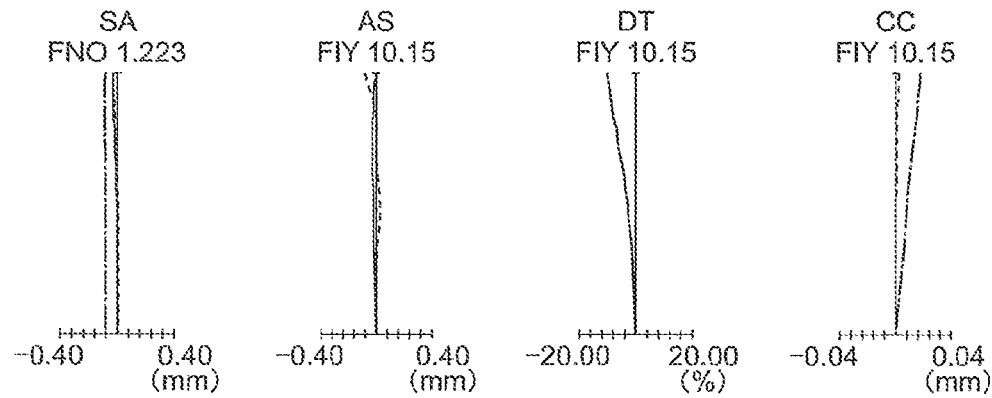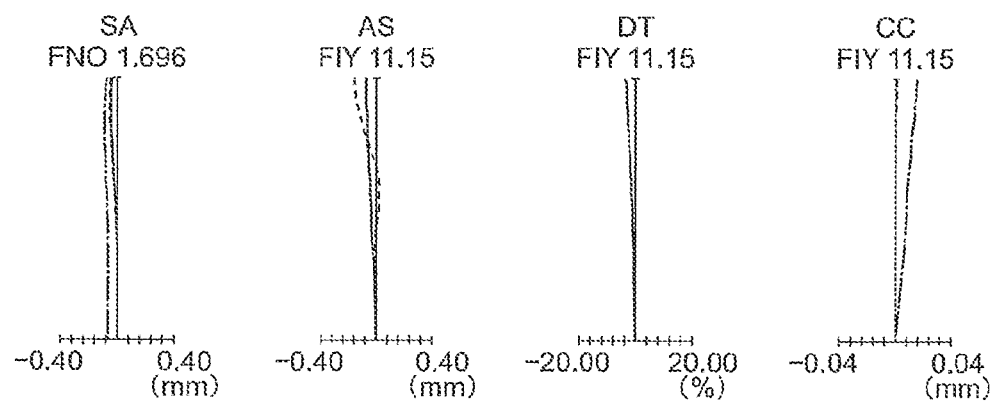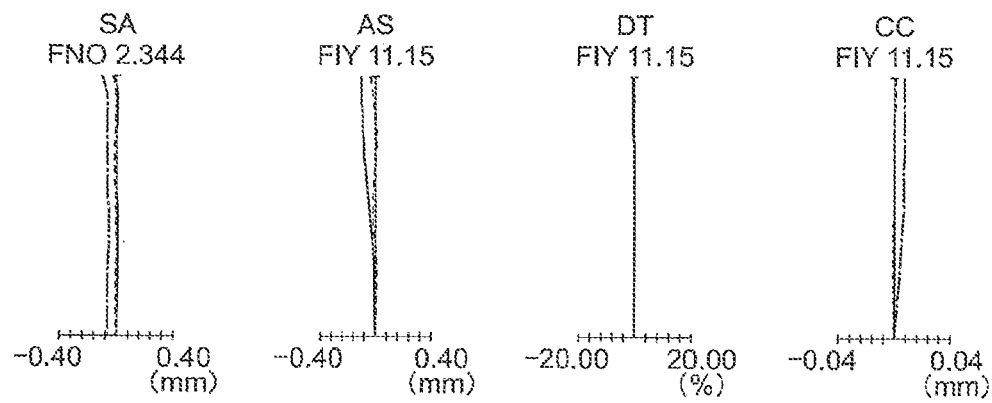

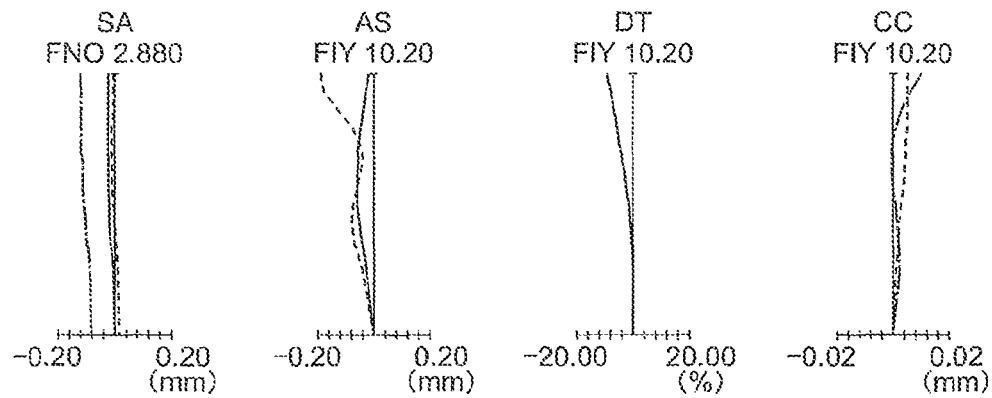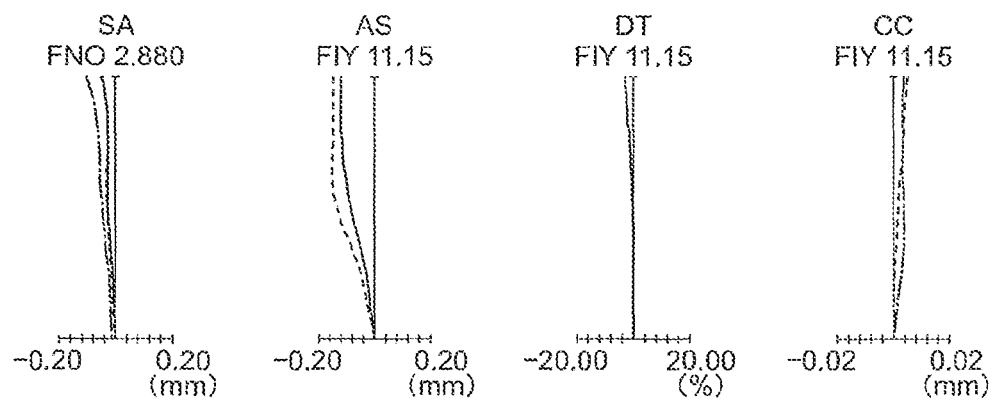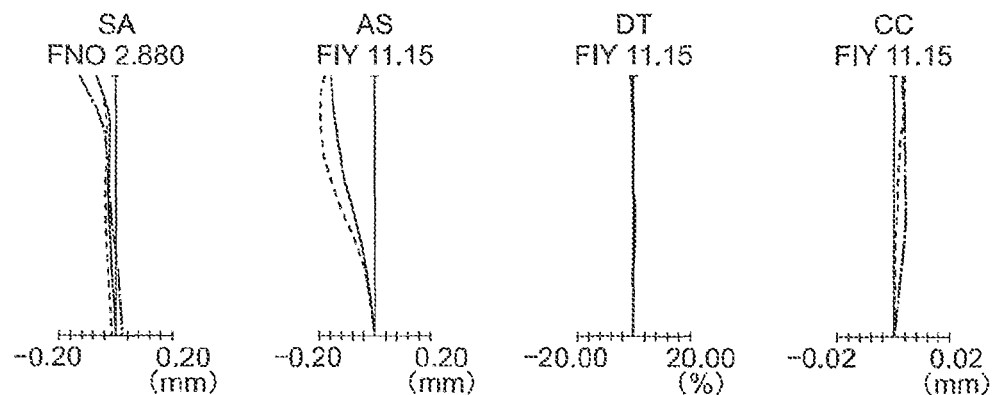

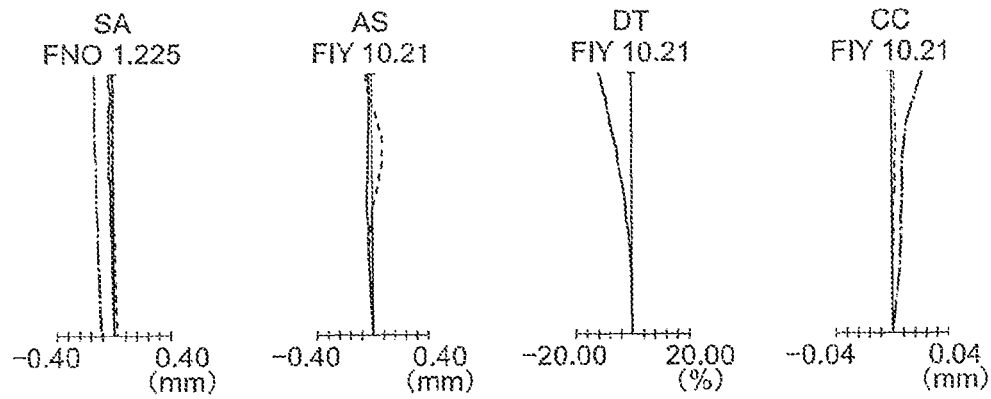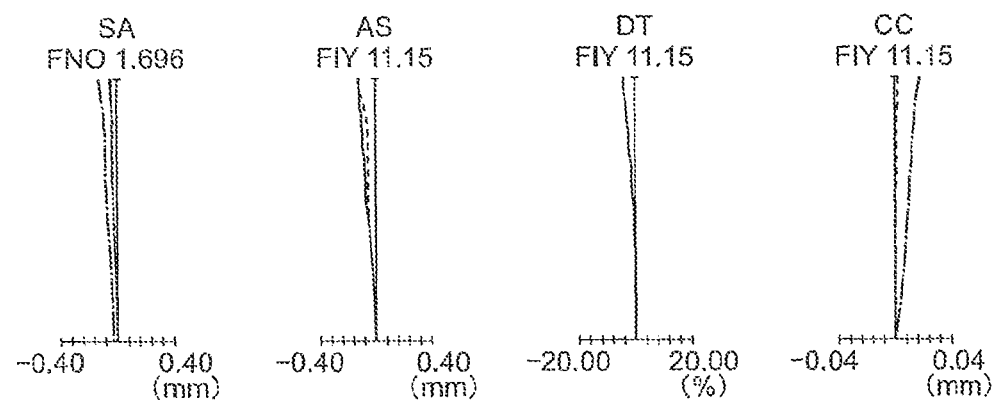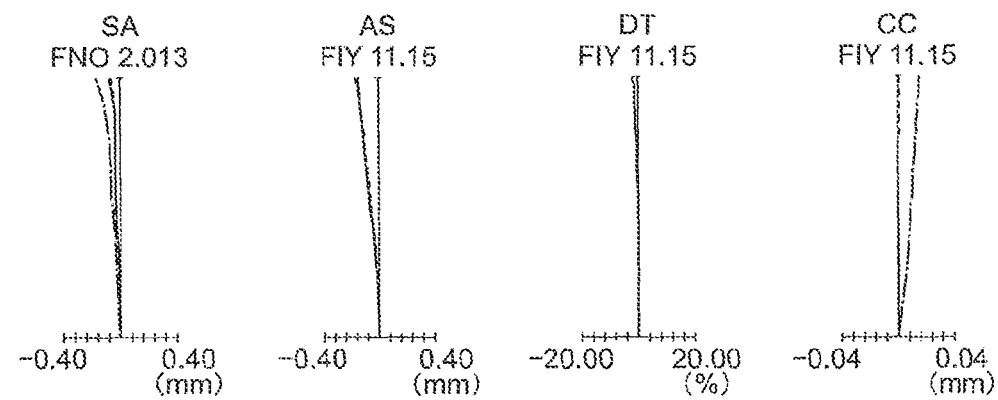

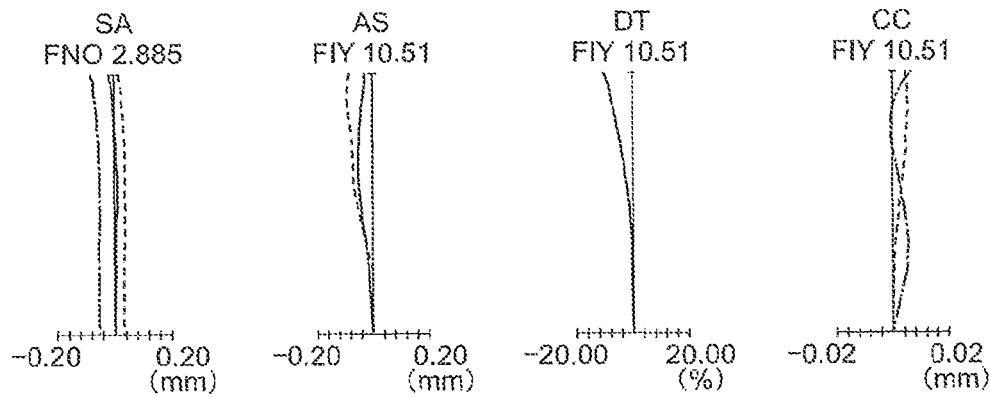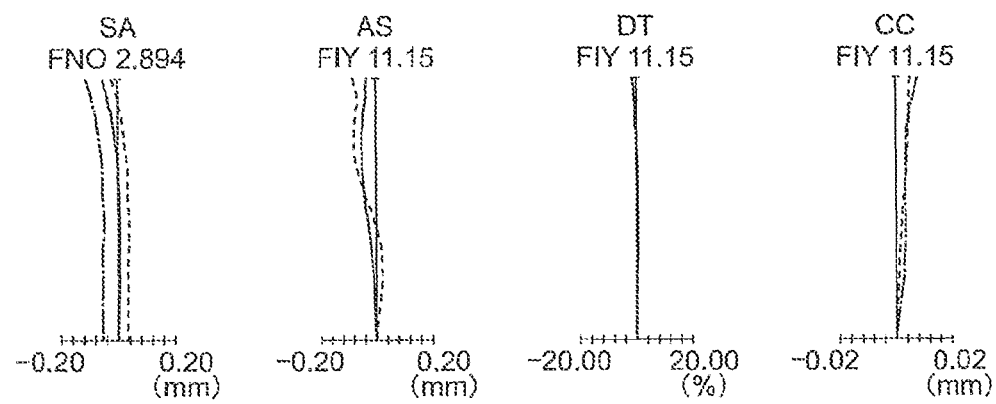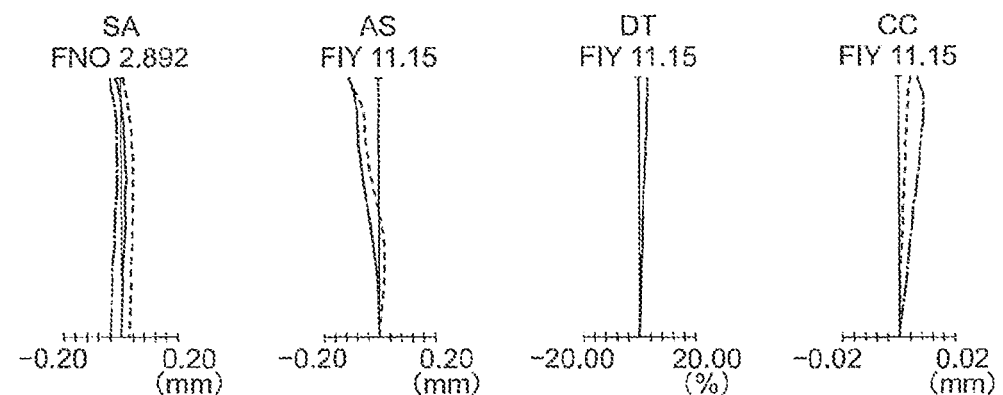

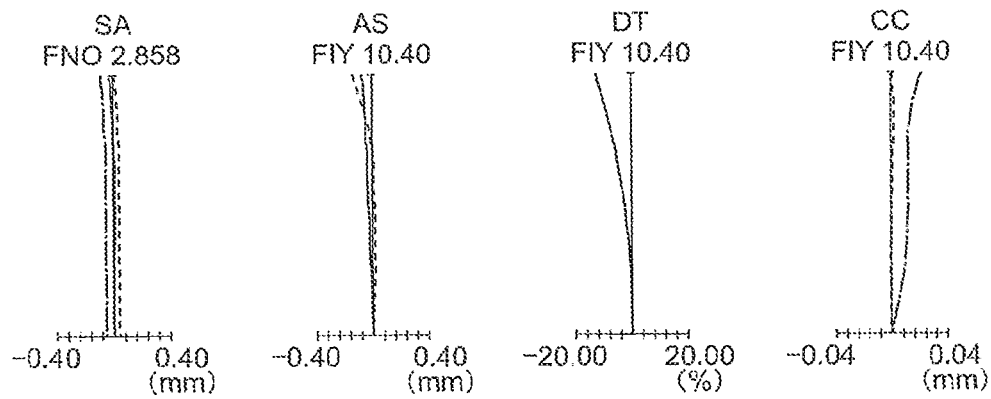
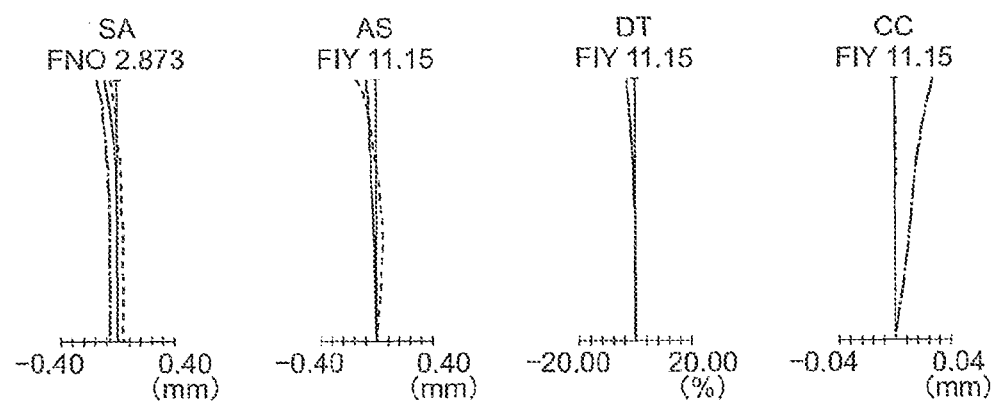
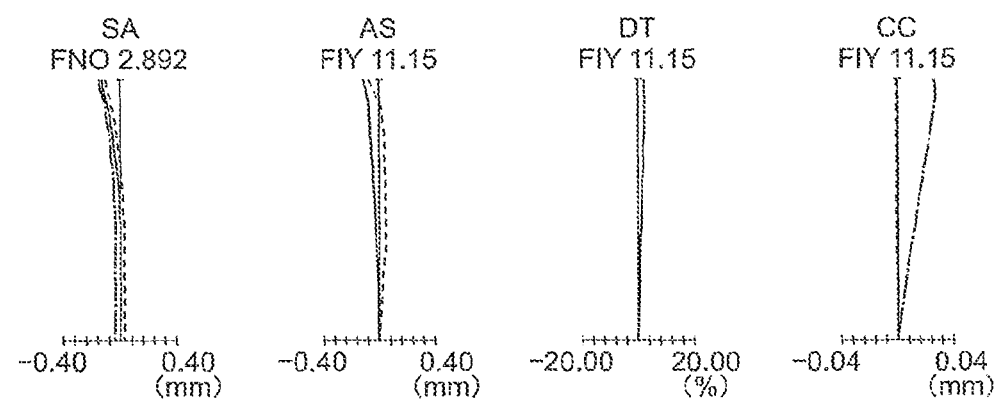

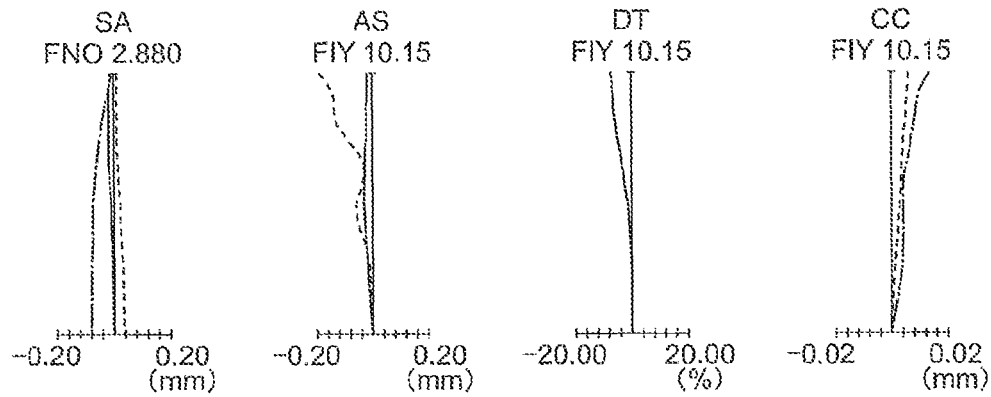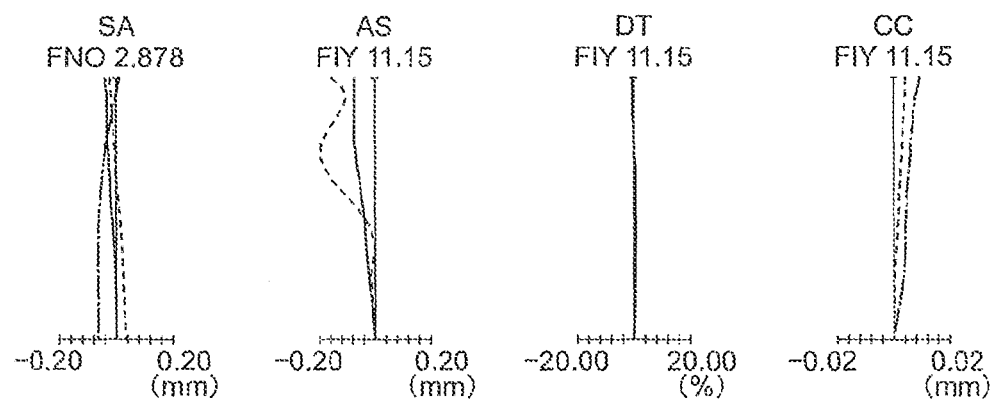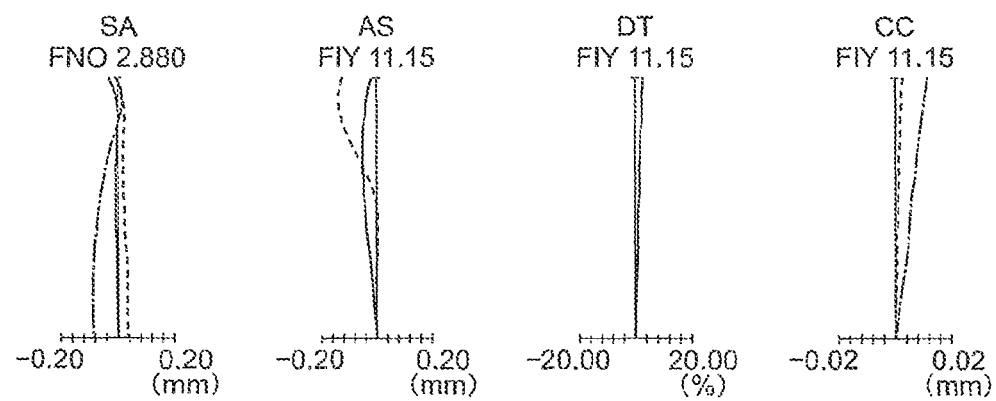

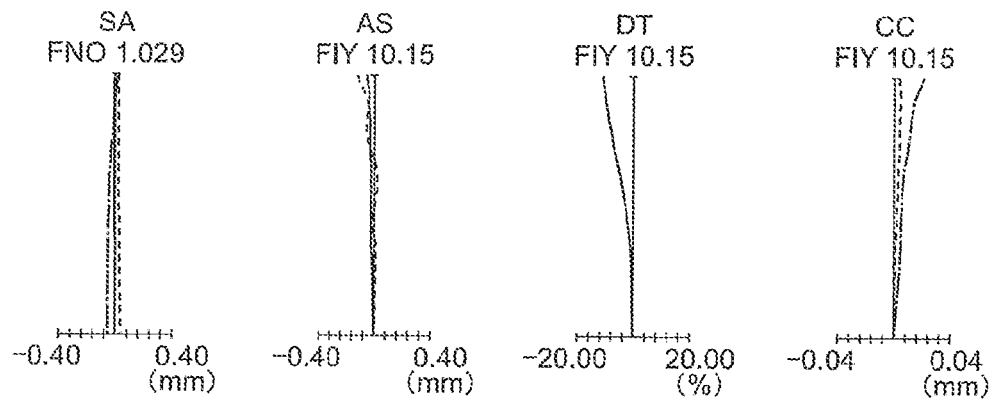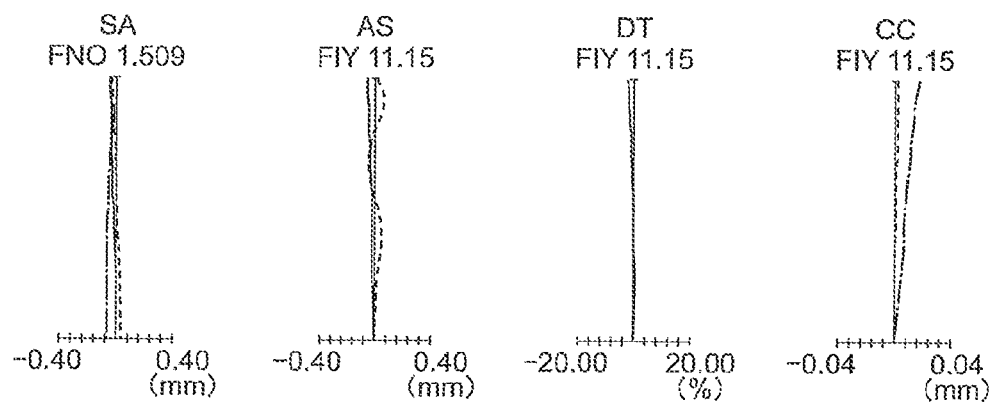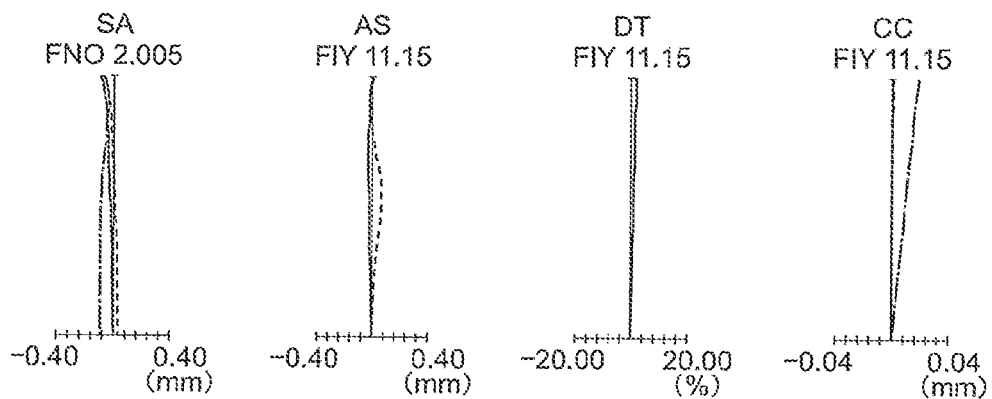

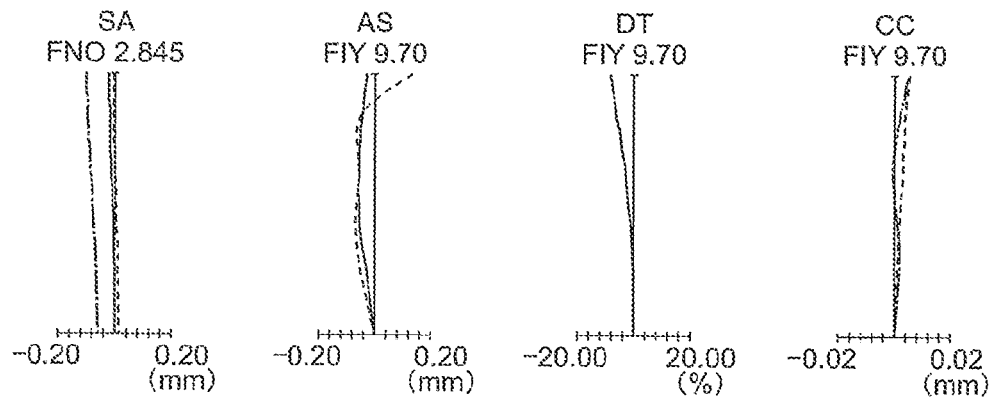
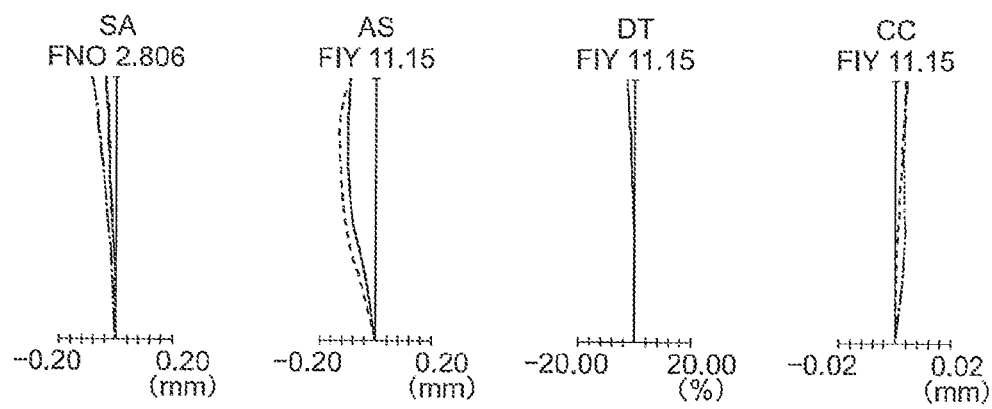
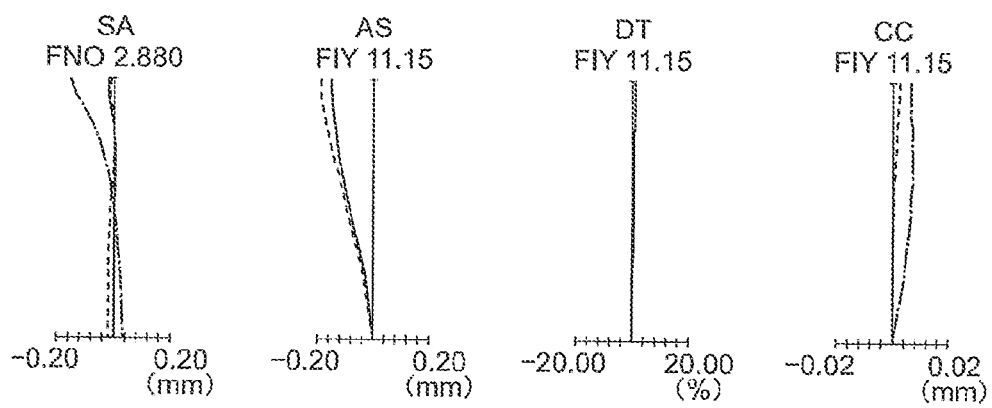

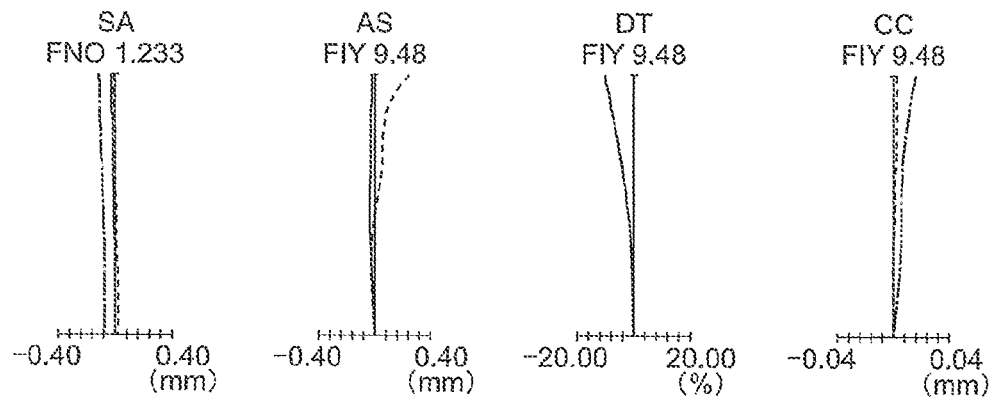
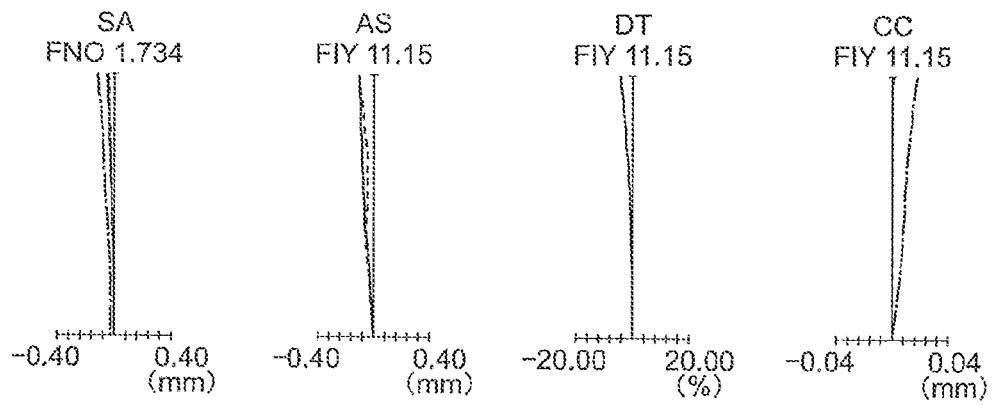
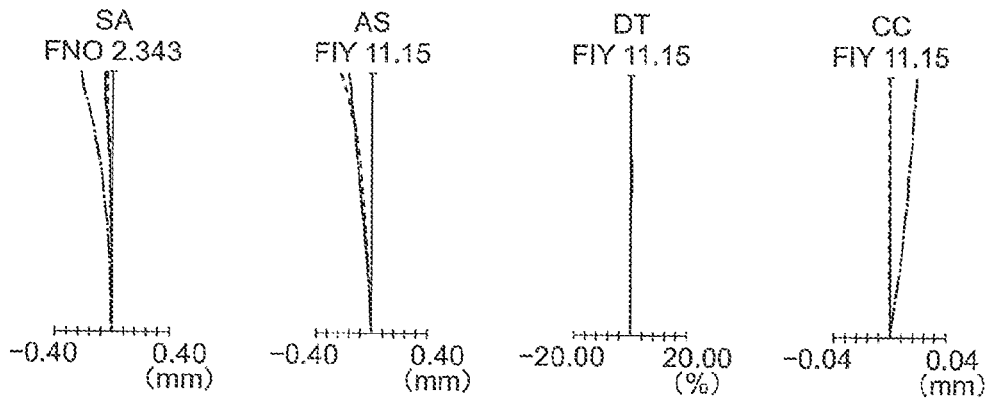

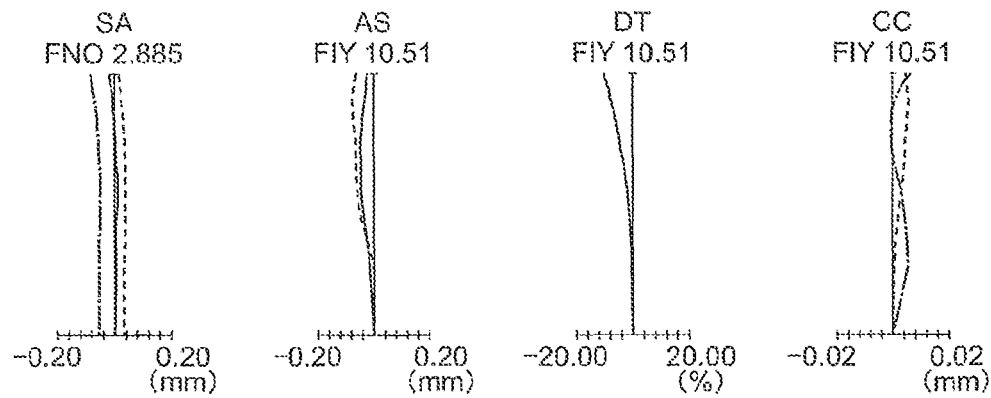
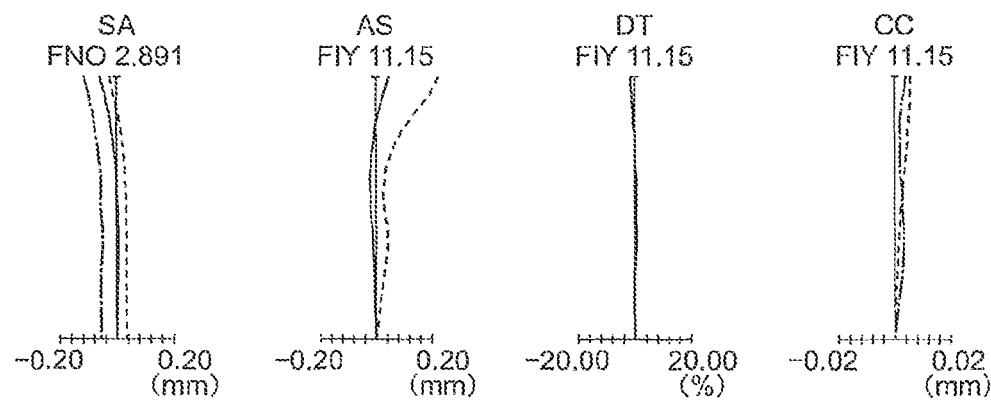
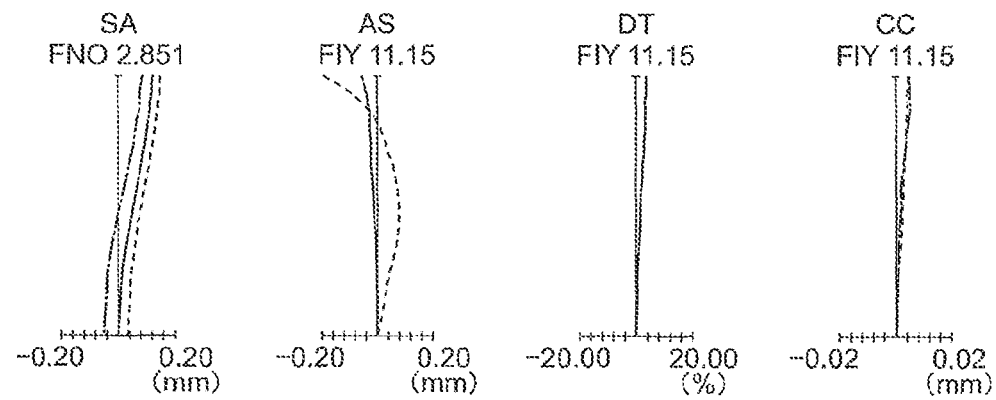

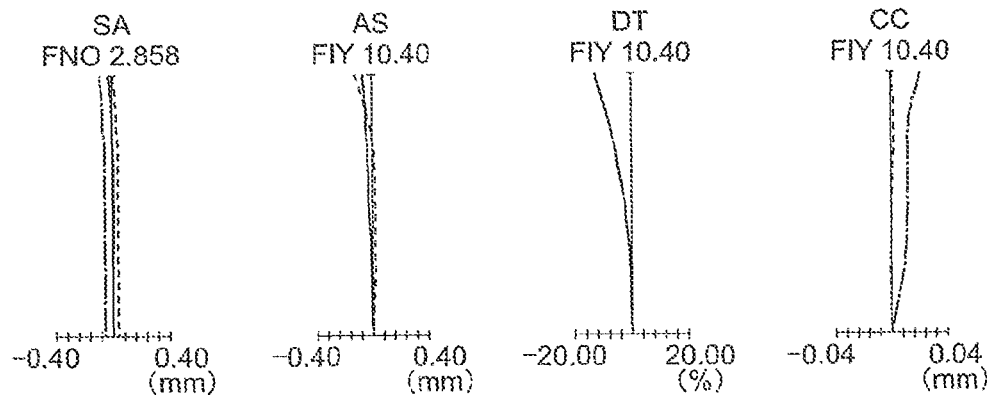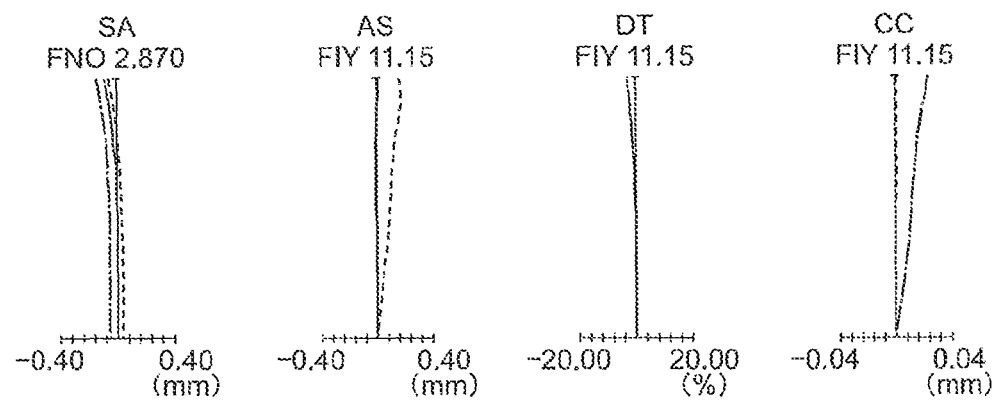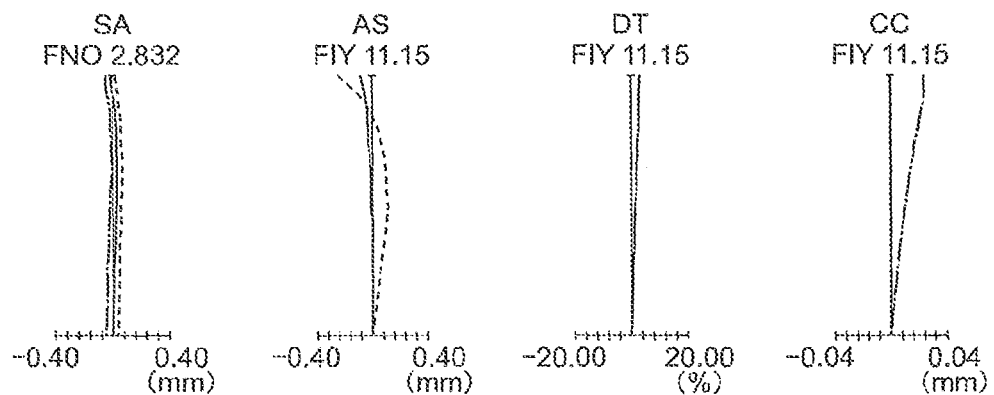

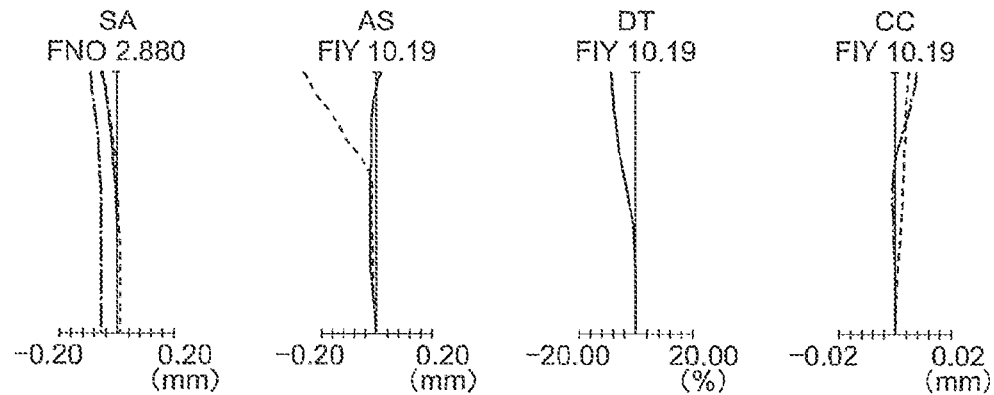
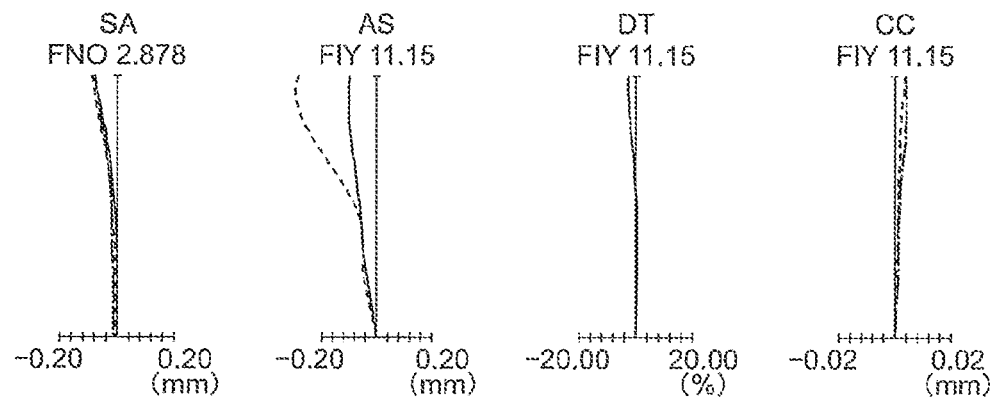
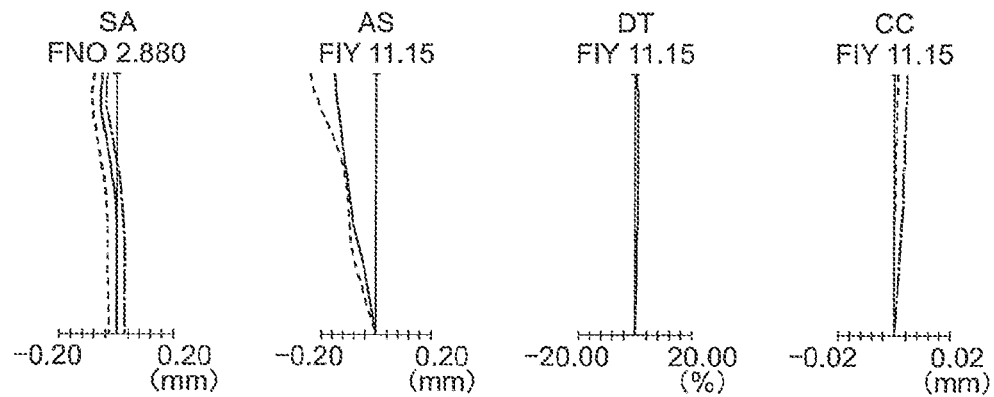

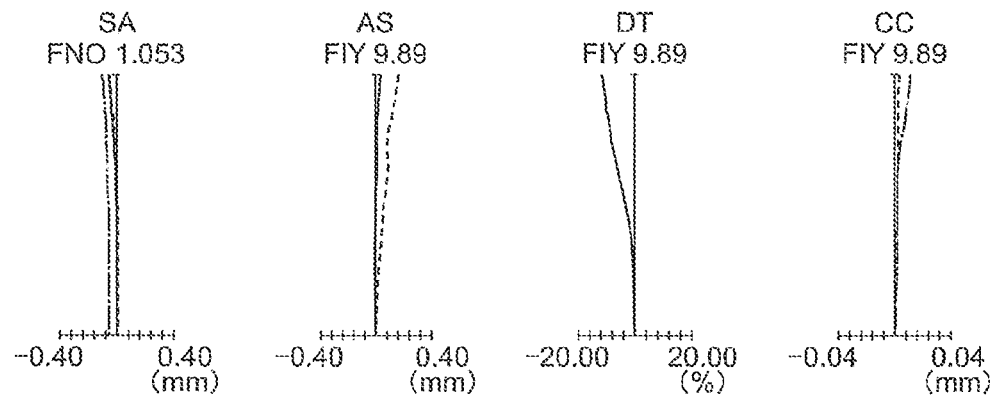
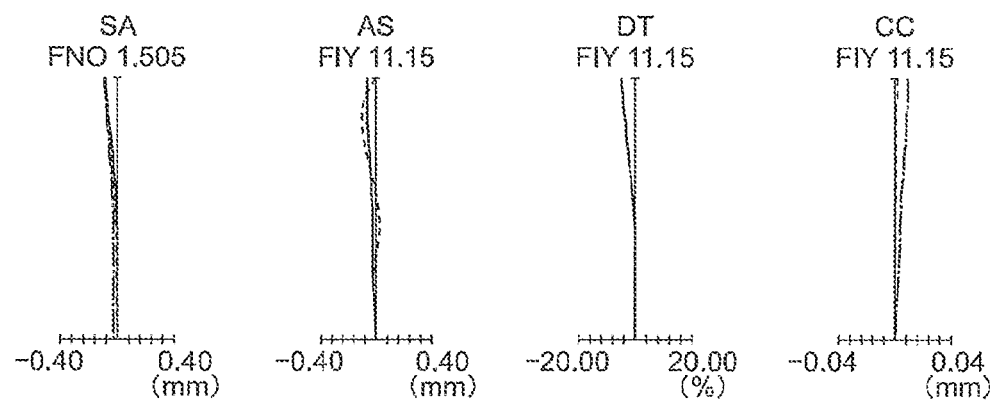
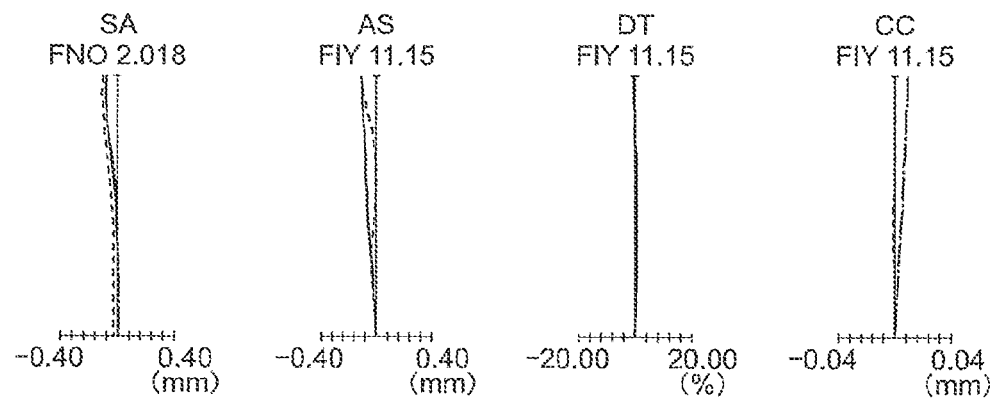

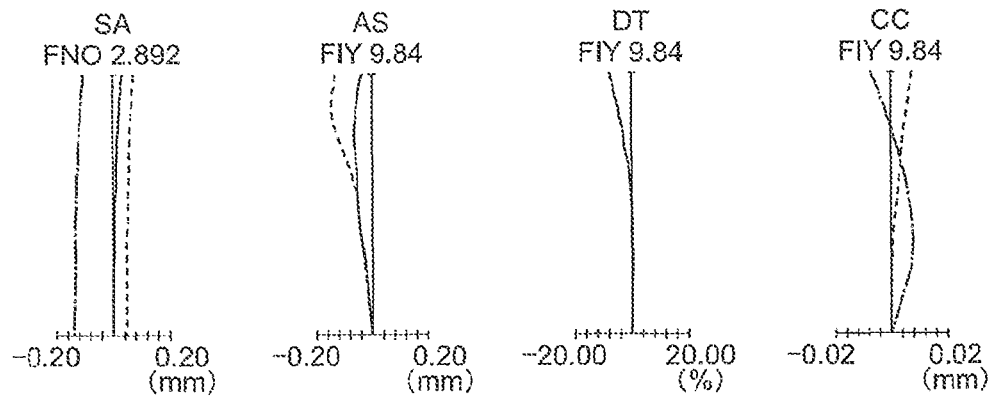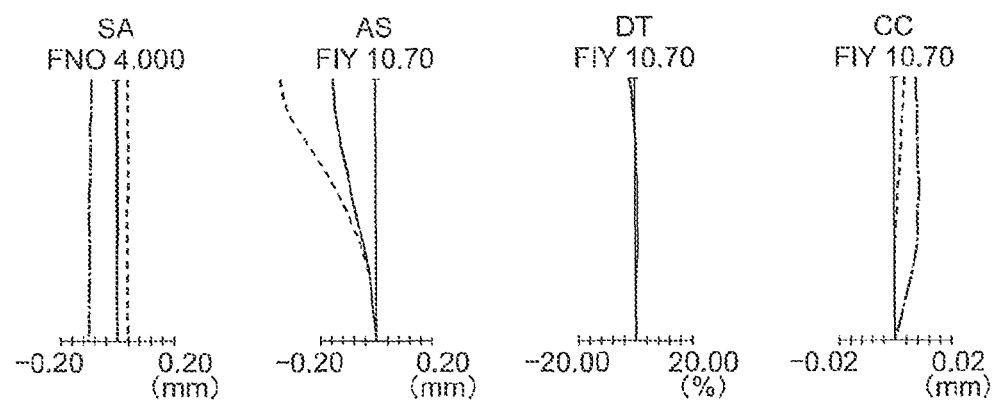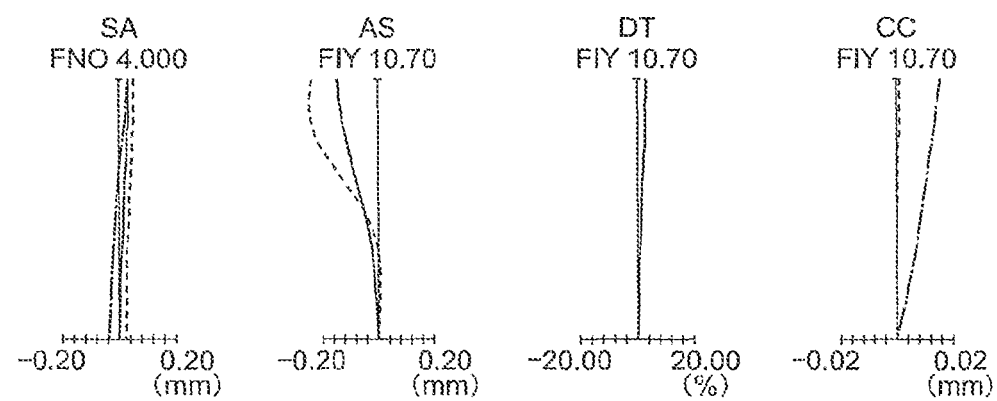

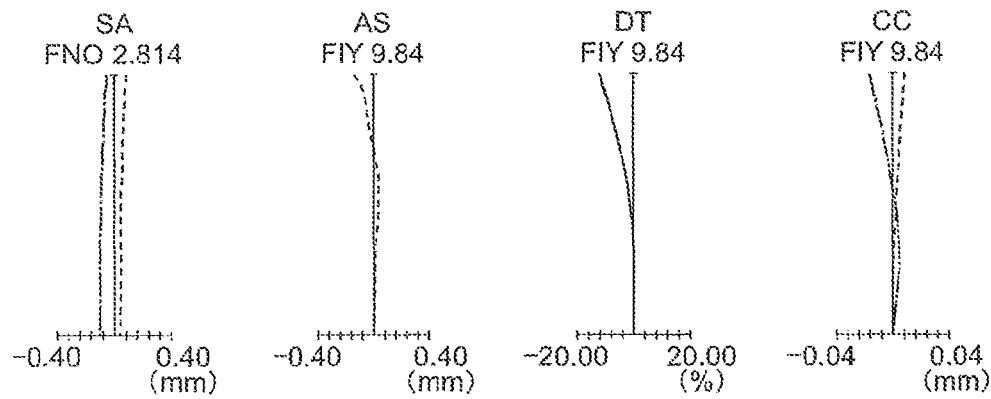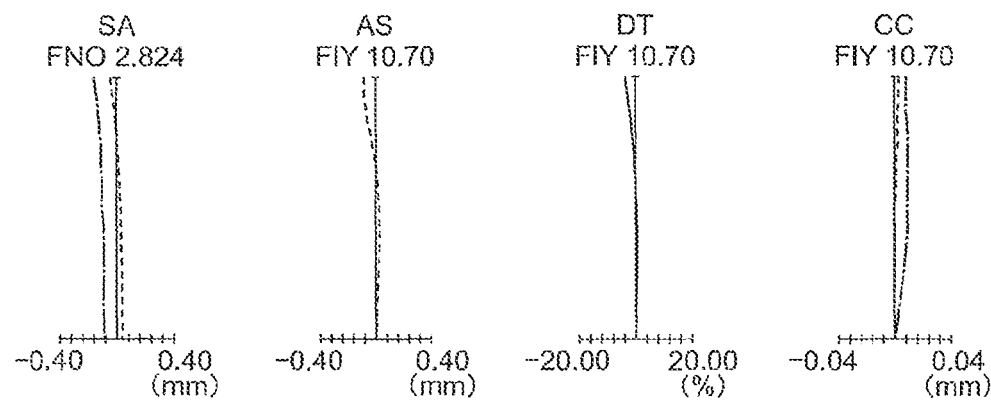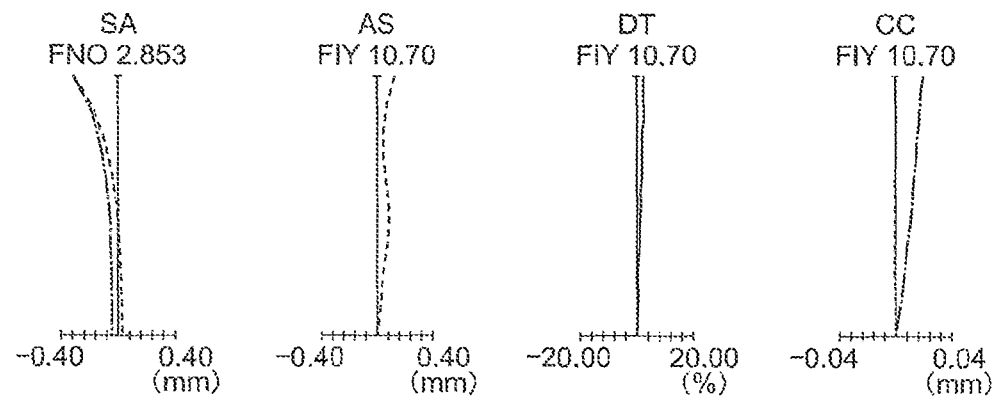

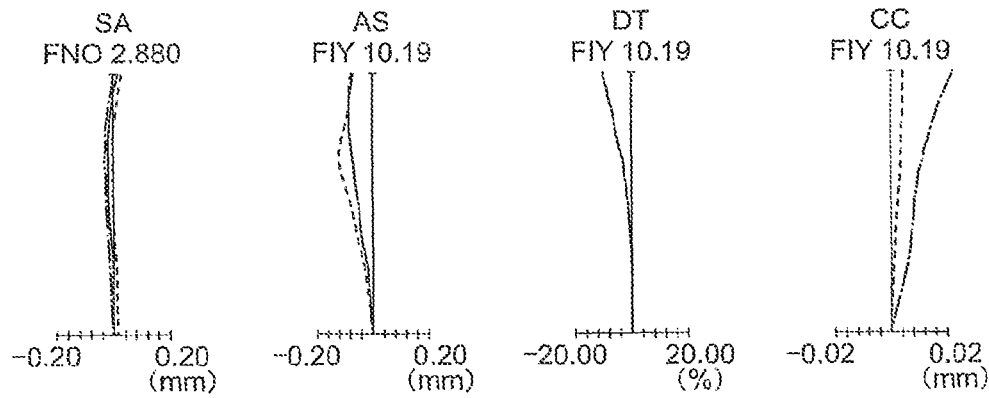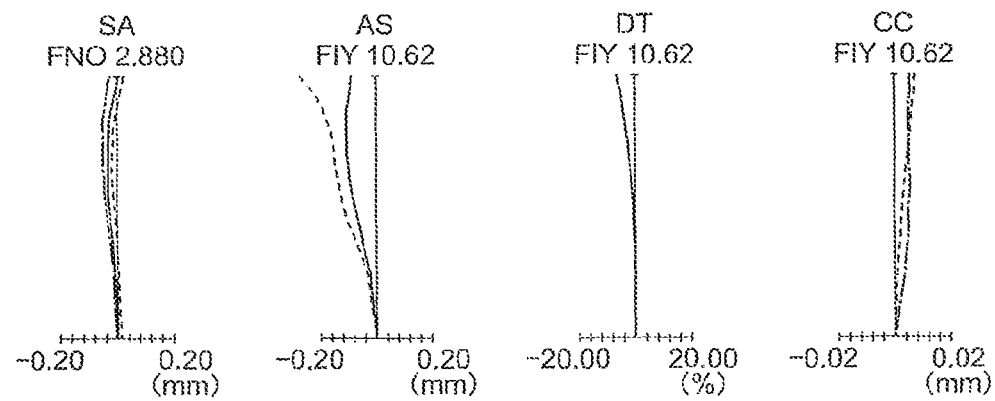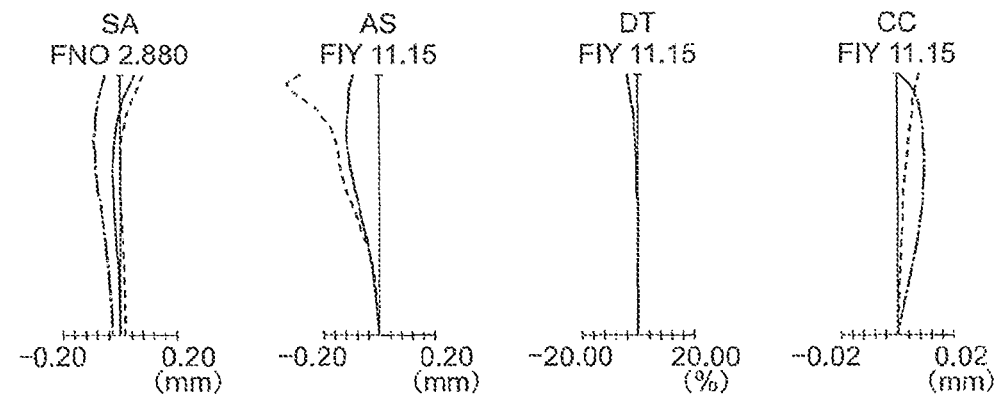

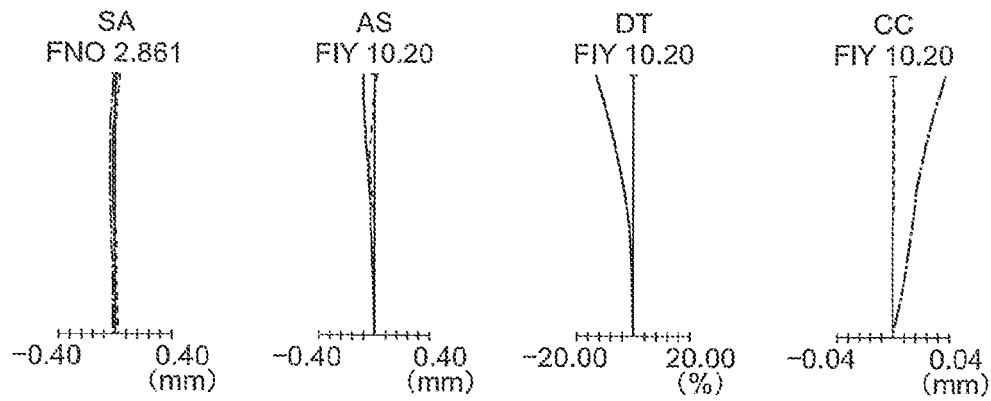
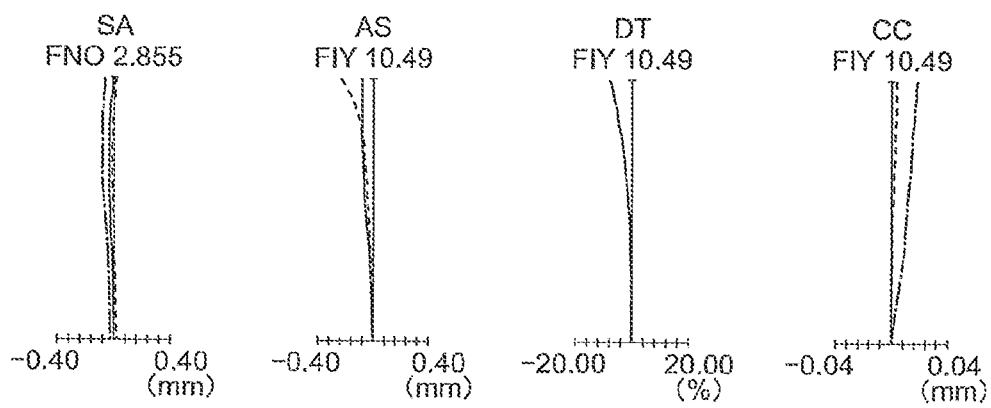
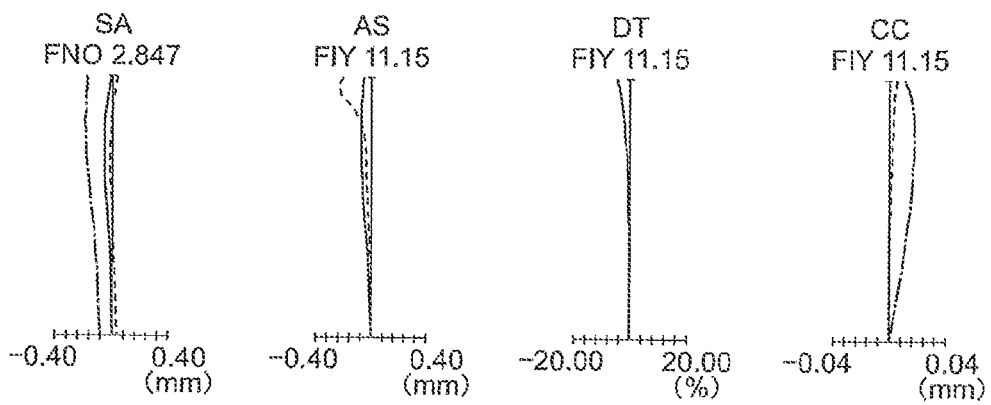

SA
FNO 2.880

-0.20  0.20
(mm)

AS
FIY 10.12

-0.20  0.20
(mm)

DT
FIY 10.12

-20.00  20.00
(%)

CC
FIY 10.12

-0.02  0.02
(mm)

SA
FNO 2.880

-0.20  0.20
(mm)

AS
FIY 11.15

-0.20  0.20
(mm)

DT
FIY 11.15

-20.00  20.00
(%)

CC
FIY 11.15

-0.02  0.02
(mm)

SA
FNO 2.880

-0.20  0.20
(mm)

AS
FIY 11.15

-0.20  0.20
(mm)

DT
FIY 11.15

-20.00  20.00
(%)

CC
FIY 11.15

-0.02  0.02
(mm)

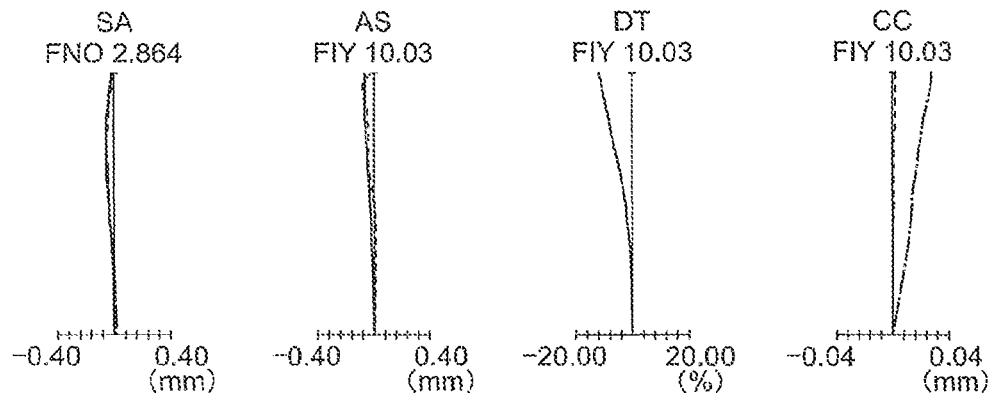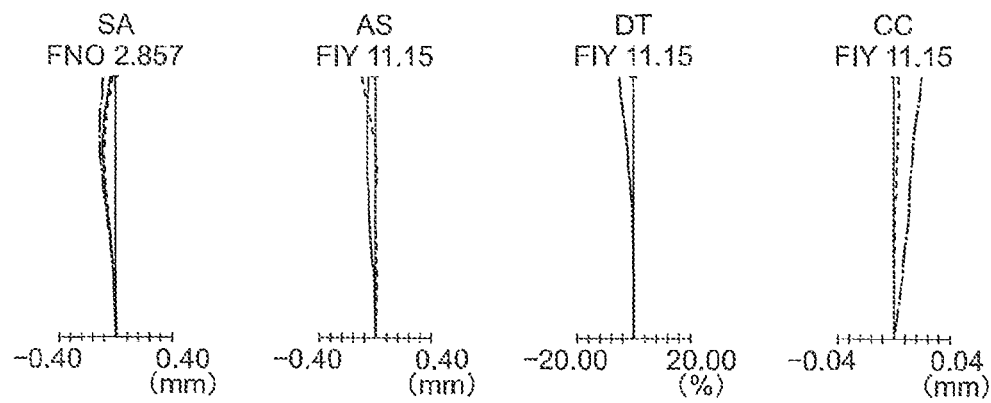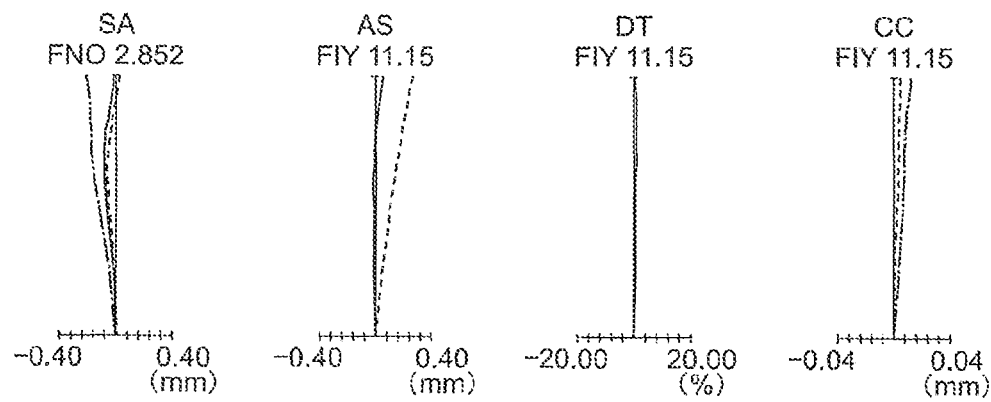

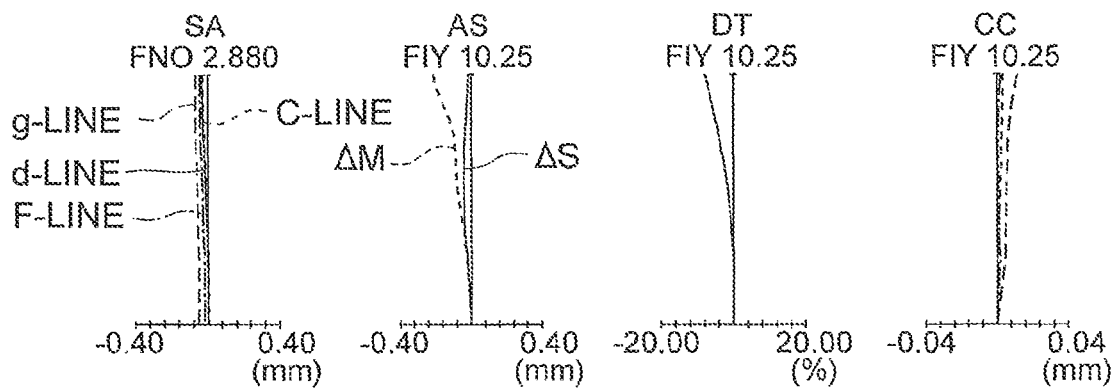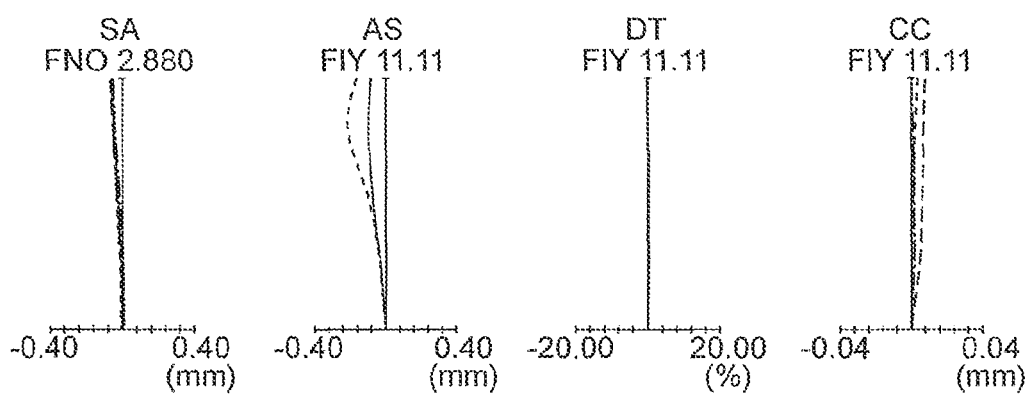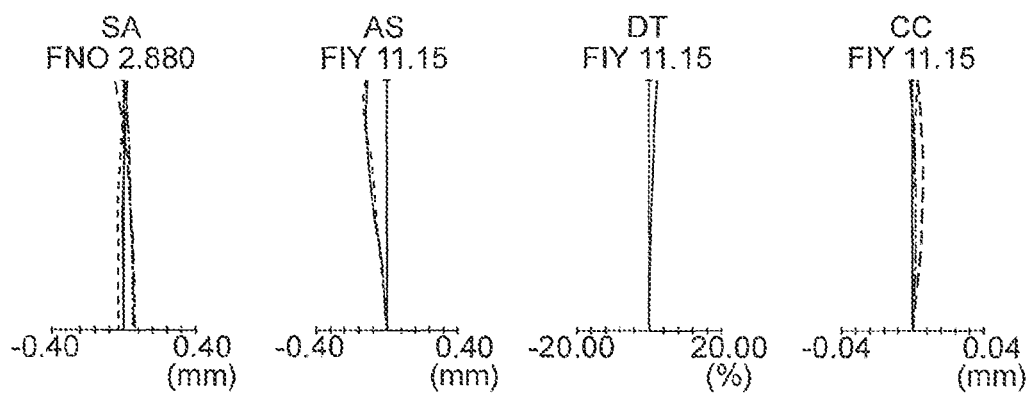

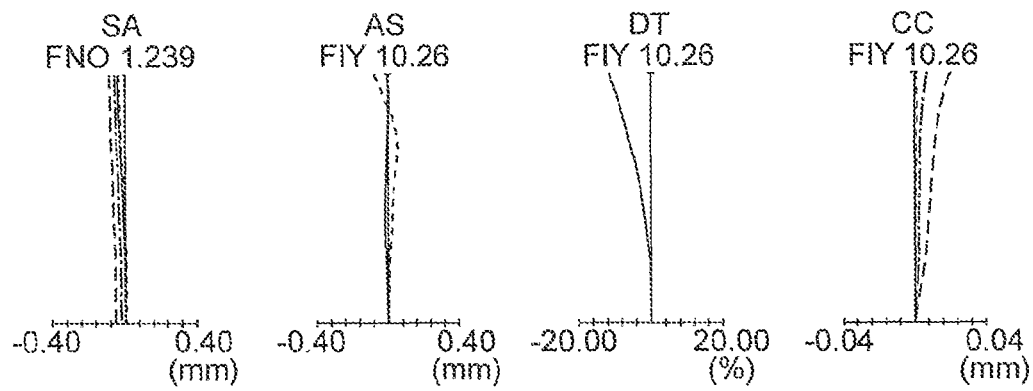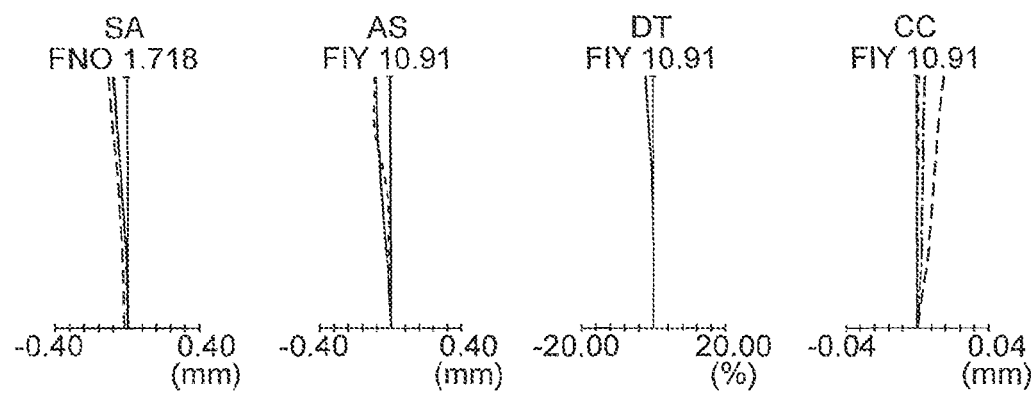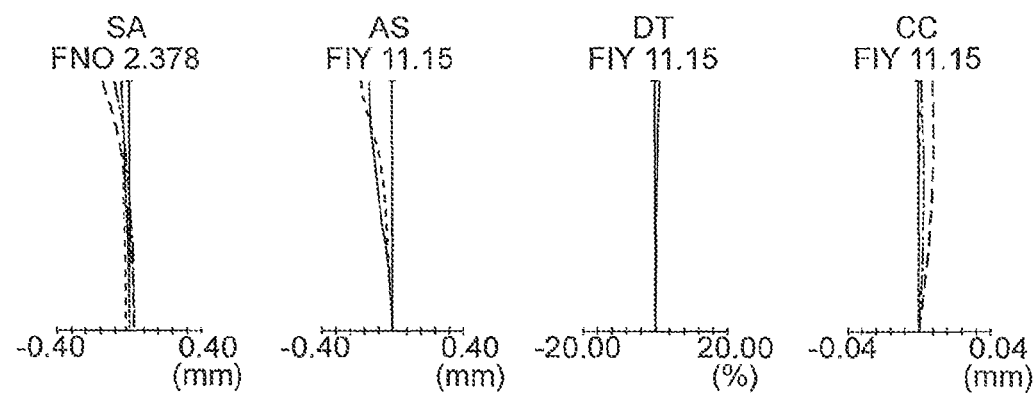

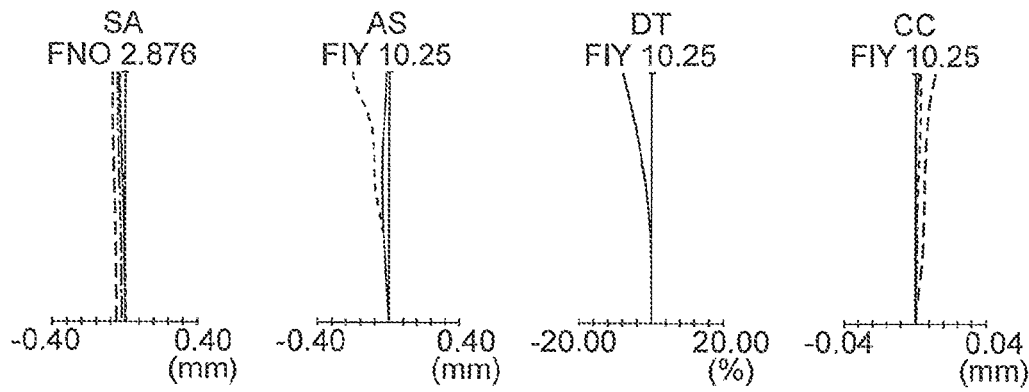
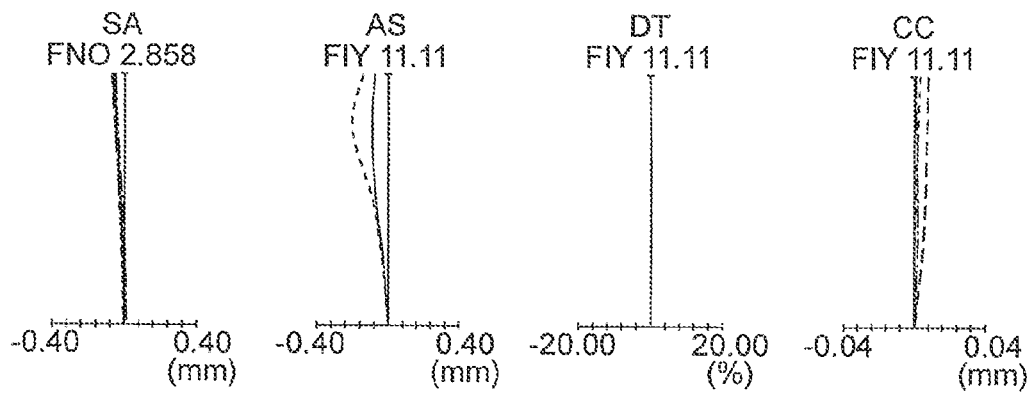
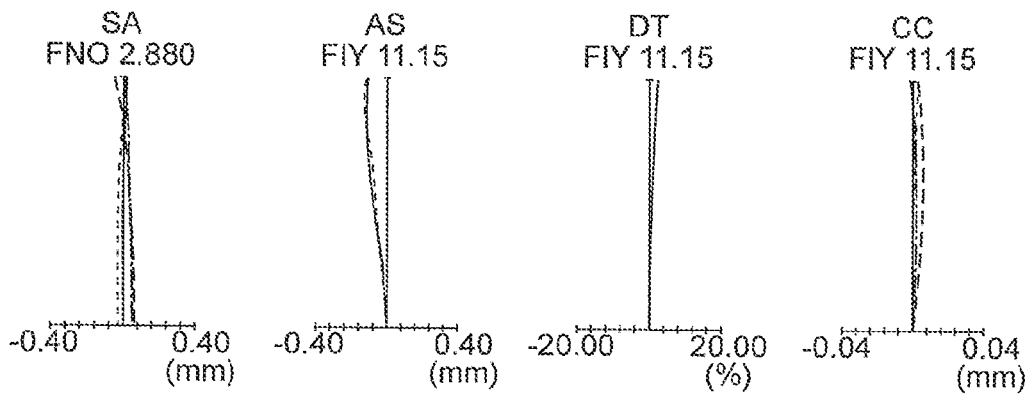

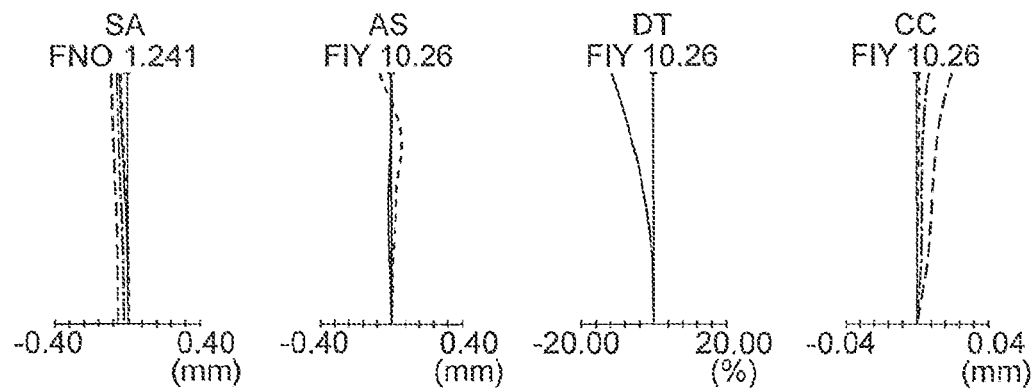
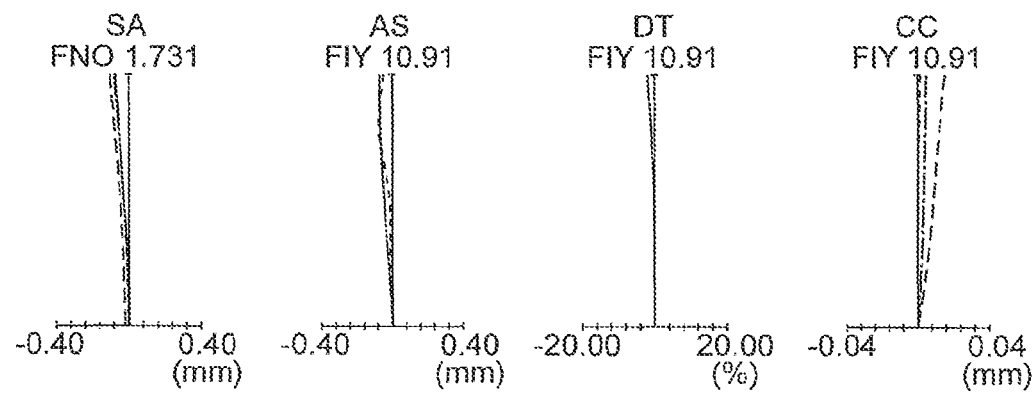
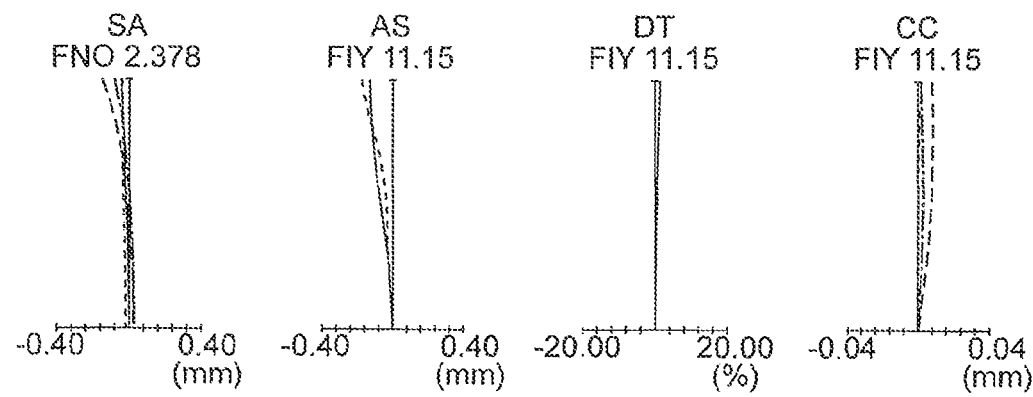

SA
FNO 2.880
-0.40  0.40
(mm)

AS
FIY 10.30
-0.40  0.40
(mm)

DT
FIY 10.30
-20.00  20.00
(%)

CC
FIY 10.30
-0.04  0.04
(mm)

SA
FNO 2.880
-0.40  0.40
(mm)

AS
FIY 11.15
-0.40  0.40
(mm)

DT
FIY 11.15
-20.00  20.00
(%)

CC
FIY 11.15
-0.04  0.04
(mm)

SA
FNO 2.880
-0.40  0.40
(mm)

AS
FIY 11.15
-0.40  0.40
(mm)

DT
FIY 11.15
-20.00  20.00
(%)

CC
FIY 11.15
-0.04  0.04
(mm)

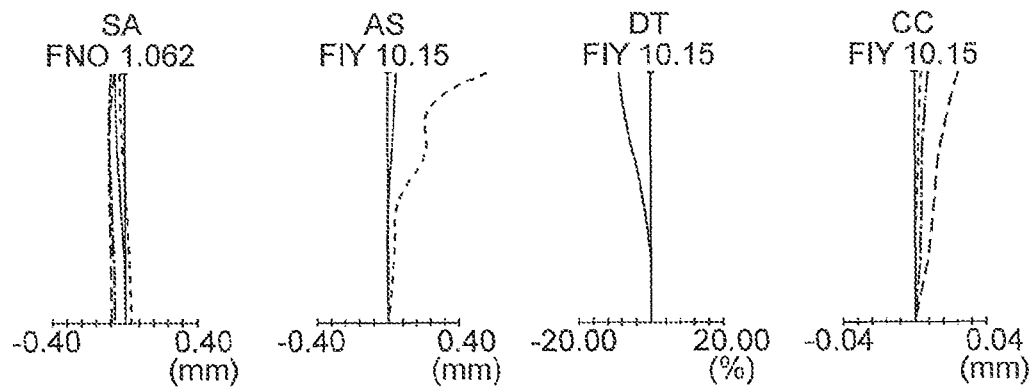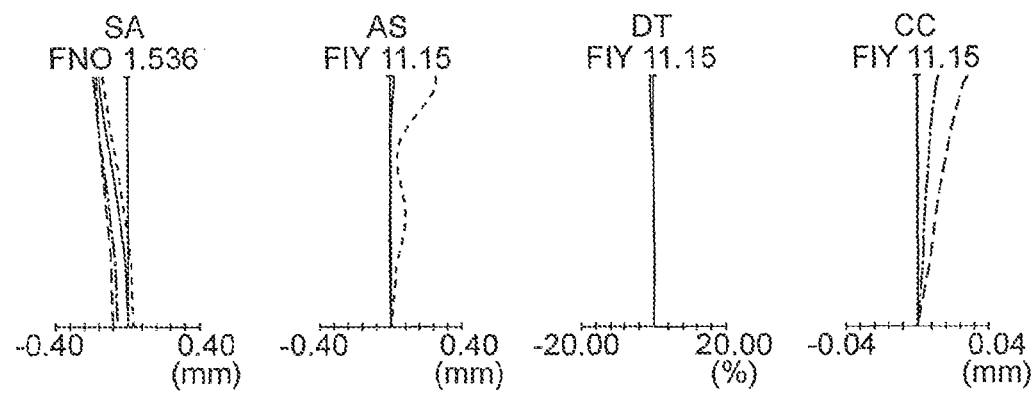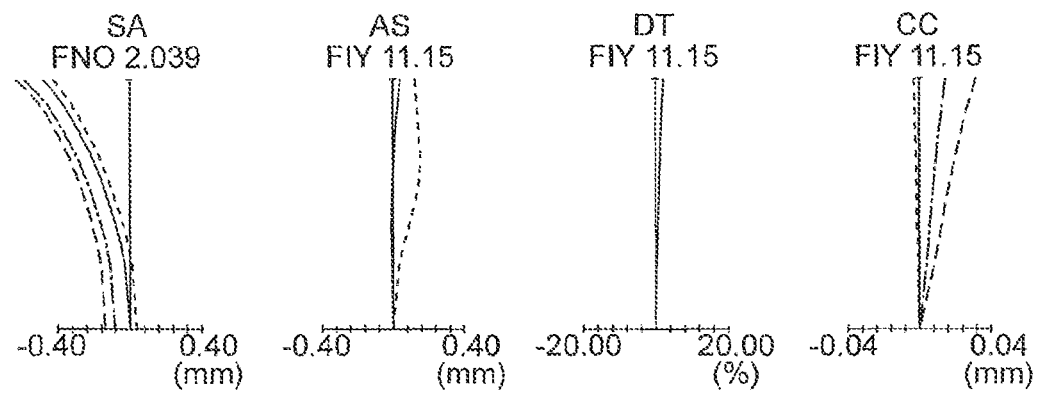

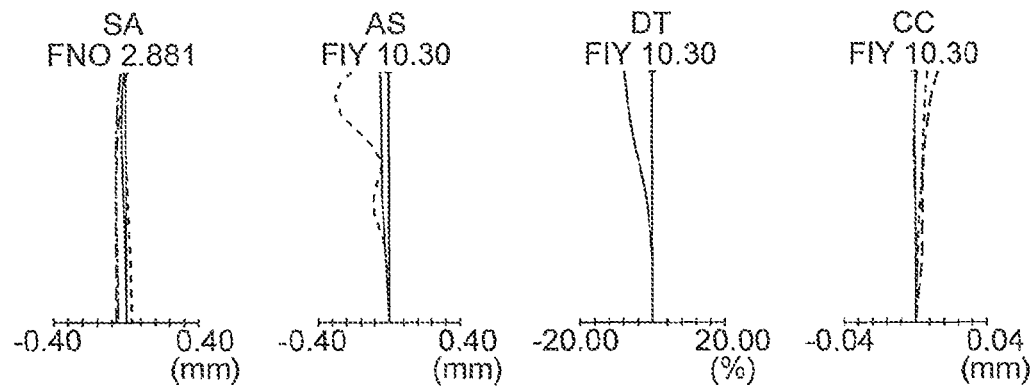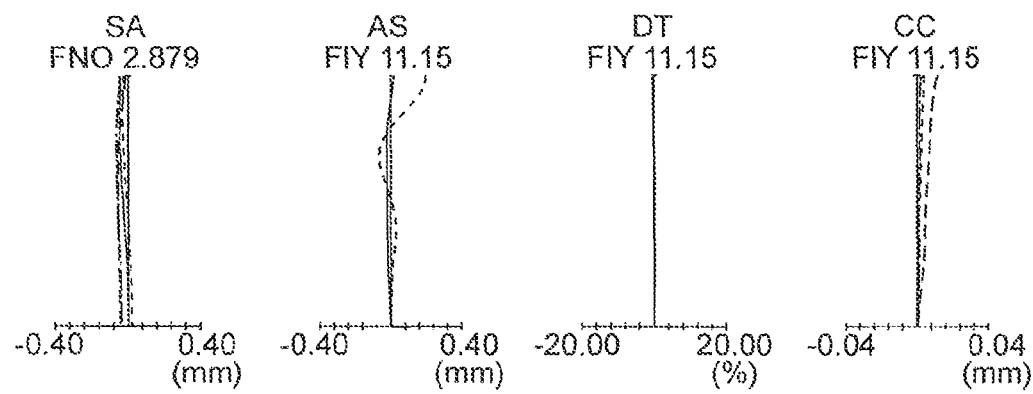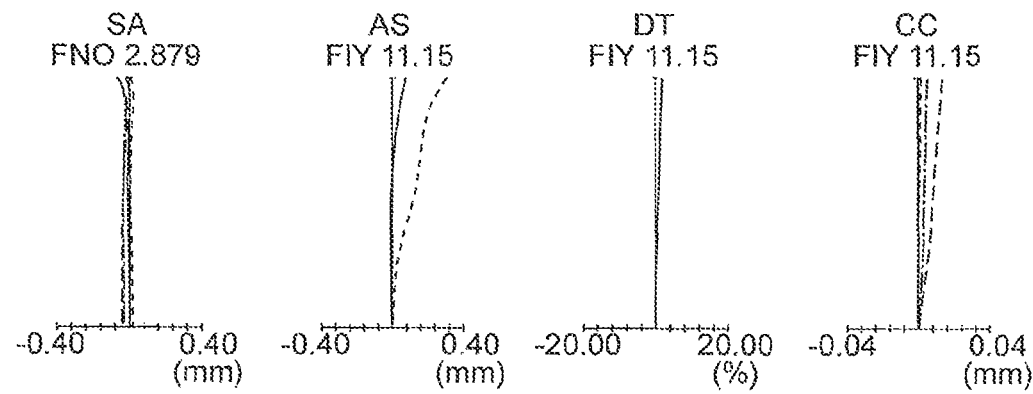

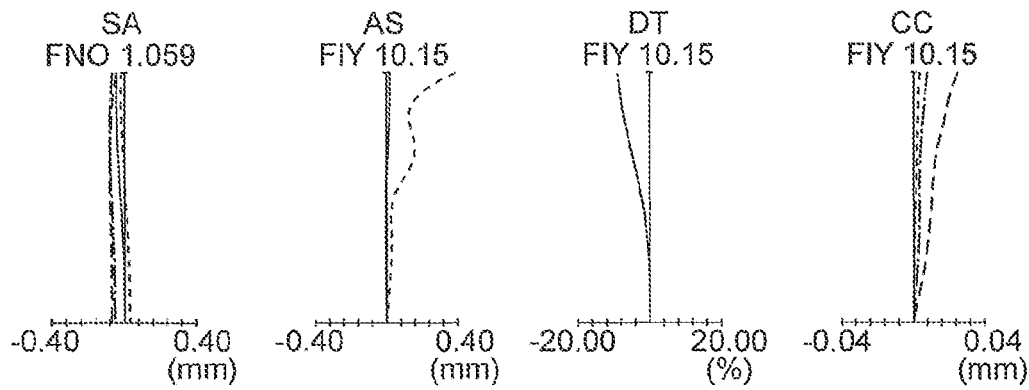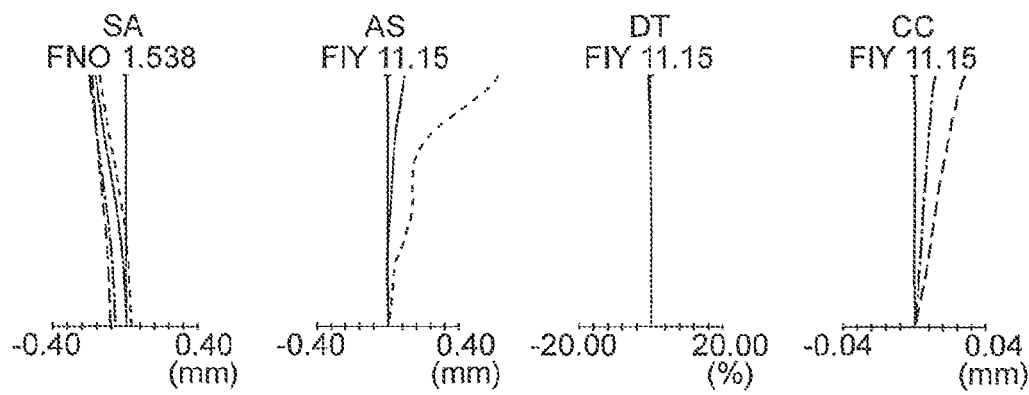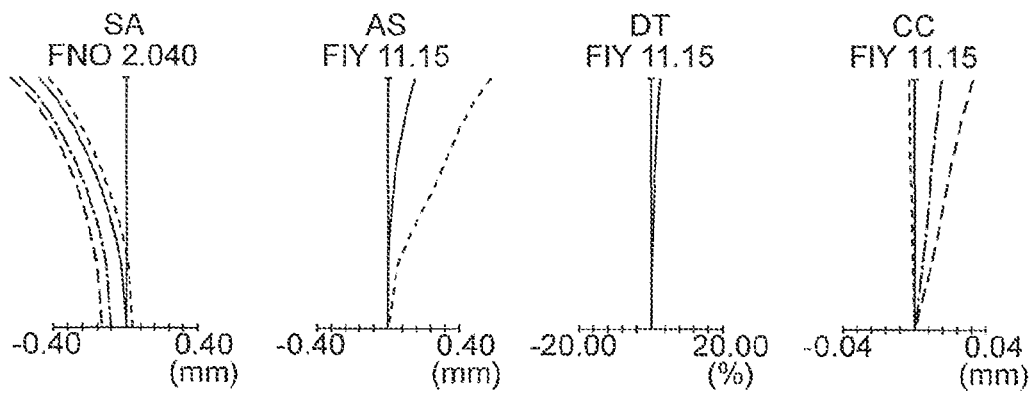

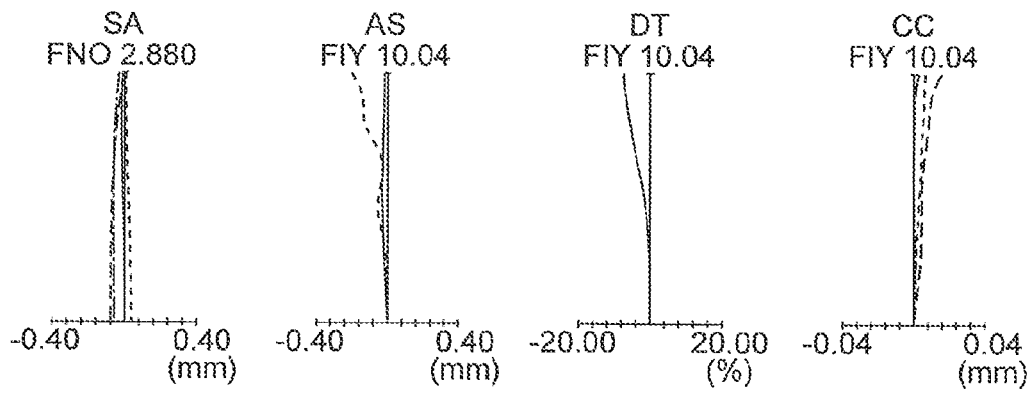
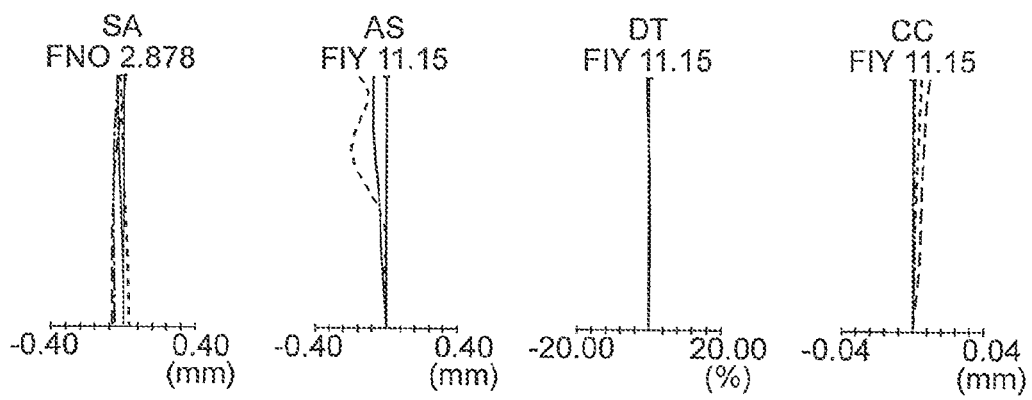
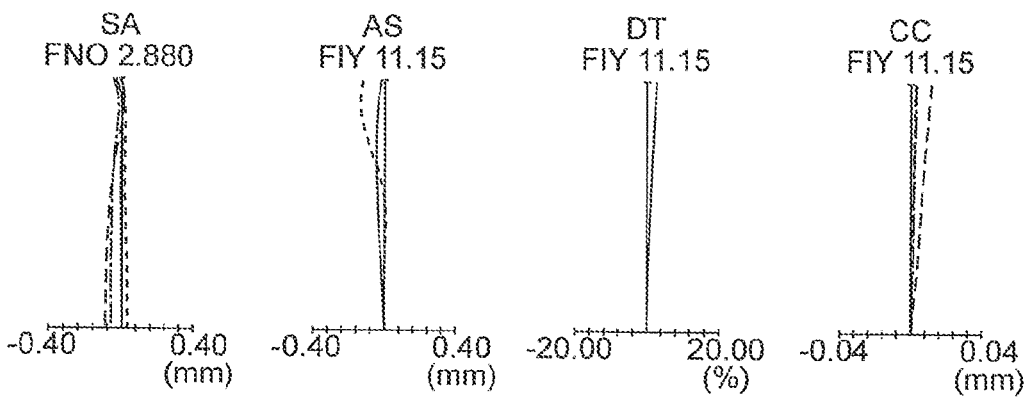

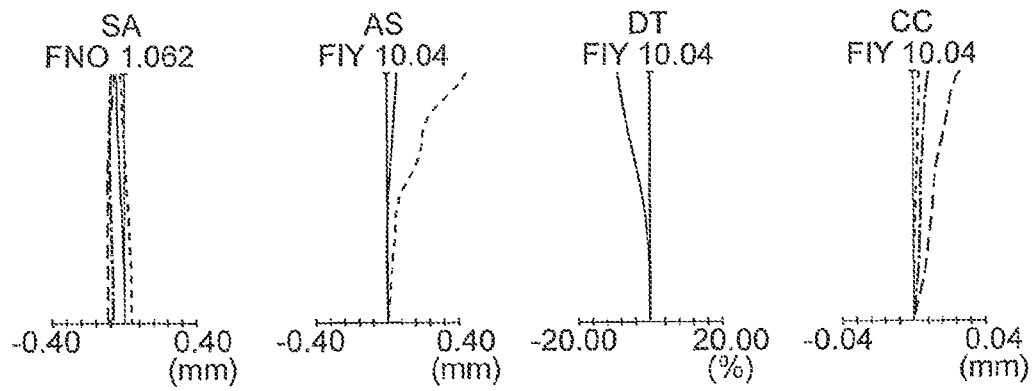
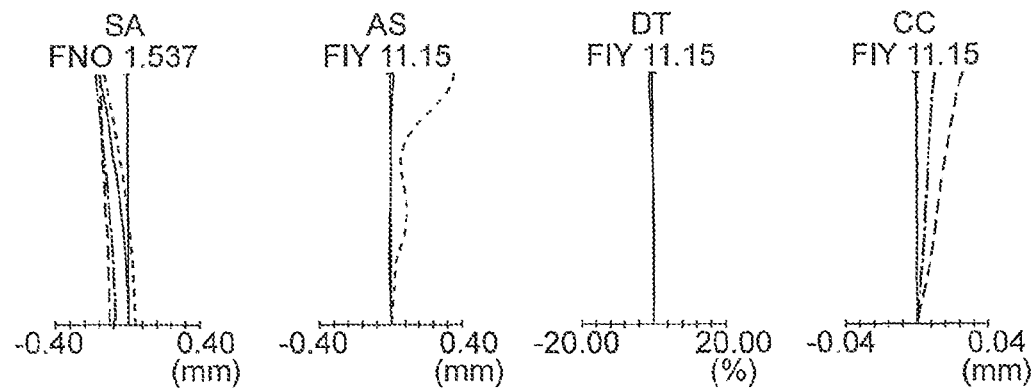
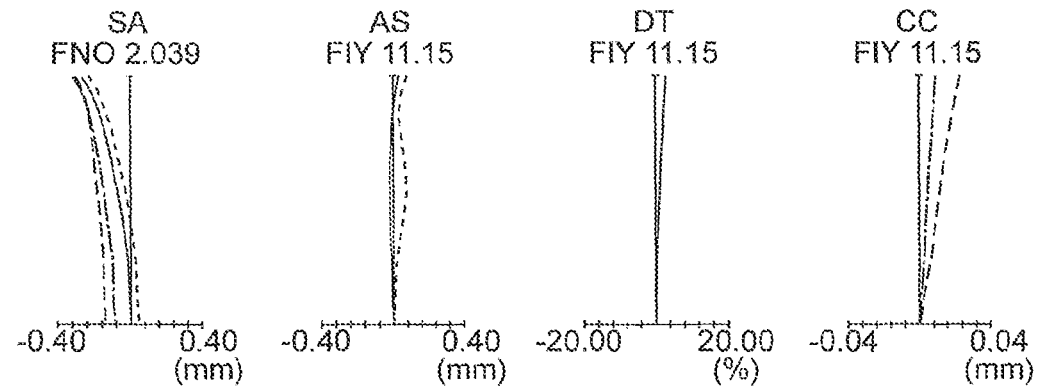

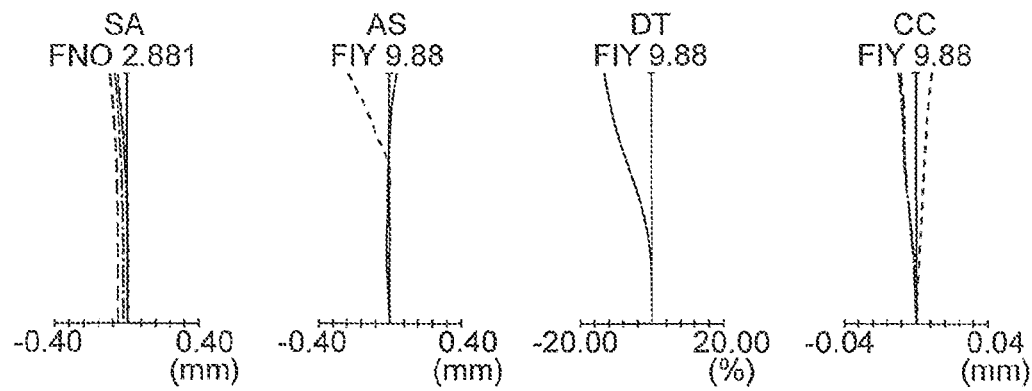
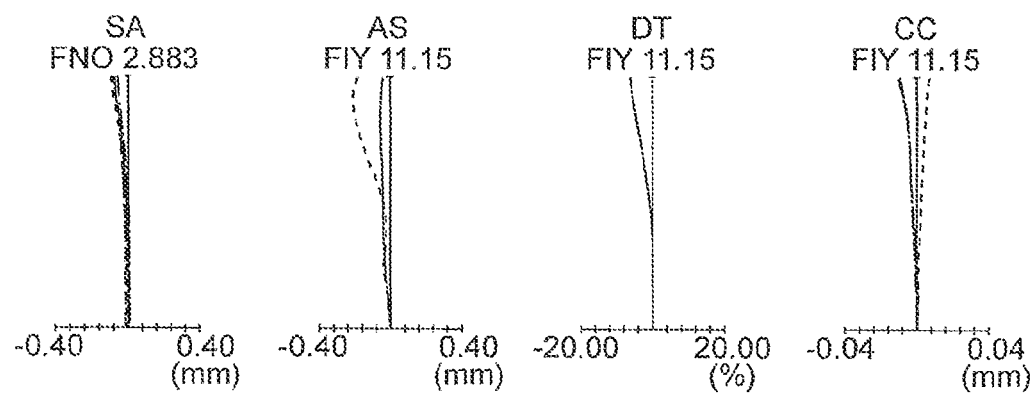
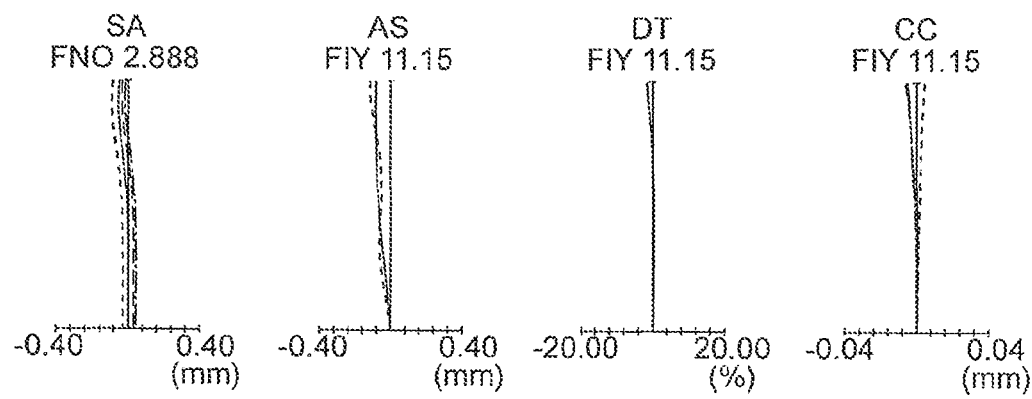

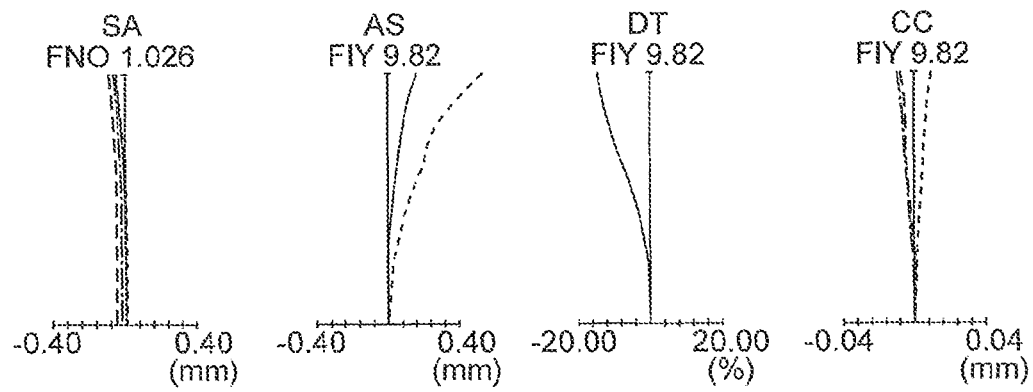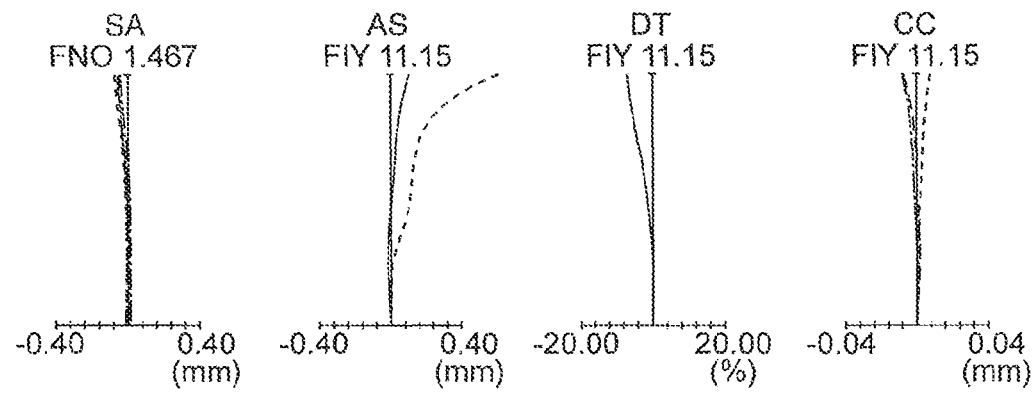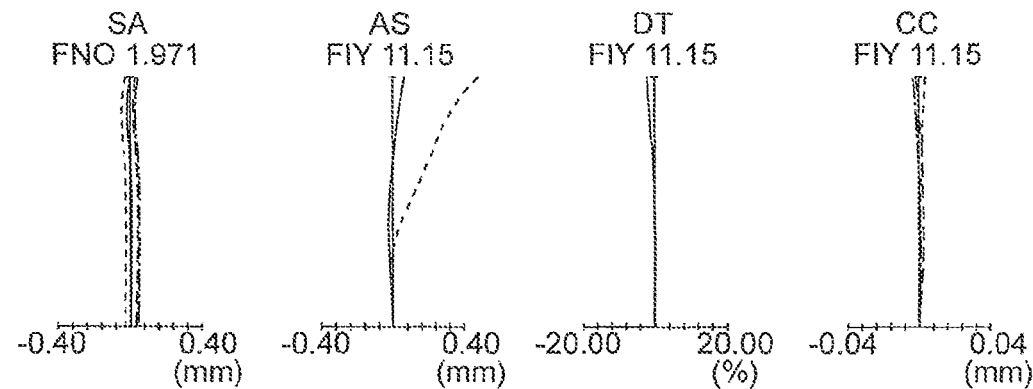

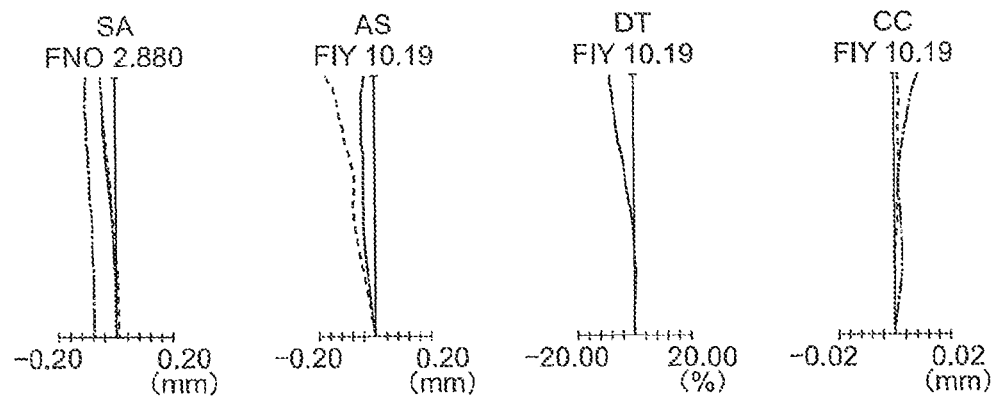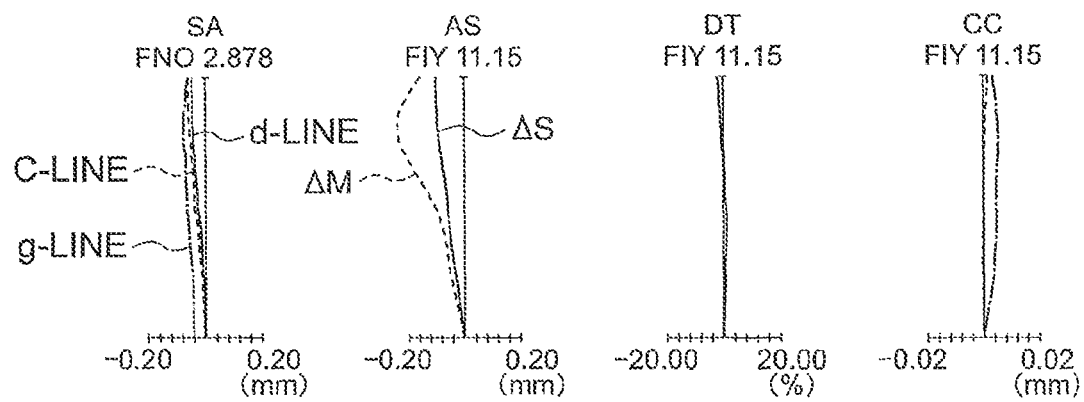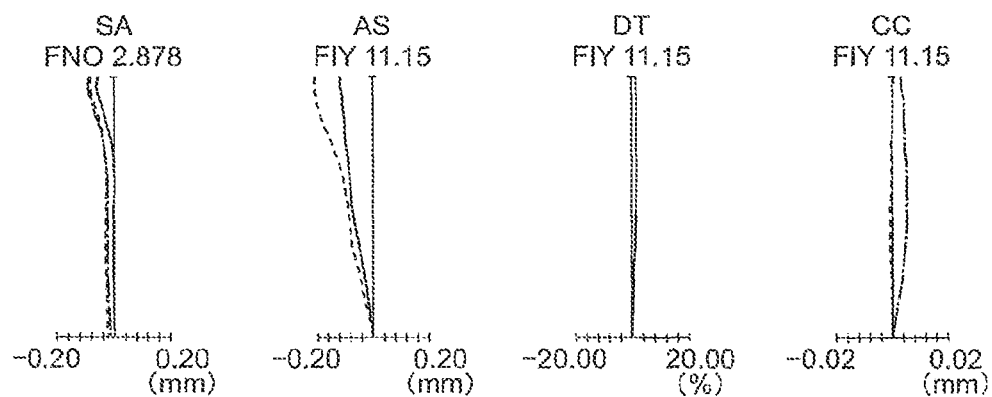

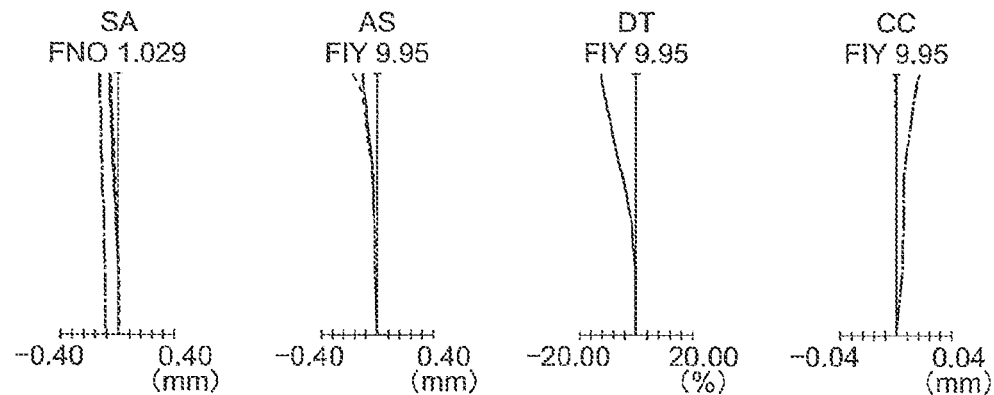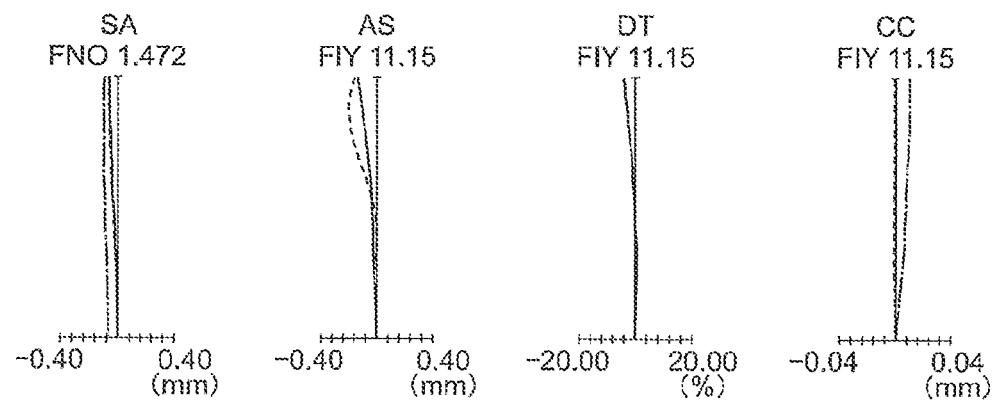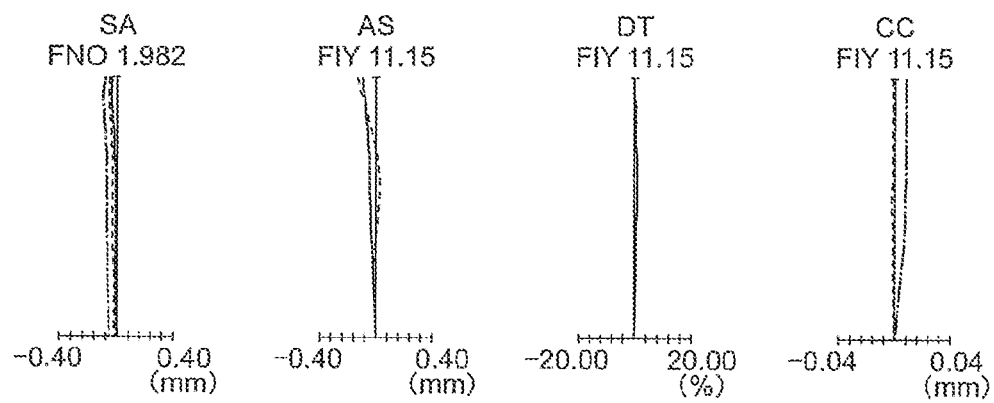

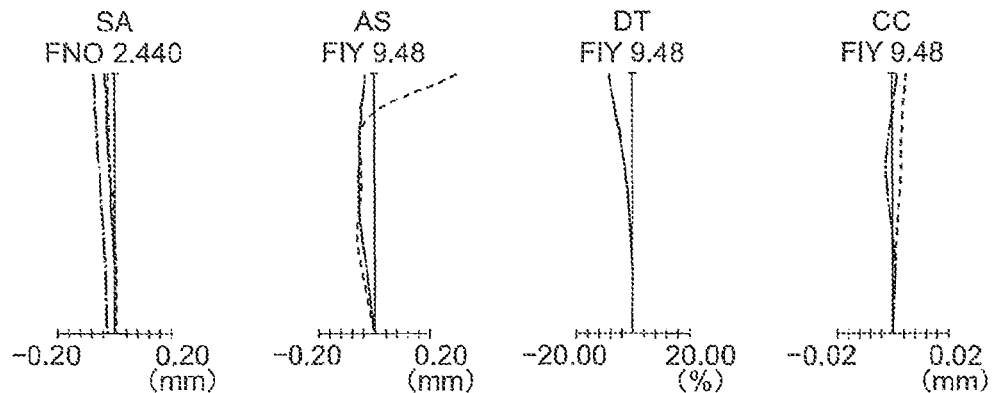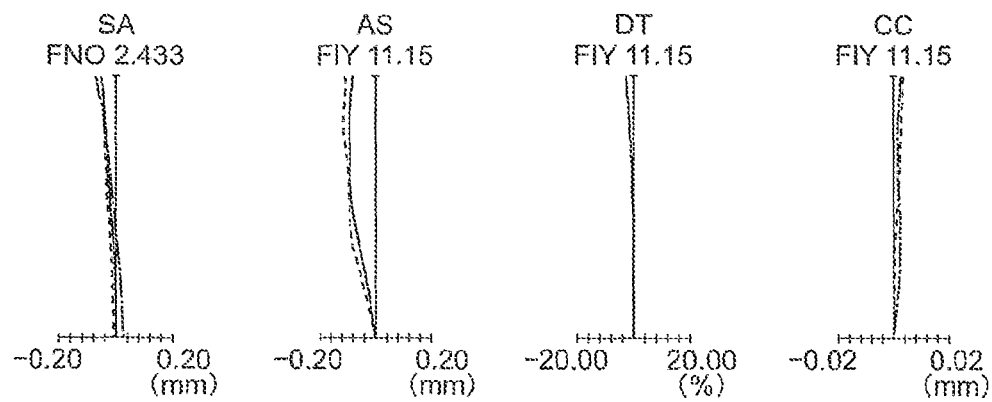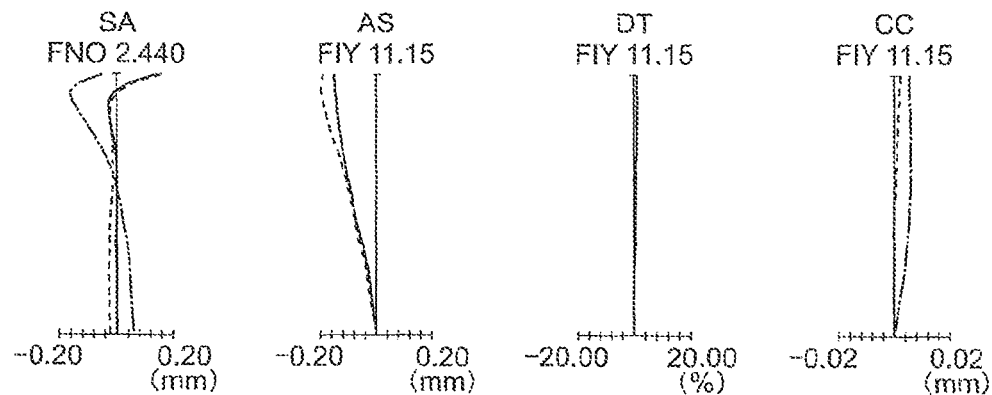

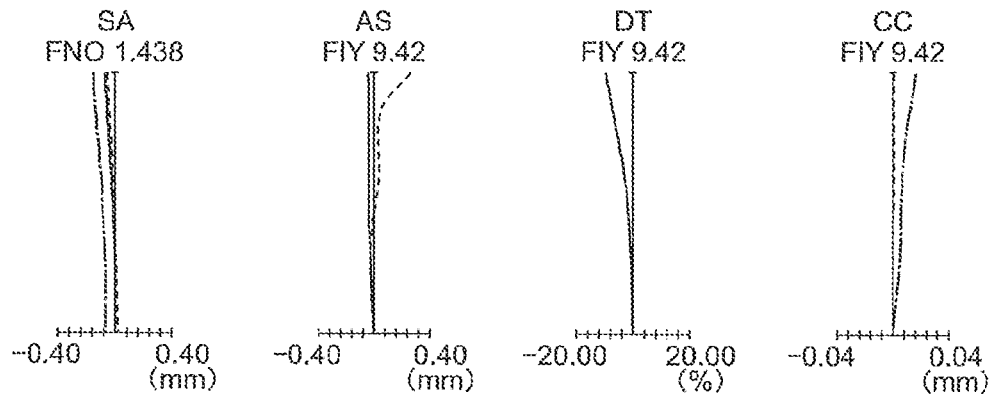
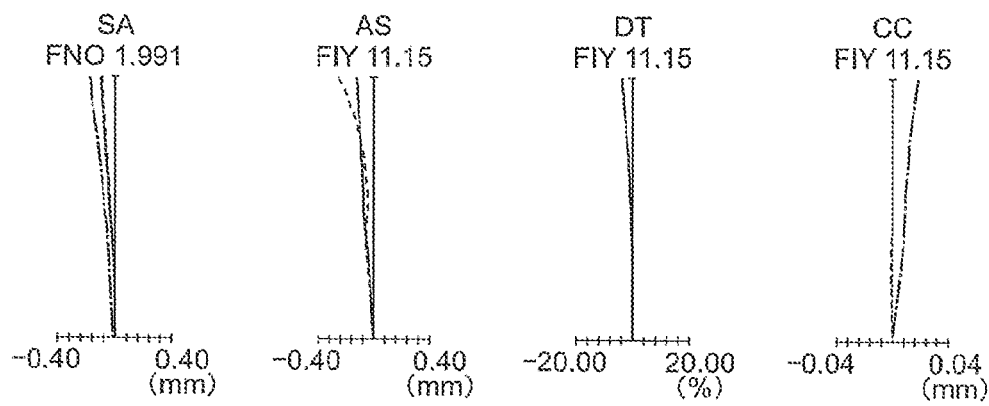
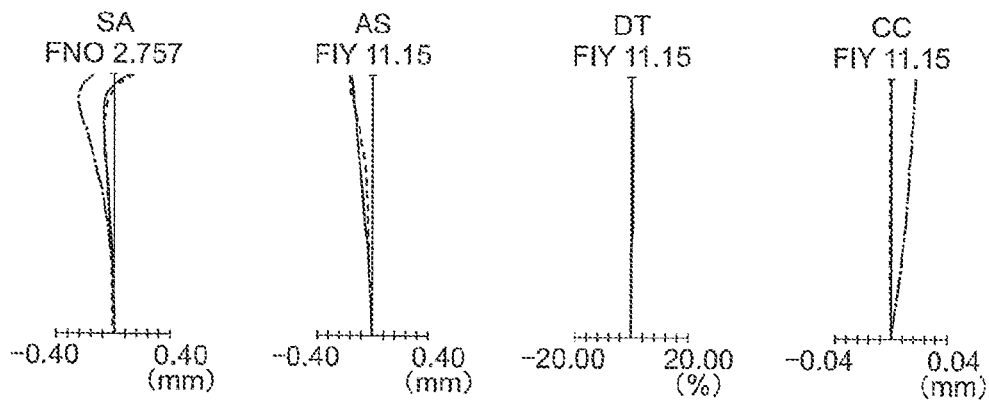

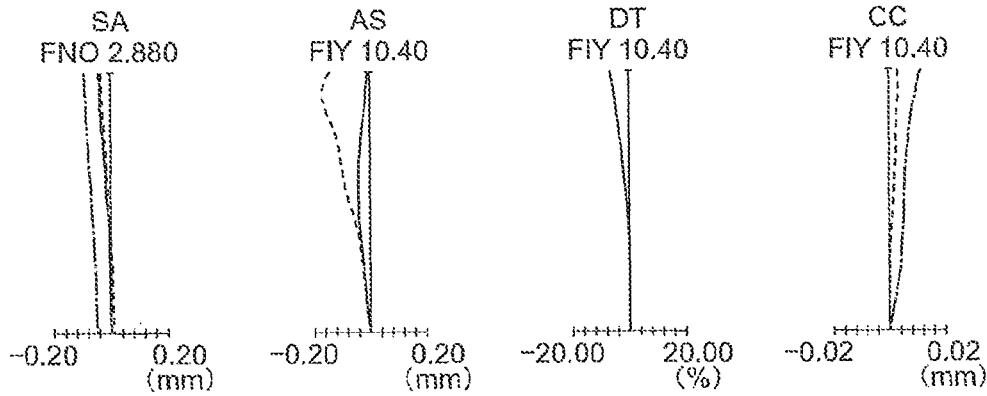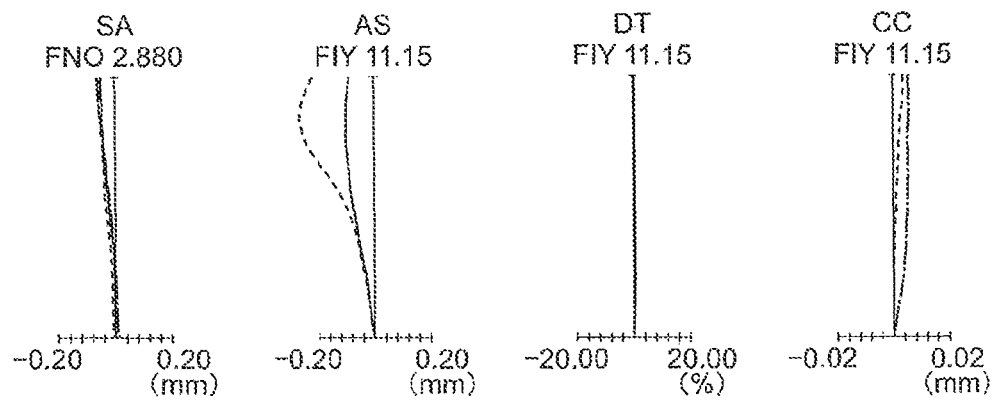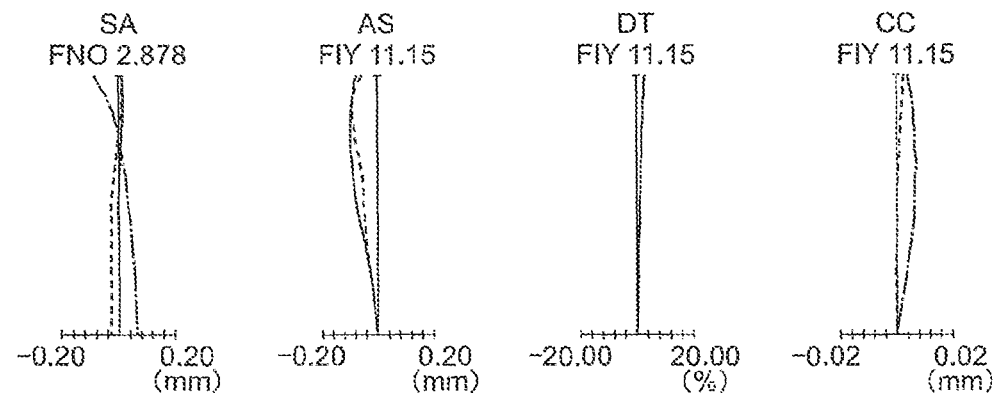

SA
FNO 1.239
-0.40  0.40
(mm)

AS
FIY 10.18
-0.40  0.40
(mm)

DT
FIY 10.18
-20.00  20.00
(%)

CC
FIY 10.18
-0.04  0.04
(mm)

SA
FNO 1.718
-0.40  0.40
(mm)

AS
FIY 11.15
-0.40  0.40
(mm)

DT
FIY 11.15
-20.00  20.00
(%)

CC
FIY 11.15
-0.04  0.04
(mm)

SA
FNO 2.380
-0.40  0.40
(mm)

AS
FIY 11.15
-0.40  0.40
(mm)

DT
FIY 11.15
-20.00  20.00
(%)

CC
FIY 11.15
-0.04  0.04
(mm)

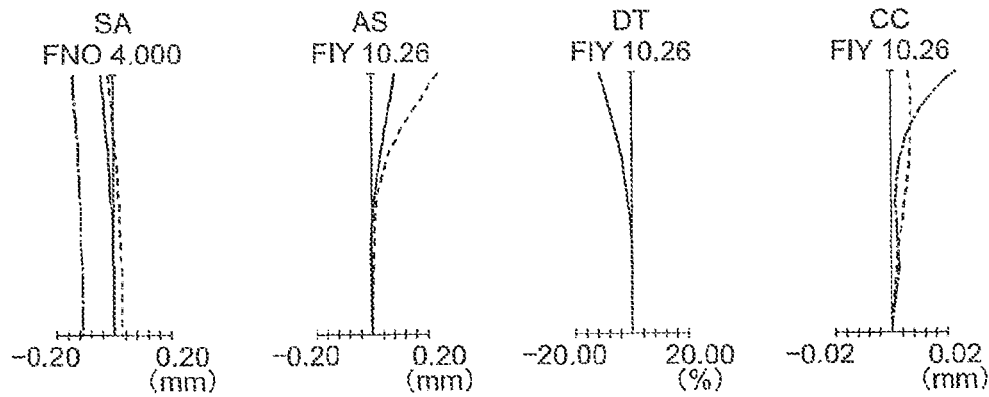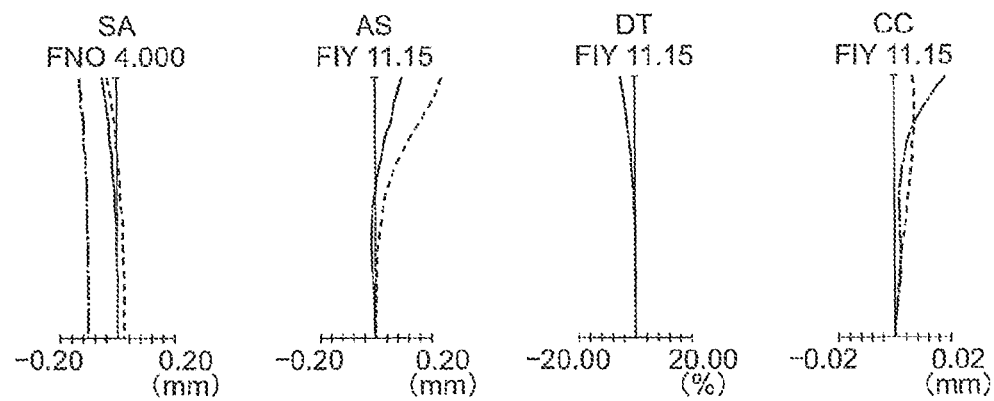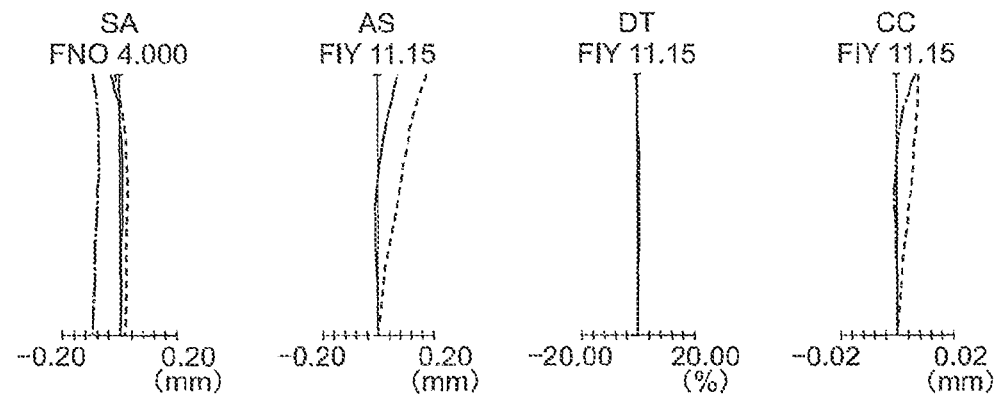

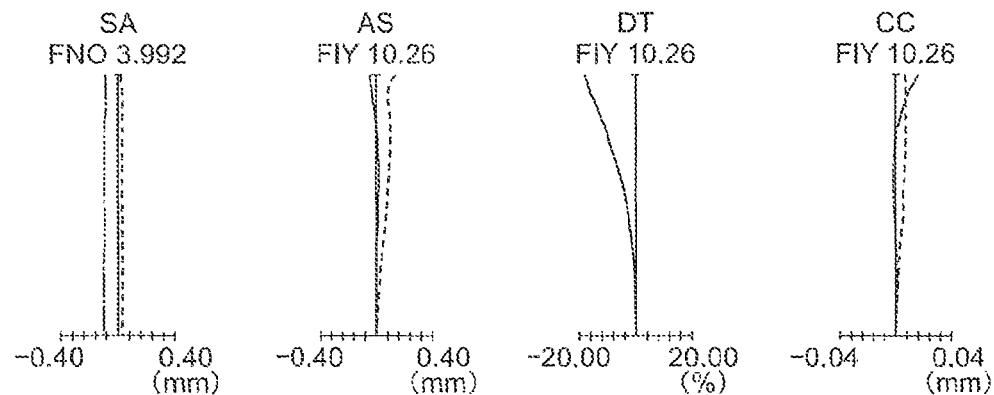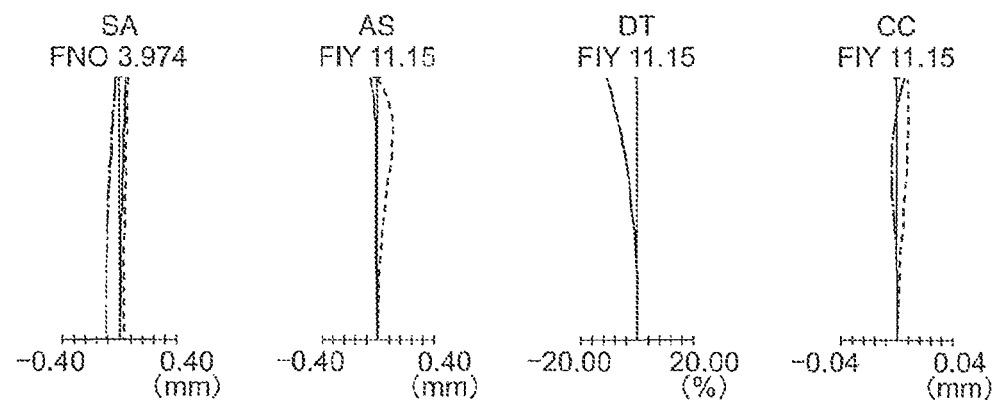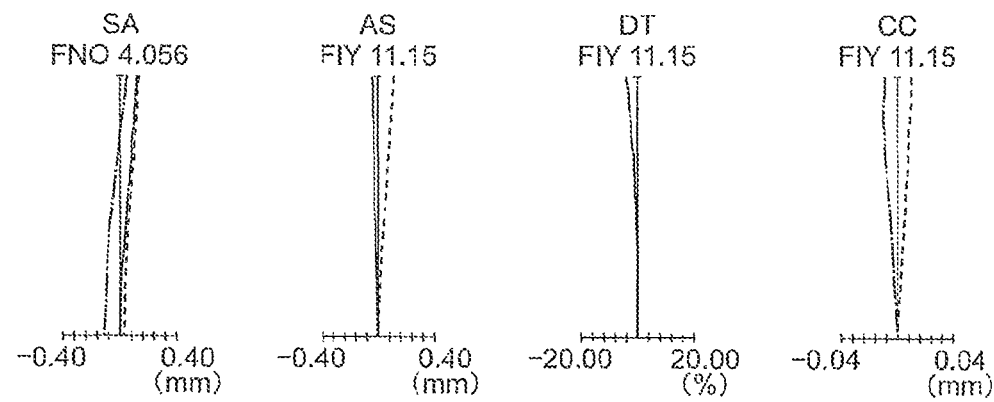

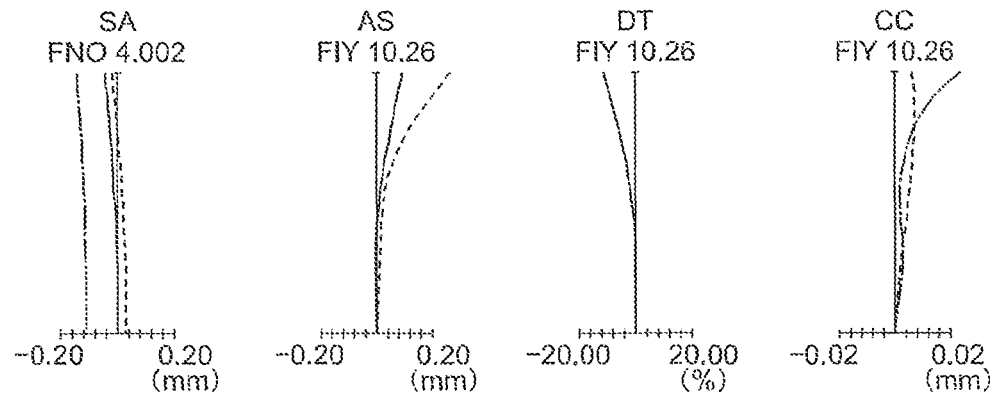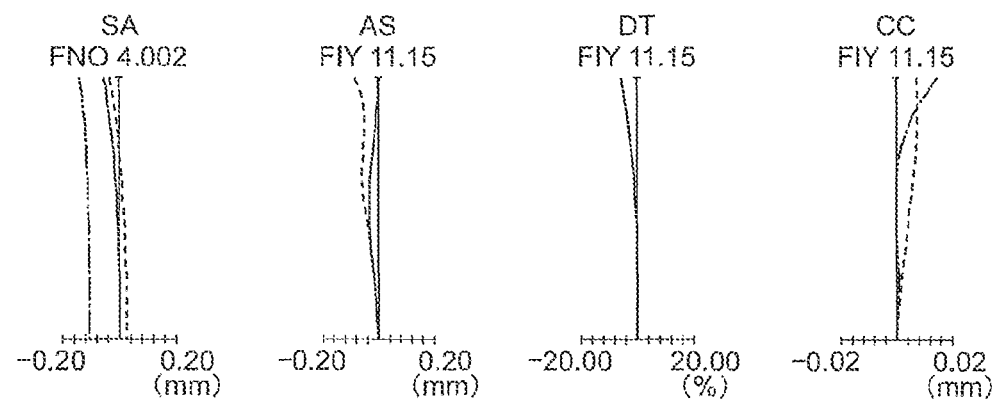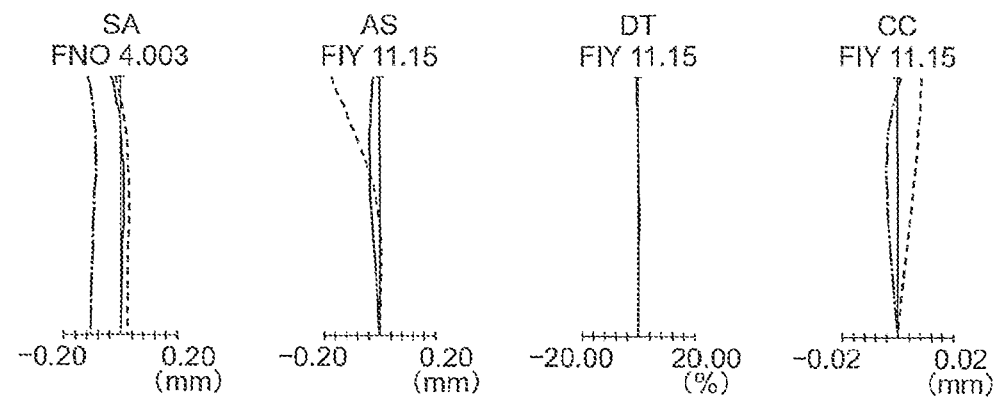

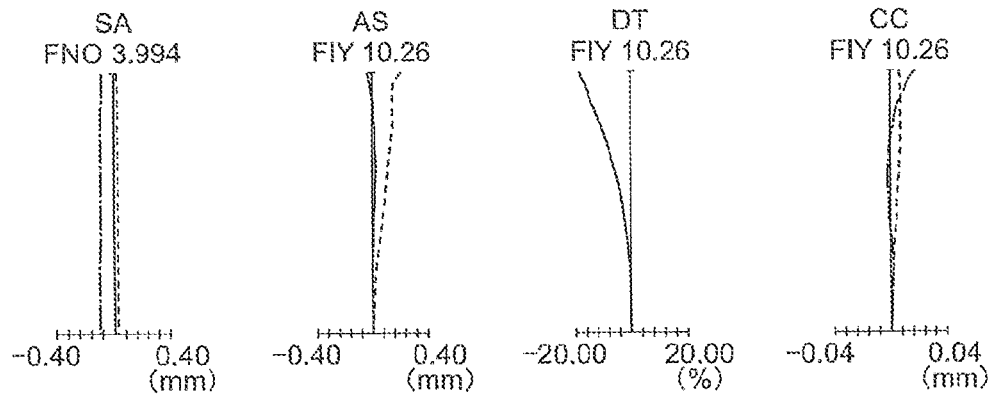
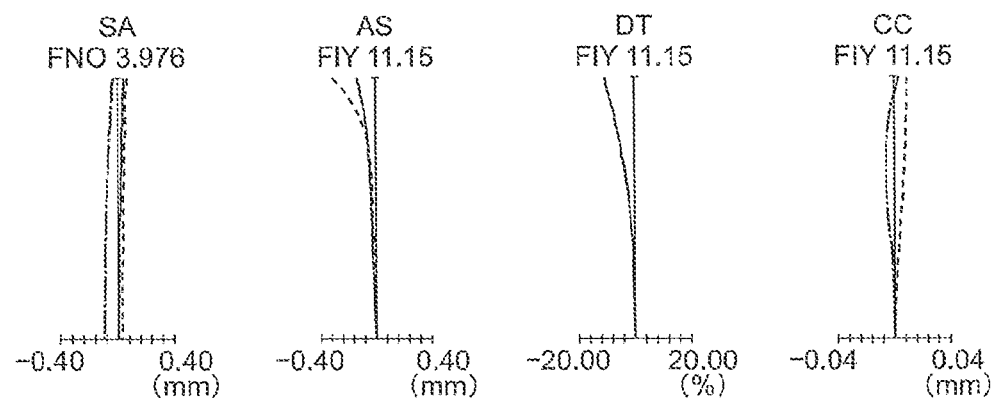
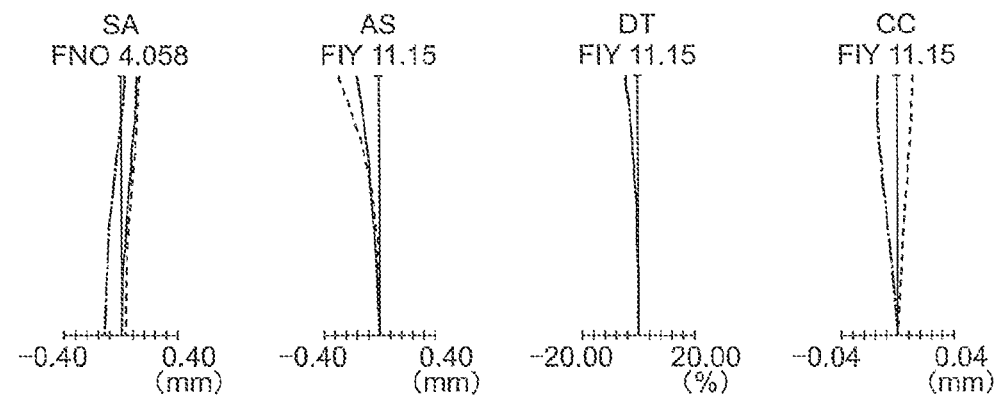

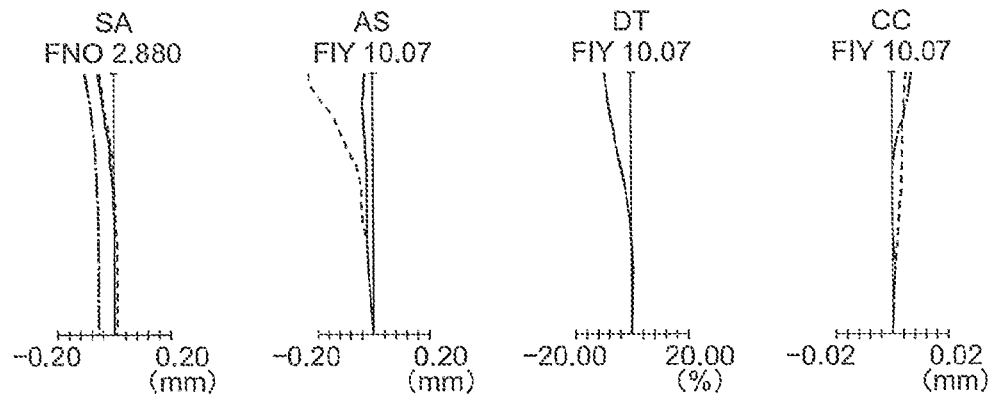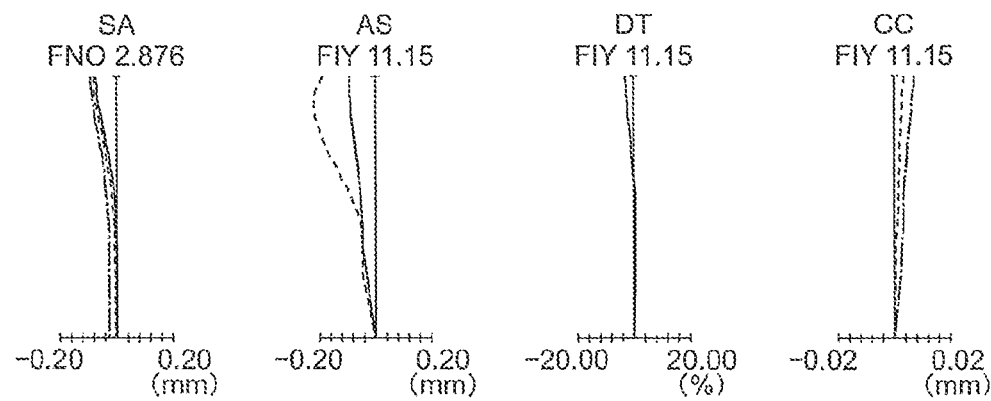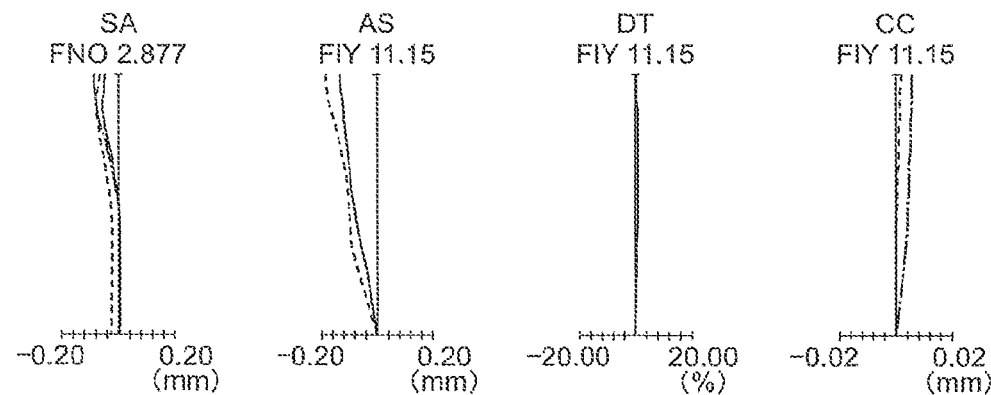

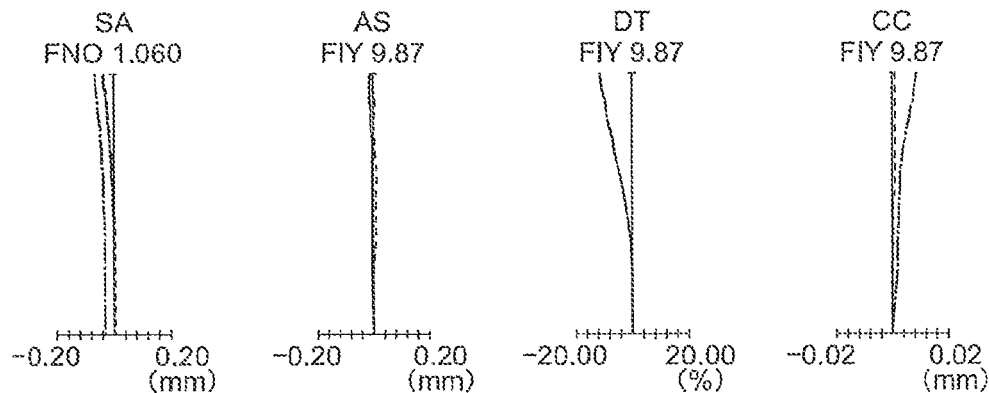
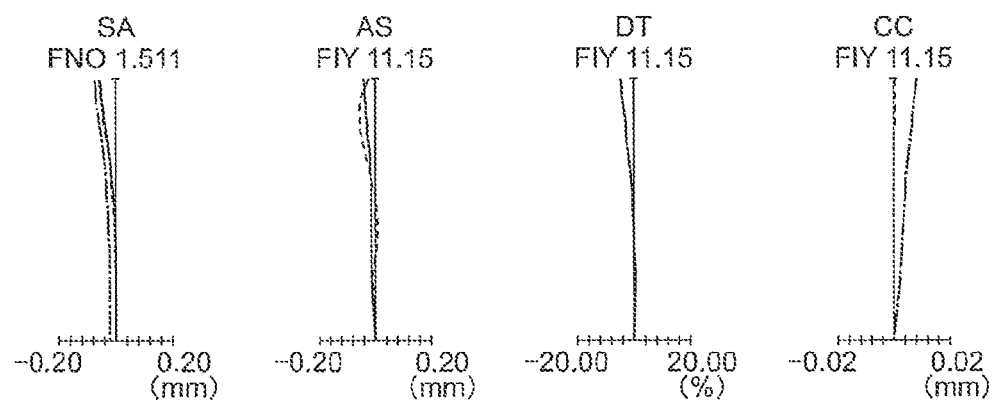
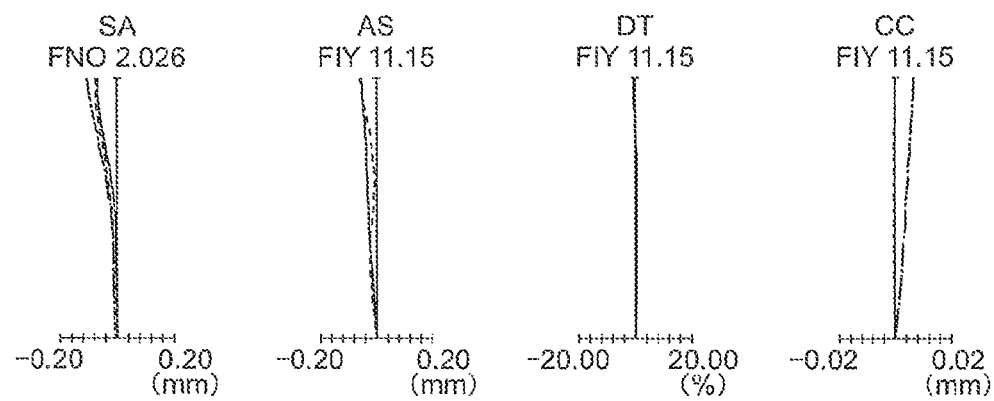

ZOOM LENS AND IMAGE PICKUP APPARATUS USING THE SAME

CROSS-REFERENCE TO RELATED APPLICATIONS

The present application is a Divisional application of U.S. Ser. No. 15/355,951, filed Nov. 18, 2016, which is a continuation application of PCT/JP2015/059053 filed on Mar. 25, 2014 which is based upon and claims the benefit of priority from Japanese Patent Application Nos. 2014-103798 filed on May 19, 2014, 2014-103799 filed on May 19, 2014, 2014-103800 filed on May 19, 2014, 2014-111803 filed on May 30, 2014, and 2014-117158 filed on Jun. 6, 2014, the entire contents of all of which are incorporated herein by reference.

BACKGROUND OF THE INVENTION

Field of the Invention

The present invention relates to a zoom lens and an image pickup apparatus using the same.

Description of the Related Art

As a lens which is capable of capturing a wide range, a wide-angle lens has been known. As a conventional wide angle lens, wide-angle lenses disclosed in Japanese Patent Application Laid-open Publication Nos. 2010-060612, 2010-176098, and 2010-249959 are available.

SUMMARY OF THE INVENTION

A zoom lens according to a first aspect of the present invention comprises in order from an object side to an image side,
  a front unit having a negative refractive power, and
  a rear unit having a positive refractive power, which includes an aperture stop, wherein
  the front unit includes a first lens having a negative refractive power, and
  the first lens is disposed nearest to an object, and has a meniscus shape of which a convex surface is directed toward the object side, and
  the rear unit includes in order from the object side to the image side, a first lens unit A and a second lens unit B, and
  at the time of zooming from a wide angle end to a telephoto end, a distance between the front unit and the rear unit changes.

Moreover, an image pickup apparatus according to the present invention includes
  the abovementioned zoom lens, and
  an image pickup element which has an image pickup surface, and which converts an image formed on the image pickup surface by the zoom lens to an electric signal.

BRIEF DESCRIPTION OF THE DRAWINGS

FIG. 1A, FIG. 1B, and FIG. 1C are lens cross-sectional views at the time of focusing to an object at infinity of a zoom lens according to an example 1;

FIG. 2A, FIG. 2B, and FIG. 2C are lens cross-sectional views at the time of focusing to an object at infinity of a zoom lens according to an example 2;

FIG. 3A, FIG. 3B, and FIG. 3C are lens cross-sectional views at the time of focusing to an object at infinity of a zoom lens according to an example 3;

FIG. 13A, FIG. 13B, and FIG. 13C are lens cross-sectional views at the time of focusing to an object at infinity of a zoom lens according to an example 13;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams at the time of focusing to an object at infinity of the zoom lens according to the example 1;

FIG. 27A, FIG. 27B, FIG. 27C, FIG. 27D, FIG. 27E, FIG. 27F, FIG. 27G, FIG. 27H, FIG. 27I, FIG. 27J, FIG. 27K, and FIG. 27L are aberration diagrams at the time of focusing to an object at a close distance of the zoom lens according to the example 1;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are aberration diagrams at the time of focusing to an object at infinity of the zoom lens according to the example 2;

FIG. 29A, FIG. 29B, FIG. 29C, FIG. 29D, FIG. 29E, FIG. 29F, FIG. 29G, FIG. 29H, FIG. 29I, FIG. 29J, FIG. 29K, and FIG. 29L are aberration diagrams at the time of focusing to an object at a close distance of the zoom lens according to the example 2;

FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L are aberration diagrams at the time of focusing to an object at infinity of the zoom lens according to the example 3;

FIG. 31A, FIG. 31B, FIG. 31C, FIG. 31D, FIG. 31E, FIG. 31F, FIG. 31G, FIG. 31H, FIG. 31I, FIG. 31J, FIG. 31K, and FIG. 31L are aberration diagrams at the time of focusing to an object at a close distance of the zoom lens according to the example 3;

FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L are aberration diagrams at the time of focusing to an object at infinity of the zoom lens according to the example 4;

FIG. 33A, FIG. 33B, FIG. 33C, FIG. 33D, FIG. 33E, FIG. 33F, FIG. 33G, FIG. 33H, FIG. 33I, FIG. 33J, FIG. 33K, and FIG. 33L are aberration diagrams at the time of focusing to an object at a close distance of the zoom lens according to the example 4;

FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L are aberration diagrams at the time of focusing to an object at infinity of the zoom lens according to the example 5;

FIG. 35A, FIG. 35B, FIG. 35C, FIG. 35D, FIG. 35E, FIG. 35F, FIG. 35G, FIG. 35H, FIG. 35I, FIG. 35J, FIG. 35K, and FIG. 35L are aberration diagrams at the time of focusing to an object at a close distance of the zoom lens according to the example 5;

FIG. 36A, FIG. 36B, FIG. 36C, FIG. 36D, FIG. 36E, FIG. 36F, FIG. 36G, FIG. 36H, FIG. 36I, FIG. 36J, FIG. 36K, and FIG. 36L are aberration diagrams at the time of focusing to an object at infinity of the zoom lens according to the example 6;

FIG. 37A, FIG. 37B, FIG. 37C, FIG. 37D, FIG. 37E, FIG. 37F, FIG. 37G, FIG. 37H, FIG. 37I, FIG. 37J, FIG. 37K, and FIG. 37L are aberration diagrams at the time of focusing to an object at a close distance of the zoom lens according to the example 6;

FIG. 38A, FIG. 38B, FIG. 38C, FIG. 38D, FIG. 38E, FIG. 38F, FIG. 38G, FIG. 38H, FIG. 38I, FIG. 38J, FIG. 38K, and FIG. 38L are aberration diagrams at the time of focusing to an object at infinity of the zoom lens according to the example 7;

FIG. 39A, FIG. 39B, FIG. 39C, FIG. 39D, FIG. 39E, FIG. 39F, FIG. 39G, FIG. 39H, FIG. 39I, FIG. 39J, FIG. 39K, and FIG. 39L are aberration diagrams at the time of focusing to an object at a close distance of the zoom lens according to the example 7;

FIG. 40A, FIG. 40B, FIG. 40C, FIG. 40D, FIG. 40E, FIG. 40F, FIG. 40G, FIG. 40H, FIG. 40I, FIG. 40J, FIG. 40K, and FIG. 40L are aberration diagrams at the time of focusing to an object at infinity of the zoom lens according to the example 8;

FIG. 41A, FIG. 41B, FIG. 41C, FIG. 41D, FIG. 41E, FIG. 41F, FIG. 41G, FIG. 41H, FIG. 41I, FIG. 41J, FIG. 41K, and FIG. 41L are aberration diagrams at the time of focusing to an object at a close distance of the zoom lens according to the example 8;

FIG. 42A, FIG. 42B, FIG. 42C, FIG. 42D, FIG. 42E, FIG. 42F, FIG. 42G, FIG. 42H, FIG. 42I, FIG. 42J, FIG. 42K, and FIG. 42L are aberration diagrams at the time of focusing to an object at infinity of the zoom lens according to the example 9;

FIG. 43A, FIG. 43B, FIG. 43C, FIG. 43D, FIG. 43E, FIG. 43F, FIG. 43G, FIG. 43H, FIG. 43I, FIG. 43J, FIG. 43K, and FIG. 43L are aberration diagrams at the time of focusing to an object at a close distance of the zoom lens according to the example 9;

FIG. 44A, FIG. 44B, FIG. 44C, FIG. 44D, FIG. 44E, FIG. 44F, FIG. 44G, FIG. 44H, FIG. 44I, FIG. 44J, FIG. 44K, and FIG. 44L are aberration diagrams at the time of focusing to an object at infinity of the zoom lens according to the example 10;

FIG. 45A, FIG. 45B, FIG. 45C, FIG. 45D, FIG. 45E, FIG. 45F, FIG. 45G, FIG. 45H, FIG. 45I, FIG. 45J, FIG. 45K, and FIG. 45L are aberration diagrams at the time of focusing to an object at a close distance of the zoom lens according to the example 10;

FIG. 46A, FIG. 46B, FIG. 46C, FIG. 46D, FIG. 46E, FIG. 46F, FIG. 46G, FIG. 46H, FIG. 46I, FIG. 46J, FIG. 46K, and FIG. 46L are aberration diagrams at the time of focusing to an object at infinity of the zoom lens according to the example 11;

FIG. 47A, FIG. 47B, FIG. 47C, FIG. 47D, FIG. 47E, FIG. 47F, FIG. 47G, FIG. 47H, FIG. 47I, FIG. 47J, FIG. 47K, and FIG. 47L are aberration diagrams at the time of focusing to an object at a close distance of the zoom lens according to the example 11;

FIG. 48A, FIG. 48B, FIG. 48C, FIG. 48D, FIG. 48E, FIG. 48F, FIG. 48G, FIG. 48H, FIG. 48I, FIG. 48J, FIG. 48K, and FIG. 48L are aberration diagrams at the time of focusing to an object at infinity of the zoom lens according to the example 12;

FIG. 49A, FIG. 49B, FIG. 49C, FIG. 49D, FIG. 49E, FIG. 49F, FIG. 49G, FIG. 49H, FIG. 49I, FIG. 49J, FIG. 49K, and FIG. 49L are aberration diagrams at the time of focusing to an object at a close distance of the zoom lens according to the example 12;

FIG. 51A, FIG. 51B, FIG. 51C, FIG. 51D, FIG. 51E, FIG. 51F, FIG. 51G, FIG. 51H, FIG. 51I, FIG. 51J, FIG. 51K, and FIG. 51L are aberration diagrams at the time of focusing to an object at a close distance of the zoom lens according to the example 13;

FIG. 52A, FIG. 52B, FIG. 52C, FIG. 52D, FIG. 52E, FIG. 52F, FIG. 52G, FIG. 52H, FIG. 52I, FIG. 52J, FIG. 52K, and FIG. 52L are aberration diagrams at the time of focusing to an object at infinity of the zoom lens according to the example 14;

FIG. 53A, FIG. 53B, FIG. 53C, FIG. 53D, FIG. 53E, FIG. 53F, FIG. 53G, FIG. 53H, FIG. 53I, FIG. 53J, FIG. 53K, and FIG. 53L are aberration diagrams at the time of focusing to an object at a close distance of the zoom lens according to the example 14;

FIG. 54A, FIG. 54B, FIG. 54C, FIG. 54D, FIG. 54E, FIG. 54F, FIG. 54G, FIG. 54H, FIG. 54I, FIG. 54J, FIG. 54K, and FIG. 54L are aberration diagrams at the time of focusing to an object at infinity of the zoom lens according to the example 15;

FIG. 55A, FIG. 55B, FIG. 55C, FIG. 55D, FIG. 55E, FIG. 55F, FIG. 55G, FIG. 55H, FIG. 55I, FIG. 55J, FIG. 55K, and FIG. 55L are aberration diagrams at the time of focusing to an object at a close distance of the zoom lens according to the example 15;

FIG. 57A, FIG. 57B, FIG. 57C, FIG. 57D, FIG. 57E, FIG. 57F, FIG. 57G, FIG. 57H, FIG. 57I, FIG. 57J, FIG. 57K, and FIG. 57L are aberration diagrams at the time of focusing to an object at a close distance of the zoom lens according to the example 16;

FIG. 58A, FIG. 58B, FIG. 58C, FIG. 58D, FIG. 58E, FIG. 58F, FIG. 58G, FIG. 58H, FIG. 58I, FIG. 58J, FIG. 58K, and FIG. 58L are aberration diagrams at the time of focusing to an object at infinity of the zoom lens according to the example 17;

FIG. 59A, FIG. 59B, FIG. 59C, FIG. 59D, FIG. 59E, FIG. 59F, FIG. 59G, FIG. 59H, FIG. 59I, FIG. 59J, FIG. 59K, and FIG. 59L are aberration diagrams at the time of focusing to an object at a close distance of the zoom lens according to the example 17;

FIG. 60A, FIG. 60B, FIG. 60C, FIG. 60D, FIG. 60E, FIG. 60F, FIG. 60G, FIG. 60H, FIG. 60I, FIG. 60J, FIG. 60K, and FIG. 60L are aberration diagrams at the time of focusing to an object at infinity of the zoom lens according to the example 18;

FIG. 61A, FIG. 61B, FIG. 61C, FIG. 61D, FIG. 61E, FIG. 61F, FIG. 61G, FIG. 61H, FIG. 61I, FIG. 61J, FIG. 61K, and FIG. 61L are aberration diagrams at the time of focusing to an object at a close distance of the zoom lens according to the example 18;

FIG. 62A, FIG. 62B, FIG. 62C, FIG. 62D, FIG. 62E, FIG. 62F, FIG. 62G, FIG. 62H, FIG. 62I, FIG. 62J, FIG. 62K, and FIG. 62L are aberration diagrams at the time of focusing to an object at infinity of the zoom lens according to the example 19;

FIG. 63A, FIG. 63B, FIG. 63C, FIG. 63D, FIG. 63E, FIG. 63F, FIG. 63G, FIG. 63H, FIG. 63I, FIG. 63J, FIG. 63K, and FIG. 63L are aberration diagrams at the time of focusing to an object at a close distance of the zoom lens according to the example 19;

FIG. 64A, FIG. 64B, FIG. 64C, FIG. 64D, FIG. 64E, FIG. 64F, FIG. 64G, FIG. 64H, FIG. 64I, FIG. 64J, FIG. 64K, and FIG. 64L are aberration diagrams at the time of focusing to an object at infinity of the zoom lens according to the example 20;

FIG. 65A, FIG. 65B, FIG. 65C, FIG. 65D, FIG. 65E, FIG. 65F, FIG. 65G, FIG. 65H, FIG. 65I, FIG. 65J, FIG. 65K, and FIG. 65L are aberration diagrams at the time of focusing to an object at a close distance of the zoom lens according to the example 20;

FIG. 66A, FIG. 66B, FIG. 66C, FIG. 66D, FIG. 66E, FIG. 66F, FIG. 66G, FIG. 66H, FIG. 66I, FIG. 66J, FIG. 66K, and FIG. 66L are aberration diagrams at the time of focusing to an object at infinity of the zoom lens according to the example 21;

FIG. 67A, FIG. 67B, FIG. 67C, FIG. 67D, FIG. 67E, FIG. 67F, FIG. 67G, FIG. 67H, FIG. 67I, FIG. 67J, FIG. 67K, and FIG. 67L are aberration diagrams at the time of focusing to an object at a close distance of the zoom lens according to the example 21;

FIG. 68A, FIG. 68B, FIG. 68C, FIG. 68D, FIG. 68E, FIG. 68F, FIG. 68G, FIG. 68H, FIG. 68I, FIG. 68J, FIG. 68K, and FIG. 68L are aberration diagrams at the time of focusing to an object at infinity of the zoom lens according to the example 22;

FIG. 70A, FIG. 70B, FIG. 70C, FIG. 70D, FIG. 70E, FIG. 70F, FIG. 70G, FIG. 70H, FIG. 70I, FIG. 70J, FIG. 70K, and FIG. 70L are aberration diagrams at the time of focusing to an object at infinity of the zoom lens according to the example 23;

FIG. 71A, FIG. 71B, FIG. 71C, FIG. 71D, FIG. 71E, FIG. 71F, FIG. 71G, FIG. 71H, FIG. 71I, FIG. 71J, FIG. 71K, and FIG. 71L are aberration diagrams at the time of focusing to an object at a close distance of the zoom lens according to the example 23;

FIG. 72A, FIG. 72B, FIG. 72C, FIG. 72D, FIG. 72E, FIG. 72F, FIG. 72G, FIG. 72H, FIG. 70I, FIG. 70J, FIG. 70K, and FIG. 70L are aberration diagrams at the time of focusing to an object at infinity of the zoom lens according to the example 24;

FIG. 73A, FIG. 73B, FIG. 73C, FIG. 73D, FIG. 73E, FIG. 73F, FIG. 73G, FIG. 73H, FIG. 73I, FIG. 73J, FIG. 73K, and FIG. 73L are aberration diagrams at the time of focusing to an object at a close distance of the zoom lens according to the example 24;

FIG. 74A, FIG. 74B, FIG. 74C, FIG. 74D, FIG. 74E, FIG. 74F, FIG. 74G, FIG. 74H, FIG. 74I, FIG. 74J, FIG. 74K, and FIG. 74L are aberration diagrams at the time of focusing to an object at infinity of the zoom lens according to the example 25;

FIG. 75A, FIG. 75B, FIG. 75C, FIG. 75D, FIG. 75E, FIG. 75F, FIG. 75G, FIG. 75H, FIG. 75I, FIG. 75J, FIG. 75K, and FIG. 75L are aberration diagrams at the time of focusing to an object at a close distance of the zoom lens according to the example 25;

DETAILED DESCRIPTION OF THE INVENTION

Figure 4A:
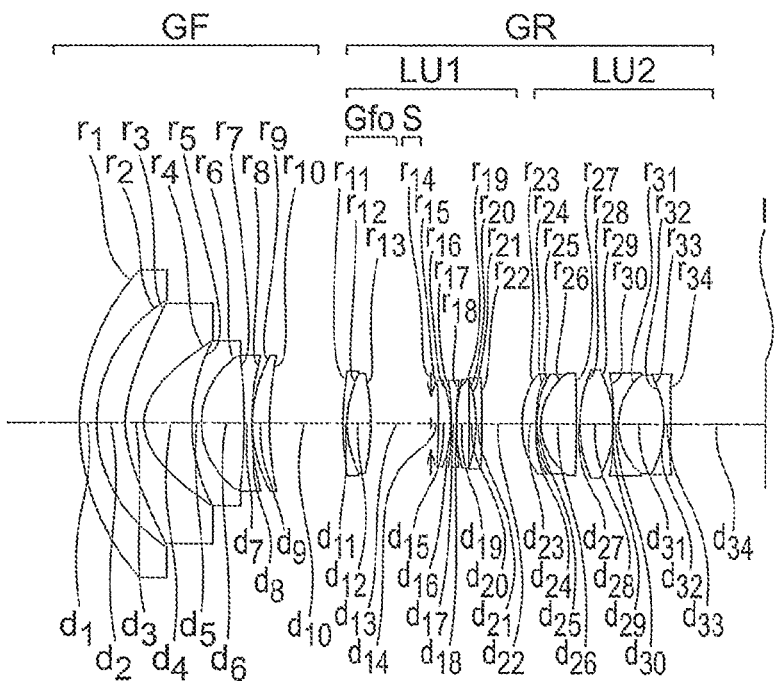
FIG. 4A, FIG. 4B, and FIG. 4C are lens cross-sectional views at the time of focusing to an object at infinity of a zoom lens according to an example 4.

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A zoom lens according to the present embodiment will be described below. To start with, a basic arrangement of the zoom lens will be described below.

A first basic arrangement of the zoom lens according to the present embodiment includes in order from an object side to an image side, a front unit having a negative refractive power, and a rear unit having a positive refractive power, which includes an aperture stop, wherein the front unit includes a first lens having a negative refractive power, a second lens having a negative refractive power, and a third lens having a positive refractive power, and the first lens is disposed nearest to an object, and has a meniscus shape of which a convex surface is directed toward the object side, and the second lens is disposed on the image side of the first lens, and has a meniscus shape of which a convex surface is directed toward the object side, and the rear unit includes in order from the object side to the image side, a first lens unit A and a second lens unit B, and at the time of zooming from a wide angle end to a telephoto end, a distance between the front unit and the rear unit narrows, and a distance between the first lens unit A and the second lens unit B changes, and the first lens unit A includes a focusing lens unit having a positive refractive power, which is disposed on the object side of the aperture stop, and at the time of focusing, only the focusing lens unit moves along an optical axis.

In the first basic arrangement, the zoom lens includes in order from the object side to the image side, the front unit having a negative refractive power and the rear unit having a positive refractive power, which includes an aperture stop. Accordingly, it is possible to let an arrangement of an optical system to be of a retro-focus type. As a result, it is possible to secure a back focus of an appropriate length while having a super-wide angle of view. Here, the super-wide angle of view refers to an angle of view such as 105° or more, and more preferably, 110° or more.

Moreover, in the first basic arrangement, the front unit includes the first lens having a negative refractive power, the second lens having a negative refractive power, and a third lens having a positive refractive power, and the first lens is disposed nearest to the object, and has a meniscus shape of which a convex surface is directed toward the object side, and the second lens is disposed on the image side of the first lens, and has a meniscus shape of which a convex surface is directed toward the object side.

As mentioned above, the front unit has a negative refractive power. Therefore, when the negative refractive power of the front unit is enhanced, it is possible to make a diameter of the optical system small. An amount of curvature of field and astigmatism that occur tends to increase as a height of off-axis principal light ray increases. In an optical system with a super-wide angle of view, the height of an off-axis principal light ray is the maximum while passing through the front unit. Therefore, as the negative refractive power of the front unit is enhanced, the amount of curvature of field and astigmatism that occur is susceptible to increase when the angle of view is let to be super wide.

Therefore, the first lens having a negative refractive power is disposed in the front unit. Moreover, the first lens is disposed nearest to the object in the front unit, and is let to have the meniscus shape of which the convex surface directed toward the object side.

Accordingly, one meniscus lens having a concave surface directed toward the aperture stop is disposed in the front unit where the height of an off-axis principal light ray is the maximum. By making such arrangement, it is possible to refract an off-axis light ray gradually while making the negative refractive power in the front unit large. In other words, it is possible to suppress a sharp refraction of a light ray. As a result, it is possible to make the angle of view super wide while reducing the amount of curvature of field and astigmatism that occur.

Furthermore, the second lens having a negative refractive power is disposed in the front unit. Moreover, the second lens is disposed on the image side of the first lens, and is let to have a meniscus shape of which the convex surface directed toward the object side.

Accordingly, it is possible to make the angle of view further super-wide, while reducing the amount of curvature of field and astigmatism that occur.

Furthermore, the third lens having a positive refractive power is disposed in the front unit. By making such arrangement, it is possible to suppress occurrence of longitudinal chromatic aberration and chromatic aberration of magnification. Moreover, it is possible to reduce an amount of spherical aberration that occurs near the telephoto end.

Moreover, at the time of zooming from the wide angle end to the telephoto end, the distance between the front unit and the rear unit narrows. By making such arrangement, it is possible to achieve a large zooming effect. The distance between the front unit and the rear unit is a paraxial distance.

Moreover, the rear unit includes in order from the object side to the image side, the first lens unit A and the second lens unit B. Furthermore, at the time of zooming from the wide angle end to the telephoto end, the distance between the first lens unit A and the second lens unit B changes. The distance between the first lens unit A and the second lens unit B is a paraxial distance.

As mentioned above, in the basic arrangement, the arrangement of the optical system is of the retro-focus type. In the retro-focus type arrangement, for further thinning of the optical system, it is necessary to make the negative refractive power of the front unit large. Particularly, in a zoom lens with a super-wide angle of view, for shortening the overall length of the optical system upon securing a zooming ratio of 1.9 times or more for instance, the refractive power of not only the front unit but also of the rear unit is required to be made large.

However, when the negative refractive power of the front unit is excessively large, a substantial positive curvature of field occurs in the front unit, and also, at the time of zooming, an off-axis aberration, particularly, the astigmatism is susceptible to fluctuate. Therefore, for reducing the amount of aberration that occurs and suppressing the fluctuation in aberration while maintaining the small-size of the optical system, it is necessary to correct an aberration in the rear unit favorably.

For such reason, the rear unit includes in order from the object side to the image side, the first lens unit A and the second lens unit B. Accordingly, it is possible to correct the aberration in the rear unit favorably. Moreover, at the time of zooming, it is possible to lessen the fluctuation in astigmatism.

Moreover, at the time of zooming from the wide angle end to the telephoto end, the distance between the first lens unit A and the second lens unit B changes. Accordingly, at the time of zooming, it is possible to lessen the fluctuation in aberration.

It is preferable to dispose a positive lens in both the first lens unit A and the second lens unit B, and to make the positive refractive power large. By doing so, it is possible to reduce the amount of curvature of field that occurs.

Moreover, the first lens unit A includes the focusing lens unit having a positive refractive power that is disposed on the object side of the aperture stop, and at the time of focusing, only the focusing lens unit moves along the optical axis.

In the first lens unit A, when the focusing lens unit having a positive refractive power is disposed on the object side of the aperture stop, the focusing lens unit is positioned near the aperture stop, in the vicinity of the wide angle end. Here, a diameter of a light beam becomes small near the aperture stop. Consequently, the focusing lens unit can be disposed at a location where a diameter of a lens in the rear unit becomes further smaller. As a result, it is possible to make the diameter of the focusing lens unit small.

Moreover, at the time of focusing, only the focusing lens unit moves along the optical axis. When such an arrangement is made, on the image side of the aperture stop, there is no lens unit that moves at the time of focusing. Therefore, there is no need to secure a predetermined space on the image side of the aperture stop. As a result, it is possible to make small the diameter of a lens unit positioned on the image side of the aperture stop. The predetermined space is a space that is necessary for the movement of a lens unit at the time of focusing.

Moreover, in an optical system with a super-wide angle of view, it is possible to capture further wider range. In such optical system, the fluctuation in curvature of field that occurs at the time of focusing is a major cause of deterioration of an imaging performance. Especially, the fluctuation in curvature of field at a meridional plane becomes a cause of substantial deterioration of the imaging performance at the time of focusing to an object at a close distance.

The front unit causes the substantial curvature of field at the meridional plane. Therefore, at the time of focusing, when a height of a marginal light ray passing through the front unit fluctuates, the fluctuation in curvature of field at the meridional plane also becomes large. Especially, at the time of focusing to the object at the close distance, the height of a marginal light ray passing through the front unit fluctuates substantially.

Therefore, the focusing lens unit is to be disposed on the object side of the aperture stop. By doing so, the focusing lens unit is positioned on the image side of the front unit. Here, the height of the marginal light ray is lower at the image side of the front unit as compared to the height in the front unit. Consequently, in the focusing lens unit, the height of the marginal light ray becomes low.

In this case, even if the focusing lens unit moves, it is possible to suppress the fluctuation in the height of the marginal light ray passing through the front unit to be small. Accordingly, it is possible to suppress also the fluctuation in curvature of field at the meridional plane. As a result, even at the time of focusing to the object at the close distance, it is possible to maintain high imaging performance of the optical system.

Moreover, a sensitivity of focusing is affected by a magnification of the focusing lens unit and a magnification of the predetermined lens unit. Here, the predetermined lens unit is a lens unit positioned between an image-side surface of the focusing lens unit and an image plane. Therefore, by disposing the focusing lens unit on the object side of the aperture stop and setting appropriately the magnification of the predetermined lens unit, it is possible to improve the sensitivity of focusing. As a result, it is possible to reduce an amount of movement of the focusing lens unit.

Moreover, since it is possible to reduce the amount of movement of the focusing lens unit, at the time of focusing, it is possible to reduce the fluctuation in the height of the marginal light ray in the front unit. Therefore, it is possible to suppress the fluctuation in curvature of field at the meridional plane. As a result, even at the time of focusing to the object at the close distance, it is possible to maintain high imaging performance of the optical system.

As a result, even at the time of focusing to the object at the close distance, it is possible to maintain favorable optical performance. Moreover, it is possible to realize small-sizing and light-weight of the focusing lens unit. Accordingly, it is possible to speed up focusing and to make a drive mechanism of the focusing lens unit light-weight and space-saving.

A separation amount of an axial light ray and a marginal light ray is small near the aperture stop. Therefore, it is preferable to dispose the focusing lens unit near the aperture stop. At this position, a diameter of an axial light beam is large. When the diameter of the axial light beam is large, it is possible to improve the magnification of the focusing lens unit more effectively.

In such manner, when the focusing lens unit is disposed near the aperture stop, it is possible to carry out focusing at a location where the magnification of the focusing lens unit is improved more effectively, or in other words, at a location where the axial light beam is thick. Therefore, by focusing at this position, it is possible to reduce the fluctuation in the height of the marginal light ray in the front unit while improving the sensitivity of focusing.

A second basic arrangement of the zoom lens according to the present embodiment includes in order from an object side to an image side, a front unit having a negative refractive power, and a rear unit having a positive refractive power, which includes an aperture stop, wherein the front unit includes a first lens having a negative refractive power, a second lens having a negative refractive power, and a third lens having a positive refractive power, and the first lens is disposed nearest to an object, and has a meniscus shape of which a convex surface is directed toward the object side, and the second lens is disposed on the image side of the first lens, and has a meniscus shape of which a convex surface is directed toward the object side, and the rear unit includes in order from the object side to the image side, a first lens unit A and a second lens unit B, and at the time of zooming from a wide angle end to a telephoto end, a distance between the front unit and the rear unit narrows, and a distance between the first lens unit A and the second lens unit B changes, and the first lens unit A includes in order from the object side to the image side, a first sub-lens unit having a positive refractive power, the aperture stop, and a second sub-lens unit, and the second sub-lens unit includes a focusing lens unit, and at the time of focusing, only the focusing lens unit moves along an optical axis, and at the time of zooming, a distance between the first sub-lens unit and the second sub-lens unit either changes or is constant.

Description of points in the second basic arrangement that are similar to the points in the first basic arrangement is omitted.

The first lens unit A includes in order from the object side to the image side, the first sub-lens unit having a positive refractive power, the aperture stop, and the second sub-lens unit.

In this case, the first sub-lens unit having a positive refractive power is disposed on the object side of the aperture stop, and the second sub-lens unit is disposed on the image side of the aperture stop. By doing so, correction of spherical aberration and coma can be carried out easily.

Moreover, since the first sub-lens unit has the positive refractive power, the first sub-lens unit has an effect of converging a light beam. Therefore, by disposing the first sub-lens unit nearest to the object in the rear unit, it is possible to make small a diameter of the overall rear unit easily. Moreover, since it is possible to suppress the height of an axial light ray in the rear unit to be low, it is possible to suppress an amount of spherical aberration that occurs.

Moreover, a diameter of a light beam becomes small near the aperture stop. Here, the first sub-lens unit and the second sub-lens unit are disposed to be face-to-face, sandwiching the aperture stop in between. Accordingly, it is possible to make the first sub-lens unit and the second sub-lens unit small-sized. Particularly, it becomes easy to make small a diameter of a lens positioned on the image side of the aperture stop.

Moreover, the second sub-lens unit includes the focusing lens unit, and at the time of focusing, only the focusing lens unit moves along the optical axis.

When the focusing lens unit is disposed in the second sub-lens unit, the focusing lens unit is positioned on the image side of the aperture stop. As mentioned above, the diameter of a light beam becomes small on the image side of the aperture stop. Therefore, the focusing lens unit can be disposed at a location where a diameter of a lens becomes small, in the rear unit. As a result, it is possible to make a diameter of the focusing lens unit small.

Moreover, at the time of focusing, only the focusing lens unit moves along the optical axis. When such an arrangement is made, on the object side of the aperture stop, there is not lens unit that moves at the time of focusing. Therefore, there is no need to secure a predetermined space on the object side of the aperture stop. As a result, it is possible to make small the diameter of a lens unit positioned on the image side of the aperture stop. The predetermined space is a space that is necessary for the movement of a lens unit at the time of focusing.

Moreover, in an optical system with a super-wide angle of view, it is possible to capture further wider range. In such optical system, the fluctuation in curvature of field that occurs at the time of focusing is a major cause of deterioration of an imaging performance. Especially, the fluctuation in the curvature of field at the meridional plane becomes a cause of substantial deterioration of the imaging performance at the time of focusing to an object at a close distance.

The front unit causes a substantial curvature of field at the meridional plane. Therefore, at the time of focusing, when the height of a marginal light ray passing through the front unit fluctuates, the fluctuation in the curvature of field at the meridional plane also becomes large. Especially, at the time of focusing to the object at the close distance, the height of a marginal light ray passing through the front unit fluctuates substantially.

Therefore, the focusing lens unit is to be disposed in the second sub-lens unit. Since the second sub-lens unit is positioned on the image side of the front unit, the focusing lens unit is positioned on the image side of the front unit. Here, the height of the marginal light ray is lower at the image side of the front unit as compared to the height in the front unit. Consequently, in the focusing lens unit, the height of the marginal light ray becomes low.

In this case, even if the focusing lens unit moves, it is possible to suppress the fluctuation in the height of the marginal light ray passing through the front unit to be small. Accordingly, it is possible to suppress also the fluctuation in curvature of field at the meridional plane. As a result, even at the time of focusing to the object at the close distance, it is possible to maintain high imaging performance of the optical system.

Moreover, the sensitivity of focusing is affected by a magnification of the focusing lens unit and a magnification of the predetermined lens unit. Here, the predetermined lens unit is a lens unit positioned between an image-side surface of the focusing lens unit and an image plane. Therefore, by disposing the focusing lens unit on the image side of the aperture stop and setting appropriately the magnification of the predetermined lens unit, it is possible to improve the sensitivity of focusing. As a result, it is possible to reduce an amount of movement of the focusing lens unit.

Moreover, at the time of zooming, the distance between the first sub-lens unit and the second sub-lens unit either changes or is constant.

In a case in which, at the time of zooming, the distance between the first sub-lens unit and the second sub-lens unit is constant, a distance between any lenses in the first lens unit A becomes invariable. Therefore, there is no need to provide a space necessary for the movement of a lens in the first lens unit A. As a result, it is possible to make the first lens unit A small. Moreover, since it is possible to further simplify a structure of a lens barrel, it becomes easier to make a diameter of the lens barrel small. The distance between the first sub-lens unit and the second sub-lens unit is a paraxial distance.

Moreover, at the time of zooming, if a direction of movement or an amount of movement differs for each lens, there arises a need to provide an extra space which is necessary for the movement of a lens in some cases. As a result, sometimes, the overall length of the first lens unit A changes. Whereas, when the first lens unit A moves integrally, all lenses in the first lens unit A move in the same direction by the same amount. In this case, the overall length of the first lens unit A does not change. Therefore, it is possible to make the first lens unit A small-sized.

Moreover, in a case in which the distance between the first sub-lens unit and the second sub-lens unit changes, it is possible to share a zooming ratio by two lens units namely, the first sub-lens unit and the second sub-lens unit. In this case, it is possible to suppress the amount of movement of the first sub-lens unit and the second sub-lens unit at the time of zooming. Therefore, it is possible to shorten the overall length of the optical system.

Moreover, by including the first sub-lens unit and the second sub-lens unit in the first lens unit A, it is possible to impart a zooming effect to both of the first sub-lens unit and the second sub-lens unit. In this case, the magnification necessary for achieving a desired zooming ratio can be shared by the first sub-lens unit and the second sub-lens unit. Consequently, it is possible to suppress the amount of movement at the time of zooming to be small for both the first sub-lens unit and the second sub-lens unit. As a result, it is possible to shorten the overall length of the optical system. The distance between the first sub-lens unit and the second sub-lens unit is a paraxial distance.

Moreover, at the time of zooming, a fluctuation in spherical aberration is susceptible to occur. Therefore, by changing the distance between the two sub-lens units, it is possible to achieve an effect of suppressing mainly the fluctuation in spherical aberration. Making such an arrangement is effective for improving the zooming ratio. Moreover, an amount of fluctuation in curvature of field can also be reduced.

A third basic arrangement of the zoom lens according to the present embodiment includes in order from an object side to an image side, a front unit having a negative refractive power, and a rear unit having a positive refractive power, which includes an aperture stop, wherein the front unit includes a first lens having a negative refractive power, and the first lens is disposed nearest to an object, and has a meniscus shape of which a convex surface is directed toward the object side, and the rear unit includes in order from the object side to the image side, a first lens unit A and a second lens unit B, and at the time of zooming from a wide angle end to a telephoto end, a distance between the from unit and the rear unit narrows, and a distance between the first lens unit A and the second lens unit B changes, and the first lens unit A includes in order from the object side to the image side, a first sub-lens unit having a positive refractive power, an aperture stop, and a second sub-lens unit, and the first lens unit A includes a first focusing lens unit, and a second focusing lens unit is disposed on the image side of the first focusing lens unit, and at the time of focusing, only the first focusing lens unit and the second focusing lens unit move along an optical axis, and at the time of zooming, a distance between the first sub-lens unit and the second sub-lens unit either changes or is constant.

Description of points in the third basic arrangement, that are similar to the points in the first basic arrangement or the second basic arrangement, is omitted.

The first lens unit A includes the first focusing lens unit and the second focusing lens unit on the image side of the first focusing lens unit, and at the time of focusing, only the first focusing lens unit and the second focusing lens unit move along the optical axis.

Since the first lens unit A is disposed in the rear unit, the first lens unit A is positioned on the image side of the front unit. In this case, the focusing lens unit is positioned on the image side of the front unit. As described above, the diameter of a light beam becomes small on the image side of the front unit. Furthermore, the first lens unit A includes the aperture stop. In this case, the focusing lens unit is positioned near the aperture stop. The diameter of a light beam becomes small near the aperture stop. Thus, the focusing lens unit can be disposed at a location where a diameter of a lens becomes small in the rear unit. As a result, it is possible to make a diameter of the focusing lens unit small.

Moreover, at the time of focusing, only the first focusing lens unit and the second focusing lens unit move along the optical axis. When such an arrangement is made, it is possible to make the focusing lens unit light-weight. Moreover, it is possible to make the drive mechanism of the focusing lens unit small-sized and light-weight. As a result, a high-speed focusing drive with less power consumption is possible.

Moreover, in an optical system with a super-wide angle of view, it is possible to capture further wider range. In such optical system, the fluctuation in curvature of field that occurs at the time of focusing is a major cause of deterioration of an imaging performance. Especially, the fluctuation in curvature of field at the meridional plane becomes a cause of substantial deterioration of the imaging performance at the time of focusing to an object at a close distance.

The front unit causes a substantial curvature of field at the meridional plane. Therefore, at the time of focusing, when the height of a marginal light ray passing through the front unit fluctuates, the fluctuation in curvature of field at the meridional plane also becomes large. Especially, at the time of focusing to the object at the close distance, the height of a marginal light ray passing through the front unit fluctuates substantially.

Therefore, the first focusing lens unit is to be disposed in the first lens unit A. Since the first lens unit A is disposed on the image side of the front unit, by doing so, the first focusing lens unit is positioned on the image side of the front unit. Here, the height of the marginal light ray is lower at the image side of the front unit as compared to the height in the front unit. Consequently, in the first focusing lens unit, the height of the marginal light ray becomes low.

In this case, even if the first focusing lens unit moves, it is possible to suppress the fluctuation in the height of the marginal light ray passing through the front unit to be small. Accordingly, it is possible to suppress also the fluctuation in curvature of field at the meridional plane. As a result, even at the time of focusing to the object at the close distance, it is possible to maintain high imaging performance of the optical system.

Moreover, since it is possible to reduce the amount of movement of the first focusing lens unit, at the time of focusing, it is possible to reduce the fluctuation in the height of the marginal light ray in the front unit. Therefore, it is possible to suppress the fluctuation in curvature of field at the meridional plane. As a result, even at the time of focusing to the object at the close distance, it is possible to maintain high imaging performance of the optical system.

As a result, even at the time of focusing to the object at the close distance, it is possible to maintain favorable optical performance. Moreover, it is possible to realize small-sizing and light-weight of the first focusing lens unit. Accordingly, it is possible to speed up focusing and to make a drive mechanism of the first focusing lens unit light-weight and space-saving.

A separation amount of an axial light ray and a marginal light ray is small near the aperture stop. Therefore, it is preferable to dispose the first focusing lens unit near the aperture stop. At this position, a diameter of an axial light beam is large. When the diameter of the axial light beam is large, it is possible to improve the magnification of the first focusing lens unit more effectively.

In such manner, when the first focusing lens unit is disposed near the aperture stop, it is possible to carry out focusing at a location where the magnification of the first focusing lens unit is improved more effectively, or in other words, at a location where the axial light beam is thick. Therefore, by focusing at this position, it is possible to reduce the fluctuation in the height of the marginal light ray in the front unit while improving the sensitivity of focusing.

Moreover, the first lens unit A includes the second focusing lens unit on the image side of the first focusing lens unit. The second focusing lens unit is disposed on the image side of the first focusing lens unit. Consequently, the second focusing lens unit is disposed in the rear unit. Here, as mentioned above, it is possible to make the rear unit small-sized easily. Therefore, it is possible to realize small-sizing and light-weight of the second focusing lens unit.

Moreover, in the focusing by the first focusing lens unit, the fluctuation in curvature of field remains in some cases.

Even in such case, it is possible to correct more favorably the fluctuation in curvature of field that has remained. Moreover, even when the refractive power of the front unit and the rear unit is made large, since it is possible to suppress the fluctuation of various aberrations by the two focusing lens units, it is possible to make the optical system further smaller.

Moreover, it is possible to make both the first focusing lens unit and the second focusing lens unit small-sized and light-weight. Therefore, it is possible to make the focusing speed high. Also, it is possible to make a drive mechanism of the focusing lens unit light-weight and space-saving.

Moreover, at the time of zooming, if a direction of movement or an amount of movement differs for each lens, there arises a need to provide an extra space which is necessary for the movement of a lens in some cases. As a result, some times, the overall length of the first lens unit A changes. Whereas, when the first lens unit A moves integrally, all lenses in the first lens unit A move in the same direction by the same amount. In this case, the overall length of the first lens unit A does not change. Therefore, it is possible to make the first lens unit A small-sized.

Moreover, in a case in which the distance between the first sub-lens unit and the second sub-lens unit changes, it is possible to share a zooming ratio by two lens units namely, the first sub-lens unit and the second sub-lens unit. In this case, it is possible to suppress the amount of movement of the first sub-lens unit and the second sub-lens unit at the time of zooming. Therefore, it is possible to shorten the overall length of the optical system.

Moreover, by including the first sub-lens unit and the second sub-lens unit in the first lens unit A, it is possible to impart a zooming effect to both of the first sub-lens unit and the second sub-lens unit. In this case, the magnification necessary for achieving a desired zooming ratio can be shared by the first sub-lens unit and the second sub-lens unit. Consequently, it is possible to suppress the amount of movement at the time of zooming to be small for both the first sub-lens unit and the second sub-lens unit. As a result, it is possible to shorten the overall length of the optical system. The distance between the first sub-lens unit and the second sub-lens unit is a paraxial distance.

Moreover, the spherical aberration is susceptible to occur at the time of zooming. Therefore, by changing the distance between the two sub-lens units, it is possible to achieve an effect of suppressing mainly the fluctuation in the spherical aberration. Making such an arrangement is effective for improving the zooming ratio. Moreover, it is possible to reduce the amount of fluctuation in the curvature of field.

A fourth basic arrangement of the zoom lens according to the present embodiment includes in order from an object side to an image side, a front unit having a negative refractive power, and a rear unit having a positive refractive power, which includes an aperture stop, wherein the front unit includes a first lens having a negative refractive power and a third lens having a positive refractive power, and the first lens is disposed nearest to an object, and has a meniscus shape of which a convex surface is directed toward the object side, and the rear unit includes in order from the object side to the image side, a second lens unit having a positive refractive power which is positioned on the object side of the aperture stop, a third lens unit, a fourth lens unit having a negative refractive power, and a fifth lens unit having a positive refractive power, and either the second lens unit or the third lens unit includes a focusing lens unit, and at the time of zooming from a wide angle end to a telephoto end, distances between the lens units change, and a distance between the front unit and the rear unit narrows.

Description of points in the fourth basic arrangement, that are similar to the points in the first basic arrangement, the second basic arrangement, and the third basic arrangement, is omitted.

According to the abovementioned arrangement of lens units, at the time of zooming from the wide angle end to the telephoto end, a negative distortion that occurs in the front unit can be reduced in the second lens unit and the third lens unit, and an occurrence of curvature field can be reduced favorably in the fourth lens unit.

Moreover, by the second lens unit having a positive refractive power, it is possible to reduce spherical aberration that occur in the front unit, and at the same time, to reduce a fluctuation in spherical aberration at the time of zooming from the wide angle end to the telephoto end. As a result, according to the zoom lens of the present embodiment, it is possible to have high magnification easily.

It is preferable to dispose a positive lens in both the second lens unit and the third lens unit, and to make the refractive power of the positive lens large. By doing so, it is possible to reduce an amount of curvature of field that occurs.

Moreover, either the second lens unit or the third lens unit includes the focusing lens unit.

When the focusing lens unit is disposed in either the second lens unit or the third lens unit, in the vicinity of the wide angle end, the focusing lens is disposed near the aperture stop. Here, the diameter of a light beam becomes small near the aperture stop. Consequently, the focusing lens unit can be disposed at a location where a diameter of a lens in the rear unit becomes further smaller. As a result, it is possible to make the diameter of the focusing lens unit small.

Moreover, it is preferable to dispose the focusing lens unit having a positive refractive power on the object side of the aperture stop, and also it is preferable that only the focusing lens unit moves along the optical axis at the time of focusing. When such an arrangement is made, on the image side of the aperture stop, there is no lens unit that moves at the time of focusing. Therefore, there is no need to secure a predetermined space on the image side of the aperture stop. As a result, it is possible to make small the diameter of a lens unit positioned on the image side of the aperture stop. The predetermined space is a space that is necessary for the movement of a lens unit at the time of focusing.

Moreover, in an optical system with a super-wide angle of view, it is possible to capture further wider range. In such optical system, the fluctuation in curvature of field that occurs at the time of focusing is a major cause of deterioration of an imaging performance. Especially, the fluctuation in the curvature of field at a meridional plane becomes a cause of substantial deterioration of the imaging performance at the time of focusing to an object at a close distance.

The front unit causes a substantial curvature of field at the meridional plane. In this case, at the time of focusing, when the height of a marginal light ray passing through the front unit fluctuates, the fluctuation in curvature of field at the meridional plane also becomes large. Especially, at the time of focusing to the object at the close distance, the height of a marginal light ray passing through the front unit fluctuates substantially.

Therefore, it is preferable to dispose the focusing lens unit on the object side of the aperture stop. By doing so, the focusing lens unit is positioned on the image side of the front unit. Here, the height of the marginal light ray is lower at the image side of the front unit as compared to the height in the front unit. Consequently, in the focusing lens unit, the height of the marginal light ray becomes low.

In this case, even if the focusing lens unit moves, it is possible to suppress the fluctuation in the height of the marginal light ray passing through the front unit to be small. Accordingly, it is possible to suppress also the fluctuation in curvature of field at the meridional plane. As a result, even at the time of focusing to the object at the close distance, it is possible to maintain high imaging performance of the optical system.

Moreover, the sensitivity of focusing is affected by a magnification of the focusing lens unit and a magnification of the predetermined lens unit. Here, the predetermined lens unit is a lens unit positioned between the image-side surface of the focusing lens unit and an image plain. Therefore, by disposing the focusing lens unit on the object side of the aperture stop and setting appropriately the magnification of the predetermined lens unit, it is possible to improve the sensitivity of focusing. As a result, it is possible to reduce the amount of movement of the focusing lens unit.

Moreover, since it is possible to reduce the amount of movement of the focusing lens unit, at the time of focusing, it is possible to reduce the fluctuation in the height of the marginal light ray in the front unit. Therefore, it is possible to suppress the fluctuation in curvature of field at the meridional plane. As a result, even at the time of focusing to the object at the close distance, it is possible to maintain high imaging performance of the optical system.

As a result, even at the time of focusing to the object at the close distance, it is possible to maintain favorable optical performance. Moreover, it is possible to realize small-sizing and light-weight of the focusing lens unit. Accordingly, it is possible to speed up focusing and to make the drive mechanism of the focusing lens unit light-weight and space-saving.

The separation amount of an axial light ray and a marginal light ray is small near the aperture stop. Therefore, it is preferable to dispose the focusing lens unit near the aperture stop. At this position, a diameter of an axial light beam is large. When the diameter of the axial light beam is large, it is possible to improve the magnification of the focusing lens unit more effectively.

In such manner, when the focusing lens unit is disposed near the aperture stop, it is possible to carry out focusing at a location where the magnification of the focusing lens unit is improved more effectively, or in other words, at a location where the axial light beam is thick. Therefore, by focusing at this position, it is possible to reduce the fluctuation in the height of the marginal light ray in the front unit while improving the sensitivity of focusing.

A fifth basic arrangement of the zoom lens according to the present embodiment includes in order from an object side to an image side, a front unit having a negative refractive power, and a rear unit having a positive refractive power, which includes an aperture stop, wherein the front unit includes a first lens having a negative refractive power, a second lens having a negative refractive power, and a third lens having a positive refractive power, and the first lens is disposed nearest to an object, and has a meniscus shape of which a convex surface directed toward the object side, and the second lens is disposed on the image side of the first lens, and has a meniscus shape of which a convex surface is directed toward the object side, and the rear unit includes in order from the object side to the image side, a second lens unit having a positive refractive power which is positioned on the object side of the aperture stop, a third lens unit having a negative refractive power, and a fourth lens unit having a positive refractive power, and either the second lens unit or the third lens unit includes a focusing lens unit, and at the time of zooming from a wide angle end to a telephoto end, distances between the lens units change, and a distance between the front unit and the rear unit narrows.

Description of points in the fourth basic arrangement that are similar to the points in the first basic arrangement to the fourth basic arrangement is omitted.

According to the abovementioned arrangement of lens units, at the time of zooming from the wide angle end to the telephoto end, a negative distortion that occurs in the front unit can be reduced in the second lens unit and the third lens unit. Moreover, it is possible to correct the negative distortion occurring in the front unit by the second lens unit having a positive refractive power and the third lens unit having a negative refractive power.

Next, preferable aspects of the present embodiment will be described below. Repetitive description of same arrangements will be omitted.

It is preferable that a zoom lens according to a first embodiment has the abovementioned first basic arrangement, and the following conditional expressions (1) and (2) are satisfied:

$$72 < \nu d_{Fnmax} < 110 \qquad (1),\text{ and}$$

$$-1.45 < FB_w/f_F < -0.3 \qquad (2),$$

where, $\nu d_{Fnmax}$ denotes a maximum of Abbe number from among Abbe numbers for lenses having a negative refractive power in the front unit, $FB_w$ denotes a back focus at the wide angle end, and $f_F$ denotes a focal length of the front unit.

By exceeding a lower limit value of conditional expression (1), it is possible to reduce an amount of chromatic aberration that occurs in the front unit. Moreover, by falling below an upper limit value of conditional expression (1), it is possible to secure widely a degree of freedom of selecting a glass material.

By exceeding a lower limit value of conditional expression (2), it is possible to shorten the back focus at the wide angle end. As a result, it is possible to make the optical system small-sized. Moreover, since it is possible to suppress the refractive power of the front unit from becoming large, it is possible to reduce an amount of curvature of field and astigmatism that occur.

By falling below an upper limit value of conditional expression (2), it is possible to set the refractive power of the front unit appropriately. As a result, it is possible to make a diameter of the front unit small.

It is preferable that a zoom lens according to a second embodiment has the abovementioned first basic arrangement, and the following conditional expression (3) is satisfied:

$$-1.8 < f_w \times Fno_{wmin}/f_F < -0.5 \qquad (3),$$

where, $f_w$ denotes a focal length of the overall zoom lens system at the wide angle end, $Fno_{wmin}$ denotes a minimum of F-number from among F-numbers at the wide angle end, and $f_F$ denotes a focal length of the front unit.

By exceeding a lower limit value of conditional expression (3), it is possible to make the angle of view of the zoom lens super wide while being a zoom lens with small diameter and small F-number. Moreover, by falling below an upper limit value of conditional expression (3), it is possible to make the diameter of the front unit small.

It is preferable that a zoom lens according to a third embodiment has the abovementioned first basic arrangement, and the following conditional expressions (2-1) and (3-1) are satisfied:

$$-1.65 < FB_w/f_F < -0.3 \quad (2\text{-}1), \text{ and}$$

$$-2.3 < f_w \times Fno_{wmin}/f_F < -0.7 \quad (3\text{-}1),$$

Technical significance of conditional expression (2-1) is same as the technical significance of conditional expression (2). By exceeding a lower limit value of conditional expression (2-1), it is possible to make the refractive power of the rear unit large. Consequently, it is possible to shorten the overall length of the optical system. Moreover, by falling below an upper limit value of conditional expression (2-1), it is possible to make the refractive power of the front unit large. Consequently, it is possible to make the diameter of the optical system small.

Since technical significance of conditional expression (3-1) is same as the technical significance of conditional expression (3), a description thereof is omitted here.

It is preferable that a zoom lens according to a fourth embodiment has the abovementioned first basic arrangement, and the following conditional expression (4) is satisfied:

$$1.25 < f_{Rw}/FB_w < 5 \quad (4),$$

where, $f_{Rw}$ denotes a focal length of the rear unit at the wide angle end, and $FB_w$ denotes a back focus at the wide angle end.

By exceeding a lower limit value of conditional expression (4), it is possible to reduce an amount of spherical aberration and longitudinal chromatic aberration that occur while securing appropriately the refractive power of the rear unit at the wide angle end. Moreover, since it is possible to shorten the back focus at the wide angle end, it is possible to shorten the overall length of the optical system. Furthermore, since it is possible to make the refractive power of the front unit large, it is possible to make the diameter of the optical system small.

By falling below an upper limit value of conditional expression (4), it is possible to shorten the overall length of the optical system while securing appropriately the refractive power of the rear unit. Furthermore, by making the positive refractive power of the rear unit large, it is possible to reduce an amount of curvature of field that occurs.

It is preferable that a zoom lens according to a fifth embodiment has the abovementioned second basic arrangement, and the following conditional expression (9) is satisfied:

$$1.9 < SP_{F1} < 9.0 \quad (9),$$

where, $$SP_{F1} = (r_{F1o} + r_{F1i})/(r_{F1o} - r_{F1i}), \text{ and here}$$

$r_{F1o}$ denotes a paraxial radius of curvature of an object-side surface of the first lens, and $r_{F1i}$ denotes a paraxial radius of curvature of the image-side surface of the first lens.

By exceeding a lower limit value of conditional expression (9), it is possible to suppress a difference in a curvature of the object-side surface of the first lens and a curvature of the image-side surface of the first lens from becoming excessively large. As a result, it is possible to reduce an amount of astigmatism that occurs.

By falling below an upper limit value of conditional expression (9), it is possible to suppress the difference in the curvature of the object-side surface of the first lens and the curvature of the image-side surface of the first lens from becoming excessively small. In this case, since it is possible to secure the refractive power of appropriate magnitude in the first lens, it is possible to lower a height of a light ray incident on the rear unit. As a result, it is possible to make a lens diameter of the rear unit small. Moreover, since it is possible to make the negative refractive power of the front unit small to some extent, it is possible to suppress an apex of the object-side surface from being positioned on the object side. As a result, it is possible to shorten the overall length of the optical system and to make the optical system small-sized.

It is preferable that a zoom lens according to a sixth embodiment has the abovementioned second basic arrangement, and the following conditional expression (1-1) is satisfied:

$$65 < vd_{Fnmax} < 110 \quad (1\text{-}1),$$

Since technical significance of conditional expression (1-1) is same as the technical significance of conditional expression (1), a description thereof is omitted here.

It is preferable that a zoom lens according to a seventh embodiment has the abovementioned second basic arrangement, and the following conditional expression (2-2) is satisfied:

$$-2.5 < FB_w/f_F < -0.3 \quad (2\text{-}2),$$

Since technical significance of conditional expression (2-2) is same as the technical significance of conditional expression (2), a description thereof is omitted here.

It is preferable that a zoom lens according to an eighth embodiment has the abovementioned second basic arrangement, and the following conditional expression (3-2) is satisfied.

$$-2.3 < f_w \times Fno_{wmin}/f_F < -0.5 \quad (3\text{-}2)$$

Since technical significance of conditional expression (3-2) is same as the technical significance of conditional expression (3), a description thereof is omitted here.

It is preferable that a zoom lens according to a ninth embodiment has the abovementioned second basic arrangement, and conditional expression (4) is satisfied.

It is preferable that a zoom lens according to a tenth embodiment has the abovementioned third basic arrangement, and the front unit includes a third lens having a positive refractive power which is disposed on the aperture-stop side of the first lens.

By making such arrangement, it is possible to suppress an occurrence of longitudinal chromatic aberration and chromatic aberration of magnification. Moreover, it is possible to reduce an amount of spherical aberration that occurs near the telephoto end.

It is preferable that a zoom lens according to an eleventh embodiment has the abovementioned third basic arrangement, and the front unit includes a second lens having a negative refractive power and a third lens having a positive refractive power, and the second lens is disposed on the image side of the first lens, and has a meniscus shape of which a convex surface is directed toward the object side.

Accordingly, two meniscus lenses having a concave surface directed toward the aperture stop are disposed in the front unit for which a height of an off-axis principal light ray is the maximum. By making such arrangement, it is possible to refract an off-axis light ray gradually while making the negative refractive power in the front unit large. In other words, it is possible to suppress a sharp refraction of a light ray. As a result, it is possible to make the angle of view super wide while reducing an amount of curvature of field and astigmatism that occur.

Moreover, by the third lens having a positive refractive power, it is possible to suppress an occurrence of longitudinal chromatic aberration and chromatic aberration of magnification. Also, it is possible to reduce an occurrence of spherical aberration near the telephoto end.

It is preferable that a zoom lens according to a twelfth embodiment has the abovementioned third basic arrangement, and the following conditional expression (1-2) is satisfied:

$$49 < vd_{Fnmax} < 110 \quad (1\text{-}2).$$

Since technical significance of conditional expression (1-2) is same as the technical significance of conditional expression (1), a description thereof is omitted here.

It is preferable that a zoom lens according to a thirteenth embodiment has the abovementioned third basic arrangement, and the following conditional expression (2-2) is satisfied:

$$-2.5 < FB_w/f_F < -0.3 \quad (2\text{-}2).$$

Since technical significance of conditional expression (2-2) is same as the technical significance of conditional expression (2), a description thereof is omitted here.

It is preferable that a zoom lens according to a fourteenth embodiment has the abovementioned third basic arrangement, and conditional expression (3-2) is satisfied:

$$-2.3 < f_w \times Fno_{wmin}/f_F < -0.5 \quad (3\text{-}2).$$

It is preferable that a zoom lens according to a fifteenth embodiment has the abovementioned third basic arrangement, and conditional expression (4) is satisfied.

It is preferable that a zoom lens according to a sixteenth embodiment has the abovementioned fourth basic arrangement, and the following conditional expression (9-1) is satisfied:

$$1.65 < SP_{F1} < 9.0 \quad (9\text{-}1).$$

It is preferable that a zoom lens according to a seventeenth embodiment of the present invention has the abovementioned fourth basic arrangement, and conditional expression (2) is satisfied.

It is preferable that a zoom lens according to an eighteenth embodiment has the abovementioned fourth basic arrangement, and the following conditional expression (1-3) is satisfied:

$$52 < vd_{Fnmax} < 110 \quad (1\text{-}3).$$

It is preferable that a zoom lens according to a nineteenth embodiment has the abovementioned fourth basic arrangement, and conditional expression (4) is satisfied.

It is preferable that a zoom lens according to a twentieth embodiment has the abovementioned fifth basic arrangement, and conditional expressions (1) and (2) are satisfied.

It is preferable that a zoom lens according to a twenty first embodiment has the abovementioned fifth basic arrangement, and conditional expression (4-1) is satisfied:

$$1.2 < f_{Rw}/FB_w < 5 \quad (4\text{-}1).$$

Since technical significance of conditional expression (4-1) is same as the technical significance of conditional expression (4), a description thereof is omitted here.

It is preferable that a zoom lens according to a twenty second embodiment has the abovementioned fifth basic arrangement, and conditional expressions (1), (2-1), and (3-3) are satisfied:

$$-1.8 < f_w \times Fno_{wmin}/f_F < -0.5 \quad (3\text{-}3).$$

Since technical significance of conditional expression (3-3) is same as the technical significance of conditional expression (3), a description thereof is omitted here.

It is preferable that a zoom lens according to a twenty third embodiment has the abovementioned fifth basic arrangement, and the following conditional expression (16) is satisfied:

$$2.6 < f_3/f_F < 15 \quad (16),$$

where, $f_3$ denotes a focal length of the third lens unit, and
$f_F$ denotes a focal length of the front unit.

By exceeding a lower limit value of conditional expression (16), it is possible to make the negative refractive power of the third lens unit large. As a result, it is possible to reduce favorably the negative distortion that may occur in the front unit. Moreover, by falling below an upper limit value of conditional expression (16), it is possible to suppress bending of a marginal light ray, and to make a diameter of the fourth lens unit small. As a result, it is possible to make the overall zoom lens small-sized.

It is preferable that a zoom lens according to a twenty fourth embodiment has the abovementioned fifth basic arrangement, and the following conditional expression (17) is satisfied:

$$-25 < f_3/f_w < -4 \quad (17),$$

where, $f_3$ denotes the focal length of the third lens unit, and
$f_w$ denotes the focal length of the overall zoom lens at the wide angle end.

By exceeding a lower limit value of conditional expression (17), it is possible to make the negative refractive power of the third lens unit large. As a result, it is possible to reduce favorably the negative distortion that may occur in the front unit. Moreover, by falling below an upper limit value of conditional expression (17), it is possible to suppress bending of a marginal light, and to make the diameter of the fourth lens unit small. As a result, it is possible to make the overall zoom lens small-sized.

Preferable aspects of the zoom lenses according to the embodiments from the first embodiment to the twenty fourth embodiment will be described below. In the following description, the zoom lenses according to the first embodiment to the twenty fourth embodiment will simply be referred to as 'the zoom lens according to the present embodiment'.

In the zoom lens according to the present embodiment, it is preferable that the front unit further includes a fourth lens having a negative refractive power.

By making such arrangement, it is possible to correct favorably the spherical aberration in the front unit, and to suppress a fluctuation in the spherical aberration at the time of zooming. As a result, a favorable optical performance in the entire zoom range is achieved. Moreover, it is possible to make the refractive power of the front unit large while suppressing an occurrence of curvature of field, astigmatism, and chromatic aberration of magnification. As a result, since an entrance pupil is positioned farther on the object side, it is possible to make the diameter of the front unit small. The front unit may further include a lens having a negative refractive power. By making such arrangement, it is possible to further enhance the abovementioned effect.

Moreover, it is preferable that the lens having a negative refractive power is disposed near a lens having a positive refractive power. It is preferable that the fourth lens is disposed near the third lens for example. By making such arrangement, it is possible to further enhance the abovementioned effect.

Moreover, in the zoom lens according to the present embodiment, it is preferable that the front unit further includes a fourth lens having a negative refractive power, and the fourth lens has a meniscus shape.

By making such arrangement, three meniscus lenses are disposed in the front unit. In this case, it is possible to refract gradually a light ray incident on the front unit with a super-wide angle of view by the three meniscus lenses. Moreover, in each meniscus lens, it is possible to refract a light ray gradually while suppressing an angle of incidence of a light ray on a lens to be small. Therefore, at each meniscus lens, it is possible to suppress an occurrence of curvature of field, astigmatism, and chromatic aberration of magnification. The front unit may further include a negative meniscus lens. By making such arrangement, it is possible to further enhance the abovementioned effect.

Moreover, in the zoom lens according to the present embodiment, it is preferable that the front unit further includes a fourth lens having a negative refractive power, and the fourth lens has a meniscus shape of which a convex surface is directed toward the object side.

By making such arrangement, a negative meniscus lens other than the first lens and the second lens, is disposed in the front unit. Here, each of the three meniscus lenses has a convex surface directed toward the object side, or in other words, a concave surface directed toward the image side. In this case, it is possible to suppress a sharp refraction of a light ray while further making the negative refractive power large. Consequently, it is possible to reduce an amount of curvature of field and astigmatism that occur. As a result, further super-widening of the angle of view and small-sizing of the optical system become easy. The front unit may further include a negative meniscus lens having a convex surface directed toward the object side. By making such arrangement, it is possible to further enhance the abovementioned effect.

Moreover, in the zoom lens according to the present embodiment, it is preferable that the fourth lens is disposed on the image side of the second lens.

Accordingly, it is possible to make the refractive power of the front unit large while reducing an amount of curvature of field, astigmatism, and chromatic aberration of magnification that occur. Moreover, since the entrance pupil is positioned farther on the object side, it is possible to make the diameter of the front unit small.

Moreover, in the zoom lens according to the present embodiment, it is preferable that the following conditional expression (5) is satisfied:

$$1.1<|r_{F1i}/f_F|<3 \qquad (5),$$

where, $r_{F1i}$ denotes a paraxial radius of curvature of an image-side surface of the first lens, and $f_F$ denotes the focal length of the front unit.

By exceeding a lower limit value of conditional expression (5), it is possible to suppress the refractive power of the first lens from becoming excessively large. As a result, it is possible to suppress an amount of curvature of field, astigmatism, and distortion that occur. Moreover, since it is possible to slim the total thickness of the front unit, it is possible to shorten the overall length of the optical system.

By below an upper limit value of conditional expression (5), the refractive power of the first lens becomes large. In this case, since the lens diameter in the front unit becomes small, it is possible to make the optical system small-sized. Moreover, it is possible to make the refractive power of the front unit large while reducing the occurrence of curvature of field and astigmatism.

Moreover, in the zoom lens according to the present embodiment, it is preferable that the following conditional expression (6) is satisfied:

$$0.53<\theta gF_{Fn}<0.55 \qquad (6),$$

where, $\theta gF_{Fn}$ denotes a partial dispersion ratio of a lens for which a value of Abbe number is the maximum from among lenses having a negative refractive power in the front unit, and is expressed by $\theta gF_{Fn}=(ng-nF)/(nF-nc)$, and here ng, nF, and nc denote refractive indices for a g-line, an F-line, and a C-line respectively of a lens for which the value of Abbe number is the maximum.

By satisfying conditional expression (6), it is possible to suppress an occurrence of chromatic aberration of magnification in the front unit while securing widely a degree of freedom of selecting a glass material to be used in the front unit.

Moreover, in the zoom lens according to the present embodiment, it is preferable that the following conditional expression (7) is satisfied:

$$0.01<\theta gF_{Fn}+0.0016\times vd-0.6415<0.054 \qquad (7),$$

where, $\theta gF_{Fn}$ denotes a partial dispersion ratio of a lens for which a value of Abbe number is the maximum from among lenses having a negative refractive power in the front unit, and is expressed by $\theta gF_{Fn}=(ng-nF)/(nF-nc)$, and here ng, nF, and nc denote refractive indices for a g-line, an F-line, and a C-line respectively of a lens for which the value of Abbe number is the maximum, and vd denotes Abbe number for the lens for which the value of Abbe number is the maximum.

For suppressing the occurrence of mainly the curvature of field and astigmatism, a plurality of lenses having a negative refractive power is used in the front unit. However, by using lenses having a negative refractive power, mainly the longitudinal chromatic aberration, chromatic aberration of magnification, and spherical aberration occur in some cases. Therefore, by disposing a lens having a positive refractive power in the front unit, it becomes easy to reduce an occurrence of these aberrations. As a result, it becomes easy to secure high optical performance.

Here, for correcting a chromatic aberration favorably while making the negative refractive power of the front unit large, it is preferable that a dispersion of a lens having a positive refractive power is high. However, when the dispersion of the lens having a positive refractive power is high, a secondary spectrum occurs substantially in some cases. Therefore, for the lens having a negative refractive power in the front unit, using a glass material having a peculiarity of being capable of reducing an amount of the secondary spectrum that occurs is effective for correction of the chromatic aberration.

By exceeding a lower limit value of conditional expression (7), it is possible to reduce the amount of secondary spectrum that occurs in the front unit. As a result, it is possible to reduce the amount of longitudinal chromatic aberration and chromatic aberration of magnification that occur.

By falling below an upper limit value of conditional expression (7), it is possible to suppress the excessive correction of the amount of secondary spectrum occurring in the front unit. As a result, it is possible to balance the longitudinal chromatic aberration and chromatic aberration of magnification.

Moreover, in the zoom lens according to the present embodiment, it is preferable that the following conditional expression (8) is satisfied:

$$0.06 < FB_w/LTL_w < 0.20 \quad (8),$$

where, $FB_w$ denotes the back focus at the wide angle end, and $LTL_w$ denotes a distance on an optical axis from a surface nearest to object of the zoom lens up to an image plane, at the wide angle end.

By exceeding a lower limit value of conditional expression (8), it is possible to shorten the overall length of the optical system with respect to the back focus, at the wide angle end. As a result, it is possible to shorten the overall length of the optical system. The axial distance is a paraxial distance.

By falling below an upper limit value of conditional expression (8), it is possible to shorten the back focus with respect to the overall length of the optical system. As a result, it is possible to shorten the overall length of the optical system. Moreover, in a case of disposing an optical element in the optical system, it is possible to secure adequately a space for disposing the optical element. Consequently, it becomes easy to secure high optical performance in the entire zoom range.

Moreover, in the zoom lens according to the present embodiment, it is preferable that the following conditional expression (9) is satisfied:

$$1.9 < SP_{F1} < 9.0 \quad (9),$$

where, $$SP_{F1} = (r_{F1o} + r_{F1i})/(r_{F1o} - r_{F1i}), \text{ and here}$$

$r_{F1o}$ denotes a paraxial radius of curvature of an object-side surface of the first lens, and $r_{F1i}$ denotes the paraxial radius of curvature of the image-side surface of the first lens.

Since the technical significance of conditional expression (9) has already been described above, a description thereof is omitted here.

Moreover, in the zoom lens according to the present embodiment, it is preferable that at least one of the lenses in the front unit, having a meniscus shape of which the convex surface is directed toward the object side, is an aspheric lens which satisfies the following conditional expression (10):

$$30° < ASP_{R\theta} < 70° \quad (10),$$

where, $ASP_{R\theta}$ denotes an inclination of a plane at a predetermined position of a surface on the image side of the at least one of the lenses, and here the predetermined position is a position at which an effective aperture of the at least one of the lenses is the maximum, and the inclination of the plane is an angle at which a tangent of the plane at the predetermined position intersects the optical axis.

By exceeding a lower limit value of conditional expression (10), it is possible to reduce an amount of astigmatism and distortion that occur. By falling below an upper limit value of conditional expression (10), it is possible to reduce an amount of chromatic aberration of magnification that occurs.

Moreover, in the zoom lens according to the present embodiment, it is preferable that at the time of zooming, the front unit moves.

Accordingly, it is possible to reduce an amount of curvature of field that occurs in the entire zoom range.

Moreover, in the zoom lens according to the present embodiment, it is preferable that the first lens unit A includes in order from the object side to the image side, a first sub-lens unit and a second sub-lens unit, and at the time of zooming, a distance between the first sub-lens unit and the second sub-lens unit is constant.

In this case, at the time of zooming, a distance between any lenses in the first lens unit A becomes invariable. Therefore, there is no need of providing a space necessary for the movement of a lens in the first lens unit A. As a result, it is possible to make the first lens unit A small-sized. Moreover, since it is possible to further simplify a structure of a lens barrel, it becomes easier to make a diameter of the lens barrel small. The distance between the first sub-lens unit and the second sub-lens unit is a paraxial distance.

Moreover, at the time of zooming, if a direction of movement or an amount of movement differs for each lens, there arises a need to provide an extra space which is necessary for the movement of a lens in some cases. As a result, some times, the overall length of the first lens unit A changes. Whereas, when the first lens unit A moves integrally, all lenses in the first lens unit A move in the same direction by the same amount. In this case, the overall length of the first lens unit A does not change. Therefore, it is possible to make the first lens unit small-sized.

Moreover, in the zoom lens according to the present embodiment, it is preferable that the first lens unit A includes in order from the object side to the image side, a first sub-lens unit and a second sub-lens unit, and at the time of zooming, a distance between the first sub-lens unit and the second sub-lens unit changes.

By making such arrangement, it is possible to share a zooming ratio by two lens units namely, the first sub-lens unit and the second sub-lens unit. In this case, it is possible to suppress an amount of movement of the first sub-lens unit and the second sub-lens unit at the time of zooming. Therefore, it is possible to shorten the overall length of the optical system.

Moreover, by including the first sub-lens unit and the second sub-lens unit in the first lens unit A, it is possible to impart a zooming effect to both of the first sub-lens unit and the second sub-lens unit. In this case, the magnification necessary for achieving a desired zooming ratio can be shared by the first sub-lens unit and the second sub-lens unit. Consequently, it is possible to suppress the amount of movement at the time of zooming to be small for both the first sub-lens unit and the second sub-lens unit. As a result, it is possible to shorten the overall length of the optical system. The distance between the first sub-lens unit and the second sub-lens unit is a paraxial distance.

Moreover, at the time of zooming, the fluctuation in the spherical aberration is susceptible to occur. Therefore, by changing the distance between the two sub-lens units, it is possible to achieve an effect of suppressing mainly the fluctuation in the spherical aberration. Making such arrangement is effective for improving the zooming ratio. Moreover, an amount of fluctuation in the curvature of field can also be reduced.

Moreover, in the zoom lens according to the present embodiment, it is preferable that a part of the first sub-lens unit is the focusing lens unit, and at the time of zooming, the focusing lens unit moves integrally with the first sub-lens unit.

By making such arrangement, in zooming, it is possible to make the movement of the focusing lens unit simplified. Moreover, since only the focusing lens unit moves at the time of focusing, it is possible to make the focusing lens unit light-weight. Moreover, it is also possible to make a drive mechanism of the focusing lens unit small-sized and light-weight. As a result, a high-speed focusing drive with less power consumption is possible.

Moreover, in the zoom lens according to the present embodiment, it is preferable that the entire first sub-lens unit is the focusing lens unit.

Since the rear unit includes the aperture stop, it is possible to position the first sub-lens unit near the aperture stop. Consequently, by letting the entire first sub-lens unit to be the focusing lens unit, the focusing lens unit is positioned near the aperture stop.

The height of an off-axis light ray is low near the aperture stop. Therefore, for an off-axis light ray that passes through the focusing lens unit, a change in the height or a change in the angle of a light ray due to zooming is small. As a result, it is possible to reduce an amount of fluctuation in the off-axis aberration, particularly a coma, in the entire zoom range.

Moreover, by making such arrangement, it is possible to have a common drive mechanism for zooming and focusing. Consequently, it is possible to make a lens-frame structure simplified and small-sized.

Moreover, in the zoom lens according to the present embodiment, it is preferable that the first sub-lens unit has a positive refractive power.

Since the rear unit includes the aperture stop, the first sub-lens unit having a positive refractive power can be disposed on the object side of the aperture stop. In this case, the second sub-lens unit is disposed on the image side of the aperture stop. By making such arrangement, it is possible to correct the spherical aberration and the coma easily.

Moreover, since the first sub-lens unit has a positive refractive power, the first sub-lens unit has an effect of converging a light beam. Therefore, by disposing the first sub-lens unit nearest to object in the rear unit, it is possible to make small a diameter of the overall rear unit easily. Moreover, since it is possible to suppress the height of an axial light ray in the rear unit to be low, it is possible to suppress an amount of spherical aberration that occurs.

Moreover, in the zoom lens according to the present embodiment, it is preferable that the first lens unit A includes in order from the object side to the image side, the focusing lens unit, and a second sub-lens unit, and at the time of zooming, a distance between the focusing lens unit and the second sub-lens unit changes.

Accordingly, it is possible to reduce an amount of fluctuation in the curvature of field at the time of zooming. The distance between the focusing lens unit and the second sub-lens unit is a paraxial distance.

Moreover, in the zoom lens according to the present embodiment, it is preferable that the first lens unit A includes a motion-blur reducing lens unit, and image motion due to camera shake is reduced by moving the motion-blur reducing lens unit in a direction perpendicular to the optical axis.

A camera shake causes an image blur. Therefore, the image blur is to be corrected by moving the motion-blur reducing lens unit in the direction perpendicular to the optical axis. As mentioned above, the front unit has a negative refractive power. Therefore, the motion-blur reducing lens unit is to be disposed on the image side of the front unit, and a positive refractive power is to be imparted to the motion-blur reducing lens unit. By making such arrangement, it is possible to improve magnification of the motion-blur reducing lens unit. In other words, it is possible to make an amount of movement of image even larger with respect to an amount of movement of the motion-blur reducing lens unit. As a result, it is possible to improve the sensitivity of motion-blur reduction.

Moreover, in the zoom lens according to the present embodiment, it is preferable that the motion-blur reducing lens unit is disposed on the image side of the focusing lens unit.

It is preferable that the motion-blur reducing lens unit is capable of moving at a higher speed. Moreover, it is preferable that a range of movement is narrow. For this, it is desirable that a diameter of the motion-blur reducing lens unit is as small as possible. In other words, it is desirable to let a lens (lens unit) at a position at which a light beam becomes thinner to be the motion-blur reducing lens unit.

A light beam emerged from the focusing lens unit passes through the aperture stop. Consequently, a diameter of the light beam is small on the image side of the focusing lens unit. Therefore, by disposing the motion-blur reducing lens unit here, it is possible to make the diameter of the motion-blur reducing lens unit small. As a result, the image blur can be reduced favorably.

Moreover, in the zoom lens according to the present embodiment, it is preferable that the motion-blur reducing lens unit is disposed in the first sub-lens unit, and an image blur due to camera shake is reduced by moving the motion-blur reducing lens unit in a direction perpendicular to the optical axis.

It is preferable that the motion-blur reducing lens unit is capable of moving at a higher speed. Moreover, it is preferable that the range of movement is narrow. For this, it is desirable that the diameter of the motion-blur reducing lens unit is as small as possible. In other words, it is desirable to let a lens (lens unit) at a position at which a light beam becomes thinner to be the motion-blur reducing lens unit.

Since the rear unit includes the aperture stop, the first sub-lens unit can be disposed near the aperture stop. Consequently, by disposing the motion-blur reducing lens unit in the first sub-lens unit, it is possible to dispose the motion-blur reducing lens unit near the aperture stop. By making such arrangement, it is possible to reduce the motion blur at a location where the magnification of the motion-blur reducing lens unit is improved even more effectively, or in other words, at a location where an axial light beam is thick. As a result, it is possible to improve the sensitivity of the motion-blur reducing lens unit.

Similar is a case when the first sub-lens unit is disposed near the aperture stop.

Moreover, in the zoom lens according to the present embodiment, it is preferable that the motion-blur reducing lens unit is disposed in the first sub-lens unit.

It is preferable that the motion-blur reducing lens unit is capable of moving at a higher speed. Moreover, it is preferable that the range of movement is narrow. For this, it is desirable that the diameter of the motion-blur reducing lens unit is as small as possible. In other words, it is desirable to let a lens (lens unit) at a position at which a light beam becomes thinner to be the motion-blur reducing lens unit.

The first sub-lens unit is disposed near the aperture stop. Consequently, by disposing the motion-blur reducing lens unit in the first sub-lens unit, it is possible to dispose the motion-blur reducing lens unit near the aperture stop. By making such arrangement, it is possible to reduce the motion blur at a location where the magnification of the motion-blur reducing lens unit is improved even more effectively, or in other words, at a location where an axial light beam is thick. As a result, it is possible to improve the sensitivity of the motion-blur reducing lens unit.

Moreover, in the zoom lens according to the present embodiment, it is preferable that the motion-blur reducing lens unit is disposed in the second sub-lens unit.

It is preferable that the motion-blur reducing lens unit is capable of moving at a higher speed. Moreover, it is preferable that the range of movement is narrow. For this, it is desirable that the diameter of the motion-blur reducing lens unit is as small as possible. In other words, it is desirable to let a lens (lens unit) at a position at which a light beam becomes thinner to be the motion-blur reducing lens unit.

The second sub-lens unit is disposed near the aperture stop. Consequently, by disposing the motion-blur reducing lens unit in the second sub-lens unit, it is possible to dispose the motion-blur reducing lens unit near the aperture stop. By making such arrangement, it is possible to reduce the motion blur at a location where the magnification of the motion-blur reducing lens unit is improved even more effectively, or in other words, at a location where an axial light beam is thick. As a result, it is possible to improve the sensitivity of the motion-blur reducing lens unit.

Moreover, in the zoom lens according to the present embodiment, it is preferable that either the second lens unit or the third lens unit includes the motion-blur reducing lens unit, and it is preferable to reduce the image blur caused due to camera shake by moving the motion-blur reducing lens unit in a direction perpendicular to the optical axis.

A camera shake causes an image blur. Therefore, the image blur is to be corrected by moving the motion-blur reducing lens unit in the direction perpendicular to the optical axis. By making such arrangement, it is possible to improve magnification of the motion-blur reducing lens unit. In other words, it is possible to make an amount of movement of image even larger with respect to an amount of movement of the motion-blur reducing lens unit. As a result, it is possible to improve the sensitivity of the motion-blur reduction.

Moreover, it is preferable that the second lens unit includes the motion-blur reducing lens unit, and it is preferable to reduce the image blur due to camera shake by moving the motion-blur reducing lens unit in a direction perpendicular to the optical axis.

As mentioned above, the front unit has a negative refractive power. Therefore, the motion-blur reducing lens unit is disposed on the image side of the front unit, and a positive refractive power is imparted to the second lens unit which includes the motion-blur reducing lens unit. As a result, it is possible to further improve the sensitivity of the motion-blur reduction.

Moreover, it is preferable that the second lens unit is the motion-blur reducing lens unit, and it is preferable to reduce the image motion due to camera shake by moving the motion-blur reducing lens unit in a direction perpendicular to the optical axis.

Accordingly, it is possible to suppress an occurrence of tilt error in the motion-blur reducing lens unit, and to secure more stable performance.

Moreover, it is preferable that the third lens unit includes the motion-blur reducing lens unit, and it is preferable to reduce the image blur due to camera shake by moving the motion-blur reducing lens unit in a direction perpendicular to the optical axis.

Moreover, it is preferable that the third lens unit is the motion-blur reducing lens unit, and it is preferable to reduce the image motion due to camera shake by moving the motion-blur reducing lens unit in a direction perpendicular to the optical axis.

Accordingly, it is possible to suppress an occurrence of tilt error in the motion-blur reducing lens unit, and to secure a more stable performance.

Moreover, in the zoom lens according to the present embodiment, it is preferable that the motion-blur reducing lens unit is disposed on the image side of the focusing lens unit.

It is preferable that the motion-blur reducing lens unit is capable of moving at a higher speed. Moreover, it is preferable that a range of movement is narrow. For this, it is desirable that the diameter of the motion-blur reducing lens unit is as small as possible. In other words, it is desirable to let a lens (lens unit) at a position at which a light beam becomes thinner to be the motion-blur reducing lens unit.

A light beam emerged from the focusing lens unit passes through the aperture stop. Consequently, a diameter of the light beam is small on the image side of the focusing lens unit. Therefore, by disposing the motion-blur reducing lens unit here, it is possible to make the diameter of the motion-blur reducing lens unit small. As a result, the image blur can be reduced favorably.

Moreover, in the zoom lens according to the present embodiment, it is preferable that the motion-blur reducing lens unit has a negative refractive power.

Accordingly, the motion-blur reducing lens unit is to be positioned at a portion where the light beam has become thinner. As a result, it is possible to lessen a diameter and a range of the motion-blur reducing lens unit.

Moreover, in the zoom lens according to the present embodiment, it is preferable that the entire first sub-lens unit is the motion-blur reducing lens unit.

By making such arrangement, it is possible to eliminate the tilt error that occurs in the first sub-lens unit compared to the case in which a part of the first sub-lens unit is the motion-blur reducing lens unit. As a result, it is possible to secure a more stable reduction performance.

Moreover, in the zoom lens according to the present embodiment, it is preferable that the following conditional expression (11) is satisfied:

$$-25 < DTL_w < 7 \tag{11},$$

where, $DTL_w$ denotes a distortion at the maximum angle of view at the wide angle end, and is expressed by $DTL_w = (IH_{w1} - IH_{w2})/IH_{w2} \times 100(\%)$, and here $IH_{w1}$ denotes an actual image height of an image formed on an image plane by the maximum angle of view at the wide angle end from an infinite object point, and $IH_{w2}$ denotes a paraxial image height of an image formed on the image plane by the maximum angle of view at the wide angle end from the infinite object point.

By setting appropriately an amount of distortion that occurs, it is possible to make the diameter of the optical system small while facilitating shortening of the overall length of the optical system and super-widening the angle of view by making the refractive power of the front unit large.

By exceeding a lower limit value of conditional expression (11), it is possible to reduce an amount of barrel distortion that occurs. As a result, it is possible to enhance a perspective effect. Moreover, when the distortion is corrected electrically, deterioration of an image can occur due to a peripheral portion of the image being elongated. However, it is possible to suppress the deterioration.

By falling below an upper limit value of conditional expression (11), it is possible to make the diameter of the front unit small. As a result, it is possible to make the optical system small-sized.

Moreover, it is preferable that the zoom lens according to the present embodiment includes a predetermined lens unit, and the predetermined lens unit is a lens unit positioned between an image-side surface of the focusing lens unit and the image plane, and the following conditional expression (12) is satisfied:

$$0.10<|MG_{fob}^2 \times (MG_{fo}^2-1)|<3.0 \qquad (12),$$

where, $MG_{fo}$ denotes a lateral magnification of the focusing lens unit at an arbitrary position, and $MG_{fob}$ denotes a lateral magnification of the predetermined lens unit at a position same as the arbitrary position.

By exceeding a lower limit value of conditional expression (12), it is possible to lessen an amount of movement of the focusing lens unit. As a result, it is possible to shorten the overall length of the optical system. By falling below an upper limit value of conditional expression (12), it is possible to carry out a position-control of the focusing lens unit easily. As a result, it is possible to carry out an accurate focusing.

Moreover, in the zoom lens according to the present embodiment, it is preferable that the following conditional expression (13) is satisfied:

$$-2.0<f_F/(f_w \times f_t)^{1/2}<-1.0 \qquad (13),$$

where, $f_F$ denotes the focal length of the front unit, $f_w$ denotes the focal length of the overall zoom lens system at the wide angle end, and $f_t$ denotes a focal length of the overall zoom lens system at the telephoto end.

Conditional expression (13) is related to a ratio of the focal length of the front unit and a product of the focal length at the wide angle end and the focal length at the telephoto end.

By exceeding a lower limit value of conditional expression (13), it is possible to suppress the refractive power of the front unit from becoming excessively large. As a result, it is possible to reduce an amount of astigmatism and an amount of chromatic aberration of magnification at the wide angle end.

By falling below an upper limit value of conditional expression (13), since it is possible to make the refractive power of the front unit adequately large, it is possible to position the entrance pupil on the object side. As a result, it is possible to make the diameter of the front unit small.

Moreover, in the zoom lens according to the present embodiment, it is preferable that the following conditional expression (14) is satisfied:

$$1.6<SP_{F2}<6 \qquad (14),$$

where, $SP_{F2}=(r_{F2o}+r_{F2i})/(r_{F2o}-r_{F2i})$, and here $r_{F2o}$ denotes a paraxial radius of curvature of an object-side surface of the second lens, and $r_{F2i}$ denotes a paraxial radius of curvature of an image-side surface of the second lens.

By exceeding a lower limit value of conditional expression (14), at the wide angle end, it is possible to shorten the overall length of the optical system with respect to the back focus. As a result, it is possible to shorten the overall length of the optical system.

By falling below an upper limit value of conditional expression (14), at the wide angle end, it is possible to shorten the back focus with respect to the overall length of the optical system. As a result, it is possible to shorten the overall length of the optical system. Moreover, in a case of disposing an optical element in the optical system, it is possible to secure adequately a space for disposing the optical element. Consequently, it is possible to make favorable an optical performance in the entire zoom range.

Moreover, in the zoom lens according to the present embodiment, it is preferable that the following conditional expression (14-1) is satisfied:

$$1.5<SP_{F2}<7 \qquad (14-1),$$

where, $SP_{F2}=(r_{F2o}+r_{F2i})/(r_{F2o}-r_{F2i})$, and here $r_{F2o}$ denotes the paraxial radius of curvature of the object-side surface of the second lens, and $r_{F2i}$ denotes the paraxial radius of curvature of the image-side surface of the second lens.

By exceeding a lower limit value of conditional expression (14-1), it is possible to suppress an inflection of the second lens from becoming excessively large, and to suppress an occurrence of astigmatism.

By falling below an upper limit value of conditional expression (14-1), since it is possible to set appropriately a curvature of the second lens, it is possible to suppress an apex of the object-side surface from being positioned farther on the object side. As a result, it is possible to shorten the overall length of the optical system, and to make the optical system small-sized. Moreover, it is possible to make the diameter of a lens barrel small.

Moreover, in the zoom lens according to the present embodiment, it is preferable that the following conditional expression (15) is satisfied:

$$0.5<SP_{F4}<6.0 \qquad (15),$$

where, $SP_{F4}=(r_{F4o}+r_{F4i})/(r_{F4o}-r_{F4i})$, and here $r_{F4o}$ denotes a paraxial radius of curvature of an object-side surface of the fourth lens, and $r_{F4i}$ denotes a paraxial radius of curvature of an image-side surface of the fourth lens.

By exceeding a lower limit value of conditional expression (15), at the wide angle end, it is possible to shorten the overall length of the optical system with respect to the back focus. As a result, it is possible to further shorten the overall length of the optical system.

By falling below an upper limit value of conditional expression (15), at the wide angle end, it is possible to shorten the back focus with respect to the overall length of the optical system. As a result, it is possible to further shorten the overall length of the optical system. Moreover, in a case of disposing an optical element in the optical system, it is possible to secure adequately a space for disposing the optical element. Consequently, it is possible to make favorable an optical performance in the entire zoom range.

By falling below the upper limit value of conditional expression (15), since it is possible to set appropriately a curvature of the second lens, it is possible to suppress an apex of the object-side surface from being positioned farther on the object side. As a result, it is possible to shorten the overall length of the optical system, and to make the optical system small-sized. Moreover, it is possible to make the diameter of a lens barrel small.

Moreover, in the zoom lens according to the present embodiment, it is preferable that the focusing lens unit is disposed nearest to object in the first lens unit A.

Since the rear unit includes the aperture stop, the height of a marginal light ray is lower at a position of the aperture stop as compared to the height in the front unit. Moreover, in the rear unit, the first lens unit A is disposed on the object side. Therefore, by disposing the focusing lens unit nearest to object in the first lens unit A, the height of a marginal light ray becomes low in the focusing lens unit.

In this case, even if the focusing lens unit moves, it is possible to suppress the fluctuation in the height of the marginal light ray passing through the front unit to be small. Accordingly, it is possible to suppress also the fluctuation in the curvature of field at the meridional plane. As a result, even at the time of focusing to an object at a close distance, it is possible to maintain high imaging performance of the optical system.

In the zoom lens according to the present embodiment, it is preferable that a lens unit nearest to image has a positive refractive power.

For super-widening the angle of view, and making the diameter and the size of the optical system small, it is necessary to make the refractive power of the front unit large. However, when the refractive power of the front unit is made large, a large positive curvature of field occurs in the front unit. Therefore, by disposing the lens unit having a positive refractive power nearest to image, it is possible to correct easily the large positive curvature of field that occurs in the front unit. As a result, it is possible to secure a state in which the curvature of field has been corrected favorably in the entire zoom range.

Moreover, in the zoom lens according to the present embodiment, it is preferable that the front unit includes a first lens unit, and at the time of zooming from the wide angle end to the telephoto end, the first lens unit moves integrally.

By making such arrangement, there is no need to provide a space necessary for zooming in the front unit. Therefore, it is possible to make the front unit small-sized.

If a direction of movement or an amount of movement differs for each lens, there arises a need to provide an extra space which is necessary for the movement of a lens in some cases. As a result, sometimes, the overall length of the front unit changes. Whereas, when the front unit moves integrally, all lenses in the front unit move in the same direction by the same amount. In this case, the overall length of the front unit does not change. Therefore, by making such arrangement, it is possible to make the front unit small-sized.

Moreover, in the zoom lens according to the present embodiment, it is preferable that the front unit includes the first lens unit, and the rear unit includes the first lens unit A and the second lens unit B, and the first lens unit A includes a second lens unit having a positive refractive power and a third lens unit, and the second lens unit B includes a fourth lens unit, and at the time of zooming from the wide angle end to the telephoto end, distances between the lens units change.

By making such arrangement, it is possible to realize a zoom lens in which the optical system is made adequately small-sized and light-weight with the lesser number of lens units, and it is possible to realize a zoom lens in which various aberrations are reduced adequately while having a sufficiently wide angle of view as compared to an F-number.

Moreover, in the zoom lens according to the present embodiment, it is preferable to make the following arrangements.

It is preferable that the front unit includes four lenses having a negative refractive power and one lens having a positive refractive power.

It is preferable that the front unit includes in order from the object side to the image side, two lenses having a negative refractive power and a meniscus shape of which a convex surface is directed toward the object side, one lens having a negative refractive power, and two lenses.

It is preferable that the front unit includes in order from the object side to the image side, three lenses having a negative refractive power and a meniscus shape of which a convex surface directed toward the object side, a biconcave negative lens, and a lens having a positive refractive power of which an object-side surface is a convex surface directed toward the object side.

It is preferable that the first sub-lens unit includes one lens having a negative refractive power and one lens having a positive refractive power.

It is preferable that the first sub-lens unit includes a cemented lens of a lens having a negative refractive power and a meniscus shape of which a convex surface directed toward the object side and a lens having a positive refractive power of which an object-side surface is a convex surface directed toward the object side.

It is preferable that the first sub-lens unit includes only a lens having a positive refractive power of which an object-side surface is a convex surface directed toward the object side.

It is preferable that the second sub-lens unit includes a lens having a positive refractive power of which an image-side surface is a convex surface directed toward the image side, a biconcave negative lens, a lens having a positive refractive power of which an image-side surface is a convex surface directed toward the image side, and a lens having a negative refractive power of which an image-side surface is a convex surface directed toward the image side.

It is preferable that the second sub-lens unit includes in order from the object side to the image side, a cemented lens of a lens having a negative refractive power and a meniscus shape of which a convex surface is directed toward the object side and a biconvex positive lens, a cemented lens of a biconcave negative lens and a lens of which an object-side surface is a convex surface directed toward the object side, a biconvex positive lens, and a positive lens of which an image-side surface is a convex surface directed toward the image side.

It is preferable that the fourth lens unit includes two cemented lenses.

It is preferable that the fourth lens unit includes in order from the object side to the image side, a lens having a positive refractive power, a cemented lens of a lens having a negative refractive power and a lens having a positive refractive power, a lens having a positive refractive power, a lens having a negative refractive power, and a lens having a positive refractive power.

It is preferable that the fourth lens unit includes in order from the object side to the image side, a lens having a positive refractive power of which an object-side surface is a convex surface directed toward the object side, a lens having a negative refractive power and a meniscus shape of which a convex surface is directed toward the object side, a biconvex positive lens, a biconvex positive lens, a biconcave negative lens, and a lens having a positive refractive power of which an object-side surface is a convex surface directed toward the object side.

It is preferable that the fourth lens unit includes only a biconcave negative lens.

It is preferable that at the time of zooming from the wide angle end to the telephoto end, a paraxial distance between the first sub-lens unit and the second sub-lens unit narrows.

It is preferable that at the time of zooming from the wide angle end to the telephoto end, a paraxial distance between the second sub-lens unit and the fourth lens unit widens.

It is preferable that at the time of zooming from the wide angle end to the telephoto end, the front unit moves toward the image side.

It is preferable that at the time of zooming from the wide angle end to the telephoto end, the first sub-lens unit moves toward the object side.

It is preferable that at the time of zooming from the wide angle end to the telephoto end, the second sub-lens unit moves toward the object side.

It is preferable that at the time of zooming from the wide angle end to the telephoto end, the fourth lens unit moves toward the object side.

Moreover, in the zoom lens according to the present embodiment, it is preferable that a part of the second sub-lens unit is the focusing lens unit, and at the time of zooming, the focusing lens unit moves integrally with the second sub-lens unit.

By making such arrangement, in zooming, it is possible to make the movement of the focusing lens unit simplified. Moreover, at the time of focusing, since only the focusing lens unit moves, it is possible to make the focusing lens unit light-weight. Moreover, it is possible to make a drive mechanism of the focusing lens unit small-sized and light-weight. As a result, a high-speed focusing drive with less power consumption is possible.

Moreover, in the zoom lens according to the present embodiment, it is preferable that the entire second sub-lens unit is the focusing lens unit.

It is possible to position the second sub-lens unit near the aperture stop. Consequently, by letting the entire second sub-lens unit to be the focusing lens unit, the focusing lens unit is positioned near the aperture stop.

The height of an off-axis light ray is low near the aperture stop. Therefore, for an off-axis light ray that passes through the focusing lens unit, a change in the height or a change in the angle of a light ray due to zooming is small. As a result, it is possible to reduce an amount of fluctuation in the off-axis aberration, particularly the coma, in the entire zoom range.

Moreover, by making such arrangement, it is possible to have a common drive mechanism for zooming and focusing. Consequently, it is possible to make a lens-frame structure simplified and small-sized.

Moreover, in the zoom lens according to the present embodiment, it is preferable that the first lens unit A includes a front lens unit having a positive refractive power and a rear lens unit, and at the time of zooming, a distance between the front lens unit and the rear lens unit changes, and the front lens unit includes the first sub-lens unit.

At the time of zooming, a fluctuation in the spherical aberration is susceptible to occur. Therefore, by making an arrangement such that the distance between the front lens unit and the rear lens unit changes, it is possible to achieve an effect of suppressing mainly the fluctuation in the spherical aberration. Making such an arrangement is effective for improving the zooming ratio.

Moreover, in the zoom lens according to the present embodiment, it is preferable that the rear lens unit has a negative refractive power.

Making such arrangement is desirable for carrying out a favorable correction of the spherical aberration, and for further improving the zooming ratio.

Moreover, in the zoom lens according to the present embodiment, it is preferable that a part of the rear lens unit is the focusing lens unit, and at the time of focusing, the focusing lens unit moves integrally with the rear lens unit.

The second sub-lens unit includes the focusing lens unit. Here, an arrangement is made such that the focusing lens unit becomes a part of the second sub-lens unit and is to be moved integrally with the second sub-lens unit at the time of zooming. By making such arrangement, in zooming, it is possible to make the movement of the focusing lens unit simplified. Moreover, since only the focusing lens unit moves at the time of focusing, it is possible to make the focusing lens unit light-weight. Moreover, it is possible to make a drive mechanism of the focusing lens unit small-sized and light-weight. As a result, a high-speed focusing drive with lesser power consumption is possible.

Moreover, in the zoom lens according to the present embodiment, it is preferable that the entire rear lens unit is the focusing lens unit.

By making such arrangement, it is possible to have a common drive mechanism for zooming and focusing. Consequently, it is possible to make a lens-frame structure simplified and small-sized.

It is preferable that the third lens is disposed nearest to image in the front unit.

It is preferable that the third lens is a biconvex positive lens.

It is preferable that the front unit includes a fifth lens having a negative refractive power, and the fifth lens is disposed between the fourth lens and the third lens.

It is preferable that the fifth lens is a biconcave negative lens.

It is preferable that the front unit includes in order from the object side to the image side, the first lens, the second lens, the fourth lens, the fifth lens, and the third lens.

It is preferable that the front unit includes in order from the object side to the image side, a negative meniscus lens having a convex surface directed toward the object side, a negative meniscus lens having a convex surface directed toward the object side, a negative meniscus lens having a convex surface directed toward the object side, a biconcave negative lens, and a biconvex positive lens.

In the rear unit, it is preferable that an object-side surface of a lens disposed nearest to object is a convex surface directed toward the object side.

In the second lens unit, it is preferable that an object-side surface of a lens disposed nearest to image is a convex surface directed toward the object side.

Moreover, in the third lens unit, it is preferable that an object-side surface of a lens disposed nearest to object is a convex surface directed toward the object side.

Moreover, it is preferable that a lens disposed nearest to object in the third lens unit is a biconvex positive lens.

Moreover, it is preferable that at the time of zooming, the front unit moves toward the image side.

It is preferable that at the time of zooming, each lens unit in the rear unit moves toward the object side.

Moreover, it is preferable that the front unit includes the first lens unit.

It is preferable that the rear unit includes in order from the object side to the image side, a second lens unit having a positive refractive power, a third lens unit having either a positive refractive power or a negative refractive power, and a fourth lens unit having either a positive refractive power or a negative refractive power.

It is preferable that the rear lens unit includes in order from the object side to the image side, a second lens unit having a positive refractive power, a third lens unit having either a positive refractive power or a negative refractive power, a fourth lens unit having either a positive refractive power or a negative refractive power, and a fifth lens unit having either a positive refractive power or a negative refractive power.

Moreover, it is preferable that at the time of zooming from the wide angle end to the telephoto end, a distance between the second lens unit and the third lens unit narrows.

Moreover, it is preferable that at the time of zooming from the wide angle end to the telephoto end, the front unit moves toward the image side, and each lens unit in the rear unit moves toward the object side.

Moreover, in the zoom lens according to the present embodiment, it is preferable that the first sub-lens unit includes a first focusing lens unit.

It is possible to position the first sub-lens unit near the aperture stop. When such an arrangement is made, the first focusing lens unit is positioned near the aperture stop. The height of an off-axis light ray is low near the aperture stop. Therefore, for an off-axis light ray that passes through the first focusing lens unit, a change in the height or a change in the angle of a light ray due to zooming is small. As a result, it is possible to reduce an amount of fluctuation in the off-axis aberration, particularly the coma, in the entire zoom range.

Moreover, in the zoom lens according to the present embodiment, it is preferable that a part of the first sub-lens unit is the first focusing lens unit, and at the time of zooming, the first focusing lens unit moves integrally with the first sub-lens unit.

By making such arrangement, in zooming, it is possible to make the movement of the first focusing lens unit simplified. Moreover, since only the first focusing lens unit moves at the time of focusing, it is possible to make the first focusing lens unit light-weight. Moreover, it is possible to make a drive mechanism of the first focusing lens unit small-sized and light-weight. As a result, a high-speed focusing drive with less power consumption is possible.

Moreover, in the zoom lens according to the present embodiment, it is preferable that the entire first sub-lens unit is the first focusing lens unit.

It is possible to position the first sub-lens unit near the aperture stop. Consequently, by letting the entire first sub-lens unit to be the first focusing lens unit, the first focusing lens unit is positioned near the aperture stop.

The height of an off-axis light ray is low near the aperture stop. Therefore, for an off-axis light ray that passes through the first focusing lens unit, a change in the height or a change in the angle of a light ray due to zooming is small. As a result, it is possible to reduce an amount of fluctuation in the off-axis aberration, particularly the coma, in the entire zoom range.

Moreover, by making such arrangement, it is possible to have a common drive mechanism for zooming and focusing. Consequently, it is possible to make the lens-frame structure simplified and small-sized.

Moreover, in the zoom lens according to the present embodiment, it is preferable that the second sub-lens unit includes a first focusing lens unit.

It is possible to position the second sub-lens unit near the aperture stop. When such an arrangement is made, the first focusing lens unit is positioned near the aperture stop. The height of an off-axis light ray is low near the aperture stop. Therefore, for an off-axis light ray that passes through the first focusing lens unit, a change in the height or a change in the angle of a light ray due to zooming is small. As a result, it is possible to reduce an amount of fluctuation in the off-axis aberration, particularly the coma, in the entire zoom range.

Moreover, in the zoom lens according to the present embodiment, it is preferable that the entire second sub-lens unit is the first focusing lens unit.

It is possible to position the second sub-lens unit near the aperture stop. Consequently, by letting the entire second sub-lens unit to be the first focusing lens unit, the first focusing lens unit is positioned near the aperture stop.

The height of an off-axis light ray is low near the aperture stop. Therefore, for an off-axis light ray that passes through the first focusing lens unit, a change in the height or a change in the angle of a light ray due to zooming is small. As a result, it is possible to reduce an amount of fluctuation in the off-axis aberration, particularly the coma, in the entire zoom range.

Moreover, by making such arrangement, it is possible to have a common drive mechanism for zooming and focusing. Consequently, it is possible to make the lens-frame structure simplified and small-sized.

Moreover, in the zoom lens according to the present embodiment, it is preferable that the second sub-lens unit includes a second focusing lens unit.

It is possible to position the second sub-lens unit near the aperture stop. When such an arrangement is made, the second focusing lens unit is positioned near the aperture stop. The height of an off-axis light ray is low near the aperture stop. Therefore, for an off-axis light ray that passes through the second focusing lens unit, a change in the height or a change in the angle of a light ray due to zooming is small. As a result, it is possible to reduce an amount of fluctuation in the off-axis aberration, particularly the coma in the entire zoom range.

Moreover, in the zoom lens according to the present embodiment, it is preferable that a part of the second sub-lens unit is the second focusing lens unit, and at the time of zooming, the second focusing lens unit moves integrally with the second sub-lens unit.

By making such arrangement, in zooming, it is possible to make the movement of the second focusing lens unit simplified. Moreover, since only the second focusing lens unit moves at the time of focusing, it is possible to make the second focusing lens unit light-weight. Moreover, it is also possible to make a drive mechanism of the second focusing lens unit small-sized and light-weight. As a result, a high-speed focusing drive with less power consumption is possible.

Moreover, in the zoom lens according to the present embodiment, it is preferable that the entire second sub-lens unit is the focusing lens unit.

It is possible to position the second sub-lens unit near the aperture stop. Consequently, by letting the entire second sub-lens unit to be the second focusing lens unit, the second focusing lens unit is positioned near the aperture stop.

The height of an off-axis light ray is low near the aperture stop. Therefore, for an off-axis light ray that passes through the second focusing lens unit, a change in the height or a change in the angle of a light ray due to zooming is small. As a result, it is possible to reduce an amount of fluctuation in the off-axis aberration, particularly a coma in the entire zoom range.

Moreover, by making such arrangement, it is possible to have a common drive mechanism for zooming and focusing. Consequently, it is possible to make a lens-frame structure simplified and small-sized.

Moreover, in the zoom lens according to the present embodiment, it is preferable that the first lens unit A includes the first focusing lens unit and the second lens unit B includes the second focusing lens unit.

By making such arrangement, in zooming, it is possible to make the movement of the first focusing lens unit and the second focusing lens unit simplified. Moreover, at the time of focusing, since only the first focusing lens unit in the first lens unit A and only the second focusing lens unit in the second lens unit B move, it is possible to make the first focusing lens unit and the second focusing lens unit light-weight. Moreover, it is possible to make a drive mechanism of the first focusing lens unit and the second focusing lens unit small-sized and light-weight. As a result, a high-speed focusing drive with less power consumption is possible.

In the zoom lens according to the present embodiment, it is preferable that the front lens unit includes the first focusing lens unit.

It is possible to position the front lens unit near the aperture stop. When such an arrangement is made, the first focusing lens unit is positioned near the aperture stop. The height of an off-axis light ray is low near the aperture stop. Therefore, for an off-axis light ray that passes through the first focusing lens unit, a change in the height or a change in the angle of a light ray due to zooming is small. As a result, it is possible to reduce an amount of fluctuation in the off-axis aberration, particularly the coma, in the entire zoom range.

In the zoom lens according to the present embodiment, it is preferable that the rear lens unit includes the first focusing lens unit.

It is possible to position the rear lens unit near the aperture stop. When such an arrangement is made, the first focusing lens unit is positioned near the aperture stop. The height of an off-axis light ray is low near the aperture stop. Therefore, for an off-axis light ray that passes through the first focusing lens unit, a change in the height or a change in the angle of a light ray due to zooming is small. As a result, it is possible to reduce an amount of fluctuation in the off-axis aberration, particularly the coma, in the entire zoom range.

In the zoom lens according to the present embodiment, it is preferable that the rear lens unit includes the second focusing lens unit.

It is possible to position the rear lens unit near the aperture stop. When such an arrangement is made, the second focusing lens unit is positioned near the aperture stop. The height of an off-axis light ray is low near the aperture stop. Therefore, for an off-axis light ray that passes through the second focusing lens unit, a change in the height or a change in the angle of a light ray due to zooming is small. As a result, it is possible to reduce an amount of fluctuation in the off-axis aberration, particularly the coma, in the entire zoom range.

Moreover, in the zoom lens according to the present embodiment, it is preferable that the first focusing lens unit is disposed nearest to object in the first lens unit A.

Since the rear unit includes the aperture stop, the height of a marginal light ray is lower at a position of the aperture stop as compared to the height in the front unit. Moreover, in the rear unit, the first lens unit A is disposed on the object side. Therefore, by disposing the first focusing lens unit nearest to object in the first lens unit A, the height of a marginal light ray becomes low in the first focusing lens unit.

In this case, even if the first focusing lens unit moves, it is possible to suppress the fluctuation in the height of the marginal light ray passing through the front unit to be small. Accordingly, it is possible to suppress also the fluctuation in the curvature of field at the meridional plane. As a result, even at the time of focusing to an object at a close distance, it is possible to maintain high imaging performance of the optical system.

In the zoom lens according to the present embodiment, it is preferable that a lens unit nearest to image has a positive refractive power.

For super-widening the angle of view, and making the diameter and the size of the optical system small, it is necessary to make the refractive power of the front unit large. However, when the refractive power of the front unit is made large, a large positive curvature of field occurs in the front unit. Therefore, by disposing the lens unit having a positive refractive power nearest to image, it is possible to correct easily the large positive curvature of field that occurs in the front unit. As a result, it is possible to secure a state in which the curvature of field has been corrected favorably in the entire zoom range.

Moreover, in the zoom lens according to the present embodiment, it is preferable to make the following arrangements.

It is preferable that the front unit includes in order from the object side to the image side, a first lens, a second lens, a fourth lens, a biconcave negative lens, and a third lens.

Moreover, it is preferable that the front unit includes in order from the object side to the image side, a first lens, a second lens, a biconcave negative lens, and a third lens.

Moreover, in the rear unit, it is preferable that a lens nearest to object has a convex surface directed toward the object side.

Moreover, it is preferable that the front unit includes a first lens unit.

Moreover, it is preferable that the rear unit includes in order from the object side to the image side, a second lens unit having a positive refractive power, a third lens unit having a negative refractive power, and a fourth lens unit having a positive refractive power.

Moreover, it is preferable that the rear unit includes in order from the object side to the image side, a second lens unit having a positive refractive power, a third lens unit having a positive refractive power, a fourth lens unit having a negative refractive power, and a fifth lens unit having a positive refractive power.

Moreover, it is preferable that at the time of zooming, the front unit moves toward the image side.

Moreover, it is preferable that at the time of zooming, the second lens unit moves toward the object side.

Moreover, it is preferable that at the time of zooming, the third lens unit moves toward the object side.

Moreover, it is preferable that at the time of zooming, the fourth lens unit moves toward the object side.

Moreover, it is preferable that at the time of zooming, the fifth lens unit moves toward the object side.

In the zoom lens according to the present embodiment, it is preferable that the following conditional expression (3-3) is satisfied:

$$-2.7 < f_w \times Fno_{wmin}/f_F < -0.5 \quad (3\text{-}3),$$

where, $f_w$ denotes a focal length of the overall zoom lens system at the wide angle end, $Fno_{wmin}$ denotes the minimum of F-number at the wide angle end, and $f_F$ denotes a focal length of the front unit.

Since technical significance of conditional expression (3-3) being same as the technical significance of conditional expression (3), a description thereof is omitted here.

Moreover, it is preferable that the front unit includes a second lens having a negative refractive power, and the second lens is disposed on the image side of the first lens, and has a meniscus shape of which a convex surface is directed toward the object side.

By making such arrangement, it is possible to refract an off-axis light ray gradually while making the negative refractive power in the front unit large. In other words, it is possible to suppress a sharp refraction of a light ray. As a result, it is possible to make the angle of view super wide while reducing the amount of curvature of field and astigmatism that occur.

It preferable that the second lens unit includes the focusing lens unit.

It is preferable that the third lens unit includes the focusing lens unit.

Moreover, in the zoom lens according to the present embodiment, it is preferable that the following conditional expression (15-1) is satisfied:

$$0.3 < SP_{F4} < 4.5 \quad (15\text{-}1),$$

where, $$SP_{F4} = (r_{F4o} + r_{F4i})/(r_{F4o} - r_{F4i}), \text{ and here}$$

$r_{F4o}$ denotes the paraxial radius of curvature of an object-side surface of the fourth lens, and $r_{F4i}$ denotes the paraxial radius of curvature of an image-side surface of the fourth lens.

Since technical significance of conditional expression (15-1) is same as the technical significance of conditional expression (15), a description thereof is omitted here.

Moreover, in the zoom lens according to the present embodiment, it is preferable that the focusing lens unit is disposed nearest to object in the rear unit.

Since the rear unit includes the aperture stop, the height of a marginal light ray is lower at a position of the aperture stop as compared to the height in the front unit. Therefore, by disposing the focusing lens unit nearest to object in the rear unit, the height of a marginal light ray becomes low in the focusing lens unit.

In this case, even if the focusing lens unit moves, it is possible to suppress the fluctuation in the height of the marginal light ray passing through the front unit to be small. Accordingly, it is possible to suppress also the fluctuation in the curvature of field at the meridional plane. As a result, even at the time of focusing to an object at a close distance, it is possible to maintain high imaging performance of the optical system.

Moreover, in the zoom lens according to the present embodiment, it is preferable that the front unit includes a first lens unit, and the rear unit includes a second lens unit, a third lens unit, a fourth lens unit, and a fifth lens unit, or the rear unit includes a second lens unit, a third lens unit, a fourth lens unit, a fifth lens unit, and a sixth lens unit, and at the time of zooming from the wide angle end to the telephoto end, distances between the lens units change.

By making such arrangement, it is possible to realize a zoom lens in which the optical system is made adequately small-sized and light-weight with the lesser number of lens units, and it is possible to realize a zoom lens in which various aberrations are reduced adequately while having a sufficiently wide angle of view as compared to the F-number.

It is preferable that at the time of zooming from the wide angle end to the telephoto end, the second lens unit moves toward the object side.

It is preferable that at the time of zooming from the wide angle end to the telephoto end, the third lens unit moves toward the object side.

Moreover, in the zoom lens according to the present embodiment, it is preferable that at least one of the lenses in the front unit, having a meniscus shape of which a convex surface is directed toward the object side is an aspheric lens which satisfies the following conditional expression (10-1):

$$30° < ASP_{R\theta} < 75° \quad (10\text{-}1),$$

where, $ASP_{R\theta}$ denotes the inclination of a plane at a predetermined position of the surface on the image side of the at least one of the lenses, and here the predetermined position is a position at which an effective aperture of the at least one of the lenses is the maximum, and the inclination of the plane is an angle at which a tangent of the plane at the predetermined position intersects the optical axis.

By exceeding a lower limit value of conditional expression (10-1), it is possible to reduce an amount of astigmatism and distortion that occur. By falling below an upper limit value of conditional expression (10-1), it is possible to reduce an amount of chromatic aberration of magnification that occurs.

Moreover, it is preferable that the zoom lens according to the present embodiment includes a predetermined lens unit, and the predetermined lens unit is a lens unit positioned between an image-side surface of the focusing lens unit and the image plane, and the following conditional expression (12-1) is satisfied:

$$-0.40 < |MG_{fob}^2 \times (MG_{fo}^2 - 1)| < 3.0 \quad (12\text{-}1),$$

where, $MG_{fo}$ denotes a lateral magnification of the focusing lens unit at an arbitrary position, and $MG_{fob}$ denotes a lateral magnification of the predetermined lens unit at a position same as the arbitrary position.

By exceeding a lower limit value of conditional expression (12-1), it is possible to reduce the amount of movement of the focusing lens unit. As a result, it is possible to shorten the overall length of the optical system. By falling below an upper limit value of conditional expression (12-1), it is possible to carry out a position-control of the focusing lens unit easily. As a result, it is possible to carry out an accurate focusing.

It is preferable that the aperture stop is disposed between the second lens unit and the third lens unit. Since the second lens unit has a positive refractive power, it is possible to make a converged light beam be incident at an aperture-stop position. As a result, since it is possible to make the aperture small-sized, it is possible to make even the overall zoom lens small-sized.

Moreover, in the zoom lens according to the present embodiment, it is preferable that the front unit includes a first lens unit, and the rear unit includes a second lens unit, a third lens unit, and a fourth lens unit, and at the time of zooming from the wide angle end to the telephoto end, distances between the lens units change.

By making such arrangement, it is possible to realize a zoom lens in which the optical system is made adequately small-sized and light-weight with the lesser number of lens units, and it is possible to realize a zoom lens in which various aberrations are reduced adequately while having a sufficiently wide angle of view as compared to the F-number.

It is preferable that the fourth lens unit includes two cemented lenses.

It is preferable that the fourth lens unit includes in order from the object side to the image side, a lens having a positive refractive power, a cemented lens of a lens having a negative refractive power and a lens having a positive refractive power, a lens having a positive refractive power, a lens having a negative refractive power, and a lens having a positive refractive power.

It is preferable that the fourth lens unit includes in order from the object side to the image side, a lens having a positive refractive power of which an object-side surface is a convex surface directed toward the object side, a lens having a negative refractive power and a meniscus shape of which a convex surface is directed toward the object side, a biconvex positive lens, a biconvex positive lens, a biconcave negative lens, and a lens having a positive refractive power of which an object-side surface is a convex surface directed toward the object side.

It is preferable that at the time of zooming from the wide angle end to the telephoto end, the front unit moves toward the image side.

It is preferable that at the time of zooming from the wide angle end to the telephoto end, the first sub-lens unit moves toward the object side.

It is preferable that at the time of zooming from the wide angle end to the telephoto end, the second sub-lens unit moves toward the object side.

It is preferable that at the time of zooming from the wide angle end to the telephoto end, the fourth lens unit moves toward the object side.

Moreover, an image pickup apparatus according to the present embodiment includes the abovementioned zoom lens, and an image pickup element which has an image pickup surface, and which converts an image formed on the image pickup surface by the zoom lens to an electric signal.

By making such arrangement, it is possible to have an image pickup apparatus which is advantageous for achieving a high-resolution image without deteriorating an image quality, while being small-sized and having a super-wide angle of view.

Moreover, it is preferable that a plurality of the abovementioned arrangements is mutually satisfied simultaneously. Also, some of the arrangements may be satisfied simultaneously. For instance, one of the abovementioned zoom lenses may be used in either the abovementioned zoom lens or the image pickup apparatus.

Moreover, regarding the conditional expressions, an arrangement may be made such that each conditional expression is satisfied individually. This is preferable as it is easy to achieve an effect of each conditional expression.

For each conditional expression, the lower limit value or the upper limit value may be changed as given below. This is preferable as the effect of each conditional expression can be achieved even more assuredly.

It is preferable to change conditional expression (1) as follows.

$$74 < vd_{Fnmax} < 110$$

$$80 < vd_{Fnmax} < 100$$

It is preferable to change conditional expression (1-1) as follows.

$$70 < vd_{Fnmax} < 110$$

$$72 < vd_{Fnmax} < 110$$

$$74 < vd_{Fnmax} < 110$$

It is preferable to change conditional expression (1-2) as follows.

$$60 < vd_{Fnmax}$$

$$65 < vd_{Fnmax}$$

$$70 < vd_{Fnmax}$$

$$72 < vd_{Fnmax}$$

$$74 < vd_{Fnmax}$$

It is preferable to change conditional expression (1-3) as follows.

$$74 < vd_{Fnmax} < 110$$

$$80 < vd_{Fnmax} < 100$$

It is preferable to change conditional expression (2) as follows.

$$-1.40 < FB_w/f_F < -0.4$$

$$-1.35 < FB_w/f_F < -0.6$$

It is preferable to change conditional expression (2-1) as follows.

$$-1.50 < FB_w/f_F < -0.5$$

$$-1.40 < FB_w/f_F < -0.6$$

It is preferable to change conditional expression (2-2) as follows.

$$-1.8 < FB_w/f_F < -0.3$$

$$-1.6 < FB_w/f_F < -0.6$$

It is preferable to change conditional expression (3) as follows.

$$-1.77 < f_w \times Fno_{wmin}/f_F < -0.8$$

$$-1.75 < f_w \times Fno_{wmin}/f_F < -1.2$$

It is preferable to change conditional expression (3-1) as follows.

$$-2.00 < f_w \times Fno_{wmin}/f_F < -1.0$$

$$-1.80 < f_w \times Fno_{wmin}/f_F < -1.2$$

It is preferable to change conditional expression (3-2) as follows.

$$-1.8<f_w\times Fno_{wmin}/f_F<-0.7$$

It is preferable to change conditional expression (3-3) as follows.

$$-2.30<f_w\times Fno_{wmin}/f_F<-0.6$$

$$-1.80<f_w\times Fno_{wmin}/f_F<-0.7$$

$$-2.00<f_w\times Fno_{wmin}/f_F<-1.0$$

$$-1.80<f_w\times Fno_{wmin}/f_F<-1.2$$

$$-1.77<f_w\times Fno_{wmin}/f_F<-0.8$$

$$-1.75<f_w\times Fno_{wmin}/f_F<-1.2$$

It is preferable to change conditional expression (4) as follows.

$$1.35<f_{Rw}/FB_w<3.5$$

$$1.45<f_{Rw}/FB_w<3.0$$

It is preferable to change conditional expression (4-1) as follows.

$$1.35<f_{Rw}/FB_w<3.5$$

$$1.45<f_{Rw}/FB_w<3.0$$

It is preferable to change conditional expression (5) as follows.

$$1.2<|r_{F1f}/f_F|<2.5$$

$$1.3<|r_{F1f}/f_F|<2.4$$

It is preferable to change conditional expression (7) as follows.

$$0.015<\theta gF_{Fn}+0.0016\times vd-0.6415<0.048$$

$$0.025<\theta gF_{Fn}+0.0016\times vd-0.6415<0.046$$

It is preferable to change conditional expression (8) as follows.

$$0.07<FB_w/LTL_w<0.18$$

$$0.08<FB_w/LTL_w<0.16$$

$$0.08<FB_w/LTL_w<0.17$$

It is preferable to change conditional expression (9) as follows.

$$2.3<SP_{F1}<8.7$$

$$2.6<SP_{F1}<8.5$$

$$2.2<SP_{F1}<6.5$$

$$2.5<SP_{F1}<5.3$$

It is preferable to change conditional expression (9-1) as follows.

$$2.0<SP_{F1}<6.5$$

$$2.5<SP_{F1}<5.3$$

It is preferable to change conditional expression (10) as follows.

$$33°<ASP_{R\theta}<60°$$

$$35°<ASP_{R\theta}<58°$$

It is preferable to change conditional expression (10-1) as follows.

$$33°<ASP_{R\theta}<72°$$

$$35°<ASP_{R\theta}<68°$$

It is preferable to change conditional expression (11) as follows.

$$-23<DTL_w<6$$

$$-20<DTL_w<5$$

$$-20<DTL_w<-5$$

It is preferable to change conditional expression (12) as follows.

$$0.11<|MG_{fob}^2\times(MG_{fo}^2-1)|<2.0$$

$$0.13<|MG_{fob}^2\times(MG_{fo}^2-1)|<1.2$$

$$0.15<|MG_{fob}^2\times(MG_{fo}^2-1)|<1.5$$

It is preferable to change conditional expression (12-1) as follows.

$$-0.30<|MG_{fob}^2\times(MG_{fo}^2-1)|<2.0$$

$$-0.20<|MG_{fob}^2\times(MG_{fo}^2-1)|<1.2$$

It is preferable to change conditional expression (13) as follows.

$$-1.9<f_F/(f_w\times f_t)^{1/2}<-1.1$$

$$-1.8<f_F/(f_w\times f_t)^{1/2}<-1.2$$

$$-1.7<f_F/(f_w\times f_t)^{1/2}<-1.2$$

It is preferable to change conditional expression (14) as follows.

$$1.7<SP_{F2}<5.5$$

$$1.8<SP_{F2}<5.8$$

$$1.9<SP_{F2}<5.5$$

It is preferable to change conditional expression (14-1) as follows.

$$1.7<SP_{F2}<5.5$$

$$1.8<SP_{F2}<5.8$$

$$1.9<SP_{F2}<5.5$$

It is preferable to change conditional expression (15) as follows.

$$0.9<SP_{F4}<5.0$$

$$1.0<SP_{F4}<4.0$$

It is preferable to change conditional expression (15-1) as follows.

$$0.9<SP_{F4}<5.0$$

$$1.0<SP_{F4}<4.0$$

It is preferable to change conditional expression (16) as follows.

$$2.8<f_3/f_F<13$$

$$3.2<f_3/f_F<11$$

It is preferable to change conditional expression (17) as follows.

$$-20 < f_3/f - 5.5$$

$$-17 < f_3/f - 6.0$$

Examples of a zoom lens used in an image pickup apparatus will be described below in detail by referring to the accompanying diagrams. However, the present invention is not restricted to the examples described below.

In each example, an image is recorded and displayed upon correcting electrically a barrel distortion that occurs at a wide-angle side. In zoom lenses according to the examples, an image is formed on a rectangular opto-electric conversion surface. Here, the barrel distortion occurs at the wide angle end. Whereas, an occurrence of distortion is suppressed near an intermediate focal length state and at the telephoto end.

For correcting the distortion electrically, an effective image pickup area has been set such that, the distortion assumes a barrel shape at the wide angle end and a rectangular shape in the intermediate focal length state and at the telephoto end. Moreover, image information of the effective image pickup area that has been set in advance is subjected to image conversion by image processing, and is converted to image information of a rectangular shape in which the distortion has been reduced.

In the zoom lenses of according to the examples, an arrangement has been made such that the maximum image height at the wide angle end becomes smaller than the maximum image height in the intermediate focal length state and the maximum image height at the telephoto end.

Examples from an example 1 to an example 25 (hereinafter, 'the examples 1 to 25') will be described below. Lens cross-sectional views of the zoom lenses according the examples 1 to 25 will be described below. FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, FIG. 14A, FIG. 15A, FIG. 16A, FIG. 17A, FIG. 18A, FIG. 19A, FIG. 20A, FIG. 21A, FIG. 22A, FIG. 23A, FIG. 24A, and FIG. 25A are lens cross-sectional views at the wide angle end.

FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, FIG. 14B, FIG. 15B, FIG. 16B, FIG. 17B, FIG. 18B, FIG. 19B, FIG. 20B, FIG. 21B, FIG. 22B, FIG. 23B, FIG. 24B, and FIG. 25B are lens cross-sectional views in the intermediate focal length state.

FIG. 1C, FIG. 2C, FIG. 3C, FIG. 4C, FIG. 5C, FIG. 6C, FIG. 7C, FIG. 8C, FIG. 9C, FIG. 10C, FIG. 11C, FIG. 12C, FIG. 13C, FIG. 14C, FIG. 15C, FIG. 16C, FIG. 17C, FIG. 18C, FIG. 19C, FIG. 20C, FIG. 21C, FIG. 22C, FIG. 23C, FIG. 24C, and FIG. 25C are lens cross-sectional views at the telephoto end.

Each lens cross-sectional view is a lens cross-sectional view at the time of focusing to an object at infinity.

Moreover, a first lens unit is denoted by G1, a second lens unit is denotes by G2, a third lens unit is denotes by G3, a fourth lens unit is denoted by G4, a fifth lens unit is denoted by G5, a sixth lens unit is denoted by G6, a focusing lens unit is denoted by Gfo or Gfo1 and Gfo2, an aperture stop is denoted by S, and an image plane (image pickup surface) is denoted by I. Moreover, a lens unit that moves at the time of focusing is denoted by F and a lens that moves at the time of stabilizing image is denotes by W.

A parallel and flat plate that forms a low-pass filter or a cover glass of an electronic image pickup element may be disposed between a lens unit positioned nearest to an image and the image plane I. In this case, a wavelength region restricting coating which restricts infrared light may be applied to a surface of the parallel and flat plate. Moreover, a multilayer film for restricting wavelength region may be applied to a surface of the cover glass. Moreover, the cover glass may be imparted an effect of a low-pass filter.

The zoom lens according to the example 1, as shown in FIG. 1A, FIG. 1B, and FIG. 1C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, a third lens unit G3 having a positive refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a negative meniscus lens L6 having a convex surface directed toward the object side and a positive meniscus lens L7 having a convex surface directed toward the object side. Here, the negative meniscus lens L6 and the positive meniscus lens L7 are cemented.

The third lens unit G3 includes a biconvex positive lens L8, a negative meniscus lens L9 having a convex surface directed toward the object side, a biconvex positive lens L10, a negative meniscus lens L11 having a convex surface directed toward the image side, a biconcave negative lens L12, a biconvex positive lens L13, a positive meniscus lens L14 having a convex surface directed toward the image side, a negative meniscus lens L15 having a convex surface directed toward the object side, a biconvex positive lens L16, and a negative meniscus lens L17 having a convex surface directed toward the object side. Here, the negative meniscus lens L9 and the biconvex positive lens L10 are cemented. Moreover, the biconcave negative lens L12 and the biconvex positive lens L13 are cemented.

The fourth lens unit G4 includes a negative meniscus lens L18 having a convex surface directed toward the object side and a biconvex positive lens L19.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 is fixed. The aperture stop S moves toward the object side together with the third lens unit G3.

At the time of focusing, the second lens unit G2 moves along an optical axis. More elaborately, at the time of focusing from an object at infinity to an object at a close distance, the second lens unit G2 moves toward the image side.

An aspheric surface is provided to a total of six surfaces namely, both surfaces of the negative meniscus lens L2, both surfaces of the negative meniscus lens L3, an image-side surface of the positive meniscus lens L7, and an image-side surface of the biconvex positive lens L19.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

The zoom lens according to the example 2, as shown in FIG. 2A, FIG. 2B, and FIG. 2C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a negative meniscus lens L6 having a convex surface directed toward the object side and a biconvex positive lens L7. Here, the negative meniscus lens L6 and the biconvex positive lens L7 are cemented.

The third lens unit G3 includes a biconvex positive lens L8, a biconcave negative lens L9, a positive meniscus lens L10 having a convex surface directed toward the image side, and a negative meniscus lens L11 having a convex surface directed toward the image side.

The fourth lens unit G4 includes a positive meniscus lens L12 having a convex surface directed toward the object side, a negative meniscus lens L13 having a convex surface directed toward the object side, a biconvex positive lens L14, a biconvex positive lens L15, a biconcave negative lens L16, and a positive meniscus lens L17 having a convex surface directed toward the object side. Here, the negative meniscus lens L13 and the biconvex positive lens L14 are cemented. Moreover, the biconcave negative lens L16 and the positive meniscus lens L17 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The aperture stop S moves toward the object side together with the third lens unit G3.

At the time of focusing, the second lens unit G2 moves along an optical axis. More elaborately, at the time of focusing from an object at infinity to an object at a close distance, the second lens unit G2 moves toward the image side. At the time of stabilizing image, the biconvex positive lens L8 in the third lens unit G3 moves in a direction orthogonal to the optical axis.

An aspheric surface is provided to a total of five surfaces namely, both surfaces of the negative meniscus lens L2, both surfaces of the negative meniscus lens L3, and an image-side surface of the positive meniscus lens L17.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

The zoom lens according to the example 3, as shown in FIG. 3A, FIG. 3B, and FIG. 3C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, a third lens unit G3 having a positive refractive power, a fourth lens unit G4 having a negative refractive power, and a fifth lens unit G5 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a positive meniscus lens L5 having a convex surface directed toward the object side. Here, the biconcave negative lens L4 and the positive meniscus lens L5 are cemented.

The second lens unit G2 includes a positive meniscus lens L6 having a convex surface directed toward the object side.

The third lens unit G3 includes a negative meniscus lens L7 having a convex surface directed toward the object side, a biconvex positive lens L8, a biconcave negative lens L9, a biconvex positive lens L10, a biconvex positive lens L11, and a biconvex positive lens L12. Here, the negative meniscus lens L7 and the biconvex positive lens L8 are cemented. Moreover, the biconcave negative lens L9 and the biconvex positive lens L10 are cemented.

The fourth lens unit G4 includes a biconcave negative lens L13.

The fifth lens unit G5 includes a biconvex positive lens L14.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The fifth lens unit G5 is fixed. The aperture stop S moves toward the object side together with the third lens unit G3.

At the time of focusing, the second lens unit G2 moves along an optical axis. More elaborately, at the time of focusing from an object at infinity to an object at a close distance, the second lens unit G2 moves toward the image side. At the time of stabilizing image, the negative meniscus lens L7 and the biconvex positive lens L8 in the third lens unit G3 move in a direction orthogonal to the optical axis.

An aspheric surface is provided to a total of eight surfaces namely, both surfaces of the negative meniscus lens L3, both surfaces of the positive meniscus lens L6, both surfaces of the biconvex positive lens L12, and both surfaces of the biconvex positive lens L14.

The front unit GF includes the first lens unit G1. The rear unit GR includes the second lens unit G2, the third lens unit G3, the fourth lens unit G4, and the fifth lens unit G5. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

Figure 4B:
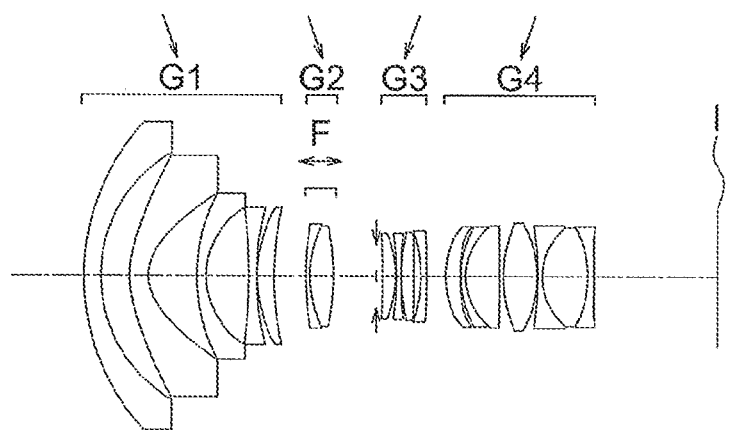
Figure 4C:
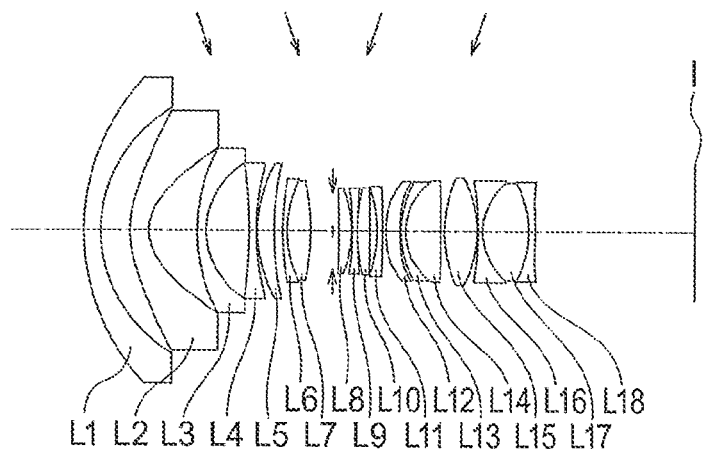

The zoom lens according to the example 4, as shown in FIG. 4A, FIG. 4B, and FIG. 4C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a positive meniscus lens L5 having a convex surface directed toward the object side.

The second lens unit G2 includes a negative meniscus lens L6 having a convex surface directed toward the object side and a biconvex positive lens L7. Here, the negative meniscus lens L6 and the biconvex positive lens L7 are cemented.

The third lens unit G3 includes a positive meniscus lens L8 having a convex surface directed toward the image side, a biconcave negative lens L9, a biconvex positive lens L10, and a negative meniscus lens L11 having a convex surface directed toward the image side.

The fourth lens unit G4 includes a positive meniscus lens L12 having a convex surface directed toward the object side, a negative meniscus lens L13 having a convex surface directed toward the object side, a biconvex positive lens L14, a biconvex positive lens L15, a biconcave negative lens L16, a biconvex positive lens L17, and a negative meniscus lens L18 having a convex surface directed toward the image side. Here, the negative meniscus lens L13 and the biconvex positive lens L14 are cemented. Moreover, the biconcave negative lens L16 and the biconvex positive lens L17 are cemented.

At the time of zooming from a wide angle end to a telephoto end, each lens unit moves as follows. The first lens unit G1 moves toward the image side. The second lens unit G2 moves toward the image side. The third lens unit G3 moves toward the object side. The fourth lens unit G4 moves toward the object side. The aperture stop S moves toward the object side together with the third lens unit G3.

At the time of focusing, the second lens unit G2 moves along an optical axis. More elaborately, at the time of focusing from an object at infinity to an object at a close distance, the second lens unit G2 moves toward the image side.

An aspheric surface is provided to a total of five surfaces namely, both surfaces of the negative meniscus lens L2, both surfaces of the positive meniscus lens L12, and an image-side surface of the negative meniscus lens L18.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

Figure 5A:
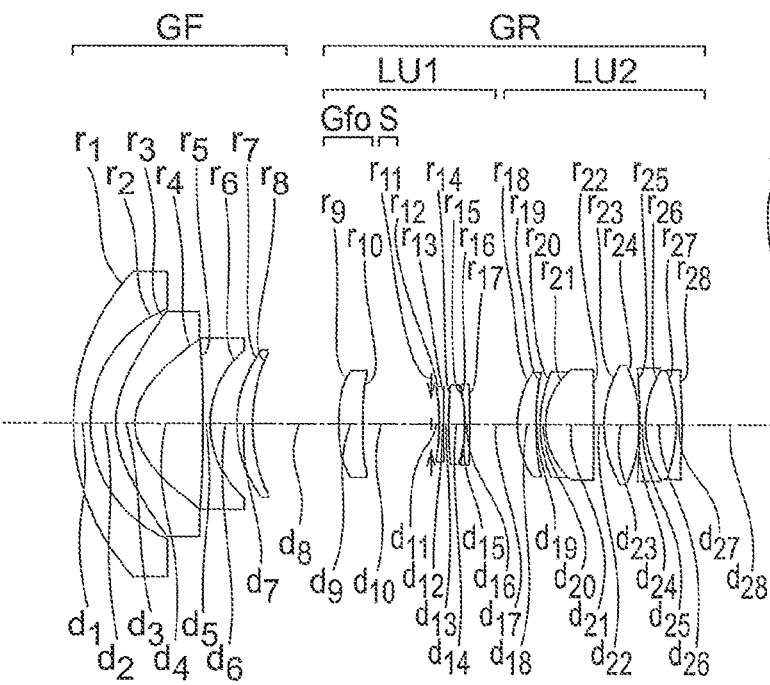
FIG. 5A, FIG. 5B, and FIG. 5C are lens cross-sectional views at the time of focusing to an object at infinity of a zoom lens according to an example 5.
Figure 5B:
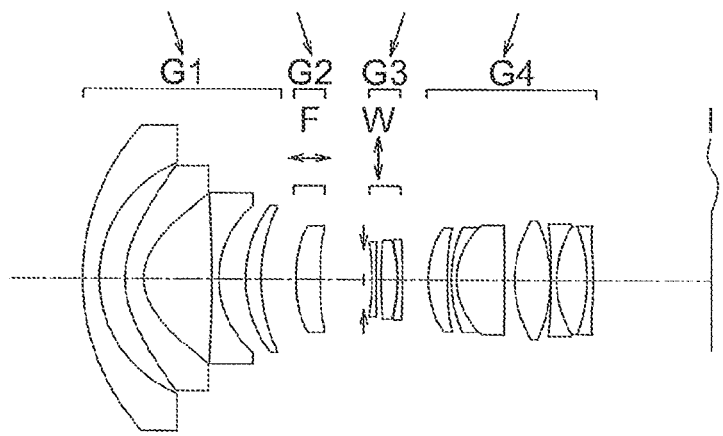
Figure 5C:
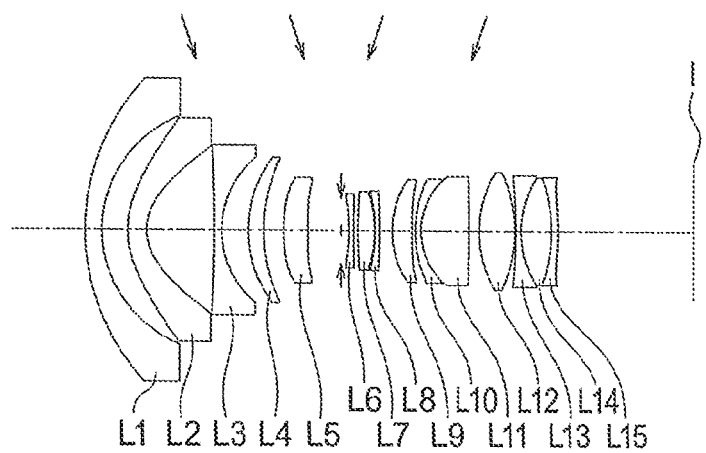

The zoom lens according to the example 5, as shown in FIG. 5A, FIG. 5B, and FIG. 5C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a biconcave negative lens L3, and a positive meniscus lens L4 having a convex surface directed toward the object side.

The second lens unit G2 includes a positive meniscus lens L5 having a convex surface directed toward the object side.

The third lens unit G3 includes a biconcave negative lens L6, a biconvex positive lens L7, and a negative meniscus lens L8 having a convex surface directed toward the image side.

The fourth lens unit G4 includes a positive meniscus lens L9 having a convex surface directed toward the object side, a negative meniscus lens L10 having a convex surface directed toward the object side, a biconvex positive lens L11, a biconvex positive lens L12, a biconcave negative lens L13, a biconvex positive lens L14, and a negative meniscus lens L15 having a convex surface directed toward the image side. Here, the negative meniscus lens L10 and the biconvex positive lens L11 are cemented. Moreover, the biconcave negative lens L13, the biconvex positive lens L14, and the negative meniscus lens L15 are cemented.

At the time of zooming from a wide angle end to a telephoto end, each lens unit moves as follows. The first lens unit G1 moves toward the image side. The second lens unit G2 moves toward the image side. The third lens unit G3 moves toward the object side. The fourth lens unit G4 moves toward the object side. The aperture stop S moves toward the object side together with the third lens unit G3.

At the time of focusing, the second lens unit G2 moves along an optical axis. More elaborately, at the time of focusing from an object at infinity to an object at a close distance, the second lens unit G2 moves toward the image side. At the time of stabilizing image, the third lens unit G3 moves in a direction orthogonal to the optical axis.

An aspheric surface is provided to a total of seven surfaces namely, both surfaces of the negative meniscus lens L2, both surfaces of the positive meniscus lens L5, both surfaces of the positive meniscus lens L9, and an image-side surface of the negative meniscus lens L15.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

Figure 6A:
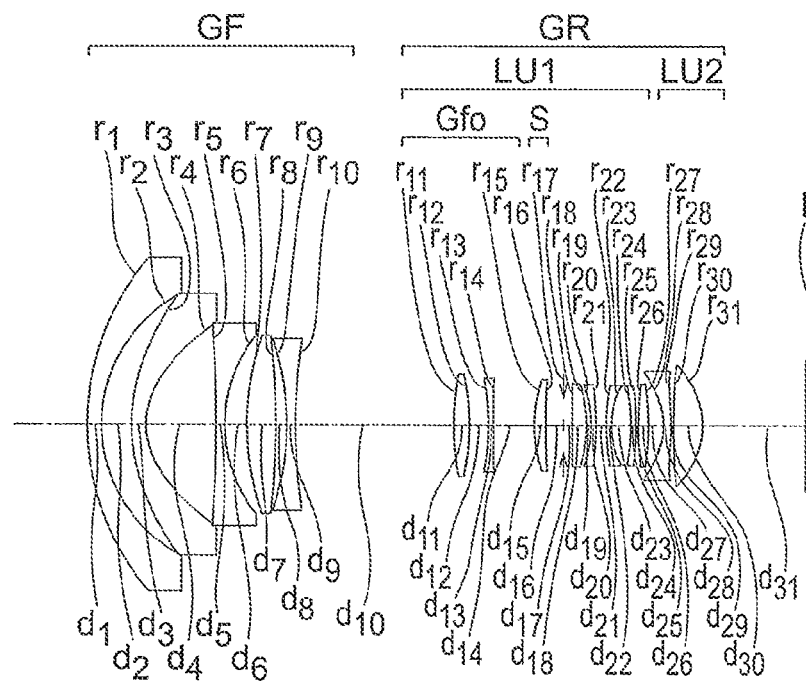
FIG. 6A, FIG. 6B, and FIG. 6C are lens cross-sectional views at the time of focusing to an object at infinity of a zoom lens according to an example 6.
Figure 6B:
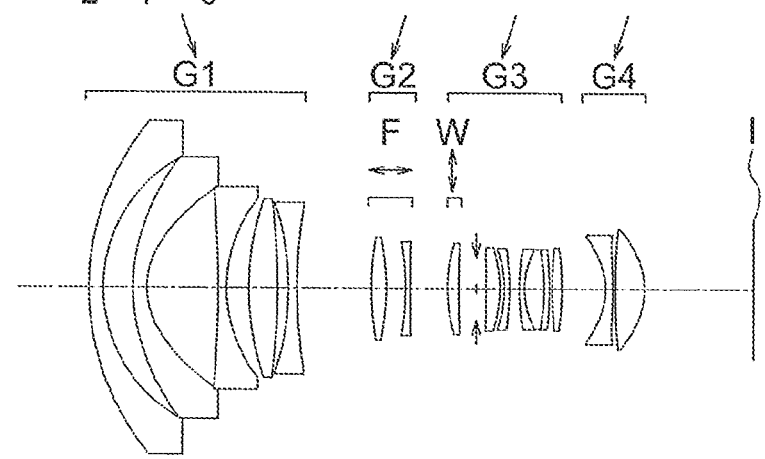
Figure 6C:
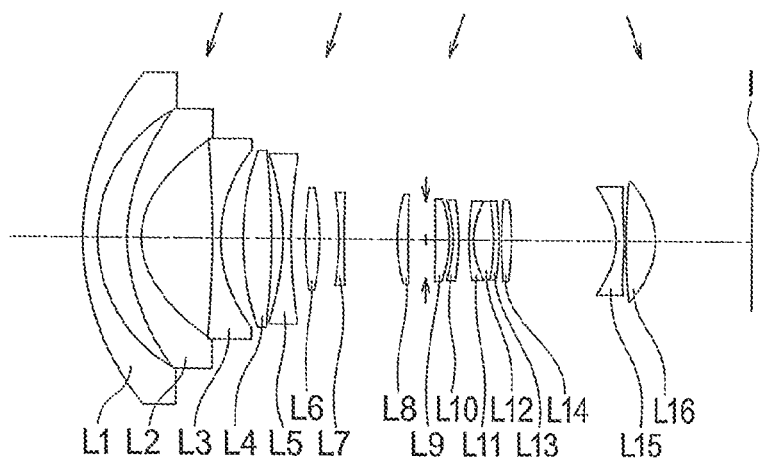

The zoom lens according to the example 6, as shown in FIG. 6A, FIG. 6B, and FIG. 6C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of the aperture stop S.

More specifically, the zoom lens includes in order from the object side to the image side, a first lens unit G1 having a negative refractive power, a second lens unit G2 having a positive refractive power, a third lens unit G3 having a positive refractive power, and a fourth lens unit G4 having a positive refractive power. The aperture stop S is disposed in the third lens unit G3.

The first lens unit G1 includes a negative meniscus lens L1 having a convex surface directed toward the object side, a negative meniscus lens L2 having a convex surface directed toward the object side, a biconcave negative lens L3, a biconvex positive lens L4, and a biconcave negative lens L5.

The second lens unit G2 includes a biconvex positive lens L6 and a biconcave negative lens L7.

The third lens unit G3 includes a positive meniscus lens L8 having a convex surface directed toward the object side, a positive meniscus lens L9 having a convex surface directed toward the image side, a negative meniscus lens L10 having a convex surface directed toward the image side, a negative meniscus lens L11 having a convex surface directed toward the object side, a biconvex positive lens L12, a negative meniscus lens L13 having a convex surface directed toward the image side, and a biconvex positive lens L14. Here, the negative meniscus lens L11, the biconvex positive lens L12, and the negative meniscus lens L13 are cemented.

The fourth lens unit G4 includes a negative meniscus lens L15 having a convex surface directed toward the image side and a biconvex positive lens L16.

At the time of zooming from a wide angle end to a telephoto end, each lens unit moves as follows. The first lens unit G1, after moving toward the image side, moves toward the object side. The second lens unit G2 moves toward the object side. The third lens unit G3 moves toward the object side. The fourth lens unit G4, after moving toward the object side, moves toward the image side. The aperture stop S moves toward the object side together with the third lens unit G3.

At the time of focusing, the second lens unit G2 moves along an optical axis. More elaborately, at the time of focusing from an object at infinity to an object at a close distance, the second lens unit G2 moves toward the image side. At the time of stabilizing image, the positive meniscus lens L8 in the third lens unit G3 moves in a direction orthogonal to the optical axis.

An aspheric surface is provided to a total of eight surfaces namely, both surfaces of the negative meniscus lens L2, both surfaces of the biconvex positive lens L6, both surfaces of the negative meniscus lens L15, and both surfaces of the biconvex positive lens L16.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

Figure 7A:
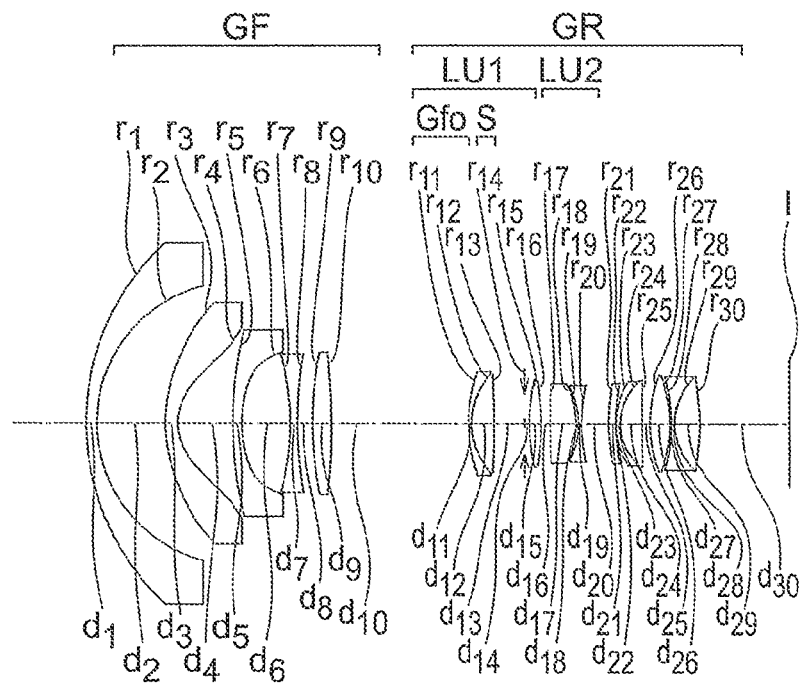
FIG. 7A, FIG. 7B, and FIG. 7C are lens cross-sectional views at the time of focusing to an object at infinity of a zoom lens according to an example 7.
Figure 7B:
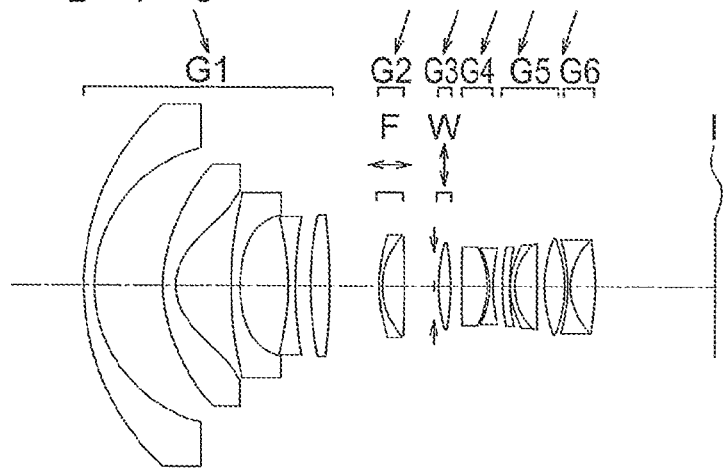
Figure 7C:
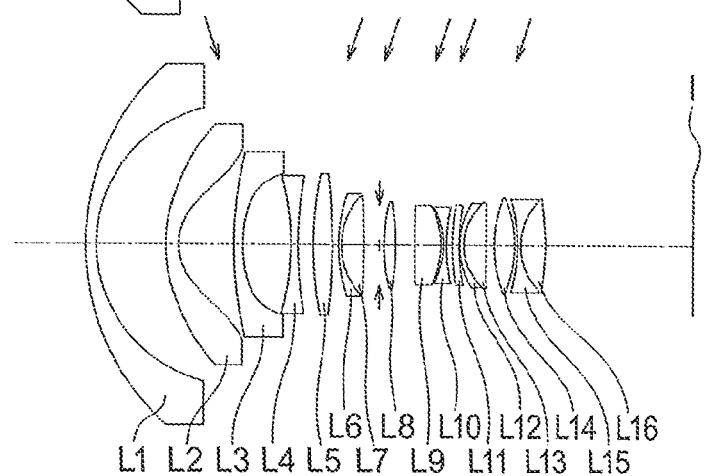

The zoom lens according to the example 7, as shown in FIG. 7A, FIG. 7B, and FIG. 7C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, a third lens unit G3 having a positive refractive power, a fourth lens unit G4 having a negative refractive power, a fifth lens unit G5 having a positive refractive power, and a sixth lens unit G6 having a negative refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a negative meniscus lens L6 having a convex surface directed toward the object side and a biconvex positive lens L7. Here, the negative meniscus lens L6 and the biconvex positive lens L7 are cemented.

The third lens unit G3 includes a biconvex positive lens L8.

The fourth lens unit G4 includes a biconvex positive lens L9 and a biconcave negative lens L10.

The fifth lens unit G5 includes a negative meniscus lens L11 having a convex surface directed toward the object side, a negative meniscus lens L12 having a convex surface directed toward the object side, a positive meniscus lens L13 having a convex surface directed toward the object side, and a biconvex positive lens L14. Here, the negative meniscus lens L12 and the positive meniscus lens L13 are cemented.

The sixth lens unit G6 includes a biconcave negative lens L15 and a biconvex positive lens L16. Here, the biconcave negative lens L15 and the biconvex positive lens L16 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The fifth lens unit G5 moves toward the object side. The sixth lens unit G6 moves toward the object side. The aperture stop S moves toward the object side together with the third lens unit G3.

At the time of focusing, the second lens unit G2 moves along an optical axis. More elaborately, at the time of focusing from an object at infinity to an object at a close distance, the second lens unit G2 moves toward the image side. At the time of stabilizing image, the third lens unit G3 moves in a direction orthogonal to the optical axis.

An aspheric surface is provided to a total of four surfaces namely, both surfaces of the negative meniscus lens L2, an image-side surface of the negative meniscus lens L3, and an image-side surface of the biconvex positive lens L16.

The front unit GF includes the first lens unit G1. The rear unit GR includes the second lens unit G2, the third lens unit G3, the fourth lens unit G4, the fifth lens unit G5, and the sixth lens unit G6. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

Figure 8A:
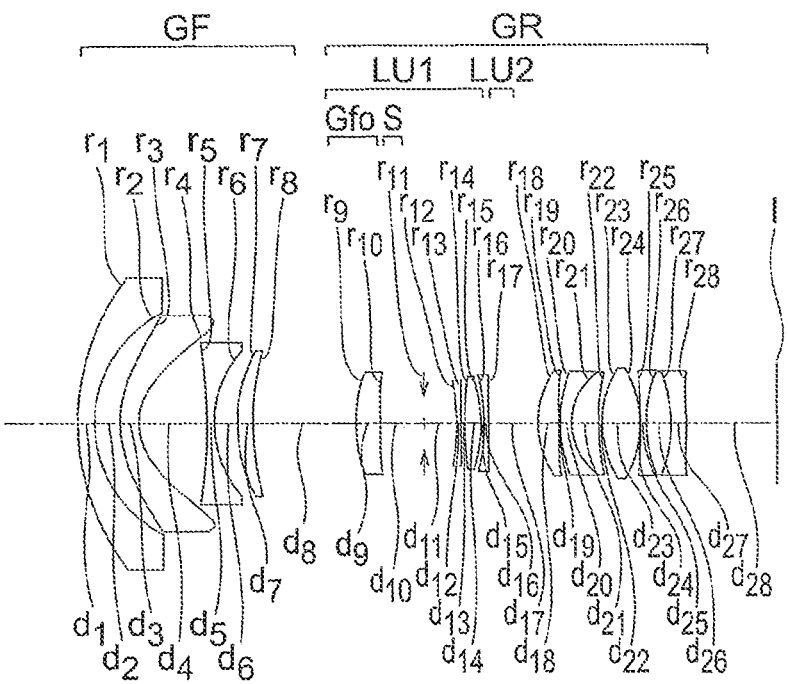
FIG. 8A, FIG. 8B, and FIG. 8C are lens cross-sectional views at the time of focusing to an object at infinity of a zoom lens according to an example 8.
Figure 8B:
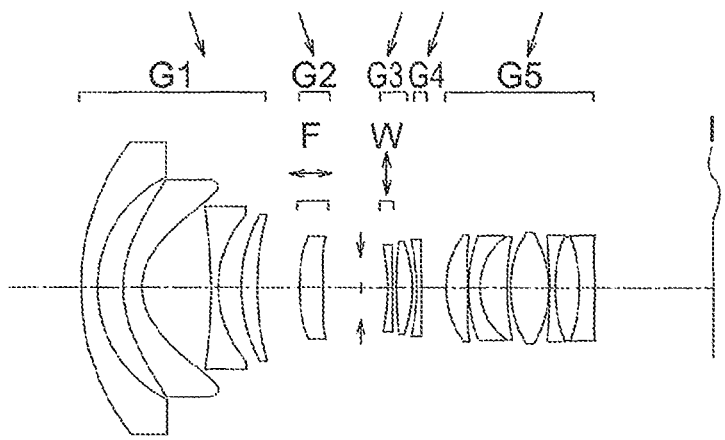
Figure 8C:
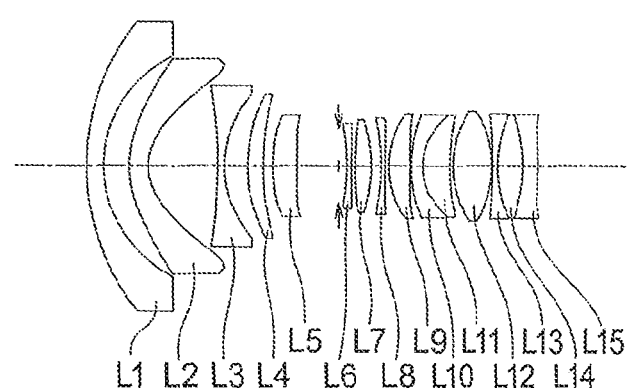

The zoom lens according to the example 8, as shown in FIG. 8A, FIG. 8B, and FIG. 8C, includes in order from an object side to an image side, a front unit GF having a negative refractive power and a rear unit GR having a positive refractive power. The rear unit GR includes in order from the object side to the image side, a first lens unit LU1 and the second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, a third lens unit G3 having a positive refractive power, a fourth lens unit G4 having a negative refractive power, and a fifth lens unit G5 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a biconcave negative lens L3, and a positive meniscus lens L4 having a convex surface directed toward the object side.

The second lens unit G2 includes a biconvex positive lens L5.

The third lens unit G3 includes a biconcave negative lens L6 and a biconvex positive lens L7.

The fourth lens unit G4 includes a biconcave negative lens L8.

The fifth lens unit G5 includes a biconvex positive lens L9, a negative meniscus lens L10 having a convex surface directed toward the object side, a positive meniscus lens L11 having a convex surface directed toward the object side, a biconvex positive lens L12, a biconcave negative lens L13, a biconvex positive lens L14, and a negative meniscus lens L15 having a convex surface directed toward the image side. Here, the negative meniscus lens L10 and the positive meniscus lens L11 are cemented. Moreover, the biconcave negative lens L13, the biconvex positive lens L14, and the negative meniscus lens L15 are cemented.

At the time of zooming from a wide angle end to a telephoto end, each lens unit moves as follows. The first lens unit G1 moves toward the image side. The second lens unit G2, after moving toward the image side, moves toward the object side. The third lens unit G3 moves toward the object side. The fourth lens unit G4 moves toward the object side. The fifth lens unit G5 moves toward the object side. The aperture stop S is fixed.

At the time of focusing, the second lens unit G2 moves along an optical axis. More elaborately, at the time of focusing from an object at infinity to an object at a close distance, the second lens unit G2 moves toward the image side. At the time of stabilizing image, the negative meniscus lens L6 in the third lens unit G3 moves in a direction orthogonal to the optical axis.

An aspheric surface is provided to a total of seven surfaces namely, both surfaces of the negative meniscus lens L2, both surfaces of the biconvex positive lens L5, both surfaces of the biconvex positive lens L9, and an image-side surface of the negative meniscus lens L15.

The front unit GF includes the first lens unit G1. The rear unit GR includes the second lens unit G2, the third lens unit G3, the fourth lens unit G4, and the fifth lens unit G5. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

Figure 9A:
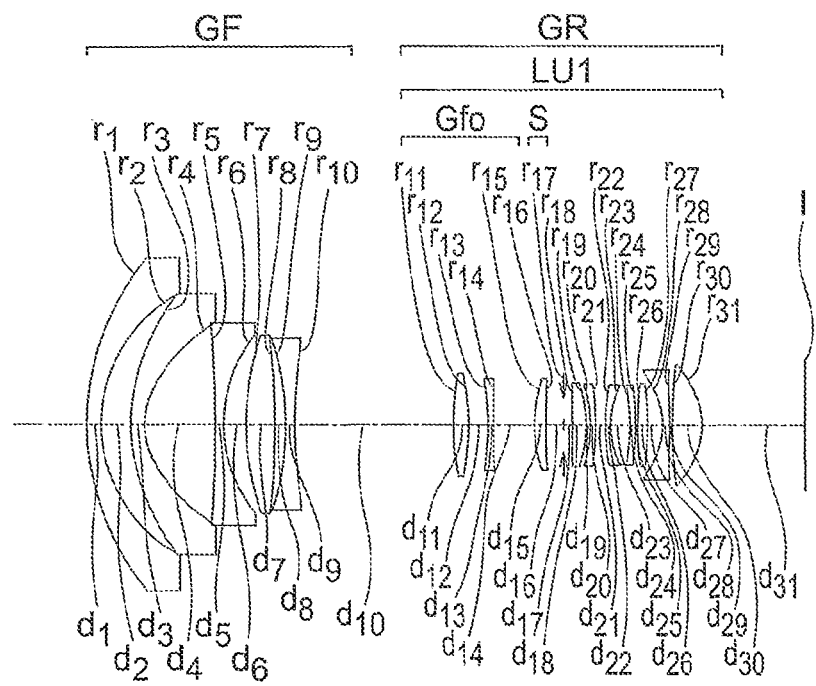
FIG. 9A, FIG. 9B, and FIG. 9C are lens cross-sectional views at the time of focusing to an object at infinity of a zoom lens according to an example 9.
Figure 9B:
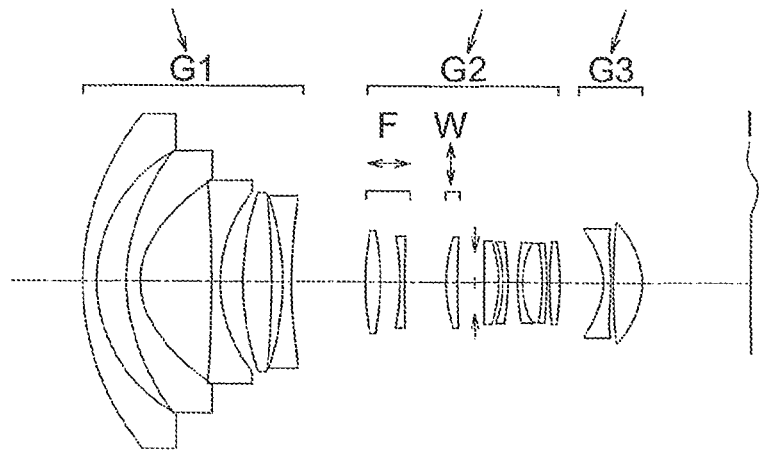
Figure 9C:
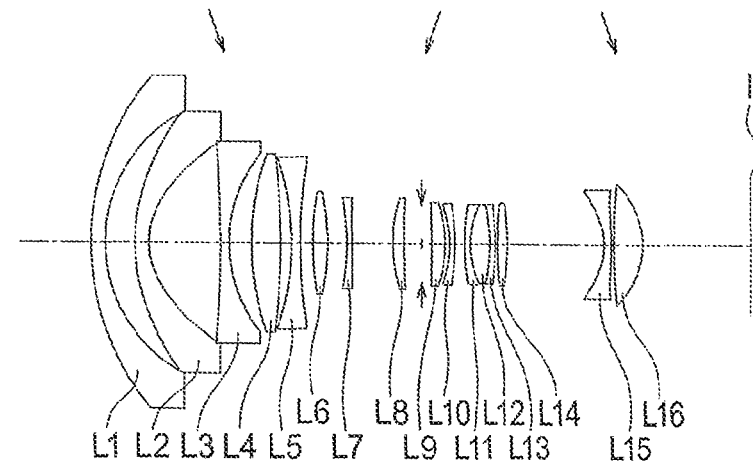

The zoom lens according to the example 9, as shown in FIG. 9A, FIG. 9B, and FIG. 9C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, and a third lens unit G3 having a positive refractive power. The aperture stop S is disposed in the second lens unit G2.

The first lens unit G1 includes a negative meniscus lens L1 having a convex surface directed toward the object side, a negative meniscus lens L2 having a convex surface directed toward the object side, a biconcave negative lens L3, a biconvex positive lens L4, and a biconcave negative lens L5.

The second lens unit G2 includes a biconvex positive lens L6, a biconcave negative lens L7, a positive meniscus lens L8 having a convex surface directed toward the object side, a positive meniscus lens L9 having a convex surface directed toward the image side, a negative meniscus lens L10 having a convex surface directed toward the image side, a negative meniscus lens L11 having a convex surface directed toward the object side, a biconvex positive lens L12, a negative meniscus lens L13 having a convex surface directed toward the image side, and a biconvex positive lens L14. Here, the negative meniscus lens L11, the biconvex positive lens L12, and the negative meniscus lens L13 are cemented.

The third lens unit G3 includes a negative meniscus lens L15 having a convex surface directed toward the image side and a biconvex positive lens L16.

At the time of zooming from a wide angle end to a telephoto end, each lens unit moves as follows. The first lens unit G1 moves toward the image side. The second lens unit G2 moves toward the object side. The third lens unit G3, after moving toward the object side, moves toward the image side. The aperture stop S moves toward the object side together with the second lens unit G2.

At the time of focusing, the biconvex positive lens L6 and the biconcave negative lens L7 in the second lens unit G2 move along an optical axis. More elaborately, at the time of focusing from an object at infinity to an object at a close distance, the biconvex positive lens L6 and the biconcave negative lens L7 in the second lens unit G2 move toward the image side. At the time of stabilizing image, the positive meniscus lens L8 in the second lens unit G2 moves in a direction orthogonal to the optical axis.

An aspheric surface is provided to a total of eight surfaces namely, both surfaces of the negative meniscus lens L2, both surfaces of the biconvex positive lens L6, both surfaces of the negative meniscus lens L15, and both surfaces of the biconvex positive lens L16.

The front unit GF includes the first lens unit G1. The rear unit GR includes the second lens unit G2 and the third lens unit G3. The first lens unit LU1 includes the second lens unit G2 and the third lens unit G3. The focusing lens unit Gfo includes the second lens unit G2. The first sub-lens unit is the second lens unit G2 and the second sub-lens unit is the third lens unit G3.

Figure 10A:
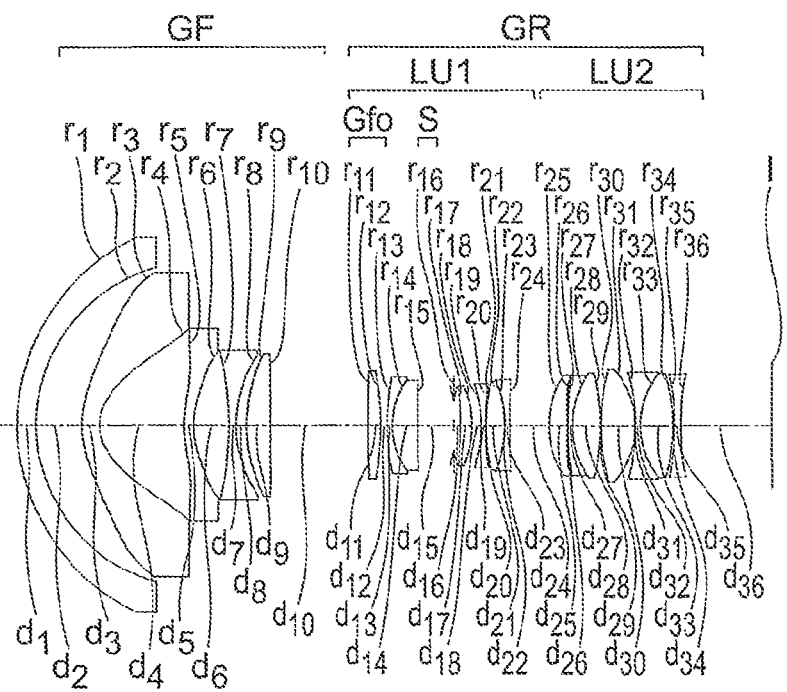
FIG. 10A, FIG. 10B, and FIG. 10C are lens cross-sectional views at the time of focusing to an object at infinity of a zoom lens according to an example 10.
Figure 10B:
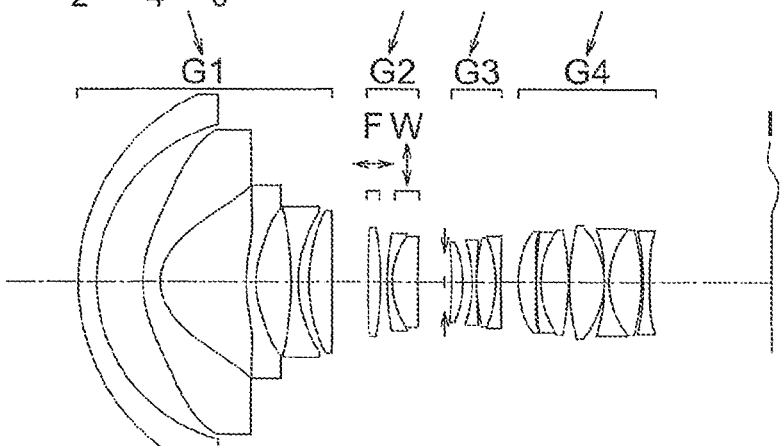
Figure 10C:
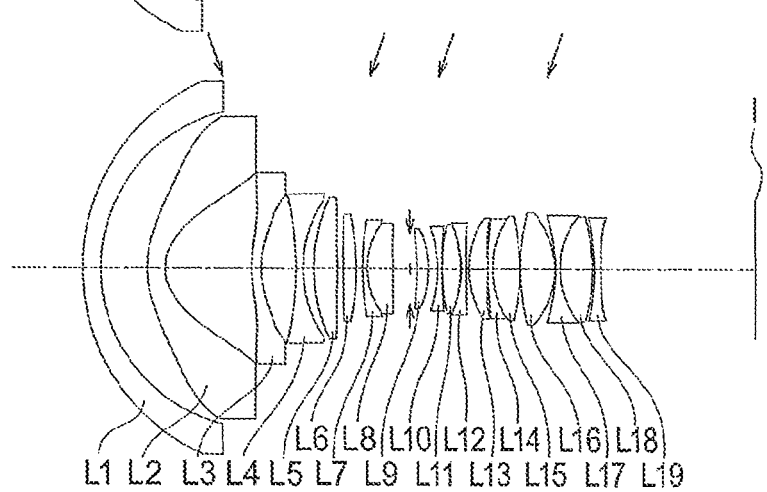

The zoom lens according to the example 10, as shown in FIG. 10A, FIG. 10B, and FIG. 10C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a biconvex positive lens L6, a negative meniscus lens L7 having a convex surface directed toward the object side, and a positive meniscus lens L8 having a convex surface directed toward the object side. Here, the negative meniscus lens L7 and the positive meniscus lens L8 are cemented.

The third lens unit G3 includes a positive meniscus lens L9 having a convex surface directed toward the image side, a biconcave negative lens L10, a biconvex positive lens L11, and a biconcave negative lens L12.

The fourth lens unit G4 includes a biconvex positive lens L13, a negative meniscus lens L14 having a convex surface directed toward the object side, a biconvex positive lens L15, a biconvex positive lens L16, a biconcave negative lens L17, a biconvex positive lens L18, and a biconcave negative lens L19. Here, the negative meniscus lens L14 and the biconvex positive lens L15 are cemented. Moreover, the biconcave negative lens L17 and the biconvex positive lens L18 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The aperture stop S moves toward the object side together with the third lens unit G3.

At the time of focusing, the biconvex positive lens L6 in the second lens unit G2 moves along an optical axis. More elaborately, at the time of focusing from an object at infinity to an object at a close distance, the biconvex positive lens L6 in the second lens unit G2 moves toward the image side. At the time of stabilizing image, the negative meniscus lens L7 and the positive meniscus lens L8 in the second lens unit G2 move in a direction orthogonal to the optical axis.

An aspheric surface is provided to a total of eight surfaces namely, both surfaces of the negative meniscus lens L2, both surfaces of the negative meniscus lens L3, an image-side surface of the biconvex positive lens L6, both surfaces of the biconvex positive lens L13, and an image-side surface of the biconcave negative lens L19.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

Figure 11A:
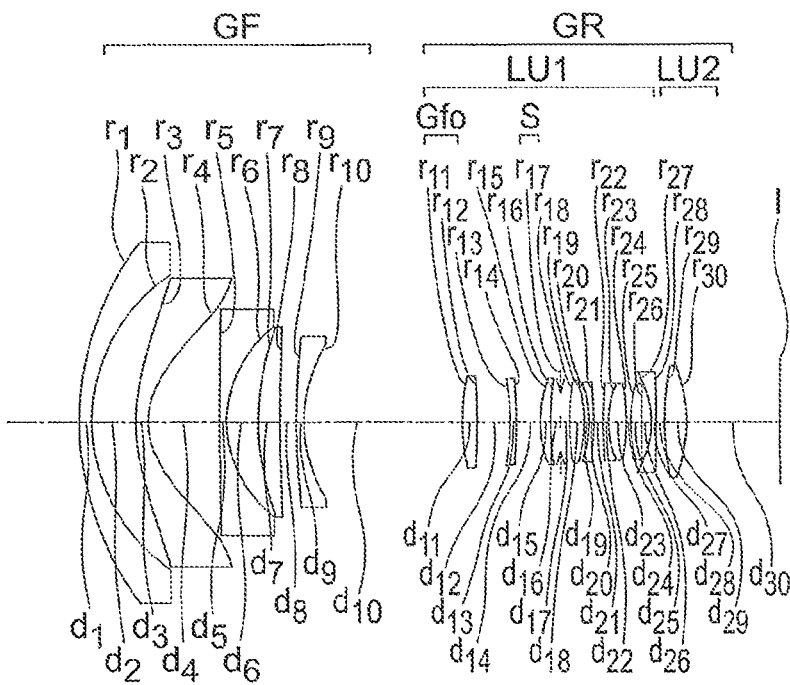
FIG. 11A, FIG. 11B, and FIG. 11C are lens cross-sectional views at the time of focusing to an object at infinity of a zoom lens according to an example 11.
Figure 11B:
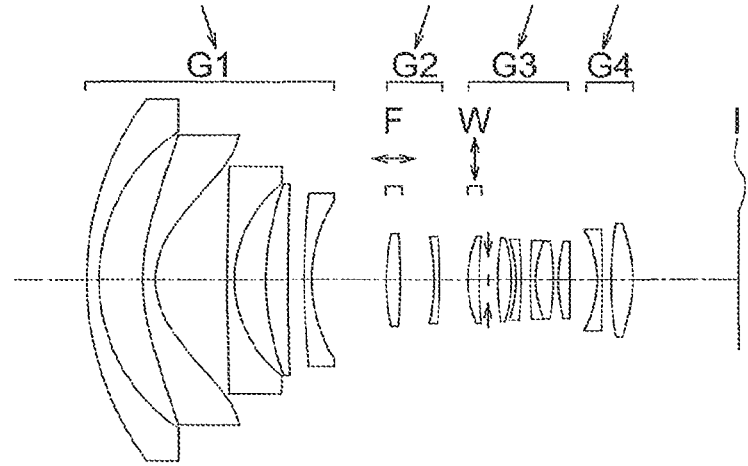
Figure 11C:
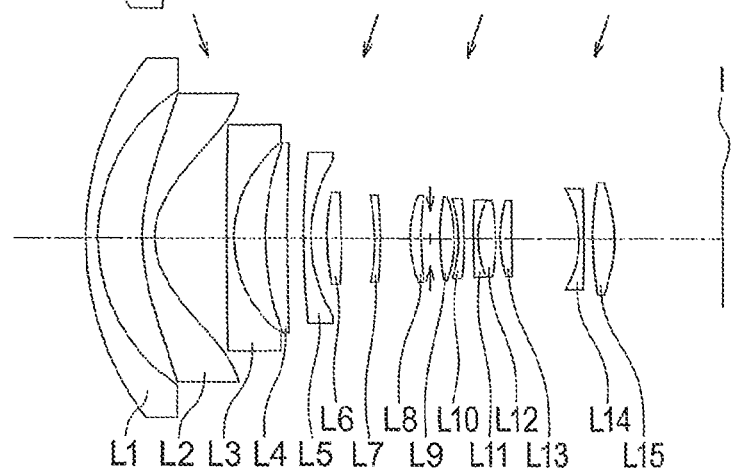

The zoom lens according to the example 11, as shown in FIG. 11A, FIG. 11B, and FIG. 11C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is disposed on the object side of an aperture stop S.

More specifically, the zoom lens includes in order from the object side to the image side, a first lens unit G1 having a negative refractive power, a second lens unit G2 having a positive refractive power, a third lens unit G3 having a positive refractive power, and a fourth lens unit G4 having a positive refractive power. The aperture stop S is disposed in the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a positive meniscus lens L4 having a convex surface directed toward the object side, and a negative meniscus lens L5 having a convex surface directed toward the object side.

The second lens unit G2 includes a biconvex positive lens L6 and a negative meniscus lens L7 having a convex surface directed toward the image side.

The third lens unit G3 includes a positive meniscus lens L8 having a convex surface directed toward the object side, a biconvex positive lens L9, a negative meniscus lens L10 having a convex surface directed toward the image side, a negative meniscus lens L11 having a convex surface directed toward the object side, a biconvex positive lens L12, and a positive meniscus lens L13 having a convex surface directed toward the object side. Here, the negative meniscus lens L11 and the biconvex positive lens L12 are cemented.

The fourth lens unit G4 includes a negative meniscus lens L14 having a convex surface directed toward the image side and a biconvex positive lens L15.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The aperture stop S moves toward the object side together with the third lens unit G3.

At the time of focusing, the biconvex positive lens L6 in the second lens unit G2 moves along an optical axis. More elaborately, at the time of focusing from an object at infinity to an object at a close distance, the biconvex positive lens L6 in the second lens unit G2 moves toward the image side. At the time of stabilizing image, the positive meniscus lens L8 in the third lens unit G3 moves in a direction orthogonal to the optical axis.

An aspheric surface is provided to a total of three surfaces namely, both surfaces of the negative meniscus lens L2 and an object-side surface of the biconvex positive lens L15.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

Figure 12A:
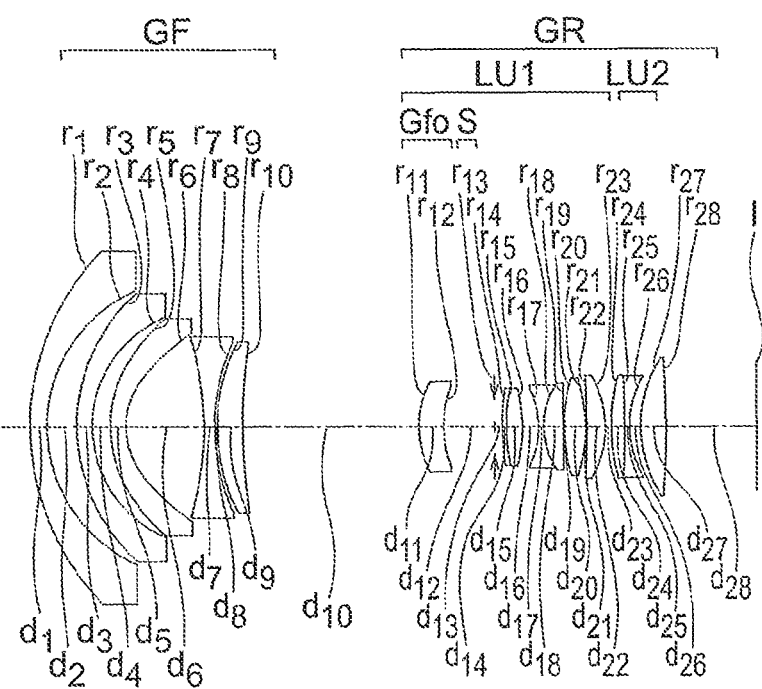
FIG. 12A, FIG. 12B, and FIG. 12C are lens cross-sectional views at the time of focusing to an object at infinity of a zoom lens according to an example 12.
Figure 12B:
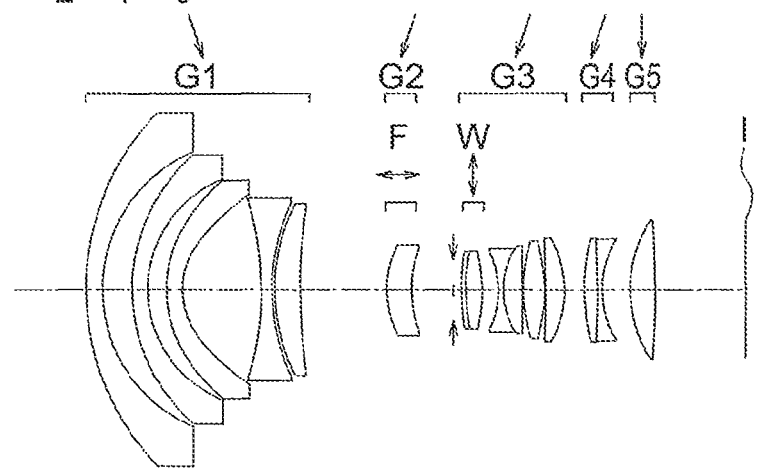
Figure 12C:
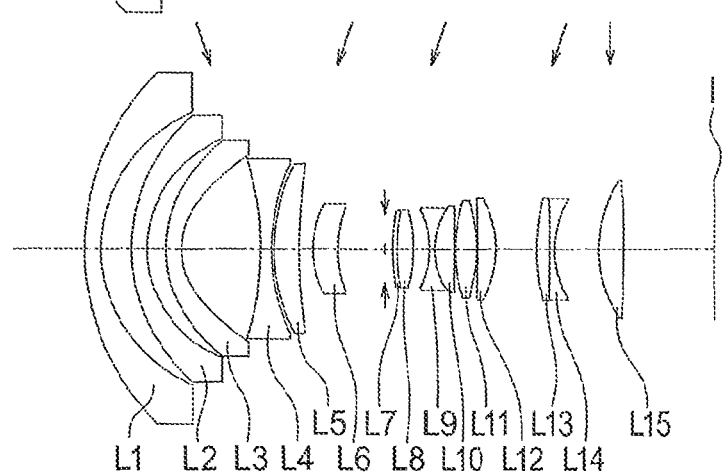

The zoom lens according to the example 12, as shown in FIG. 12A, FIG. 12B, and FIG. 12C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is disposed on the object side of an aperture stop S.

More specifically, the zoom lens includes in order from the object side to the image side, a first lens unit G1 having a negative refractive power, a second lens unit G2 having a positive refractive power, a third lens unit G3 having a positive refractive power, a fourth lens unit G4 having a negative refractive power, and a fifth lens unit G5 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a positive meniscus lens L5 having a convex surface directed toward the object side.

The second lens unit G2 includes a positive meniscus lens L6 having a convex surface directed toward the object side.

The third lens unit G3 includes a negative meniscus lens L7 having a convex surface directed toward the object side, a biconvex positive lens L8, a biconcave negative lens L9, a positive meniscus lens L10 having a convex surface directed toward the object side, a biconvex positive lens L11, and a positive meniscus lens L12 having a convex surface directed toward the image side. Here, the negative meniscus lens L7 and the biconvex positive lens L8 are cemented. Moreover, the biconcave negative lens L9 and the positive meniscus lens L10 are cemented.

The fourth lens unit G4 includes a biconvex positive lens L13 and a biconcave negative lens L14. Here, the biconvex positive lens L13 and the biconcave negative lens L14 are cemented.

The fifth lens unit G5 includes a biconvex positive lens L15.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The fifth lens unit G5 is fixed. The aperture stop S moves toward the object side together with the third lens unit G3.

At the time of focusing, the second lens unit G2 moves along an optical axis. More elaborately, at the time of focusing from an object at infinity to an object at a close distance, the second lens unit G2 moves toward the image side. At the time of stabilizing image, the negative meniscus lens L7 and the biconvex positive lens L8 in the third lens unit G3 move in a direction orthogonal to the optical axis.

An aspheric surface is provided to a total of eight surfaces namely, both surfaces of the negative meniscus lens L3, both surfaces of the positive meniscus lens L6, both surfaces of the biconvex positive lens L11, and both surfaces of the biconvex positive lens L15.

The front unit GF includes the first lens unit G1. The rear unit GR includes the second lens unit G2, the third lens unit G3, the fourth lens unit G4, and the fifth lens unit G5. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

The zoom lens according to the example 13, as shown in FIG. 13A, FIG. 13B, and FIG. 13C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the object side of an aperture stop S.

More specifically, the zoom lens includes in order from the object side to the image side, a first lens unit G1 having a negative refractive power, a second lens unit G2 having a positive refractive power, a third lens unit G3 having a positive refractive power, a fourth lens unit G4 having a negative refractive power, and a fifth lens unit G5 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a positive meniscus lens L5 having a convex surface directed toward the object side. Here, the biconcave negative lens L4 and the positive meniscus lens L5 are cemented.

The second lens unit G2 includes a positive meniscus lens L6 having a convex surface directed toward the object side.

The third lens unit G3 includes a negative meniscus lens L7 having a convex surface directed toward the object side, a biconvex positive lens L8, a biconcave negative lens L9, a positive meniscus lens L10 having a convex surface directed toward the object side, a biconvex positive lens L11, and a biconvex positive lens L12. Here, the negative meniscus lens L7 and the biconvex positive lens L8 are cemented. Moreover, the biconcave negative lens L9 and the positive meniscus lens L10 are cemented.

The fourth lens unit G4 includes a biconcave negative lens L13.

The fifth lens unit G5 includes a biconvex positive lens L14.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The fifth lens unit G5 moves toward the object side. The aperture stop S moves toward the object side together with the third lens unit G3.

At the time of focusing, the second lens unit G2 moves along an optical axis. More elaborately, at the time of focusing from an object at infinity to an object at a close distance, the second lens unit G2 moves toward the image side.

An aspheric surface is provided to a total of eight surfaces namely, both surfaces of the negative meniscus lens L3, both surfaces of the positive meniscus lens L6, both surfaces of the biconvex positive lens L12, and both surfaces of the biconvex positive lens L14.

The front unit GF includes the first lens unit G1. The rear unit GR includes the second lens unit G2, the third lens unit G3, the fourth lens unit G4, and the fifth lens unit G5. The first lens unit LU1 includes the second lens unit G2 and the third lens unit G3. The second lens unit LU2 includes the fourth lens unit G4. The focusing lens unit Gfo includes the second lens unit G2. The first sub-lens unit is the second lens unit G2 and the second sub-lens unit is the third lens unit G3.

Figure 14A:
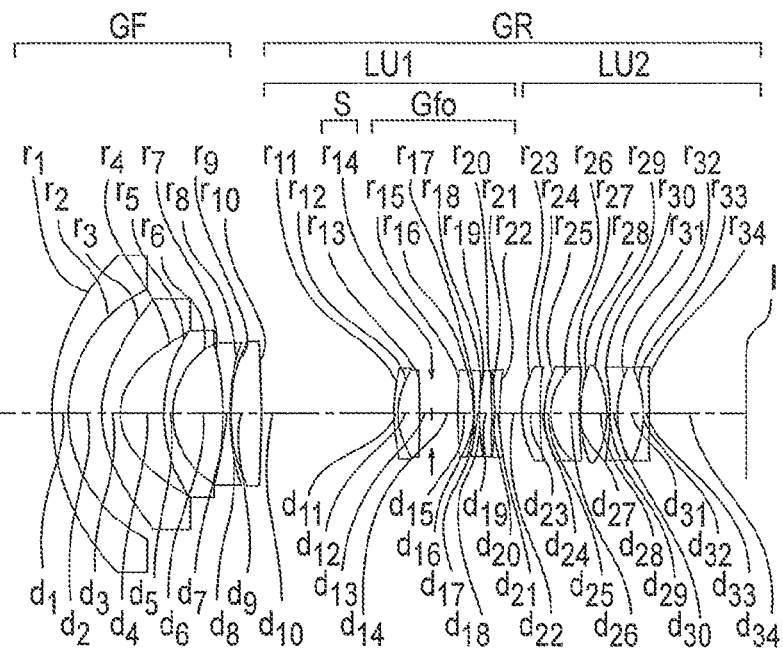
FIG. 14A, FIG. 14B, and FIG. 14C are lens cross-sectional views at the time of focusing to an object at infinity of a zoom lens according to an example 14.
Figure 14B:
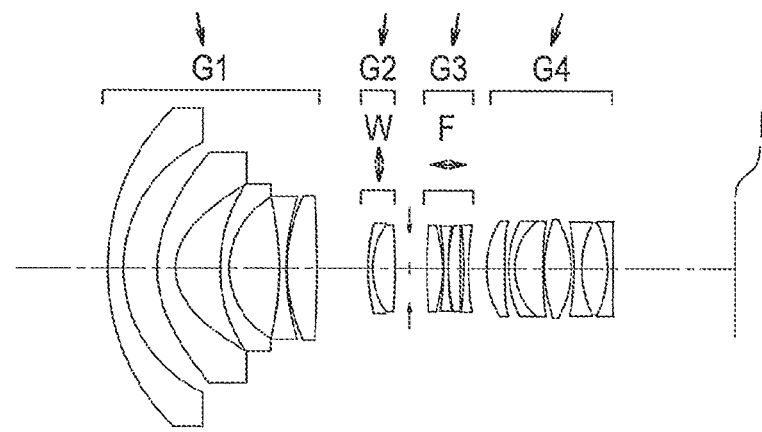
Figure 14C:
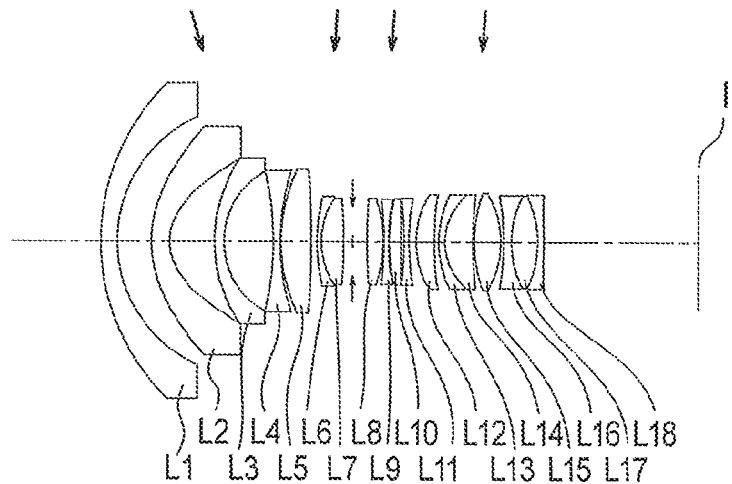

The zoom lens according to the example 14, as shown in FIG. 14A, FIG. 14B, and FIG. 14C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the image side of an aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a negative meniscus lens L6 having a convex surface directed toward the object side and a biconvex positive lens L7. Here, the negative meniscus lens L6 and the biconvex positive lens L7 are cemented.

The third lens unit G3 includes a biconvex positive lens L8, a biconcave negative lens L9, a biconvex positive lens L10, and a biconcave negative lens L11.

The fourth lens unit G4 includes a positive meniscus lens L12 having a convex surface directed toward the object side, a negative meniscus lens L13 having a convex surface directed toward the object side, a positive meniscus lens L14 having a convex surface directed toward the object side, a biconvex positive lens L15, a biconcave negative lens L16, a biconvex positive lens L17, and a negative meniscus lens L18 having a convex surface directed toward the image side. Here, the negative meniscus lens L13 and the positive meniscus lens L14 are cemented. Moreover, the biconcave negative lens L16 and the biconvex positive lens L17 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The aperture stop S moves toward the object side. The aperture stop S moves independently of the second lens unit G2 and the third lens unit G3.

At the time of focusing, the third lens unit G3 moves along an optical axis. More elaborately, at the time of focusing from an object at infinity to an object at a close distance, the third lens unit G3 moves toward the object side. Moreover, at the time of stabilizing image, the second lens unit G2 moves in a direction orthogonal to the optical axis.

An aspheric surface is provided to a total of five surfaces namely, both surfaces of the negative meniscus lens L2, both surfaces of the positive meniscus lens L12, and an image-side surface of the negative meniscus lens L18.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the third lens unit G3. The first sub-lens unit is the second lens unit G2 and the second sub-lens unit is the third lens unit G3.

A distance between the second lens unit G2 and the third lens unit G3 changes at the time of zooming. Therefore, at the time of zooming, a distance between the first sub-lens unit and the second sub-lens unit changes.

Figure 15A:
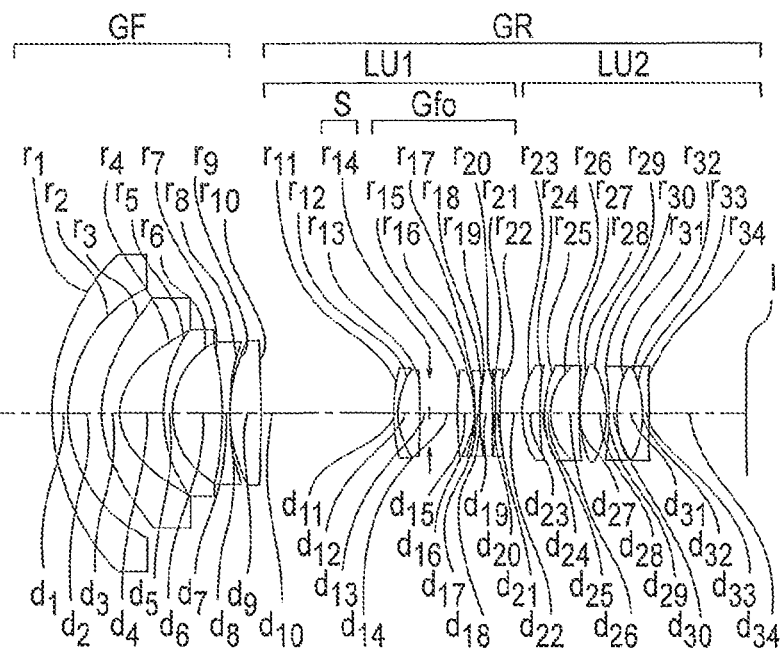
FIG. 15A, FIG. 15B, and FIG. 15C are lens cross-sectional views at the time of focusing to an object at infinity of a zoom lens according to an example 15.
Figure 15B:
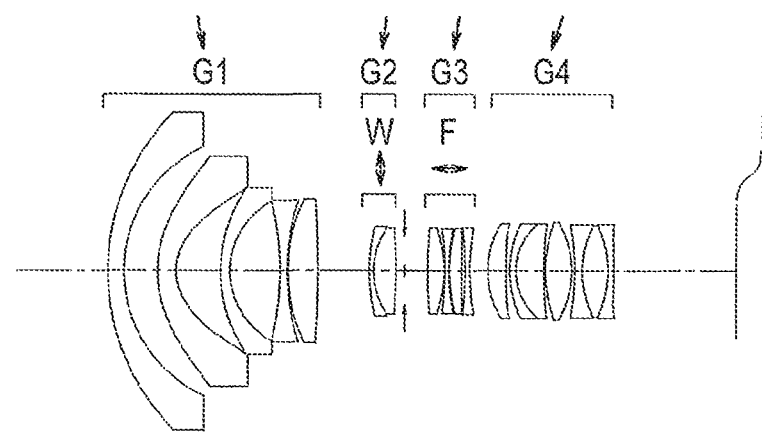
Figure 15C:
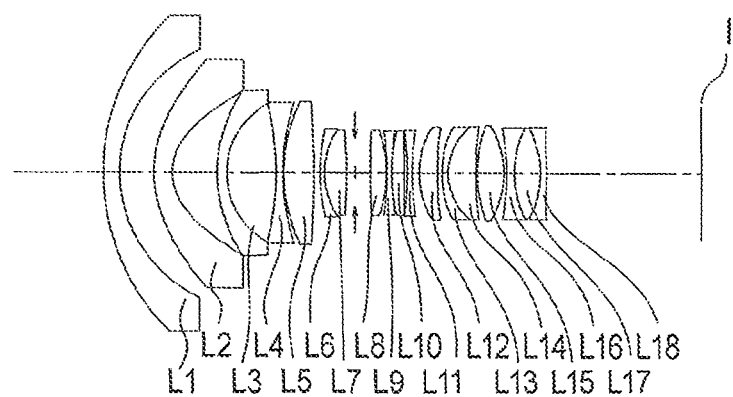

The zoom lens according to the example 15, as shown in FIG. 15A, FIG. 15B, and FIG. 15C includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the image side of an aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a negative meniscus lens L6 having a convex surface directed toward the object side and a biconvex positive lens L7. Here, the negative meniscus lens L6 and the biconvex positive lens L7 are cemented.

The third lens unit G3 includes a biconvex positive lens L8, a biconcave negative lens L9, a biconvex positive lens L10, and a biconcave negative lens L11.

The fourth lens unit G4 includes a positive meniscus lens L12 having a convex surface directed toward the object side, a negative meniscus lens L13 having a convex surface directed toward the object side, a positive meniscus lens L14 having a convex surface directed toward the object side, a biconvex positive lens L15, a biconcave negative lens L16, a biconvex positive lens L17, and a negative meniscus lens L18 having a convex surface directed toward the image side. Here, the negative meniscus lens L13 and the positive meniscus lens L14 are cemented. Moreover, the biconcave negative lens L16 and the biconvex positive lens L17 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The aperture stop S moves toward the object side together with the second lens unit G2.

At the time of focusing, the third lens unit G3 moves along an optical axis. More elaborately, at the time of focusing from an object at infinity to an object at a close distance, the third lens unit G3 moves toward the object side. Moreover, at the time of stabilizing image, the second lens unit G2 moves in a direction orthogonal to the optical axis.

An aspheric surface is provided to a total of five surfaces namely, both surfaces of the negative meniscus lens L2, both surfaces of the positive meniscus lens L12, and an image-side surface of the negative meniscus lens L18.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the third lens unit G3. The first sub-lens unit is the second lens unit G2 and the second sub-lens unit is the third lens unit G3.

A distance between the second lens unit G2 and the third lens unit G3 changes at the time of zooming. Consequently, at the time of zooming, a distance between the first sub-lens unit and the second sub-lens unit changes.

Figure 16A:
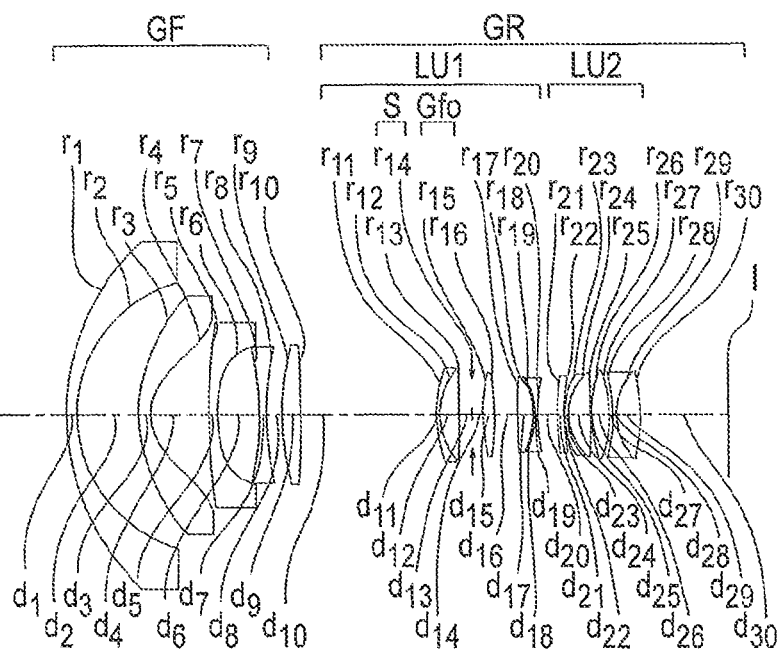
FIG. 16A, FIG. 16B, and FIG. 16C are lens cross-sectional views at the time of focusing to an object at infinity of a zoom lens according to an example 16.
Figure 16B:
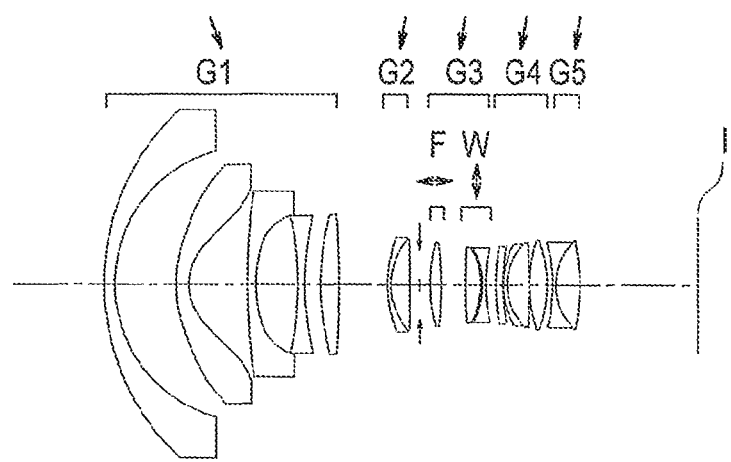
Figure 16C:
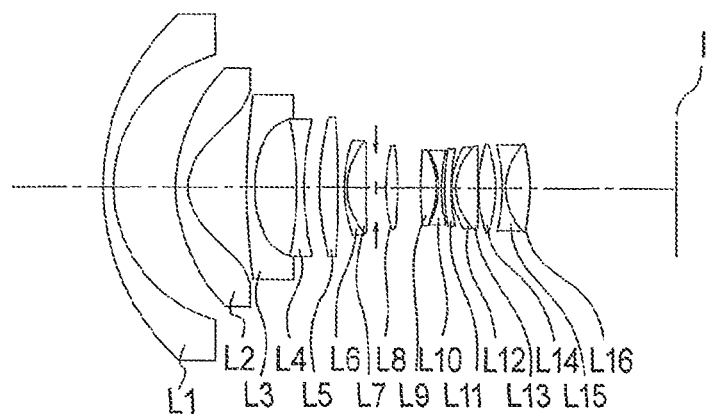

The zoom lens according to the example 16, as shown in FIG. 16A, FIG. 16B, and FIG. 16C includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the image side of an aperture stop S.

More specifically, the zoom lens includes in order from the object side to the image side, a first lens unit G1 having a negative refractive power, a second lens unit G2 having a positive refractive power, a third lens unit G3 having a negative refractive power, a fourth lens unit G4 having a positive refractive power, and a fifth lens unit G5 having a negative refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a negative meniscus lens L6 having a convex surface directed toward the object side and a biconvex positive lens L7. Here, the negative meniscus lens L6 and the biconvex positive lens L7 are cemented.

The third lens unit G3 includes a biconvex positive lens L8, a biconvex positive lens L9, and a biconcave negative lens L10.

The fourth lens unit G4 includes a negative meniscus lens L11 having a convex surface directed toward the object side, a negative meniscus lens L12 having a convex surface directed toward the object side, a biconvex positive lens L13, and a biconvex positive lens L14. Here, the negative meniscus lens L12 and the biconvex positive lens L13 are cemented.

The fifth lens unit G5 includes a biconcave negative lens L15 and a biconvex positive lens L16. Here, the biconcave negative lens L15 and the biconvex positive lens L16 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The fifth lens unit G5 moves toward the object side. The aperture stop S moves toward the object side together with the third lens unit G3.

At the time of focusing, the biconvex positive lens L8 in the third lens unit G3 moves along an optical axis. More elaborately, at the time of focusing from an object at infinity to an object at a close distance, the biconvex positive lens L8 in the third lens unit G3 moves toward the object side. Moreover, at the time stabilizing image, the biconvex positive lens L9 and the biconcave negative lens L10 in the third lens unit G3 move in a direction orthogonal to the optical axis.

An aspheric surface is provided to a total of four surfaces namely, both surfaces of the negative meniscus lens L2, an image-side surface of the negative meniscus lens L3, and an image-side surface of the biconvex positive lens L16.

The front unit GF includes the first lens unit G1. The rear unit GR includes the second lens unit G2, the third lens unit G3, the fourth lens unit G4, and the fifth lens unit G5. The first lens unit LU1 includes the second lens unit G2 and the third lens unit G3. The second lens unit LU2 includes the fourth lens unit G4. The focusing lens unit Gfo includes the biconvex positive lens L8 in the third lens unit G3. The first sub-lens unit is the second lens unit G2 and the second sub-lens unit is the third lens unit G3.

A distance between the second lens unit G2 and the third lens unit G3 changes at the time of zooming. Consequently, at the time of zooming, a distance between the first sub-lens unit and the second sub-lens unit changes.

Figure 17A:
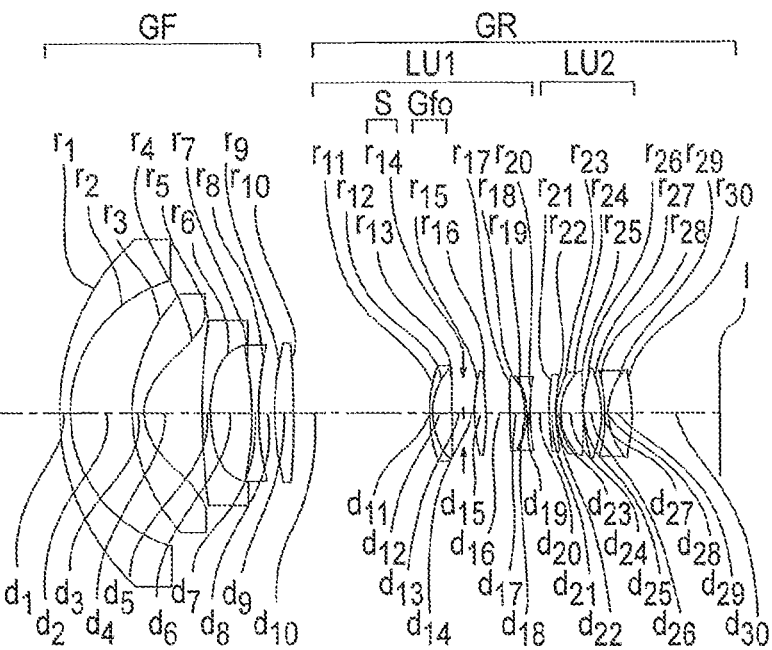
FIG. 17A, FIG. 17B, and FIG. 17C are lens cross-sectional views at the time of focusing to an object at infinity of a zoom lens according to an example 17.
Figure 17B:
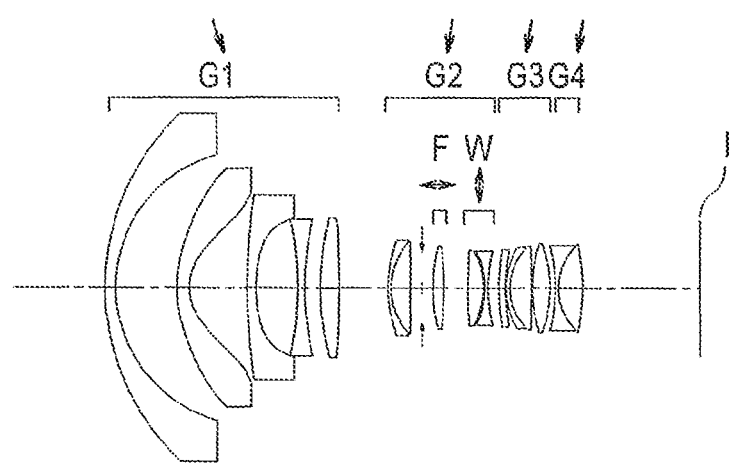
Figure 17C:
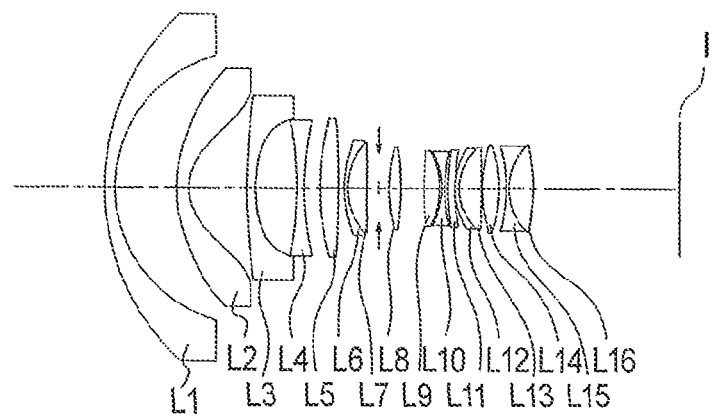

The zoom lens according to the example 17, as shown in FIG. 17A, FIG. 17B, and FIG. 17C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the image side of an aperture stop S.

More specifically, the zoom lens includes in order from the object side to the image side, a first lens unit G1 having a negative refractive power, a second lens unit G2 having a positive refractive power, a third lens unit G3 having a positive refractive power, and a fourth lens unit G4 having a negative refractive power. The aperture stop S is disposed inside the second lens unit G2.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a negative meniscus lens L6 having a convex surface directed toward the object side, a biconvex positive lens L7, a biconvex positive lens L8, a biconvex positive lens L9, and a biconcave negative lens L10. Here, the negative meniscus lens L6 and the biconvex positive lens L7 are cemented.

The third lens unit G3 includes a negative meniscus lens L11 having a convex surface directed toward the object side, a negative meniscus lens L12 having a convex surface directed toward the object side, a biconvex positive lens L13, and a biconvex positive lens L14. Here, the negative meniscus lens L12 and the biconvex positive lens L13 are cemented.

The fourth lens unit G4 includes a biconcave negative lens L15 and a biconvex positive lens L16.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The aperture stop S moves toward the object side together with the second lens unit G2.

At the time of focusing, the biconvex positive lens L8 in the second lens unit G2 moves along an optical axis. More elaborately, at the time of focusing from an object at infinity to an object at a close distance, the biconvex positive lens L8 in the second lens unit G2 moves toward the object side. Moreover, at the time of stabilizing image, the biconvex positive lens L9 and the biconcave negative lens L10 in the second lens unit G2 move in a direction orthogonal to the optical axis.

An aspheric surface is provided to a total of four surfaces namely, both surfaces of the negative meniscus lens L2, an image-side surface of the negative meniscus lens L3, and an image-side surface of the biconvex positive lens L16.

The front unit GF includes the first lens unit G1. The rear unit GR includes the second lens unit G2, the third lens unit G3, and the fourth lens unit G4. The first lens unit LU1 includes the second lens unit G2. The second lens unit LU2 includes the third lens unit G3. The focusing lens unit Gfo includes the biconvex positive lens L8 of the second lens unit G2. The first sub-lens unit is the negative meniscus lens L6 and the biconvex positive lens L7 in the second lens unit G2. The second sub-lens unit is the biconvex positive lens L8, the biconvex positive lens L9, and the biconcave negative lens L10 in the second lens unit G2.

In the second lens unit G2, a distance between the biconvex positive lens L7 and the biconvex positive lens L8 does not change at the time of zooming. Consequently, at the time of zooming, a distance between the first sub-lens unit and the second sub-lens unit is constant.

Figure 18A:
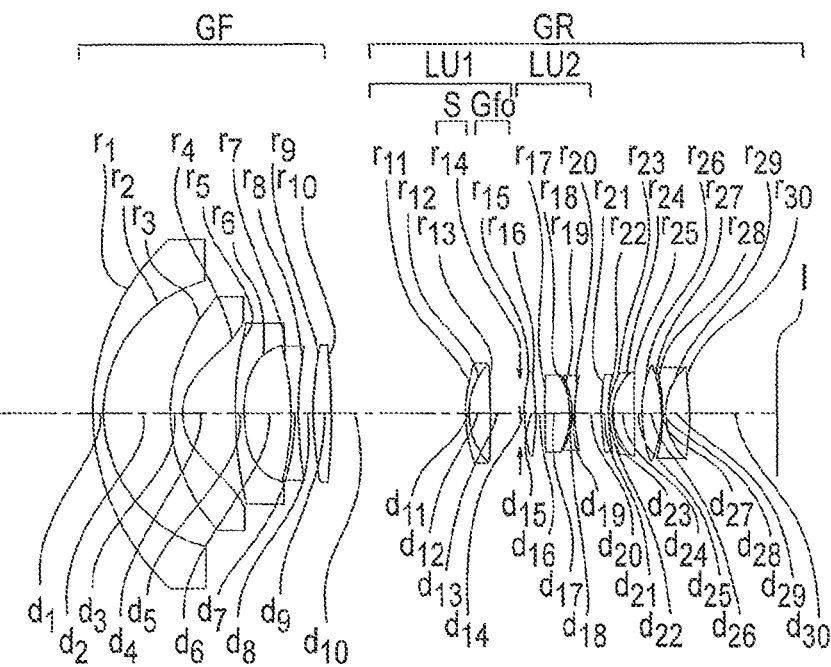
FIG. 18A, FIG. 18B, and FIG. 18C are lens cross-sectional views at the time of focusing to an object at infinity of a zoom lens according to an example 18.
Figure 18B:
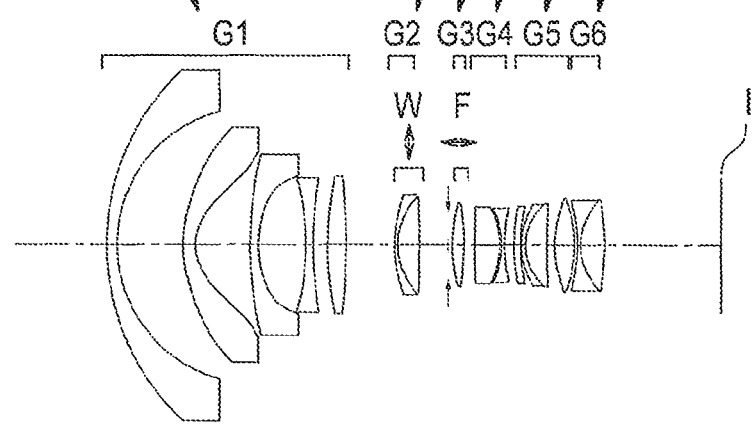
Figure 18C:
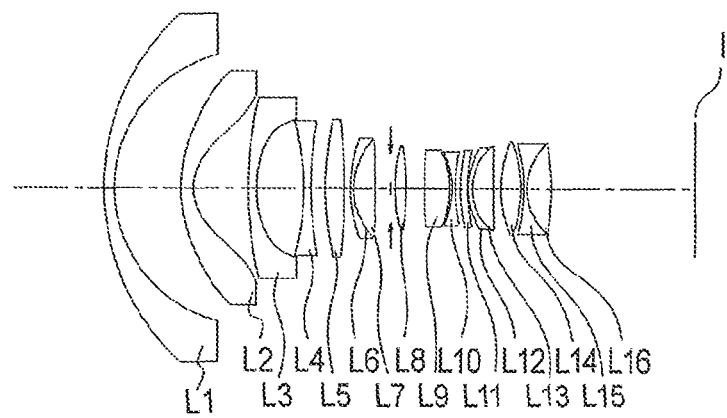

The zoom lens according to the example 18, as shown in FIG. 18A, FIG. 18B, and FIG. 18C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the image side of an aperture stop S.

More specifically, the zoom lens includes in order from the object side to the image side, a first lens unit G1 having a negative refractive power, a second lens unit G2 having a positive refractive power, a third lens unit G3 having a positive refractive power, a fourth lens unit G4 having a negative refractive power, a fifth lens unit G5 having a positive refractive power, and a sixth lens unit G6 having a negative refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a negative meniscus lens L6 having a convex surface directed toward the object side and a biconvex positive lens L7. Here, the negative meniscus lens L6 and the biconvex positive lens L7 are cemented.

The third lens unit G3 includes a biconvex positive lens L8.

The fourth lens unit G4 includes a biconvex positive lens L9 and a biconcave negative lens L10.

The fifth lens unit G5 includes a negative meniscus lens L11 having a convex surface directed toward the object side, a negative meniscus lens L12 having a convex surface directed toward the object side, a positive meniscus lens L13 having a convex surface directed toward the object side, and a biconvex positive lens L14. Here, the negative meniscus lens L12 and the positive meniscus lens L13 are cemented.

The sixth lens unit G6 includes a biconcave negative lens L15 and a biconvex positive lens L16. Here, the biconcave negative lens L15 and the biconvex positive lens L16 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The fifth lens unit G5 moves toward the object side. The sixth lens unit G6 moves toward the object side. The aperture stop S moves toward the object side together with the third lens unit G3.

At the time of focusing, the third lens unit G3 moves along an optical axis. More elaborately, at the time of focusing from an object at infinity to an object at a close distance, the third lens unit G3 moves toward the object side. Moreover, at the time stabilizing image, the second lens unit G2 moves in a direction orthogonal to the optical axis.

An aspheric surface is provided to a total of four surfaces namely, both surfaces of the negative meniscus lens L2, an image-side surface of the negative meniscus lens L3, and an image-side surface of the biconvex positive lens L16.

The front unit GF includes the first lens unit G1. The rear unit GR includes the second lens unit G2, the third lens unit G3, the fourth lens unit G4, the fifth lens unit G5, and the sixth lens unit G6. The first lens unit LU1 includes the second lens unit G2 and the third lens unit G3. The second lens unit LU2 includes the fourth lens unit G4. The focusing lens unit Gfo includes the third lens unit G3. The first sub-lens unit is the second lens unit G2 and the second sub-lens unit is the third lens unit G3.

A distance between the second lens unit G2 and the third lens unit G3 changes at the time of zooming. Consequently, a distance between the first sub-lens unit and the second sub-lens unit changes.

Figure 19A:
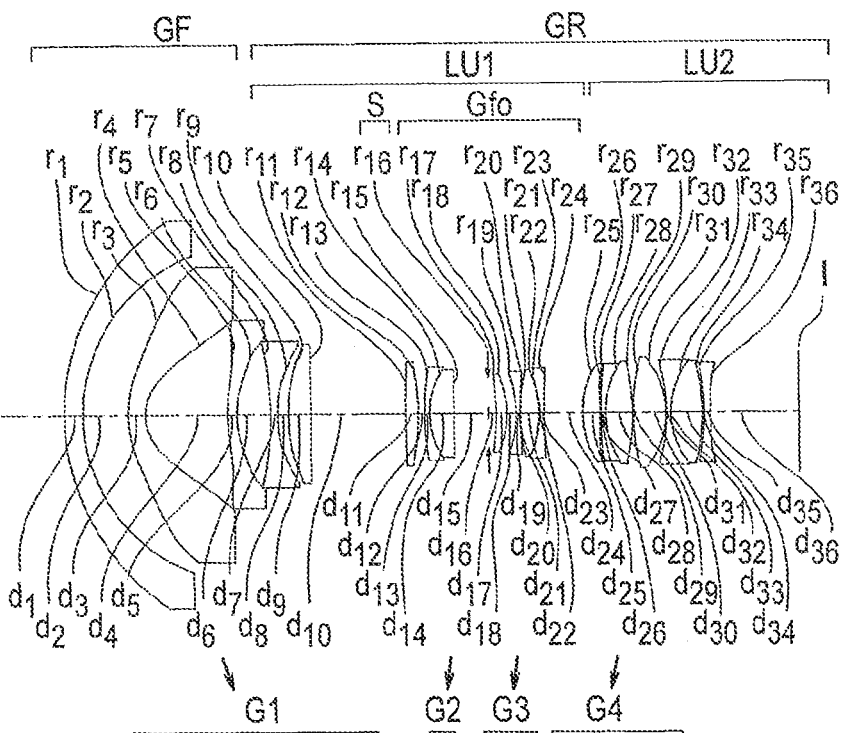
FIG. 19A, FIG. 19B, and FIG. 19C are lens cross-sectional views at the time of focusing to an object at infinity of a zoom lens according to an example 19.
Figure 19B:
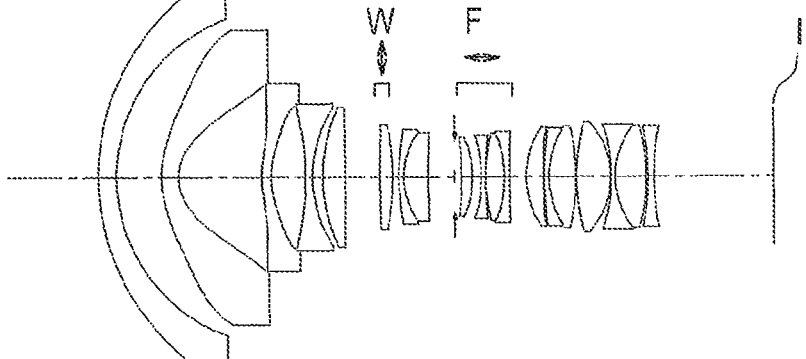
Figure 19C:
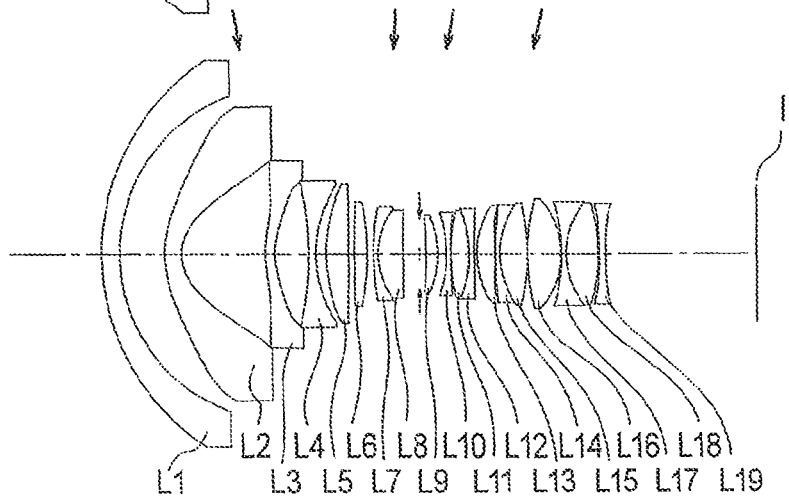

The zoom lens according to the example 19, as shown in FIG. 19A, FIG. 19B, and FIG. 19C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a focusing lens unit Gfo having a positive refractive power. The focusing lens unit Gfo is positioned on the image side of an aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a biconvex positive lens L6, a negative meniscus lens L7 having a convex surface directed toward the object side, and a positive meniscus lens L8 having a convex surface directed toward the object side. Here, the negative meniscus lens L7 and the positive meniscus lens L8 are cemented.

The third lens unit G3 includes a positive meniscus lens L9 having a convex surface directed toward the image side, a biconcave negative lens L10, a biconvex positive lens L11, and a biconcave negative lens L12.

The fourth lens unit G4 includes a biconvex positive lens L13, a negative meniscus lens L14 having a convex surface directed toward the object side, a biconvex positive lens L15, a biconvex positive lens L16, a biconcave negative lens L17, a biconvex positive lens L18, and a biconcave negative lens L19. Here, the negative meniscus lens L14 and the biconvex positive lens L15 are cemented. Moreover, the biconcave negative lens L17 and the biconvex positive lens L18 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The aperture stop S moves toward the object side together with the third lens unit G3.

At the time of focusing, the third lens unit G3 moves along an optical axis. More elaborately, at the time of focusing from an object at infinity to an object at a close distance, the third lens unit G3 moves toward the object side. Moreover, at the time of stabilizing image, the biconvex positive lens L6 in the second lens unit G2 moves in a direction orthogonal to the optical axis.

An aspheric surface is provided to a total of eight surfaces namely, both surfaces of the negative meniscus lens L2, both surfaces of the negative meniscus lens L3, an image-side surface of the biconvex positive lens L6, both surfaces of the biconvex positive lens L13, and an image-side surface of the biconcave negative lens L19.

The front unit GF includes a first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo includes the third lens unit G3. The first sub-lens unit is the second lens unit G2 and the second sub-lens unit is the third lens unit G3.

A distance between the second lens unit G2 and the third lens unit G3 changes at the time of zooming. Consequently, at the time of zooming, a distance between the first sub-lens unit and the second sub-lens unit changes.

Figure 20A:
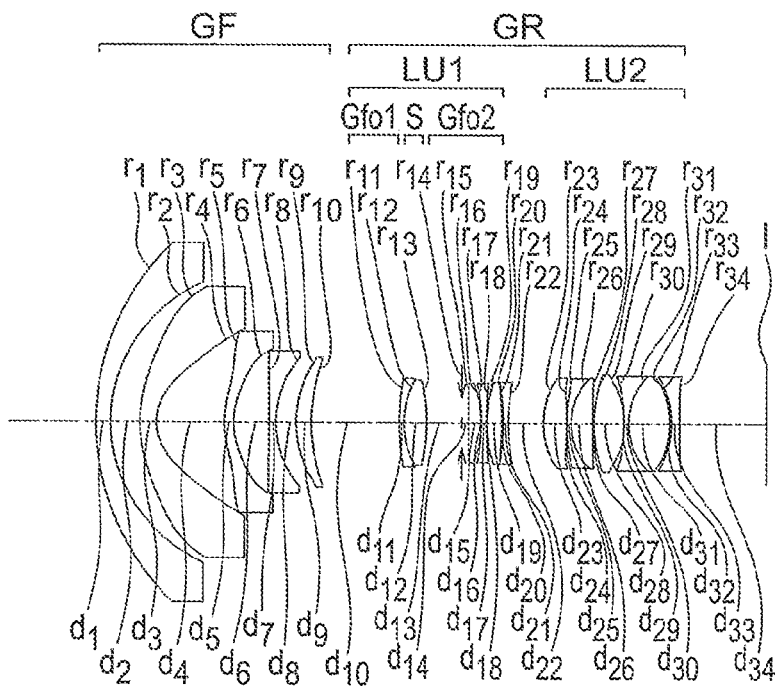
FIG. 20A, FIG. 20B, and FIG. 20C are lens cross-sectional views at the time of focusing to an object at infinity of a zoom lens according to an example 20.
Figure 20B:
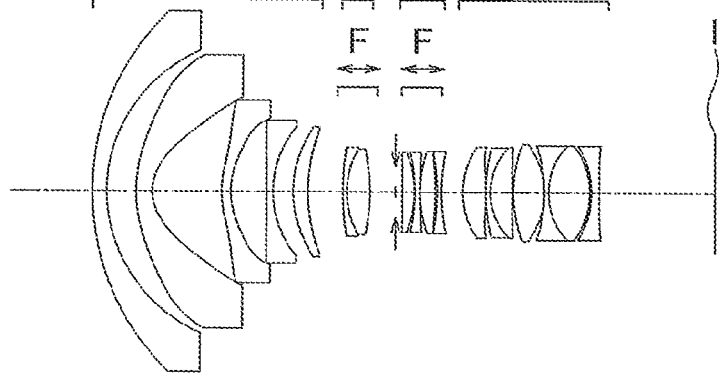
Figure 20C:
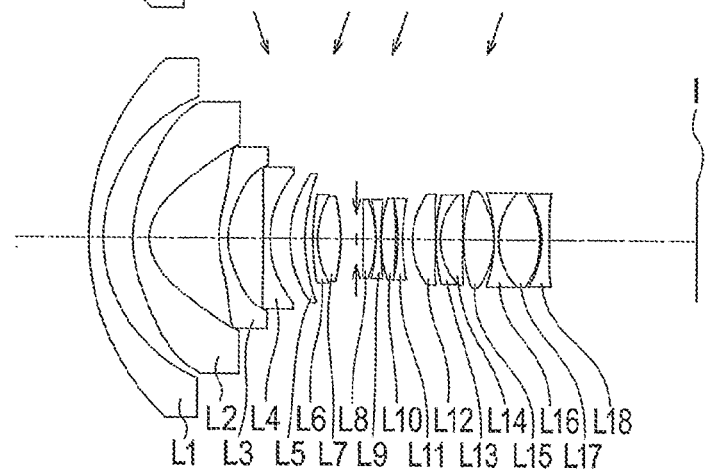

The zoom lens according to the example 20, as shown in FIG. 20A, FIG. 20B, and FIG. 20C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a first focusing lens unit Gfo1 and a second focusing lens unit Gfo2. The first focusing lens unit Gfo1 is positioned on the object side of an aperture stop S and the second focusing lens unit Gfo2 is positioned on the image side of the aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a positive meniscus lens L5 having a convex surface directed toward the object side.

The second lens unit G2 includes a negative meniscus lens L6 having a convex surface directed toward the object side and a biconvex positive lens L7. Here, the negative meniscus lens L6 and the biconvex positive lens L7 are cemented.

The third lens unit G3 includes a positive meniscus lens L8 having a convex surface directed toward the image side, a biconcave negative lens L9, a biconvex positive lens L10, and a biconcave negative lens L11.

The fourth lens unit G4 includes a biconvex positive lens L12, a negative meniscus lens L13 having a convex surface directed toward the object side, a positive meniscus lens L14 having a convex surface directed toward the object side, a biconvex positive lens L15, a biconcave negative lens L16, a biconvex positive lens L17, and a negative meniscus lens L18 having a convex surface directed toward the image side. Here, the negative meniscus lens L13 and the positive meniscus lens L14 are cemented. Moreover, the biconcave negative lens L16 and the biconvex positive lens L17 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The aperture stop S moves toward the object side together with the third lens unit G3.

At the time of focusing, the second lens unit G2 and the third lens unit G3 move along an optical axis. More elaborately, at the time of focusing from an object at infinity to an object at a short distance, both the second lens unit G2 and the third lens unit G3 move toward the image side.

An aspheric surface is provided to a total of seven surfaces namely, both surfaces of the negative meniscus lens L2, both surfaces of the negative meniscus lens L3, both surfaces of the biconvex positive lens L12, and an image-side surface of the negative meniscus lens L18.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The focusing lens unit Gfo1 includes the second lens unit G2. The focusing lens unit Gfo2 includes the third lens unit G3. The first sub-lens unit is the second lens unit G2 and the second sub-lens unit is the third lens unit G3.

A distance between the second lens unit G2 and the third lens unit G3 changes at the time of zooming. Consequently, at the time of zooming, a distance between the first sub-lens unit and the second sub-lens unit changes.

Figure 21A:
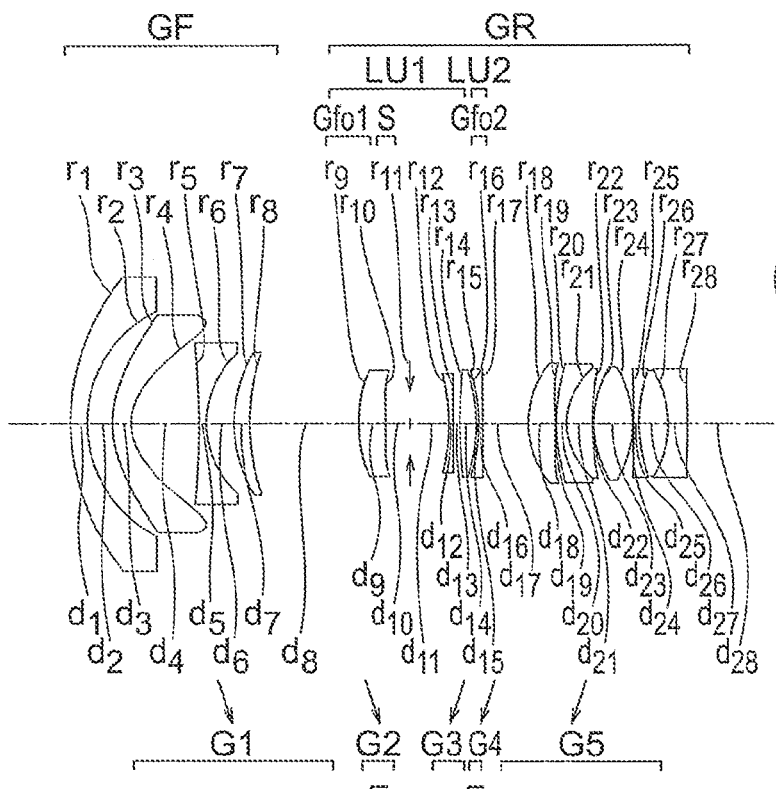
FIG. 21A, FIG. 21B, and FIG. 21C are lens cross-sectional views at the time of focusing to an object at infinity of a zoom lens according to an example 21.
Figure 21B:
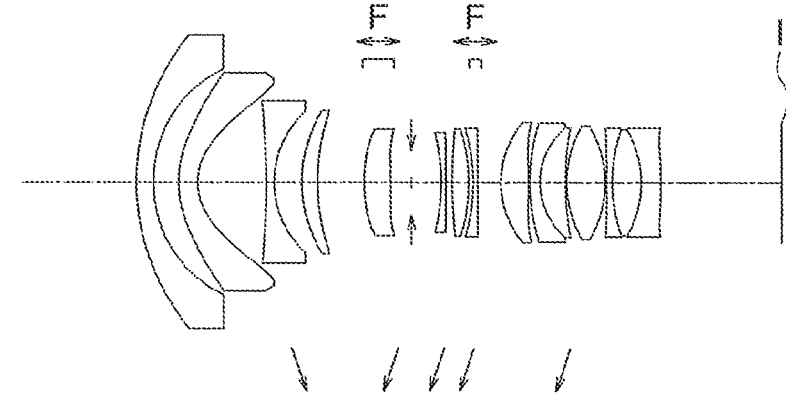
Figure 21C:
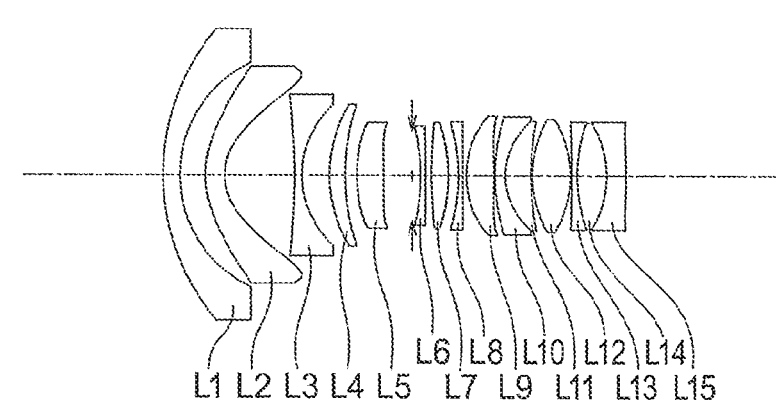

The zoom lens according to the example 21, as shown in FIG. 21A, FIG. 21B, and FIG. 21C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a first focusing lens unit Gfo1. The second lens unit LU2 includes a second focusing lens unit Gfo2. The first focusing lens unit Gfo1 is positioned on the object side of an aperture stop S, and the second focusing lens unit Gfo2 is positioned on the image side of the aperture stop S.

More specifically, the zoom lens includes in order from the object side to the image side, a first lens unit G1 having a negative refractive power, a second lens unit G2 having a positive refractive power, a third lens unit G3 having a positive refractive power, a fourth lens unit G4 having a negative refractive power, and a fifth lens unit G5 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a biconcave negative lens L3, and a positive meniscus lens L4 having a convex surface directed toward the object side.

The second lens unit G2 includes a biconvex positive lens L5.

The third lens unit G3 includes a negative meniscus lens L6 having a convex surface directed toward the image side and a biconvex positive lens L7.

The fourth lens unit G4 includes a negative meniscus lens L8 having a convex surface directed toward the image side.

The fifth lens unit G5 includes a biconvex positive lens L9, a negative meniscus lens L10 having a convex surface directed toward the object side, a positive meniscus lens L11 having a convex surface directed toward the object side, a biconvex positive lens L12, a biconcave negative lens L13, a biconvex positive lens L14, a negative meniscus lens L15 having a convex surface directed toward the image side. Here, the negative meniscus lens L10 and the positive meniscus lens L11 are cemented. Moreover, the biconcave negative lens L13, the biconvex positive lens L14, and the negative meniscus lens L15 are cemented.

At the time of zooming from a wide angle end to a telephoto end, each lens unit moves as follows. The first lens unit G1 moves toward the image side. The second lens unit G2, after moving toward the image side, moves toward the object side. The third lens unit G3 moves toward the object side. The fourth lens unit G4 moves toward the object side. The fifth lens unit G5 moves toward the object side. The aperture stop S moves toward the object side. The aperture stop S moves independently of the second lens unit G2 and the third lens unit G3.

At the time of focusing, the second lens unit G2 and the fourth lens unit G4 move along an optical axis. More elaborately, at the time of focusing from an object at infinity to an object at a close distance, both the second lens unit G2 and the fourth lens unit G4 move toward the image side.

An aspheric surface is provided to a total of seven surfaces namely, both surfaces of the negative meniscus lens L2, both surfaces of the biconvex positive lens L5, both surfaces of the biconvex positive lens L9, and an image-side surface of the negative meniscus lens L15.

The front unit GF includes the first lens unit G1. The rear unit GR includes the second lens unit G2, the third lens unit G3, the fourth lens unit G4, and the fifth lens unit G5. The first lens unit LU1 includes the second lens unit G2 and the third lens unit G3. The second lens unit LU2 includes the fourth lens unit G4. The first focusing lens unit Gfo1 includes the second lens unit G2. The second focusing lens unit Gfo2 includes the fourth lens unit G4. The first sub-lens unit is the second lens unit G2 and the second sub-lens unit is the third lens unit G3.

A distance between the second lens unit G2 and the third lens unit G3 changes at the time of zooming. Consequently, at the time of zooming, a distance between the first sub-lens unit and the second sub-lens unit changes.

Figure 22A:
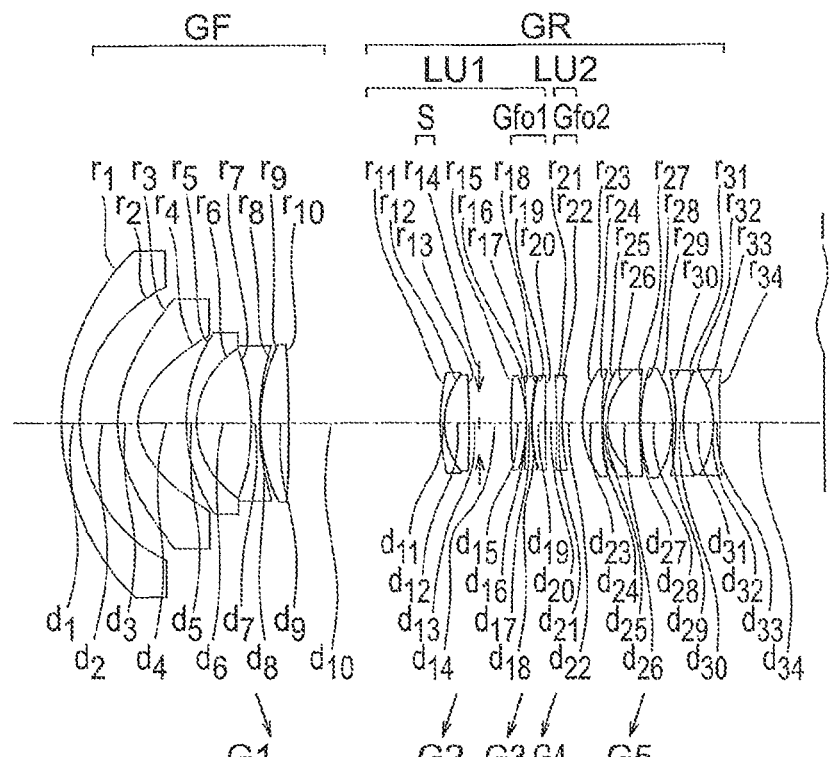
FIG. 22A, FIG. 22B, and FIG. 22C are lens cross-sectional views at the time of focusing to an object at infinity of a zoom lens according to an example 22.
Figure 22B:
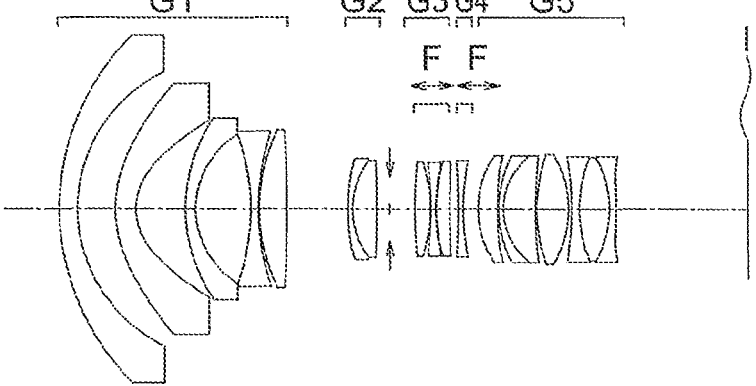
Figure 22C:
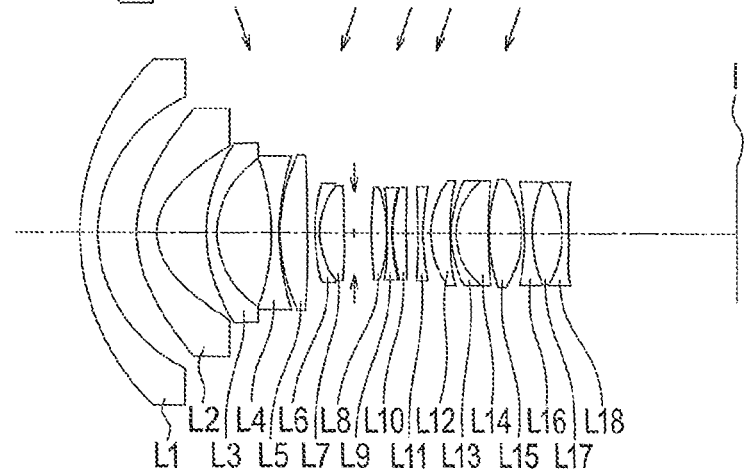

The zoom lens according to the example 22, as shown in FIG. 22A, FIG. 22B, and FIG. 22C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a first focusing lens unit Gfo1. The second lens unit LU2 includes a second focusing lens unit Gfo2. Both the first focusing lens unit Gfo1 and the second focusing lens unit Gfo2 are positioned on the image side of an aperture stop S.

More specifically, the zoom lens includes in order from the object side to the image side, a first lens unit G1 having a negative refractive power, a second lens unit G2 having a positive refractive power, a third lens unit G3 having a positive refractive power, a fourth lens unit G4 having a negative refractive power, and a fifth lens unit G5 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a negative meniscus lens L6 having a convex surface directed toward the object side and a biconvex positive lens L7. Here, the negative meniscus lens L6 and the biconvex positive lens L7 are cemented.

The third lens unit G3 includes a biconvex positive lens L8, a biconcave negative lens L9, and a positive meniscus lens L10 having a convex surface directed toward the object side.

The fourth lens unit G4 includes a biconcave negative lens L11.

The fifth lens unit G5 includes a positive meniscus lens L12 having a convex surface directed toward the object side, a negative meniscus lens L13 having a convex surface directed toward the object side, a positive meniscus lens L14 having a convex surface directed toward the object side, a biconvex positive lens L15, a biconcave negative lens L16, a biconvex positive lens L17, and a negative meniscus lens L18 having a convex surface directed toward the image side. Here, the negative meniscus lens L13 and the positive meniscus lens L14 are cemented. Moreover, the biconcave negative lens L16 and the biconvex positive lens L17 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The fifth lens unit G5 moves toward the object side. The aperture stop S moves toward the object side. The aperture stop S moves independently of the second lens unit G2 and the third lens unit G3.

At the time of focusing, the third lens unit G3 and the fourth lens unit G4 move along an optical axis. More elaborately, at the time of focusing from an object at infinity to an object at a close distance, both the third lens unit G3 and the fourth lens unit G4 move toward the object side.

An aspheric surface is provided to a total of five surfaces namely, both surfaces of the negative meniscus lens L2, both surfaces of the positive meniscus lens L12, and an image-side surface of the negative meniscus lens L18.

The front unit GF includes the first lens unit G1. The rear unit GR includes the second lens unit G2, the third lens unit G3, the fourth lens unit G4, and the fifth lens unit G5. The first lens unit LU1 includes the second lens unit G2 and the third lens unit G3. The second lens unit LU2 includes the fourth lens unit G4. The first focusing lens unit Gfo1 includes the third lens unit G3. The second focusing lens unit Gfo2 includes the fourth lens unit G4. The first sub-lens unit is the second lens unit G2 and the second sub-lens unit is the third lens unit G3.

A distance between the second lens unit G2 and the third lens unit G3 changes at the time of zooming. Consequently, at the time of zooming, a distance between the first sub-lens unit and the second sub-lens unit changes.

Figure 23A:
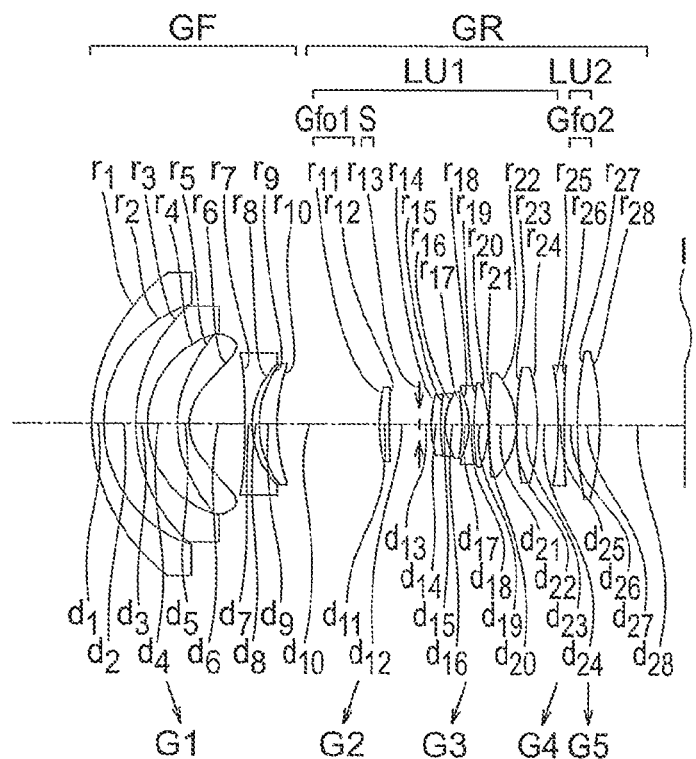
FIG. 23A, FIG. 23B, and FIG. 23C are lens cross-sectional views at the time of focusing to an object at infinity of a zoom lens according to an example 23.
Figure 23B:
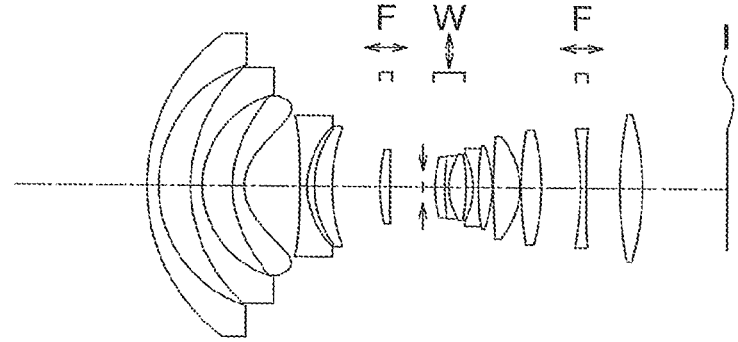
Figure 23C:
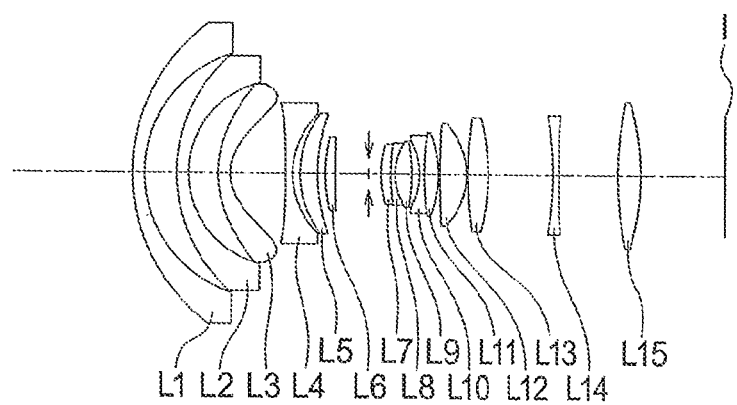

The zoom lens according to the example 23, as shown in FIG. 23A, FIG. 23B, and FIG. 23C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a first focusing lens unit Gfo1. The second lens unit LU2 includes a second focusing lens unit Gfo2. The first focusing lens unit Gfo1 is positioned on the object side of an aperture stop S and the second focusing lens unit Gfo2 is positioned on the image side of the aperture stop S.

More specifically, the zoom lens includes in order from the object side to the image side, a first lens unit G1 having a negative refractive power, a second lens unit G2 having a positive refractive power, a third lens unit G3 having a positive refractive power, a fourth lens unit G4 having a negative refractive power, and a fifth lens unit G5 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a positive meniscus lens L5 having a convex surface directed toward the object side.

The second lens unit G2 includes a positive meniscus lens L6 having a convex surface directed toward the object side.

The third lens unit G3 includes a positive meniscus lens L7 having a convex surface directed toward the object side, a negative meniscus lens L8 having a convex surface directed toward the object side, a biconvex positive lens L9, a biconcave negative lens L10, a biconvex positive lens L11, a biconvex positive lens L12, and a biconvex positive lens L13. Here, the positive meniscus lens L7, the negative meniscus lens L8, and the biconvex positive lens L9 are cemented. Moreover, the biconcave negative lens L10 and the biconvex positive lens L11 are cemented.

The fourth lens unit G4 includes a negative meniscus lens L14 having a convex surface directed toward the image side.

The fifth lens unit G5 includes a biconvex positive lens L15.

At the time of zooming from a wide angle end to a telephoto end, each lens unit moves as follows. The first lens unit G1, after moving toward the image side, moves toward the object side. The second lens unit G2 moves toward the object side. The third lens unit G3 moves toward the object side. The fourth lens unit G4 moves toward the object side. The fifth lens unit G5 is fixed. The aperture stop S moves toward the object side together with the third lens unit G3.

At the time of focusing, the second lens unit G2 and the fourth lens unit G4 move along an optical axis. More elaborately, at the time of focusing from an object at infinity to an object at a close distance, the second lens unit G2 moves toward the image side and the fourth lens unit G4 moves toward the object side. Moreover, at the time of stabilizing image, the positive meniscus lens L7, the negative meniscus lens L8, and the biconvex positive lens L9 in the third lens unit G3 move in a direction orthogonal to the optical axis.

An aspheric surface is provided to a total of four surfaces namely, both surfaces of the negative meniscus lens L3, an object-side surface of the biconcave negative lens L4, and an image-side surface of the negative meniscus lens L14.

The front unit GF includes the first lens unit G1. The rear unit GR includes the second lens unit G2, the third lens unit G3, the fourth lens unit G4, and the fifth lens unit G5. The first lens unit LU1 includes the second lens unit G2 and the third lens unit G3. The second lens unit LU2 includes the fourth lens unit G4. The first focusing lens unit Gfo1 includes the second lens unit G2. The second focusing lens unit Gfo2 includes the fourth lens unit G4. The first sub-lens unit is the second lens unit G2 and the second sub-lens unit is the third lens unit G3.

A distance between the second lens unit G2 and the third lens unit G3 changes at the time of zooming. Consequently, at the time of zooming, a distance between the first sub-lens unit and the second sub-lens unit changes.

Figure 24A:
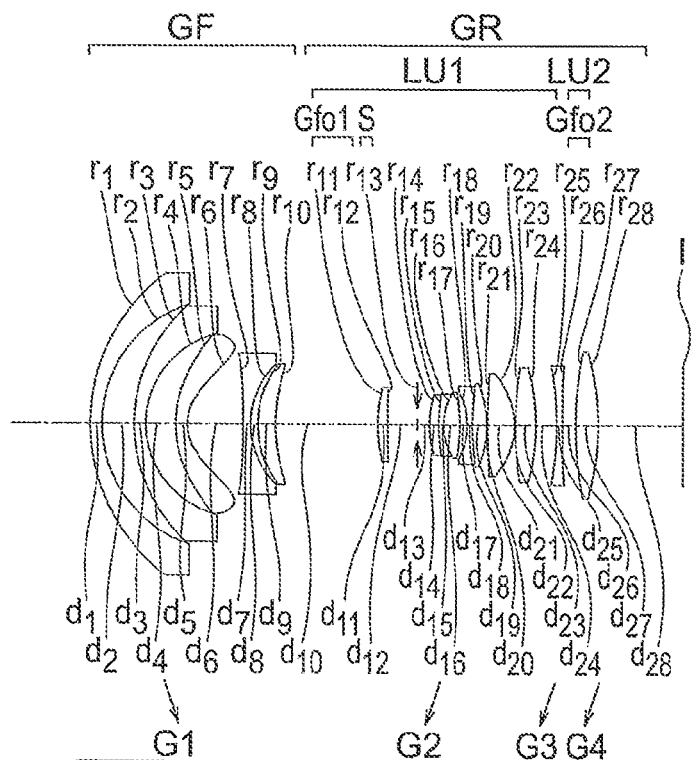
FIG. 24A, FIG. 24B, and FIG. 24C are lens cross-sectional views at the time of focusing to an object at infinity of a zoom lens according to an example 24.
Figure 24B:
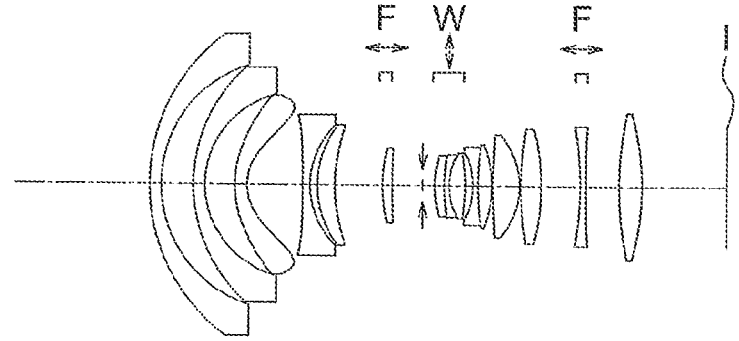
Figure 24C:
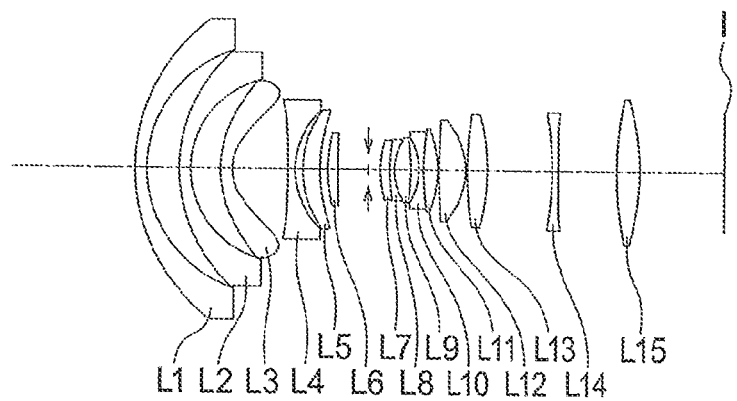

The zoom lens according to the example 24, as shown in FIG. 24A, FIG. 24B, and FIG. 24C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a first focusing lens unit Gfo1. The second lens unit LU2 includes a second focusing lens unit Gfo2. The first focusing lens unit Gfo1 is positioned on the object side of an aperture stop S and the second focusing lens unit Gfo2 is positioned on the image side of the aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed in the second lens unit G2.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a positive meniscus lens L5 having a convex surface directed toward the object side.

The second lens unit G2 includes a positive meniscus lens L6 having a convex surface directed toward the object side, a positive meniscus lens L7 having a convex surface directed toward the object side, a negative meniscus lens L8 having a convex surface directed toward the object side, a biconvex positive lens L9, a biconcave negative lens L10, a biconvex positive lens L11, a biconvex positive lens L12, and a biconvex positive lens L13. Here, the positive meniscus lens L7, the negative meniscus lens L8, and the biconvex positive lens L9 are cemented. Moreover, the biconcave negative lens L10 and the biconvex positive lens L11 are cemented.

The third lens unit G3 includes a negative meniscus lens L14 having a convex surface directed toward the image side.

The fourth lens unit G4 includes a biconvex positive lens L15.

At the time of zooming from a wide angle end to a telephoto end, each lens unit moves as follows. The first lens unit G1, after moving toward the image side, moves toward the object side. The second lens unit G2 moves toward the object side. The third lens unit G3 moves toward the object side. The fourth lens unit G4 moves toward the object side. The aperture stop S moves toward the object side together with the second lens unit G2.

At the time of focusing, the positive meniscus lens L6 in the second lens unit G2, and the fourth lens unit G4 move along an optical axis. More elaborately, at the time of focusing from an object at infinity to an object at a close distance, the positive meniscus lens L6 in the second lens unit G2 moves toward the image side, and the fourth lens unit G4 moves toward the object side. Moreover, at the time of stabilizing image, the positive meniscus lens L7, the negative meniscus lens L8, and the biconvex positive lens L9 in the second lens unit G2 move in a direction orthogonal to the optical axis.

An aspheric surface is provided to a total of four surfaces namely, both surfaces of the negative meniscus lens L3, an image-side surface of the biconcave negative lens L4, and an image-side surface of the negative meniscus lens L14.

The front unit GF includes the first lens unit G1. The rear unit GR includes the second lens unit G2, the third lens unit G3, and the fourth lens unit G4. The first lens unit LU1 includes the second lens unit G2. The second lens unit LU2 includes the third lens unit G3. The first focusing lens unit Gfo1 includes the positive meniscus lens L6 of the second lens unit G2. The second focusing lens unit Gfo2 includes the fourth lens unit G4. The first sub-lens unit is the positive meniscus lens L6 in the second lens unit G2 and the second sub-lens unit is lenses from the positive meniscus lens L7 up to the biconvex positive lens L13 in the second lens unit G2.

In the second lens unit G2, a distance between the positive meniscus lens L6 and the positive meniscus lens L7 does not change at the time of zooming. Consequently, at the time of zooming, a distance between the first sub-lens unit and the second sub-lens unit is constant.

Figure 25A:
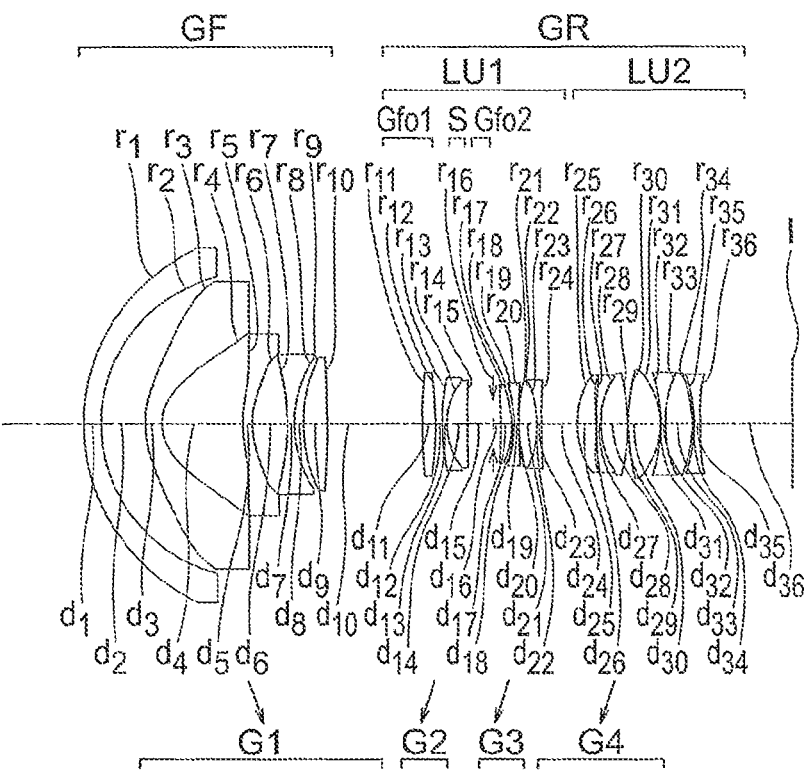
FIG. 25A, FIG. 25B, and FIG. 25c are lens cross-sectional views at the time of focusing to an object at infinity of a zoom lens according to an example 25.
Figure 25B:
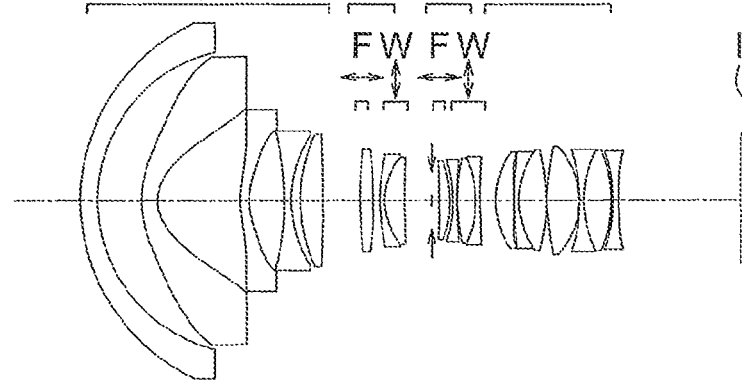
Figure 25C:
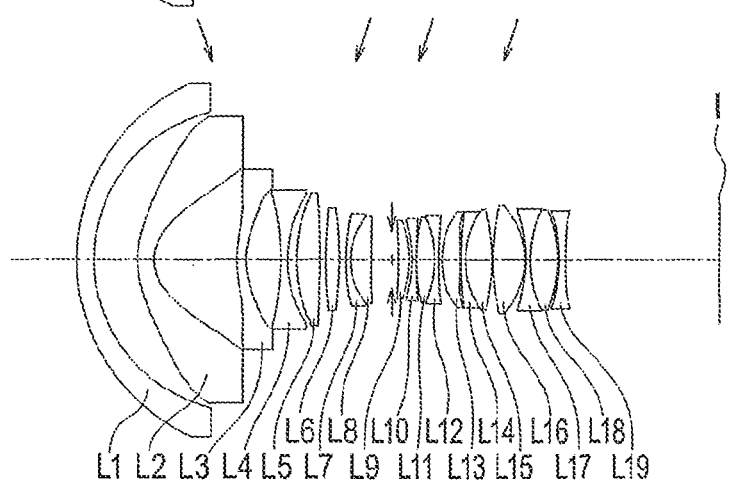
Figure 50A:
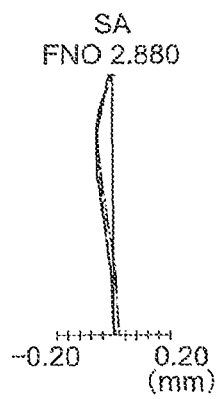
FIG. 50A, FIG. 50B, FIG. 50C, FIG. 50D, FIG. 50E, FIG. 50F, FIG. 50G, FIG. 50H, FIG. 50I, FIG. 50J, FIG. 50K, and FIG. 50L are aberration diagrams at the time of focusing to an object at infinity of the zoom lens according to the example 13.
Figure 50B:
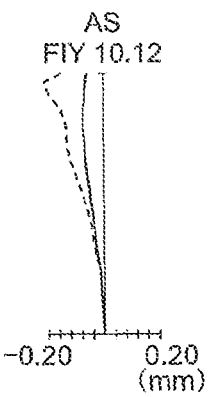
Figure 50C:
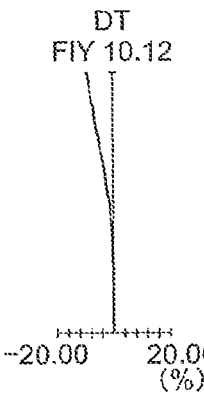
Figure 50D:
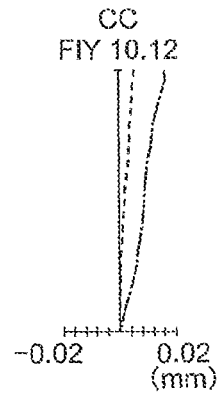
Figure 50E:
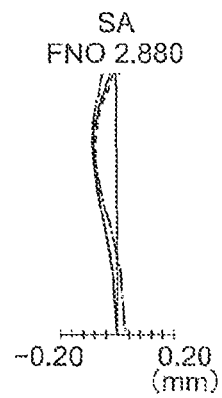
Figure 50F:
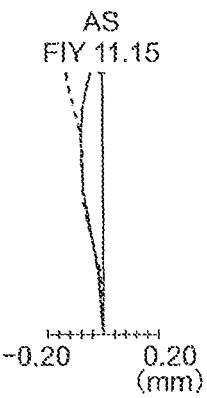
Figure 50G:
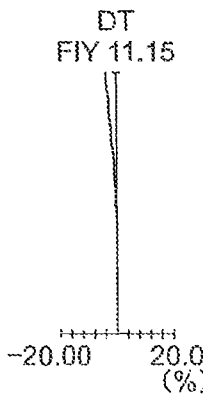
Figure 50H:
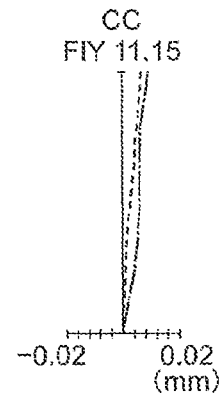
Figure 50I:
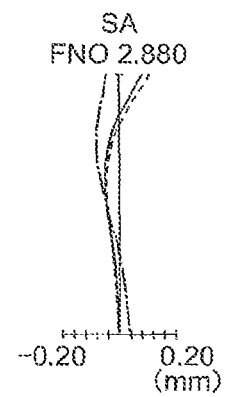
Figure 50J:
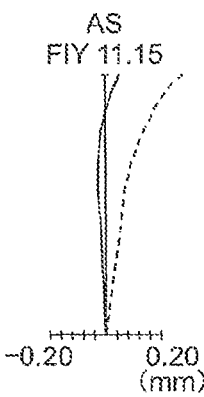
Figure 50K:
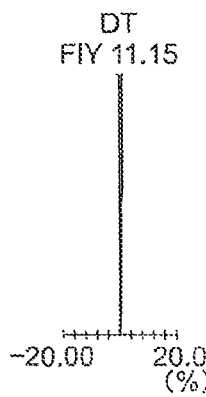
Figure 50L:
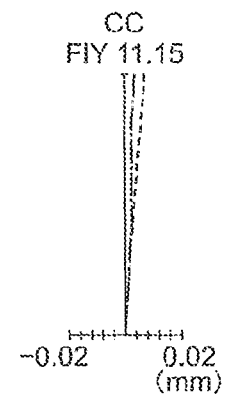
Figure 56A:
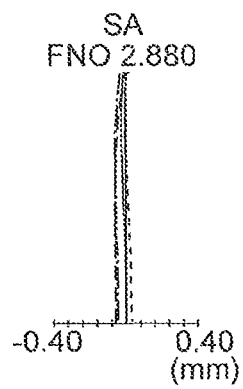
FIG. 56A, FIG. 56B, FIG. 56C, FIG. 56D, FIG. 56E, FIG. 56F, FIG. 56G, FIG. 56H, FIG. 56I, FIG. 56J, FIG. 56K, and FIG. 56L are aberration diagrams at the time of focusing to an object at infinity of the zoom lens according to the example 16.
Figure 56B:
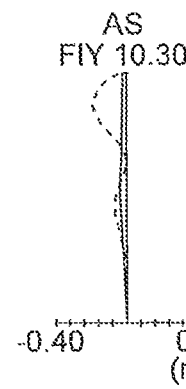
Figure 56C:
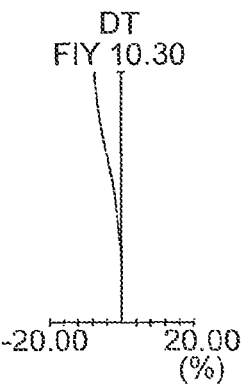
Figure 56D:
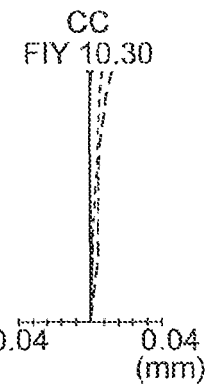
Figure 56E:
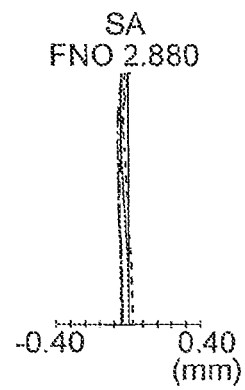
Figure 56F:
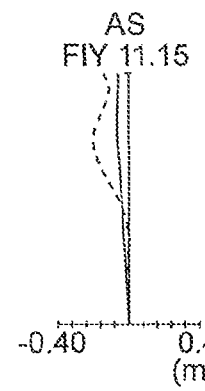
Figure 56G:
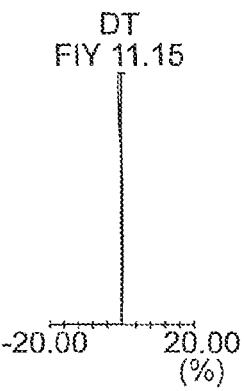
Figure 56H:
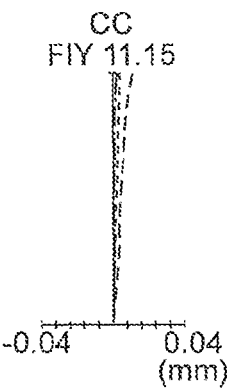
Figure 56I:
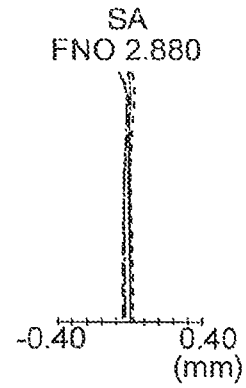
Figure 56J:
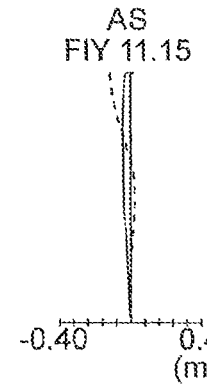
Figure 56K:
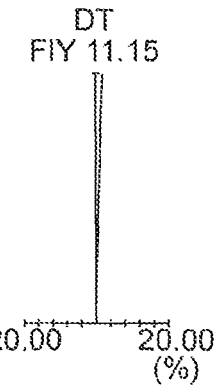
Figure 56L:
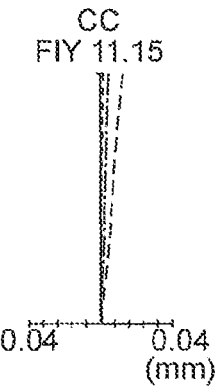
Figure 69A:
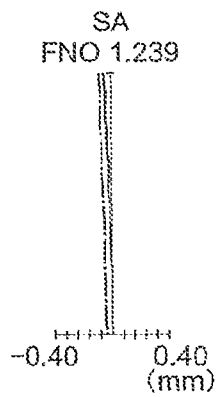
FIG. 69A, FIG. 69B, FIG. 69C, FIG. 69D, FIG. 69E, FIG. 69F, FIG. 69G, FIG. 69H, FIG. 69I, FIG. 69J, FIG. 69K, and FIG. 69L are aberration diagrams at the time of focusing to an object at a close distance of the zoom lens according to the example 22.
Figure 69B:
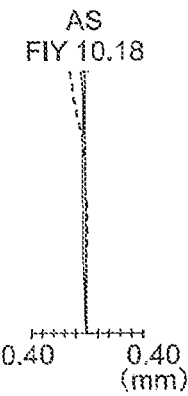
Figure 69C:
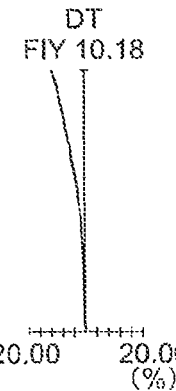
Figure 69D:
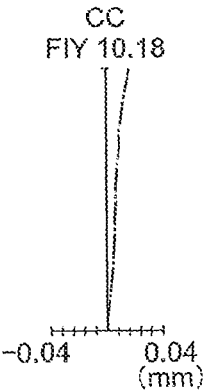
Figure 69E:
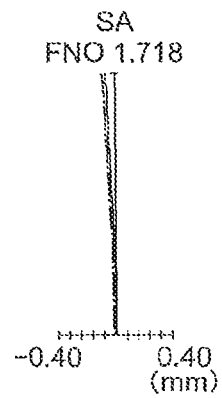
Figure 69F:
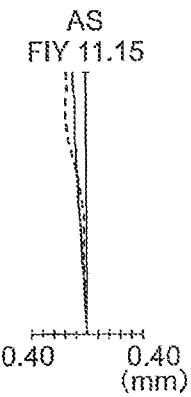
Figure 69G:
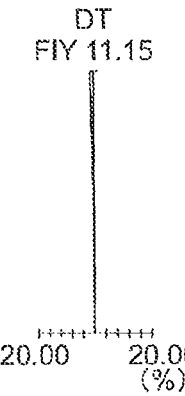
Figure 69H:
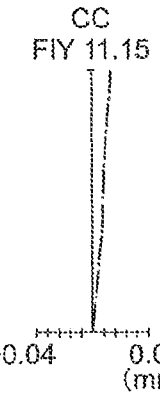
Figure 69I:
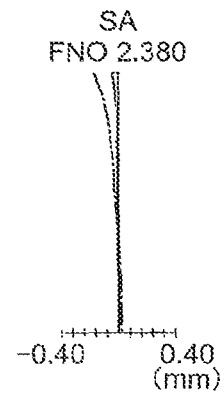
Figure 69J:
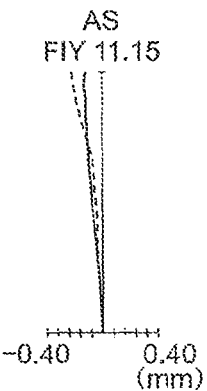
Figure 69K:
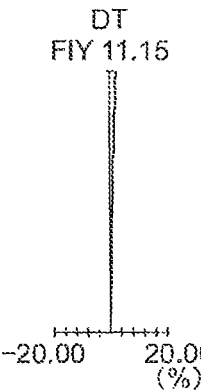
Figure 69L:
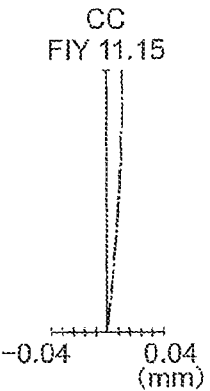

The zoom lens according to the example 25, as shown in FIG. 25A, FIG. 25B, and FIG. 25C, includes in order from an object side to an image side, a front unit GF having a negative refractive power and a rear unit GR having a positive refractive power. The rear unit GR includes in order from the object side to the image side, a first lens unit LU1 and a second lens unit LU2. The first lens unit LU1 includes a first focusing lens unit Gfo1 and a second focusing lens unit Gfo2. The first focusing lens unit Gfo1 is positioned on the object side of an aperture stop S, and the second focusing lens unit Gfo2 is positioned on the image side of the aperture stop S.

More specifically, the zoom lens includes in order from the object side to the image side, a first lens unit G1 having a negative refractive power, a second lens unit G2 having a positive refractive power, a third lens unit G3 having a negative refractive power, and a fourth lens unit G4 having a positive refractive power. The aperture stop S is disposed on the object side of the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5.

The second lens unit G2 includes a biconvex positive lens L6, a negative meniscus lens L7 having a convex surface directed toward the object side, and a positive meniscus lens L8 having a convex surface directed toward the object side. Here, the negative meniscus lens L7 and the positive meniscus lens L8 are cemented.

The third lens unit G3 includes a positive meniscus lens L9 having a convex surface directed toward the image side, a biconcave negative lens L10, a biconvex positive lens L11, and a biconcave negative lens L12.

The fourth lens unit G4 includes a biconvex positive lens L13, a negative meniscus lens L14 having a convex surface directed toward the object side, a biconvex positive lens L15, a biconvex positive lens L16, a biconcave negative lens L17, a biconvex positive lens L18, and a biconcave negative lens L19. Here, the negative meniscus lens L14 and the biconvex positive lens L15 are cemented. Moreover, the biconcave negative lens L17 and the biconvex positive lens L18 are cemented.

At the time of zooming from a wide angle end to a telephoto end, each lens unit moves as follows. The first lens unit G1 moves toward the image side. The second lens unit G2 moves toward the object side. The third lens unit G3 moves toward the object side. The fourth lens unit G4 moves toward the object side. The aperture stop S moves toward the object side together with the third lens unit G3.

At the time of focusing, the biconvex positive lens L6 in the second lens unit G2 and the positive meniscus lens L9 in the third lens unit G3 move along an optical axis. More elaborately, at the time of zooming from an object at infinity to an object at a close distance, the biconvex positive lens L6 in the second lens unit G2 moves toward the image side and the positive meniscus lens L9 in the third lens unit G3 moves toward the object side. Moreover, at the time of stabilizing image, the negative meniscus lens L7 and the positive meniscus lens L8 in the second lens unit G2 or the biconvex negative lens L10, the biconvex positive lens L11, and the biconcave negative lens L12 in the third lens unit G3 move in a direction orthogonal to the optical axis.

An aspheric surface is provided to a total of eight surfaces namely, both surfaces of the negative meniscus lens L2, both surfaces of the negative meniscus lens L3, an image-side surface of the biconvex positive lens L6, both surfaces of the biconvex positive lens L13, and an image-side surface of the biconcave negative lens L19.

The front unit GF includes the first lens unit G1. The rear unit GR includes the second lens unit G2, the third lens unit G3, and the fourth lens unit G4. The first lens unit LU1 includes the second lens unit G2 and the third lens unit G3. The second lens unit LU2 includes the fourth lens unit G4. The first focusing lens unit Gfo1 includes the biconvex positive lens L6 of the second lens unit G2. The second focusing lens unit Gfo2 includes the positive meniscus lens L9 of the third lens unit G3. The first sub-lens unit is the second lens unit G2 and the second sub-lens unit is the third lens unit G3.

A distance between the second lens unit G2 and the third lens unit G3 changes at the time of zooming. Consequently, at the time of zooming, a distance between the first sub-lens unit and the second sub-lens unit changes.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens, and denotes an aspheric surface. Further, f denotes a focal length of the entire system, FNO. denotes an F number, ω denotes a half angle of view, IH denotes an image height, FB denotes a back focus, LTL denotes a lens total length of the optical system. Further, LTL is a distance from a frontmost lens surface to the rearmost lens surface plus back focus. Each of f1, f2 . . . is a focal length of each lens unit. $f_{Rw}$ denotes a focal length of the rear unit. Back focus is a unit which is expressed upon air conversion of a distance from a rearmost lens surface to a paraxial image surface. Further, WE denotes a wide angle end, ST denotes a intermediate focal length state, TE denotes a telephoto end.

Moreover, $f_{Rw}$ denotes a focal length of the rear unit, and $f_{LU1}$ denotes a focal length of the first lens unit A. In a case of a first movement, a value of $f_{LU1}$ changes at a wide angle end, in an intermediate focal length state, and at a telephoto end. In a case of a second movement, the value of $f_{LU1}$ does not change at the wide angle end, in the intermediate focal length state, and at the telephoto end.

Zoom data in the numerical data is data when focused to an object at infinity. For instance, a value of d14 has been described in zoom data of a numerical example 9. The value of d14 is same at the wide angle end, in the intermediate focal length state, and at the telephoto end. In such manner, since d14 is not a distance that changes at the time of zooming, it is not required to be described as zoom data, but has been described for showing a movement of a focusing lens unit. Numerical data shown in "close distance" is data when focused to an object at a close distance. dOB denotes an object distance.

The movement of the focusing lens unit can be understood from a distance when focused to an object at infinity, or in other words, from a distance in the zoom data and a distance when focused to an object at a close distance. For instance, for the movement by the focusing lens unit in the numerical example 9, regarding d14, the distance when focused to an object at infinity and the distance when focused to an object at a close distance are to be compared.

At the wide angle end, the values of d14 when focused to an object at infinity and when focused to an object at a close distance respectively are as follows.

When focused to an object at infinity, d14=6.50

When focused to an object at a close distance, d14=4.96

As described above, the value of d14 when focused to an object at a close distance is smaller than the value of d14 when focused to an object at infinity. Here, d12 denotes positions of the biconvex positive lens L6 and the biconcave negative lens L7 in the second lens unit G2. Therefore, the values of d14 when focused to an object at infinity and when focused to an object at a close distance, in the numerical example 9, indicate that the biconvex positive lens L6 and the biconcave negative lens L7 move toward the image side at the time of focusing from an object at infinity to an object at a close distance. Regarding the intermediate focal length state and the telephoto end, the movement of the focusing lens unit can be understood in the same manner.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10 . . . .

$$Z=(y^2/r)/[1+\{1-(1+k)(y/r)^2\}^{1/2}]+A4y^4+A6y^6+A8y^8+A10y^{10} \ldots$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1 | 44.443 | 2.00 | 1.80400 | 46.57 |
| 2 | 23.000 | 6.26 | | |
| 3* | 25.382 | 2.00 | 1.49700 | 81.61 |
| 4* | 10.600 | 11.40 | | |
| 5* | 448.751 | 2.00 | 1.49700 | 81.61 |
| 6* | 27.675 | 7.33 | | |
| 7 | −35.532 | 1.00 | 1.43875 | 94.93 |
| 8 | 80.227 | 0.53 | | |
| 9 | 87.708 | 2.99 | 1.69895 | 30.13 |
| 10 | −69.531 | Variable | | |
| 11 | 26.300 | 0.80 | 1.76200 | 40.10 |
| 12 | 7.750 | 2.45 | 1.73077 | 40.51 |
| 13* | 46.819 | Variable | | |
| 14(Stop) | ∞ | 1.00 | | |
| 15 | 39.718 | 1.70 | 1.80810 | 22.76 |
| 16 | −47.390 | 0.84 | | |
| 17 | 130.846 | 0.80 | 1.85400 | 40.39 |
| 18 | 11.091 | 2.32 | 1.49700 | 81.61 |
| 19 | −33.188 | 1.26 | | |
| 20 | −10.408 | 0.50 | 1.64769 | 33.79 |
| 21 | −58.774 | 0.20 | | |
| 22 | −672.983 | 0.50 | 1.57250 | 57.74 |
| 23 | 27.926 | 3.17 | 1.49700 | 81.61 |

-continued

Unit mm

| | | | | |
|---|---|---|---|---|
| 24 | −13.890 | 0.20 | | |
| 25 | −236.345 | 1.87 | 1.43875 | 94.93 |
| 26 | −26.238 | 0.20 | | |
| 27 | 29.721 | 0.50 | 1.71700 | 47.92 |
| 28 | 18.656 | 0.30 | | |
| 29 | 18.367 | 4.00 | 1.43875 | 94.93 |
| 30 | −20.562 | 0.69 | | |
| 31 | 35.220 | 0.56 | 1.51633 | 64.14 |
| 32 | 14.028 | Variable | | |
| 33 | 35.367 | 0.53 | 1.80610 | 40.92 |
| 34 | 18.411 | 0.70 | | |
| 35* | 17.853 | 3.86 | 1.51633 | 64.06 |
| 36 | −247.728 | 15.36 | | |
| Image plane | ∞ | | | |

Aspherical surface data

3rd surface k = 0.000
A4 = −1.07909e−05, A6 = −2.02966e−09
4th surface k = −1.093
A4 = 4.69590e−06, A6 = −4.70577e−08
5th surface k = 0.000
A4 = 3.29640e−06, A6 = −2.88879e−09
6th surface k = 0.051
A4 = 2.39408e−05, A6 = −7.49904e−08, A8 = 2.67140e−10
13th surface k = 0.000
A4 = 3.81583e−06, A6 = 1.14549e−07
35th surface k = 0.000
A4 = −3.18526e−05, A6 = 2.34882e−08

| | WE | ST | TE |
|---|---|---|---|
| | Zoom data | | |
| | Zoom ratio 1.92 | | |
| f | 6.12 | 8.85 | 11.75 |
| FNO. | 4.08 | 4.08 | 4.08 |
| 2ω | 124.02 | 104.81 | 85.85 |
| IH | 10.26 | 11.15 | 11.15 |
| FB (in air) | 15.36 | 15.36 | 15.36 |
| LTL (in air) | 114.54 | 104.36 | 101.57 |
| d10 | 24.21 | 9.32 | 1.40 |
| d13 | 6.44 | 5.37 | 4.46 |
| d32 | 4.06 | 9.84 | 15.88 |
| | close distance | | |
| d10 | 25.82 | 11.16 | 3.51 |
| d13 | 4.83 | 3.53 | 2.35 |
| d32 | 4.06 | 9.84 | 15.88 |

Unit focal length

| | | | |
|---|---|---|---|
| f1 = −14.45 | f2 = 98.57 | f3 = 27.66 | f4 = 95.19 |

Example 2

Unit mm

Surface data

| Surface no. | r | d | nd | vd |
|---|---|---|---|---|
| Object plane | ∞ | ∞ | | |
| 1 | 40.634 | 2.50 | 1.72916 | 54.68 |
| 2 | 24.500 | 6.78 | | |
| 3* | 20.723 | 2.80 | 1.49700 | 81.54 |
| 4* | 7.797 | 11.49 | | |
| 5* | 21.833 | 1.50 | 1.74320 | 49.29 |
| 6* | 11.236 | 9.01 | | |
| 7 | −26.226 | 1.15 | 1.69680 | 55.53 |
| 8 | 36.386 | 0.10 | | |
| 9 | 33.087 | 5.30 | 1.90366 | 31.32 |
| 10 | −45.561 | Variable | | |
| 11 | 21.441 | 0.70 | 1.91082 | 35.25 |
| 12 | 10.376 | 4.52 | 1.72047 | 34.71 |
| 13 | −411.361 | Variable | | |
| 14(Stop) | ∞ | 1.10 | | |
| 15 | 27.062 | 2.95 | 1.43875 | 94.93 |
| 16 | −22.315 | 1.79 | | |
| 17 | −37.733 | 0.70 | 2.00069 | 25.46 |
| 18 | 164.295 | 0.45 | | |
| 19 | −71.871 | 2.61 | 1.49700 | 81.54 |
| 20 | −12.386 | 0.21 | | |
| 21 | −13.127 | 0.70 | 1.91082 | 35.25 |
| 22 | −265.826 | Variable | | |
| 23 | 14.849 | 2.36 | 1.49700 | 81.54 |
| 24 | 40.527 | 0.10 | | |
| 25 | 17.708 | 0.70 | 1.91082 | 35.25 |
| 26 | 10.257 | 4.79 | 1.43875 | 94.93 |
| 27 | −158.216 | 0.72 | | |
| 28 | 18.186 | 4.47 | 1.84666 | 23.78 |
| 29 | −26.928 | 0.10 | | |
| 30 | −28.151 | 0.70 | 1.91082 | 35.25 |
| 31 | 10.500 | 4.01 | 1.69350 | 53.18 |
| 32* | 239.421 | Variable | | |
| Image plane | ∞ | | | |

Aspherical surface data

3rd surface k = −0.598
A4 = −4.50810e−05, A6 = 4.11017e−09, A8 = 3.12183e−10,
A10 = −7.26913e−13, A12 = 6.17099e−16
4th surface k = −0.783
A4 = −1.72282e−05, A6 = −4.55398e−07, A8 = −2.39031e−09,
A10 = 1.37566e−11, A12 = −2.54458e−14
5th surface k = −0.374
A4 = −1.57511e−04, A6 = 1.64162e−07, A8 = 2.33326e−09,
A10 = −9.26640e−12, A12 = 1.11652e−14
6th surface k = −4.577
A4 = 1.53644e−04, A6 = −3.33764e−06, A8 = 4.53775e−08,
A10 = −2.85248e−10, A12 = 8.14436e−13
32th surface k = 0.000
A4 = 1.14461e−04, A6 = 3.01737e−07, A8 = −3.58794e−09,
A10 = 5.26034e−11, A12 = −4.61218e−13

| | WE | ST | TE |
|---|---|---|---|
| | Zoom data | | |
| | Zoom ratio 1.92 | | |
| f | 6.12 | 8.75 | 11.76 |
| FNO. | 2.88 | 2.88 | 2.88 |
| 2ω | 122.43 | 106.21 | 87.52 |

-continued

| Unit mm | | | |
|---|---|---|---|
| IH | 10.09 | 11.15 | 11.15 |
| FB (in air) | 14.82 | 20.20 | 26.19 |
| LTL (in air) | 118.73 | 109.70 | 107.10 |
| d10 | 20.36 | 8.03 | 1.27 |
| d13 | 5.10 | 5.28 | 4.85 |
| d22 | 4.15 | 1.88 | 0.50 |
| d32 | 14.82 | 20.20 | 26.19 |
| close distance | | | |
| d10 | 21.45 | 8.86 | 2.07 |
| d13 | 4.01 | 4.45 | 4.04 |
| d22 | 4.15 | 1.88 | 0.50 |
| d32 | 14.82 | 20.20 | 26.19 |

| Unit focal length | | | |
|---|---|---|---|
| f1 = −11.56 | f2 = 38.41 | f3 = −43.30 | f4 = 18.64 |

Example 3

| Unit mm | | | | |
|---|---|---|---|---|
| Surface data | | | | |
| Surface no. | r | d | nd | νd |
| Object plane | ∞ | ∞ | | |
| 1 | 41.534 | 2.70 | 1.88300 | 40.80 |
| 2 | 22.807 | 4.64 | | |
| 3 | 27.509 | 2.50 | 1.88300 | 40.80 |
| 4 | 18.423 | 3.24 | | |
| 5* | 22.194 | 2.50 | 1.80610 | 40.88 |
| 6* | 12.308 | 11.39 | | |
| 7 | −52.674 | 1.70 | 1.43700 | 95.10 |
| 8 | 28.150 | 4.17 | 1.80610 | 33.27 |
| 9 | 176.442 | Variable | | |
| 10* | 15.571 | 4.00 | 1.80610 | 40.88 |
| 11* | 20.314 | Variable | | |
| 12(Stop) | ∞ | 1.25 | | |
| 13 | 37.996 | 0.75 | 1.67300 | 38.15 |
| 14 | 25.377 | 2.82 | 1.49700 | 81.54 |
| 15 | −21.144 | 2.93 | | |
| 16 | −12.171 | 0.80 | 1.51633 | 64.14 |
| 17 | 12.171 | 3.09 | 1.49700 | 81.54 |
| 18 | −2449.791 | 0.15 | | |
| 19 | 22.985 | 4.06 | 1.43700 | 95.10 |
| 20 | −17.837 | 0.15 | | |
| 21* | 42.216 | 3.00 | 1.49700 | 81.61 |
| 22* | −22.203 | Variable | | |
| 23 | −222.327 | 0.80 | 1.90366 | 31.32 |
| 24 | 17.758 | Variable | | |
| 25* | 33.753 | 3.81 | 1.51633 | 64.06 |
| 26* | −38.501 | 14.74 | | |
| Image plane | ∞ | | | |

| Aspherical surface data |
|---|
| 5th surface |
| k = 0.000 |
| A4 = 5.37803e−05, A6 = −3.98313e−07, A8 = 1.09495e−09, A10 = −1.05283e−12 |
| 6th surface |
| k = −0.478 |
| A4 = 4.93152e−05, A6 = −5.07624e−07, A8 = −1.02107e−09, A10 = 1.42456e−11, A12 = −3.67902e−14 |
| 10th surface |
| k = 0.000 |
| A4 = 4.49075e−05, A6 = 3.50017e−07, A8 = −1.81083e−10, A10 = 3.28059e−11 |
| 11th surface |
| k = 2.202 |
| A4 = 6.05422e−05, A6 = 8.77251e−07, A8 = −9.79817e−09, A10 = 1.99367e−10 |
| 21th surface |
| k = 0.000 |
| A4 = −5.69423e−05, A6 = 7.11500e−08, A8 = −6.67964e−09, A10 = 1.99900e−11 |
| 22th surface |
| k = 0.000 |
| A4 = 2.96556e−05, A6 = 1.35880e−07, A8 = −6.35669e−09, A10 = 3.90872e−11 |
| 25th surface |
| k = 0.000 |
| A4 = 1.36963e−05, A6 = −1.93487e−07, A8 = 3.03819e−10 |
| 26th surface |
| k = 0.000 |
| A4 = 4.17364e−05, A6 = −3.01793e−07, A8 = 1.61491e−09, A10 = −1.53276e−11, A12 = 5.82244e−14 |

| | WE | ST | TE |
|---|---|---|---|
| Zoom data | | | |
| Zoom ratio 1.92 | | | |
| f | 7.14 | 9.88 | 13.70 |
| FNO. | 2.88 | 2.88 | 2.88 |
| 2ω | 114.71 | 96.68 | 77.79 |
| IH | 10.16 | 10.73 | 11.15 |
| FB (in air) | 14.74 | 14.74 | 14.74 |
| LTL (in air) | 112.88 | 101.60 | 96.54 |
| d9 | 28.14 | 12.76 | 2.00 |
| d11 | 6.89 | 6.46 | 5.98 |
| d22 | 1.00 | 2.36 | 3.94 |
| d24 | 1.66 | 4.79 | 9.38 |
| close distance | | | |
| d9 | 29.72 | 14.35 | 3.86 |
| d11 | 5.31 | 4.86 | 4.12 |
| d22 | 1.00 | 2.36 | 3.94 |
| d24 | 1.66 | 4.79 | 9.38 |

| Unit focal length | | | |
|---|---|---|---|
| f1 = −15.87 | f2 = 60.11 | f3 = 16.65 | f4 = −18.17 |
| f5 = 35.47 | | | |

Example 4

| Unit mm | | | | |
|---|---|---|---|---|
| Surface data | | | | |
| Surface no. | r | d | nd | νd |
| Object plane | ∞ | ∞ | | |
| 1 | 37.000 | 2.70 | 1.72916 | 54.68 |
| 2 | 23.294 | 4.61 | | |
| 3* | 15.303 | 3.00 | 1.49700 | 81.61 |
| 4* | 7.040 | 7.74 | | |
| 5 | 29.056 | 1.50 | 1.77250 | 49.60 |
| 6 | 13.182 | 6.86 | | |
| 7 | −80.091 | 1.15 | 1.49700 | 81.61 |
| 8 | 43.856 | 0.15 | | |
| 9 | 23.035 | 2.69 | 1.90366 | 31.32 |
| 10 | 51.336 | Variable | | |
| 11 | 48.901 | 0.70 | 1.91082 | 35.25 |
| 12 | 18.590 | 3.75 | 1.59551 | 39.24 |

-continued

Unit mm

| | | | | |
|---|---|---|---|---|
| 13 | −39.293 | Variable | | |
| 14(Stop) | ∞ | 1.10 | | |
| 15 | −130.484 | 1.97 | 1.49700 | 81.61 |
| 16 | −19.063 | 0.15 | | |
| 17 | −50.921 | 0.70 | 1.90366 | 31.32 |
| 18 | 56.454 | 0.10 | | |
| 19 | 30.992 | 2.00 | 1.80810 | 22.76 |
| 20 | −250.664 | 1.04 | | |
| 21 | −24.263 | 0.95 | 1.88300 | 40.76 |
| 22 | −143.209 | Variable | | |
| 23* | 17.086 | 2.28 | 1.49700 | 81.61 |
| 24* | 40.405 | 0.15 | | |
| 25 | 17.368 | 0.70 | 1.78590 | 44.20 |
| 26 | 10.435 | 5.51 | 1.49700 | 81.54 |
| 27 | −312.041 | 0.58 | | |
| 28 | 22.554 | 5.30 | 1.49700 | 81.54 |
| 29 | −18.597 | 0.15 | | |
| 30 | −50.357 | 0.70 | 1.69680 | 55.53 |
| 31 | 10.500 | 7.30 | 1.49700 | 81.61 |
| 32 | −17.212 | 0.00 | | |
| 33 | −17.212 | 1.00 | 1.58913 | 61.15 |
| 34* | −97.678 | Variable | | |
| Image plane | ∞ | | | |

Aspherical surface data

3rd surface k = −5.713
A4 = −1.53844e−05, A6 = 1.54000e−07, A8 = −5.67341e−10,
A10 = 1.06505e−12, A12 = −8.31170e−16
4th surface k = −1.609
A4 = 4.52714e−05, A6 = 4.84524e−07, A8 = −4.37664e−09,
A10 = 1.81465e−11, A12 = −4.19363e−14
23th surface k = 0.000
A4 = 8.17540e−05, A6 = 6.49637e−07, A8 = 7.35251e−10,
A10 = 1.30349e−11
24th surface k = 0.000
A4 = 1.47109e−04, A6 = 7.88511e−07, A8 = 5.65940e−09,
A10 = −1.38973e−11
34th surface k = 0.000
A4 = 9.13377e−05, A6 = 6.10520e−07, A8 = −9.20991e−09,
A10 = 1.55621e−10, A12 = −8.73252e−13

| | WE | ST | TE |
|---|---|---|---|
| Zoom data Zoom ratio 1.92 | | | |
| f | 7.14 | 9.90 | 13.72 |
| FNO. | 2.88 | 2.88 | 2.88 |
| 2ω | 114.69 | 98.26 | 78.13 |
| IH | 10.21 | 11.15 | 11.15 |
| FB (in air) | 15.35 | 19.87 | 25.66 |
| LTL (in air) | 109.60 | 101.21 | 97.51 |
| d10 | 11.72 | 5.03 | 1.35 |
| d13 | 9.70 | 6.81 | 3.48 |
| d22 | 6.30 | 2.98 | 0.50 |
| d34 | 15.35 | 19.87 | 25.66 |
| close distance | | | |
| d10 | 12.87 | 6.14 | 2.53 |
| d13 | 8.55 | 5.69 | 2.30 |
| d22 | 6.30 | 2.98 | 0.50 |
| d34 | 15.35 | 19.87 | 25.66 |

Unit focal length

| | | | |
|---|---|---|---|
| f1 = −12.29 | f2 = 59.63 | f3 = −88.78 | f4 = 19.83 |

Example 5

Unit mm

Surface data

| Surface no. | r | d | nd | vd |
|---|---|---|---|---|
| Object plane | ∞ | ∞ | | |
| 1 | 36.700 | 2.70 | 1.72916 | 54.68 |
| 2 | 20.150 | 4.10 | | |
| 3* | 14.942 | 3.00 | 1.80610 | 40.88 |
| 4* | 8.200 | 10.91 | | |
| 5 | −227.722 | 1.15 | 1.43700 | 95.10 |
| 6 | 15.631 | 4.26 | | |
| 7 | 19.849 | 2.50 | 1.90366 | 31.32 |
| 8 | 27.152 | Variable | | |
| 9* | 29.117 | 3.90 | 1.59201 | 67.02 |
| 10* | 210.150 | Variable | | |
| 11(Stop) | ∞ | 1.30 | | |
| 12 | −35.000 | 0.70 | 1.90366 | 31.32 |
| 13 | 737.351 | 0.70 | | |
| 14 | 72.356 | 2.58 | 1.80810 | 22.76 |
| 15 | −21.327 | 0.10 | | |
| 16 | −26.277 | 0.70 | 2.00069 | 25.46 |
| 17 | −159.667 | Variable | | |
| 18* | 16.485 | 3.07 | 1.49700 | 81.61 |
| 19* | 85.137 | 0.56 | | |
| 20 | 21.018 | 0.88 | 1.80400 | 46.58 |
| 21 | 11.640 | 7.60 | 1.43700 | 95.10 |
| 22 | −469.436 | 1.64 | | |
| 23 | 19.119 | 5.65 | 1.43700 | 95.10 |
| 24 | −23.719 | 0.16 | | |
| 25 | −91.441 | 0.85 | 1.76200 | 40.10 |
| 26 | 16.671 | 4.89 | 1.43700 | 95.10 |
| 27 | −25.734 | 1.00 | 1.69350 | 53.18 |
| 28* | −48.831 | Variable | | |
| Image plane | ∞ | | | |

Aspherical surface data

3rd surface k = −0.870
A4 = −4.22008e−05, A6 = 1.06985e−08, A8 = 1.45621e−10,
A10 = −2.92798e−13, A12 = 8.89833e−17
4th surface k = −0.993
A4 = −9.91460e−06, A6 = −1.95061e−07, A8 = 4.81517e−10,
A10 = 1.77213e−12, A12 = −1.17350e−14
9th surface k = 0.000
A4 = 7.27856e−05, A6 = 2.56753e−07, A8 = 3.06925e−09,
A10 = 2.16181e−11
10th surface k = 0.000
A4 = 8.86512e−05, A6 = 4.41810e−07, A8 = 2.62029e−09,
A10 = 7.10308e−11
18th surface k = 0.000
A4 = 1.48528e−05, A6 = 1.33867e−07, A8 = −4.05494e−09,
A10 = 8.36545e−11

-continued

Unit mm

19th surface k = 0.000
A4 = 5.16313e−05, A6 = 3.27973e−07, A8 = −8.59119e−09,
A10 = 1.30893e−10
28th surface k = 0.000
A4 = 7.70411e−05, A6 = 2.71596e−07, A8 = 1.75599e−09,
A10 = −1.87686e−11, A12 = 1.80787e−13

|  | WE | ST | TE |
|---|---|---|---|
|  | Zoom data | | |
|  | Zoom ratio 1.65 | | |
| f | 7.14 | 9.90 | 11.77 |
| FNO. | 2.88 | 2.88 | 2.88 |
| 2ω | 115.10 | 98.57 | 87.37 |
| IH | 10.20 | 11.15 | 11.15 |
| FB (in air) | 14.64 | 19.13 | 21.93 |
| LTL (in air) | 111.80 | 100.66 | 97.35 |
| d8 | 13.83 | 5.61 | 3.17 |
| d10 | 10.90 | 6.95 | 5.30 |
| d17 | 7.52 | 4.04 | 2.03 |
| d28 | 14.64 | 19.13 | 21.93 |
|  | close distance | | |
| d8 | 14.96 | 6.81 | 4.40 |
| d10 | 9.77 | 5.76 | 4.07 |
| d17 | 7.52 | 4.04 | 2.03 |
| d28 | 14.64 | 19.13 | 21.93 |

Unit focal length

| f1 = −12.89 | f2 = 56.64 | f3 = −110.20 | f4 = 22.22 |
|---|---|---|---|

Example 6

Unit mm
Surface data

| Surface no. | r | d | nd | νd |
|---|---|---|---|---|
| Object plane | ∞ | ∞ | | |
| 1 | 41.952 | 2.30 | 1.81600 | 46.62 |
| 2 | 24.010 | 4.81 | | |
| 3* | 27.936 | 2.30 | 1.74320 | 49.34 |
| 4* | 12.194 | 11.40 | | |
| 5 | −212.728 | 1.40 | 1.55332 | 71.68 |
| 6 | 23.563 | 3.56 | | |
| 7 | 44.932 | 4.60 | 2.00330 | 28.27 |
| 8 | −127.953 | 1.74 | | |
| 9 | −44.303 | 1.40 | 1.49700 | 81.61 |
| 10 | 85.783 | Variable | | |
| 11* | 49.119 | 2.40 | 1.80139 | 45.45 |
| 12* | −39.162 | 3.08 | | |
| 13 | −42.170 | 0.80 | 2.00330 | 28.27 |
| 14 | 452.639 | Variable | | |
| 15 | 24.701 | 1.80 | 1.69350 | 53.20 |
| 16 | 138.787 | 2.78 | | |
| 17(Stop) | ∞ | 1.50 | | |
| 18 | −836.911 | 2.20 | 1.59282 | 68.63 |
| 19 | −21.651 | 0.70 | | |
| 20 | −20.047 | 0.84 | 1.83481 | 42.71 |
| 21 | −42.325 | 1.59 | | |
| 22 | 37.553 | 0.81 | 1.88300 | 40.76 |
| 23 | 14.074 | 3.10 | 1.43700 | 95.10 |
| 24 | −34.252 | 0.84 | 1.80610 | 40.92 |
| 25 | −56.091 | 0.40 | | |
| 26 | 66.181 | 1.59 | 1.49700 | 81.61 |
| 27 | −47.423 | Variable | | |

-continued

Unit mm

| 28* | −11.044 | 1.19 | 1.62263 | 58.16 |
|---|---|---|---|---|
| 29* | −51.660 | 0.40 | | |
| 30* | 146.759 | 4.70 | 1.59201 | 67.02 |
| 31* | −11.998 | Variable | | |
| Image plane | ∞ | | | |

Aspherical surface data

3rd surface k = 0.000
A4 = −1.28929e−05, A6 = 9.58096e−09, A8 = −9.06906e−12,
A10 = 2.42260e−15
4th surface k = −0.649
A4 = −1.82660e−05, A6 = −7.03189e−08, A8 = 1.54826e−10,
A10 = −3.96107e−13
11th surface k = 0.000
A4 = 6.17651e−06, A6 = −2.11234e−08, A8 = −1.23434e−10
12th surface k = 0.000
A4 = 1.19868e−05, A6 = −3.46626e−08, A8 = −4.23616e−11
28th surface k = 0.000
A4 = 1.07783e−04, A6 = 8.79284e−07
29th surface k = 0.000
A4 = 8.68528e−05, A6 = 3.03940e−07, A8 = −6.27914e−10
30th surface k = 0.000
A4 = 6.98081e−06, A6 = 2.02837e−07, A8 = −9.66083e−10
31th surface k = 0.000
A4 = 8.40860e−05, A6 = 1.23009e−07, A8 = 1.07969e−09,
A10 = −3.05235e−12

|  | WE | ST | TE |
|---|---|---|---|
|  | Zoom data | | |
|  | Zoom ratio 1.92 | | |
| f | 7.14 | 9.90 | 13.72 |
| FNO. | 2.89 | 2.89 | 2.89 |
| 2ω | 117.15 | 97.61 | 76.54 |
| IH | 10.51 | 11.15 | 11.15 |
| FB (in air) | 16.58 | 17.53 | 15.57 |
| LTL (in air) | 114.99 | 106.38 | 107.12 |
| d10 | 25.31 | 11.82 | 2.20 |
| d14 | 6.46 | 5.84 | 8.38 |
| d27 | 2.43 | 6.99 | 16.75 |
| d31 | 16.58 | 17.53 | 15.57 |
|  | close distance | | |
| d10 | 26.85 | 13.55 | 4.24 |
| d14 | 4.92 | 4.11 | 6.34 |
| d27 | 2.43 | 6.99 | 16.75 |
| d31 | 16.58 | 17.53 | 15.57 |

Unit focal length

| f1 = −14.90 | f2 = 72.38 | f3 = 27.48 | f4 = 54.18 |
|---|---|---|---|

Example 7

Unit mm

Surface data

| Surface no. | r | d | nd | vd |
|---|---|---|---|---|
| Object plane | ∞ | ∞ | | |
| 1 | 39.821 | 1.75 | 1.81600 | 46.62 |
| 2 | 23.000 | 11.06 | | |
| 3* | 24.731 | 2.00 | 1.49700 | 81.54 |
| 4* | 8.505 | 8.88 | | |
| 5 | 65.085 | 1.40 | 1.49700 | 81.54 |
| 6* | 22.582 | 7.72 | | |
| 7 | −43.136 | 1.15 | 1.91082 | 35.25 |
| 8 | 66.088 | 2.39 | | |
| 9 | 57.694 | 3.04 | 2.00069 | 25.46 |
| 10 | −107.399 | Variable | | |
| 11 | 25.107 | 0.50 | 1.92286 | 18.90 |
| 12 | 11.990 | 3.53 | 1.78472 | 25.68 |
| 13 | −194.983 | Variable | | |
| 14(Stop) | ∞ | 0.75 | | |
| 15 | 29.226 | 1.85 | 1.43875 | 94.93 |
| 16 | −43.198 | Variable | | |
| 17 | 229.273 | 4.10 | 1.49700 | 81.54 |
| 18 | −14.418 | 0.38 | | |
| 19 | −13.567 | 0.50 | 1.81600 | 46.62 |
| 20 | 29.367 | Variable | | |
| 21 | 35.890 | 1.16 | 1.88300 | 40.76 |
| 22 | 33.343 | 0.10 | | |
| 23 | 13.255 | 0.65 | 1.74000 | 28.30 |
| 24 | 9.293 | 3.49 | 1.43875 | 94.93 |
| 25 | 342.739 | 1.26 | | |
| 26 | 21.049 | 3.27 | 1.75520 | 27.51 |
| 27 | −20.772 | Variable | | |
| 28 | −27.320 | 0.50 | 1.85026 | 32.27 |
| 29 | 10.500 | 4.00 | 1.55332 | 71.68 |
| 30* | −29.453 | Variable | | |
| Image plane | ∞ | | | |

Aspherical surface data

3rd surface k = 0.000
A4 = 8.40972e−06, A6 = −1.96312e−07, A8 = 6.33572e−10,
A10 = −6.59131e−13

4th surface k = −0.781
A4 = 2.71176e−06, A6 = 1.07377e−07, A8 = −1.03654e−08,
A10 = 4.69259e−11, A12 = −6.74201e−14

6th surface k = −19.553
A4 = 2.45719e−04, A6 = −2.71891e−06, A8 = 4.36132e−08,
A10 = −3.26819e−10, A12 = 1.23213e−12

30th surface k = 7.364
A4 = 1.38265e−04, A6 = 8.12349e−08, A8 = 1.19526e−08,
A10 = −6.26300e−11

| | WE | ST | TE |
|---|---|---|---|
| Zoom data | | | |
| Zoom ratio 1.92 | | | |
| f | 6.12 | 8.85 | 11.76 |
| FNO. | 2.88 | 2.88 | 2.88 |
| 2ω | 122.21 | 103.51 | 85.45 |
| IH | 10.15 | 11.15 | 11.15 |
| FB (in air) | 14.39 | 19.24 | 23.78 |
| LTL (in air) | 112.45 | 100.95 | 97.08 |
| d10 | 21.86 | 7.90 | 1.00 |
| d13 | 4.80 | 4.68 | 2.50 |
| d16 | 1.50 | 1.73 | 3.00 |
| d20 | 4.25 | 1.50 | 0.90 |
| d27 | 0.23 | 0.47 | 0.46 |
| d30 | 14.39 | 19.24 | 23.78 |
| close distance | | | |
| d10 | 23.03 | 8.62 | 1.68 |
| d13 | 3.63 | 3.96 | 1.82 |
| d16 | 1.50 | 1.73 | 3.00 |
| d20 | 4.25 | 1.50 | 0.90 |
| d27 | 0.23 | 0.47 | 0.46 |
| d30 | 14.39 | 19.24 | 23.78 |

Unit focal length

| f1 = −11.41 | f2 = 34.33 | f3 = 40.04 | f4 = −20.03 |
|---|---|---|---|
| f5 = 12.29 | f6 = −26.45 | | |

Example 8

Unit mm

Surface data

| Surface no. | r | d | nd | vd |
|---|---|---|---|---|
| Object plane | ∞ | ∞ | | |
| 1 | 38.750 | 2.70 | 1.72916 | 54.68 |
| 2 | 20.150 | 4.10 | | |
| 3* | 17.017 | 3.00 | 1.80610 | 40.88 |
| 4* | 8.773 | 11.01 | | |
| 5 | −88.459 | 1.15 | 1.43700 | 95.10 |
| 6 | 17.864 | 3.68 | | |
| 7 | 25.150 | 2.50 | 1.90366 | 31.32 |
| 8 | 44.634 | Variable | | |
| 9* | 33.761 | 3.79 | 1.59201 | 67.02 |
| 10* | −326.845 | Variable | | |
| 11(Stop) | ∞ | Variable | | |
| 12 | −35.000 | 0.70 | 2.00069 | 25.46 |
| 13 | 963.652 | 0.65 | | |
| 14 | 65.292 | 2.46 | 1.84666 | 23.78 |
| 15 | −25.858 | Variable | | |
| 16 | −34.852 | 0.70 | 1.91082 | 35.25 |
| 17 | 765.081 | Variable | | |
| 18* | 15.416 | 3.35 | 1.49700 | 81.61 |
| 19* | −769.308 | 0.15 | | |
| 20 | 23.354 | 1.83 | 1.80400 | 46.58 |
| 21 | 10.306 | 4.31 | 1.43700 | 95.10 |
| 22 | 39.932 | 0.53 | | |
| 23 | 16.986 | 6.10 | 1.43700 | 95.10 |
| 24 | −18.122 | 0.15 | | |
| 25 | −91.369 | 0.85 | 1.76200 | 40.10 |
| 26 | 22.184 | 3.97 | 1.43700 | 95.10 |
| 27 | −24.379 | 2.41 | 1.69350 | 53.18 |
| 28* | −73.437 | Variable | | |
| Image plane | ∞ | | | |

Aspherical surface data

3rd surface k = −0.772
A4 = −3.92747e−05, A6 = 1.50395e−08, A8 = 1.18115e−10,
A10 = −1.96180e−13, A12 = −2.59650e−17

4th surface k = −0.994
A4 = −1.02952e−05, A6 = −1.74449e−07, A8 = 2.73995e−10,
A10 = 4.31904e−12, A12 = −1.74697e−14

9th surface k = 0.000
A4 = 6.46420e−05, A6 = 1.96489e−07, A8 = 2.99230e−09,
A10 = 2.07686e−11

-continued

| Unit mm |
|---|
| 10th surface | k = 0.000
A4 = 7.93076e−05, A6 = 1.81734e−07, A8 = 5.20927e−09,
A10 = 3.46579e−11
18th surface k = 0.000
A4 = −4.14573e−07, A6 = 2.65414e−07, A8 = −4.10155e−09,
A10 = 5.55192e−11
19th surface k = 0.000
A4 = 4.66839e−05, A6 = 4.51038e−07, A8 = −6.38088e−09,
A10 = 7.65812e−11
28th surface k = 0.000
A4 = 8.52243e−05, A6 = 4.42744e−07, A8 = −2.52365e−09,
A10 = 4.41834e−11, A12 = −1.38054e−13

|  | WE | ST | TE |
|---|---|---|---|
| Zoom data Zoom ratio 1.92 | | | |
| f | 7.14 | 9.90 | 13.72 |
| FNO. | 2.84 | 2.81 | 2.88 |
| 2ω | 112.03 | 98.51 | 77.81 |
| IH | 9.70 | 11.15 | 11.15 |
| FB (in air) | 14.64 | 19.15 | 24.73 |
| LTL (in air) | 111.73 | 101.03 | 96.52 |
| d8 | 16.46 | 6.79 | 1.60 |
| d10 | 7.05 | 6.03 | 6.70 |
| d11 | 5.15 | 4.20 | 1.30 |
| d15 | 0.50 | 0.76 | 1.60 |
| d17 | 7.84 | 3.96 | 0.50 |
| d28 | 14.64 | 19.15 | 24.73 |
| close distance | | | |
| d8 | 17.62 | 7.98 | 2.88 |
| d10 | 5.89 | 4.84 | 5.43 |
| d11 | 5.15 | 4.20 | 1.30 |
| d15 | 0.50 | 0.76 | 1.60 |
| d17 | 7.84 | 3.96 | 0.50 |
| d28 | 14.64 | 19.15 | 24.73 |

| Unit focal length |
|---|
| f1 = −13.37  f2 = 51.89  f3 = 55.20  f4 = −36.58 |
| f5 = 22.17 |

Example 9

| Unit mm |
|---|
| Surface data |

| Surface no. | r | d | nd | νd |
|---|---|---|---|---|
| Object plane | ∞ | ∞ | | |
| 1 | 41.952 | 2.30 | 1.81600 | 46.62 |
| 2 | 24.010 | 4.81 | | |
| 3* | 27.936 | 2.30 | 1.74320 | 49.34 |
| 4* | 12.194 | 11.40 | | |
| 5 | −212.728 | 1.40 | 1.55332 | 71.68 |
| 6 | 23.563 | 3.56 | | |
| 7 | 44.932 | 4.60 | 2.00330 | 28.27 |
| 8 | −127.953 | 1.74 | | |
| 9 | −44.303 | 1.40 | 1.49700 | 81.61 |
| 10 | 85.783 | Variable | | |
| 11* | 49.119 | 2.40 | 1.80139 | 45.45 |
| 12* | −39.162 | 3.08 | | |

-continued

| Unit mm |
|---|

| 13 | −42.170 | 0.80 | 2.00330 | 28.27 |
|---|---|---|---|---|
| 14 | 452.639 | 6.50 | | |
| 15 | 24.701 | 1.80 | 1.69350 | 53.20 |
| 16 | 138.787 | 2.78 | | |
| 17(Stop) | ∞ | 1.50 | | |
| 18 | −836.911 | 2.20 | 1.59282 | 68.63 |
| 19 | −21.651 | 0.70 | | |
| 20 | −20.047 | 0.84 | 1.83481 | 42.71 |
| 21 | −42.325 | 1.59 | | |
| 22 | 37.553 | 0.81 | 1.88300 | 40.76 |
| 23 | 14.074 | 3.10 | 1.43700 | 95.10 |
| 24 | −34.252 | 0.84 | 1.80610 | 40.92 |
| 25 | −56.091 | 0.40 | | |
| 26 | 66.181 | 1.59 | 1.49700 | 81.61 |
| 27 | −47.423 | Variable | | |
| 28* | −11.044 | 1.19 | 1.62263 | 58.16 |
| 29* | −51.660 | 0.40 | | |
| 30* | 146.759 | 4.70 | 1.59201 | 67.02 |
| 31* | −11.998 | Variable | | |
| Image plane | ∞ | | | |

| Aspherical surface data |
|---|
| 3rd surface | k = 0.000
A4 = −1.28929e−05, A6 = 9.58096e−09, A8 = −9.06906e−12,
A10 = 2.42260e−15
4th surface k = −0.649
A4 = −1.82660e−05, A6 = −7.03189e−08, A8 = 1.54826e−10,
A10 = −3.96107e−13
11th surface k = 0.000
A4 = 6.17651e−06, A6 = −2.11234e−08, A8 = −1.23434e−10
12th surface k = 0.000
A4 = 1.19868e−05, A6 = −3.46626e−08, A8 = −4.23616e−11
28th surface k = 0.000
A4 = 1.07783e−04, A6 = 8.79284e−07
29th surface k = 0.000
A4 = 8.68528e−05, A6 = 3.03940e−07, A8 = −6.27914e−10
30th surface k = 0.000
A4 = 6.98081e−06, A6 = 2.02837e−07, A8 = −9.66083e−10
31th surface k = 0.000
A4 = 8.40860e−05, A6 = 1.23009e−07, A8 = 1.07969e−09,
A10 = −3.05235e−12

|  | WE | ST | TE |
|---|---|---|---|
| Zoom data Zoom ratio 1.95 | | | |
| f | 7.14 | 9.82 | 13.95 |
| FNO. | 2.88 | 2.89 | 2.85 |
| 2ω | 117.16 | 98.09 | 75.32 |
| IH | 10.51 | 11.15 | 11.15 |
| FB (in air) | 16.58 | 17.47 | 17.31 |
| LTL (in air) | 115.03 | 106.98 | 105.52 |
| d10 | 25.31 | 11.82 | 2.00 |
| d14 | 6.50 | 6.50 | 6.50 |
| d27 | 2.43 | 6.99 | 15.50 |
| d31 | 16.58 | 17.47 | 17.31 |

89
-continued

Unit mm close distance

| | | | |
|---|---|---|---|
| d10 | 26.85 | 13.55 | 4.13 |
| d14 | 4.96 | 4.77 | 4.37 |
| d27 | 2.43 | 6.99 | 15.50 |
| d31 | 16.58 | 17.47 | 17.31 |

Unit focal length

| | | |
|---|---|---|
| f1 = −14.90 | f2 = 25.89 | f3 = 54.18 |

Example 10

Unit mm

Surface data

| Surface no. | r | d | nd | vd |
|---|---|---|---|---|
| Object plane | ∞ | ∞ | | |
| 1 | 33.425 | 3.00 | 1.72916 | 54.68 |
| 2 | 26.306 | 7.50 | | |
| 3* | 17.448 | 2.85 | 1.49700 | 81.61 |
| 4* | 7.561 | 13.70 | | |
| 5* | 21.729 | 1.50 | 1.49700 | 81.61 |
| 6* | 12.893 | 5.57 | | |
| 7 | −51.538 | 1.15 | 1.80400 | 46.57 |
| 8 | 20.865 | 1.70 | | |
| 9 | 27.197 | 3.69 | 1.90366 | 31.32 |
| 10 | −733.544 | Variable | | |
| 11 | 253.308 | 2.07 | 1.61772 | 49.81 |
| 12* | −42.589 | 1.00 | | |
| 13 | 44.082 | 0.78 | 1.75520 | 27.51 |
| 14 | 12.857 | 4.04 | 1.63980 | 34.46 |
| 15 | 378.385 | Variable | | |
| 16(Stop) | ∞ | 1.10 | | |
| 17 | −58.439 | 1.82 | 1.49700 | 81.54 |
| 18 | −16.206 | 1.44 | | |
| 19 | −21.309 | 0.70 | 1.91082 | 35.25 |
| 20 | 78.965 | 0.01 | | |
| 21 | 31.783 | 2.99 | 1.84666 | 23.78 |
| 22 | −19.176 | 0.12 | | |
| 23 | −17.598 | 0.70 | 1.90366 | 31.32 |
| 24 | 195.353 | Variable | | |
| 25* | 16.026 | 2.90 | 1.49700 | 81.54 |
| 26* | −139.738 | 0.10 | | |
| 27 | 71.053 | 0.72 | 1.83481 | 42.71 |
| 28 | 15.246 | 4.42 | 1.49700 | 81.61 |
| 29 | −36.260 | 0.10 | | |
| 30 | 36.717 | 5.50 | 1.43875 | 94.93 |
| 31 | −13.883 | 0.10 | | |
| 32 | −28.774 | 0.71 | 1.51823 | 58.90 |
| 33 | 13.805 | 5.16 | 1.49700 | 81.54 |
| 34 | −31.841 | 0.30 | | |
| 35 | −39.432 | 1.01 | 1.69350 | 53.18 |
| 36* | 111.173 | Variable | | |
| Image plane | ∞ | | | |

Aspherical surface data

3rd surface k = −0.955
A4 = −3.79095e−05, A6 = −3.24438e−08, A8 = 2.92944e−10,
A10 = −4.82184e−13, A12 = 3.02433e−16
4th surface k = −0.894
A4 = 3.55903e−05, A6 = −1.76440e−07, A8 = −2.11083e−09,
A10 = 2.68243e−12, A12 = 7.63340e−15

90
-continued

Unit mm

5th surface k = −1.557
A4 = −1.79704e−04, A6 = 2.92287e−07, A8 = 2.35566e−09,
A10 = −1.03630e−11, A12 = 1.25767e−14
6th surface k = −6.619
A4 = 8.04992e−05, A6 = −3.19281e−06, A8 = 4.40368e−08,
A10 = −2.60172e−10, A12 = 6.62983e−13
12th surface k = 0.000
A4 = 8.26189e−07, A6 = 2.20076e−08, A8 = 1.74523e−11,
A10 = 2.88681e−13
25th surface k = 0.000
A4 = −3.70907e−05, A6 = 7.55536e−07, A8 = 1.28139e−09,
A10 = 9.42729e−11
26th surface k = 0.000
A4 = 6.11474e−05, A6 = 1.03197e−06, A8 = 3.75171e−09,
A10 = 1.52568e−10
36th surface k = 0.000
A4 = 8.86652e−05, A6 = 3.19556e−07, A8 = −2.15373e−09,
A10 = 7.25268e−11, A12 = −4.18521e−13

| | WE | ST | TE |
|---|---|---|---|
| | Zoom data | | |
| | Zoom ratio 1.92 | | |
| f | 6.11 | 8.73 | 11.73 |
| FNO. | 2.88 | 2.88 | 2.88 |
| 2ω | 122.55 | 105.50 | 86.83 |
| IH | 10.19 | 11.15 | 11.15 |
| FB (in air) | 14.60 | 19.60 | 24.84 |
| LTL (in air) | 120.73 | 110.91 | 107.57 |
| d10 | 15.55 | 5.73 | 1.00 |
| d12 | 1.00 | 1.00 | 1.00 |
| d15 | 5.76 | 4.35 | 2.79 |
| d24 | 6.37 | 2.80 | 0.50 |
| d36 | 14.60 | 19.60 | 24.84 |
| | close distance | | |
| d10 | 16.20 | 6.44 | 1.77 |
| d12 | 0.35 | 0.29 | 0.23 |
| d15 | 5.76 | 4.35 | 2.79 |
| d24 | 6.37 | 2.80 | 0.50 |
| d36 | 14.60 | 19.60 | 24.84 |

Unit focal length

| | | | |
|---|---|---|---|
| f1 = −11.20 | f2 = 42.56 | f3 = −62.81 | f4 = 19.30 |

Example 11

Unit mm

Surface data

| Surface no. | r | d | nd | vd |
|---|---|---|---|---|
| Object plane | ∞ | ∞ | | |
| 1 | 48.633 | 2.00 | 1.81600 | 46.62 |
| 2 | 28.815 | 7.10 | | |
| 3* | 31.077 | 2.00 | 1.69350 | 53.21 |
| 4* | 12.118 | 11.40 | | |
| 5 | 714.895 | 1.20 | 1.43875 | 94.93 |

-continued

Unit mm

| | | | | |
|---|---|---|---|---|
| 6 | 19.746 | 5.00 | | |
| 7 | 43.962 | 3.50 | 2.00100 | 29.13 |
| 8 | 430.433 | 2.60 | | |
| 9 | 130.145 | 1.20 | 1.43875 | 94.93 |
| 10 | 24.661 | Variable | | |
| 11 | 36.864 | 2.30 | 1.80400 | 46.57 |
| 12 | −107.817 | 5.29 | | |
| 13 | −37.881 | 0.92 | 2.00100 | 29.13 |
| 14 | −77.920 | Variable | | |
| 15 | 19.671 | 1.70 | 1.59201 | 67.02 |
| 16 | 56.788 | 1.50 | | |
| 17(Stop) | ∞ | 1.50 | | |
| 18 | 42.101 | 2.30 | 1.49700 | 81.54 |
| 19 | −21.523 | 0.70 | | |
| 20 | −21.051 | 0.80 | 1.77250 | 49.60 |
| 21 | −62.350 | 1.50 | | |
| 22 | 101.707 | 0.80 | 1.88300 | 40.76 |
| 23 | 15.742 | 2.86 | 1.43875 | 94.93 |
| 24 | −33.587 | 0.70 | | |
| 25 | 23.075 | 1.78 | 1.43875 | 94.93 |
| 26 | 569.324 | Variable | | |
| 27 | −16.290 | 0.80 | 1.64000 | 60.08 |
| 28 | −186.188 | 1.37 | | |
| 29 | 55.335 | 3.50 | 1.59201 | 67.02 |
| 30* | −21.314 | Variable | | |
| Image plane | ∞ | | | |

Aspherical surface data

3rd surface k = 0.000
A4 = −2.11237e−05, A6 = 1.55779e−08, A8 = −1.38951e−11
4th surface k = −0.811
A4 = −2.87459e−05, A6 = −4.47774e−08
30th surface k = 0.000
A4 = 6.40511e−05, A6 = −2.20568e−07, A8 = 2.90093e−09,
A10 = −1.37751e−11

| | WE | ST | TE |
|---|---|---|---|
| Zoom data Zoom ratio 1.92 | | | |
| f | 7.14 | 9.90 | 13.72 |
| FNO. | 2.89 | 4.00 | 4.00 |
| 2ω | 113.90 | 97.22 | 75.72 |
| IH | 9.84 | 10.70 | 10.70 |
| FB (in air) | 15.05 | 17.04 | 17.47 |
| LTL (in air) | 111.99 | 104.18 | 101.80 |
| d10 | 25.21 | 11.86 | 2.51 |
| d12 | 5.29 | 5.29 | 5.29 |
| d14 | 3.91 | 4.49 | 4.77 |
| d26 | 1.49 | 4.45 | 10.72 |
| d30 | 15.05 | 17.04 | 17.47 |
| close distance | | | |
| d10 | 27.18 | 13.04 | 3.60 |
| d12 | 3.33 | 4.12 | 4.20 |
| d14 | 3.91 | 4.49 | 4.77 |
| d26 | 1.49 | 4.45 | 10.72 |
| d30 | 15.05 | 17.04 | 17.47 |

Unit focal length

| | | | |
|---|---|---|---|
| f1 = −13.69 | f2 = 55.85 | f3 = 26.20 | f4 = 146.89 |

Example 12

Unit mm

Surface data

| Surface no. | r | d | nd | vd |
|---|---|---|---|---|
| Object plane | ∞ | ∞ | | |
| 1 | 40.857 | 2.70 | 1.88300 | 40.80 |
| 2 | 24.161 | 4.85 | | |
| 3 | 29.020 | 2.50 | 1.88300 | 40.80 |
| 4 | 19.322 | 2.97 | | |
| 5* | 22.072 | 2.50 | 1.80610 | 40.88 |
| 6* | 12.388 | 12.51 | | |
| 7 | −50.251 | 1.70 | 1.43700 | 95.10 |
| 8 | 33.573 | 0.42 | | |
| 9 | 30.981 | 4.00 | 1.90366 | 31.32 |
| 10 | 90.155 | Variable | | |
| 11* | 16.598 | 4.00 | 1.80610 | 40.88 |
| 12* | 22.336 | Variable | | |
| 13(Stop) | ∞ | 1.25 | | |
| 14 | 41.481 | 0.70 | 1.51633 | 64.14 |
| 15 | 31.481 | 2.58 | 1.49700 | 81.61 |
| 16 | −27.003 | 2.61 | | |
| 17 | −14.574 | 0.80 | 1.53996 | 59.46 |
| 18 | 12.504 | 3.11 | 1.49700 | 81.61 |
| 19 | 1684.817 | 0.15 | | |
| 20* | 26.235 | 3.41 | 1.49700 | 81.61 |
| 21* | −23.920 | 0.15 | | |
| 22 | −171.223 | 3.00 | 1.43700 | 95.10 |
| 23 | −17.233 | Variable | | |
| 24 | 33.531 | 2.09 | 1.56883 | 56.36 |
| 25 | −172.910 | 0.80 | 1.90366 | 31.32 |
| 26 | 16.111 | Variable | | |
| 27* | 21.000 | 4.00 | 1.51633 | 64.06 |
| 28* | −119.058 | 14.59 | | |
| Image plane | ∞ | | | |

Aspherical surface data

5th surface k = 0.000
A4 = 5.07542e−05, A6 = −3.26124e−07, A8 = 7.23527e−10,
A10 = −5.64831e−13
6th surface k = −0.545
A4 = 5.47849e−05, A6 = −3.95024e−07, A8 = −1.11242e−09,
A10 = 1.04300e−11, A12 = −2.12350e−14
11th surface k = 0.000
A4 = 2.79972e−05, A6 = 1.18399e−07, A8 = 2.94567e−09,
A10 = −8.36669e−12
12th surface k = 0.000
A4 = 6.23392e−05, A6 = 3.91477e−07, A8 = 4.86816e−09,
A10 = −1.84851e−11
20th surface k = 0.000
A4 = −3.06299e−05, A6 = 2.92993e−07, A8 = −2.53560e−09,
A10 = 3.68190e−11
21th surface k = 0.000
A4 = 4.70106e−05, A6 = 1.86947e−07, A8 = −1.29414e−09,
A10 = 3.34999e−11
27th surface k = 0.000
A4 = 5.08450e−06, A6 = −9.63084e−08, A8 = 4.37614e−10

-continued

| Unit mm | | | |
|---|---|---|---|
| 28th surface | | | | k = 0.000
A4 = 2.32475e−05, A6 = −2.19104e−07, A8 = 1.79764e−09,
A10 = −1.41583e−11, A12 = 5.51140e−14

| | WE | ST | TE |
|---|---|---|---|
| Zoom data | | | |
| Zoom ratio 1.91 | | | |
| f | 7.20 | 9.91 | 13.73 |
| FNO. | 2.88 | 2.88 | 2.88 |
| 2ω | 116.82 | 99.54 | 82.26 |
| IH | 10.19 | 10.62 | 11.15 |
| FB (in air) | 14.59 | 14.59 | 14.59 |
| LTL (in air) | 116.21 | 105.48 | 100.62 |
| d10 | 28.04 | 13.85 | 2.18 |
| d12 | 7.98 | 6.63 | 7.50 |
| d23 | 1.00 | 3.16 | 6.48 |
| d26 | 1.81 | 4.43 | 7.06 |
| close distance | | | |
| d10 | 29.61 | 15.46 | 4.07 |
| d12 | 6.41 | 5.02 | 5.61 |
| d23 | 1.00 | 3.16 | 6.48 |
| d26 | 1.81 | 4.43 | 7.06 |

| Unit focal length | | | |
|---|---|---|---|
| f1 = −15.86 | f2 = 61.13 | f3 = 20.96 | f4 = −25.38 |
| f5 = 34.91 | | | |

Example 13

| Unit mm | | | | |
|---|---|---|---|---|
| Surface data | | | | |
| Surface no. | r | d | nd | vd |
| Object plane | ∞ | ∞ | | |
| 1 | 40.000 | 2.50 | 1.88300 | 40.80 |
| 2 | 22.530 | 4.89 | | |
| 3 | 27.243 | 2.50 | 1.88300 | 40.80 |
| 4 | 18.157 | 2.79 | | |
| 5* | 20.564 | 2.50 | 1.80610 | 40.88 |
| 6* | 11.636 | 11.44 | | |
| 7 | −73.513 | 1.75 | 1.49700 | 81.54 |
| 8 | 24.987 | 4.20 | 1.90366 | 31.32 |
| 9 | 98.362 | Variable | | |
| 10* | 16.348 | 3.72 | 1.80610 | 40.88 |
| 11* | 21.877 | Variable | | |
| 12(Stop) | ∞ | 1.25 | | |
| 13 | 37.981 | 0.95 | 1.72000 | 46.02 |
| 14 | 26.359 | 3.22 | 1.49700 | 81.54 |
| 15 | −15.490 | 1.44 | | |
| 16 | −10.950 | 0.80 | 1.51633 | 64.14 |
| 17 | 12.238 | 2.98 | 1.49700 | 81.54 |
| 18 | 170.879 | 0.15 | | |
| 19 | 20.681 | 4.25 | 1.43700 | 95.10 |
| 20 | −17.740 | 0.15 | | |
| 21* | 112.166 | 2.85 | 1.49700 | 81.61 |
| 22* | −18.752 | Variable | | |
| 23 | −137.026 | 0.80 | 1.90366 | 31.32 |
| 24 | 19.525 | Variable | | |
| 25* | 39.261 | 4.13 | 1.51633 | 64.06 |
| 26* | −34.524 | Variable | | |
| Image plane | ∞ | | | |

-continued

| Unit mm |
|---|
| Aspherical surface data |
| 5th surface | k = 0.000
A4 = 6.57195e−05, A6 = −5.09445e−07, A8 = 1.47888e−09,
A10 = −1.69855e−12
6th surface k = −0.500
A4 = 7.32025e−05, A6 = −7.37876e−07, A8 = −3.81674e−10,
A10 = 1.47076e−11, A12 = −4.50516e−14
10th surface k = 0.000
A4 = 4.79125e−05, A6 = 4.73335e−08, A8 = 7.67036e−09,
A10 = −5.60898e−11
11th surface k = 5.585
A4 = 2.36048e−05, A6 = −3.84290e−07, A8 = 1.77462e−08,
A10 = −3.54139e−10
21th surface k = 0.000
A4 = −8.24382e−05, A6 = −6.06057e−07, A8 = 4.46043e−09,
A10 = 3.33433e−11
22th surface k = 0.000
A4 = 1.56244e−05, A6 = −5.11423e−07, A8 = 7.02354e−09,
A10 = 2.24911e−11
25th surface k = 0.000
A4 = 4.75833e−06, A6 = −2.33909e−07, A8 = 8.62893e−10
26th surface k = 0.000
A4 = 2.88478e−05, A6 = −2.44406e−07, A8 = 7.64290e−10,
A10 = −5.65104e−12, A12 = 3.44034e−14

| | WE | ST | TE |
|---|---|---|---|
| Zoom data | | | |
| Zoom ratio 2.04 | | | |
| f | 6.95 | 9.88 | 14.14 |
| FNO. | 2.88 | 2.88 | 2.88 |
| 2ω | 116.14 | 99.21 | 75.99 |
| IH | 10.12 | 11.15 | 11.15 |
| FB (in air) | 15.52 | 15.84 | 16.64 |
| LTL (in air) | 113.21 | 101.40 | 96.63 |
| d9 | 29.00 | 12.75 | 1.00 |
| d11 | 6.80 | 6.40 | 6.46 |
| d22 | 1.00 | 2.37 | 4.04 |
| d24 | 1.64 | 4.78 | 9.23 |
| d26 | 15.52 | 15.84 | 16.64 |
| close distance | | | |
| d9 | 30.36 | 14.20 | 2.75 |
| d11 | 5.44 | 4.95 | 4.71 |
| d22 | 1.00 | 2.37 | 4.04 |
| d24 | 1.64 | 4.78 | 9.23 |
| d26 | 15.52 | 15.84 | 16.64 |

| Unit focal length | | | |
|---|---|---|---|
| f1 = −15.66 | f2 = 61.14 | f3 = 16.51 | f4 = −18.87 |
| f5 = 36.27 | | | |

Example 14

Unit mm

Surface data

| Surface no. | r | d | nd | νd |
|---|---|---|---|---|
| Object plane | ∞ | ∞ | | |
| 1 | 37.362 | 2.700 | 1.72916 | 54.68 |
| 2 | 23.000 | 5.579 | | |
| 3* | 18.657 | 3.000 | 1.69350 | 53.18 |
| 4* | 8.746 | 7.312 | | |
| 5 | 25.098 | 1.500 | 1.83481 | 42.73 |
| 6 | 13.500 | 8.125 | | |
| 7 | −32.995 | 1.150 | 1.43700 | 95.10 |
| 8 | 38.632 | 0.150 | | |
| 9 | 28.275 | 4.956 | 1.88300 | 40.76 |
| 10 | −193.097 | Variable | | |
| 11 | 31.624 | 0.700 | 1.91082 | 35.25 |
| 12 | 12.969 | 3.594 | 1.64769 | 33.79 |
| 13 | −133.506 | Variable | | |
| 14(Stop) | ∞ | Variable | | |
| 15 | 101.290 | 2.592 | 1.60300 | 65.44 |
| 16 | −23.885 | 0.150 | | |
| 17 | −48.621 | 0.700 | 1.90366 | 31.32 |
| 18 | 37.619 | 0.100 | | |
| 19 | 30.861 | 2.000 | 1.80810 | 22.76 |
| 20 | −579.945 | 0.484 | | |
| 21 | −68.856 | 0.764 | 1.91082 | 35.25 |
| 22 | 43.330 | Variable | | |
| 23* | 15.720 | 2.968 | 1.55332 | 71.68 |
| 24* | 120.947 | 0.711 | | |
| 25 | 18.070 | 1.000 | 1.78800 | 47.37 |
| 26 | 10.300 | 4.564 | 1.49700 | 81.61 |
| 27 | 60.640 | 0.257 | | |
| 28 | 23.341 | 4.348 | 1.43700 | 95.10 |
| 29 | −16.478 | 0.481 | | |
| 30 | −43.048 | 1.245 | 1.69350 | 53.21 |
| 31 | 17.204 | 4.243 | 1.43700 | 95.10 |
| 32 | −17.826 | 0.000 | | |
| 33 | −17.826 | 1.000 | 1.58313 | 59.38 |
| 34* | −61.648 | Variable | | |
| Image plane | ∞ | | | |

Aspherical surface data

3rd surface k = −0.7542
A4 = −3.0409e−005, A6 = 1.3575e−007, A8 = −5.0553e−010,
A10 = 1.0318e−012, A12 = −9.4843e−016

4th surface k = −0.8734
A4 = −1.4228e−005, A6 = 2.2343e−007, A8 = −1.4788e−009,
A10 = 5.7129e−012, A12 = −2.2319e−014

23th surface k = 0.0000
A4 = 2.7188e−006, A6 = 1.9412e−007, A8 = 1.2265e−009,
A10 = 3.5889e−011, A12 = −4.4041e−014

24th surface k = 0.0000
A4 = 5.5623e−005, A6 = 3.5115e−007, A8 = 2.6658e−009,
A10 = 4.0641e−011

34th surface k = 0.0000
A4 = 1.1607e−004, A6 = 5.7905e−007, A8 = −3.1882e−009,
A10 = 9.8985e−011, A12 = −7.9302e−013

Unit mm

Zoom data
Zoom ratio 1.92

| | WE | ST | TE |
|---|---|---|---|
| f | 7.140 | 9.900 | 13.724 |
| FNO. | 2.880 | 2.880 | 2.880 |
| 2ω | 14.7 | 96.7 | 76.9 |
| IH | 10.25 | 11.11 | 11.15 |
| FB (in air) | 16.070 | 20.102 | 25.549 |
| LTL (in air) | 114.08384 | 103.11103 | 98.05480 |
| $f_{LU1}$ | 4015.6665 | 18718.7978 | −4014.1441 |
| d10 | 21.767 | 8.443 | 1.000 |
| d13 | 1.889 | 2.464 | 1.500 |
| d14 | 4.271 | 2.821 | 2.433 |
| d22 | 3.713 | 2.907 | 1.200 |
| d34 | 16.070 | 20.102 | 25.549 | close distance

| | | | |
|---|---|---|---|
| dOB | 135.91616 | 146.88897 | 151.94520 |
| d10 | 21.767 | 8.443 | 1.00000 |
| d13 | 1.889 | 2.464 | 1.500 |
| d14 | 3.210 | 1.749 | 1.299 |
| d22 | 4.774 | 3.980 | 2.334 |

Unit focal length f1 = −16.01256  f2 = 74.43324  f3 = −60.06540  f4 = 18.93592
$f_{Rw}$ = 23.7823

Example 15

Unit mm

Surface data

| Surface no. | r | d | nd | νd |
|---|---|---|---|---|
| Object plane | ∞ | ∞ | | |
| 1 | 37.362 | 2.700 | 1.72916 | 54.68 |
| 2 | 23.000 | 5.579 | | |
| 3* | 18.657 | 3.000 | 1.69350 | 53.18 |
| 4* | 8.746 | 7.312 | | |
| 5 | 25.098 | 1.500 | 1.83481 | 42.73 |
| 6 | 13.500 | 8.125 | | |
| 7 | −32.995 | 1.150 | 1.43700 | 95.10 |
| 8 | 38.632 | 0.150 | | |
| 9 | 28.275 | 4.956 | 1.88300 | 40.76 |
| 10 | −193.097 | Variable | | |
| 11 | 31.624 | 0.700 | 1.91082 | 35.25 |
| 12 | 12.969 | 3.594 | 1.64769 | 33.79 |
| 13 | −133.506 | 1.500 | | |
| 14(Stop) | ∞ | Variable | | |
| 15 | 101.290 | 2.592 | 1.60300 | 65.44 |
| 16 | −23.885 | 0.150 | | |
| 17 | −48.621 | 0.700 | 1.90366 | 31.32 |
| 18 | 37.619 | 0.100 | | |
| 19 | 30.861 | 2.000 | 1.80810 | 22.76 |
| 20 | −579.945 | 0.484 | | |
| 21 | −68.856 | 0.764 | 1.91082 | 35.25 |
| 22 | 43.330 | Variable | | |
| 23* | 15.720 | 2.968 | 1.55332 | 71.68 |
| 24* | 120.947 | 0.711 | | |
| 25 | 18.070 | 1.000 | 1.78800 | 47.37 |
| 26 | 10.300 | 4.564 | 1.49700 | 81.61 |
| 27 | 60.640 | 0.257 | | |
| 28 | 23.341 | 4.348 | 1.43700 | 95.10 |
| 29 | −16.478 | 0.481 | | |
| 30 | −43.048 | 1.245 | 1.69350 | 53.21 |
| 31 | 17.204 | 4.243 | 1.43700 | 95.10 |
| 32 | −17.826 | 0.000 | | |
| 33 | −17.826 | 1.000 | 1.58313 | 59.38 |
| 34* | −61.648 | Variable | | |
| Image plane | ∞ | | | |

-continued

Unit mm

Aspherical surface data

3rd surface k = −0.7542
A4 = −3.0409e−005, A6 = 1.3575e−007, A8 = −5.0553e−010,
A10 = 1.0318e−012, A12 = −9.4843e−016
4th surface k = −0.8734
A4 = −1.4228e−005, A6 = 2.2343e−007, A8 = −1.4788e−009,
A10 = 5.7129e−012, A12 = −2.2319e−014
23th surface k = 0.0000
A4 = 2.7188e−006, A6 = 1.9412e−007, A8 = 1.2265e−009,
A10 = 3.5889e−011, A12 = −4.4041e−014
24th surface k = 0.0000
A4 = 5.5623e−005, A6 = 3.5115e−007, A8 = 2.6658e−009,
A10 = 4.0641e−011
34th surface k = 0.0000
A4 = 1.1607e−004, A6 = 5.7905e−007, A8 = −3.1882e−009,
A10 = 9.8985e−011, A12 = −7.9302e−013

| | WE | ST | TE |
|---|---|---|---|
| Zoom data Zoom ratio 1.92 | | | |
| f | 7.140 | 9.900 | 13.724 |
| FNO. | 2.876 | 2.858 | 2.880 |
| 2ω | 114.7 | 96.8 | 76.9 |
| IH | 10.25 | 11.11 | 11.15 |
| FB (in air) | 16.070 | 20.102 | 25.549 |
| LTL (in air) | 114.08384 | 103.11103 | 98.05480 |
| $f_{LU1}$ | 4015.66658 | 18719.1528 | −4014.1441 |
| d10 | 21.767 | 8.443 | 1.000 |
| d14 | 4.660 | 3.785 | 2.433 |
| d22 | 3.713 | 2.907 | 1.200 |
| d34 | 16.070 | 20.102 | 25.549 |
| close distance | | | |
| dOB | 135.916 | 146.889 | 151.945 |
| d10 | 21.76728 | 8.44282 | 1.000 |
| d14 | 3.599 | 2.713 | 1.299 |
| d22 | 4.774 | 3.980 | 2.334 |

Unit focal length f1 = −16.01256  f2 = 74.43324  f3 = −60.06540  f4 = 18.93592
$f_{Rw}$ = 23.7823

Example 16

Unit mm

Surface data

| Surface no. | r | d | nd | vd |
|---|---|---|---|---|
| Object plane | ∞ | ∞ | | |
| 1 | 39.821 | 1.750 | 1.81600 | 46.62 |
| 2 | 23.000 | 10.201 | | |
| 3* | 24.848 | 2.000 | 1.49700 | 81.54 |
| 4* | 8.532 | 9.584 | | |
| 5 | 113.233 | 1.400 | 1.49700 | 81.54 |
| 6* | 26.615 | 6.852 | | |
| 7 | −54.245 | 1.150 | 1.91082 | 35.25 |
| 8 | 49.559 | 2.580 | | |

-continued

Unit mm

| 9 | 46.316 | 3.072 | 2.00069 | 25.46 |
|---|---|---|---|---|
| 10 | −164.939 | Variable | | |
| 11 | 23.814 | 0.500 | 1.92286 | 18.90 |
| 12 | 11.718 | 3.136 | 1.78472 | 25.68 |
| 13 | −534.088 | Variable | | |
| 14(Stop) | ∞ | 1.750 | | |
| 15 | 29.472 | 1.851 | 1.43875 | 94.93 |
| 16 | −50.433 | 3.858 | | |
| 17 | 116.067 | 2.500 | 1.49700 | 81.54 |
| 18 | −13.561 | 0.344 | | |
| 19 | −12.586 | 0.500 | 1.83481 | 42.71 |
| 20 | 31.332 | Variable | | |
| 21 | 42.650 | 1.098 | 1.84666 | 23.78 |
| 22 | 34.310 | 0.100 | | |
| 23 | 13.565 | 0.650 | 1.74000 | 28.30 |
| 24 | 9.557 | 3.598 | 1.43875 | 94.93 |
| 25 | −182.982 | 0.100 | | |
| 26 | 24.499 | 2.893 | 1.80518 | 25.42 |
| 27 | −20.831 | Variable | | |
| 28 | −26.280 | 0.500 | 1.85026 | 32.27 |
| 29 | 10.500 | 3.934 | 1.55332 | 71.68 |
| 30* | −25.080 | Variable | | |
| Image plane | ∞ | | | |

Aspherical surface data

3rd surface k = 0.0000
A4 = 8.1667e−006, A6 = −2.0226e−007, A8 = 6.5181e−010,
A10 = −6.7600e−013
4th surface k = −0.7827
A4 = 3.4137e−006, A6 = 1.1615e−007, A8 = −1.0435e−008,
A10 = 4.6445e−011, A12 = −6.5411e−014
6th surface k = −27.7162
A4 = 2.2285e−004, A6 = −2.5634e−006, A8 = 4.3176e−008,
A10 = −3.2839e−010, A12 = 1.2321e−012
30th surface k = 6.3450
A4 = 1.4825e−004, A6 = 2.8156e−007, A8 = 1.2370e−008,
A10 = −3.2638e−011

| | WE | ST | TE |
|---|---|---|---|
| Zoom data Zoom ratio 1.92 | | | |
| f | 6.120 | 8.850 | 11.760 |
| FNO. | 2.880 | 2.880 | 2.880 |
| 2ω | 122.4 | 103.7 | 86.0 |
| IH | 10.30 | 11.15 | 11.15 |
| FB (in air) | 14.590 | 19.430 | 24.101 |
| LTL (in air) | 108.79193 | 97.51027 | 94.15618 |
| $f_{LU1}$ | 41.9479 | 45.7916 | 46.1259 |
| d10 | 22.329 | 8.022 | 1.000 |
| d13 | 2.143 | 1.571 | 1.523 |
| d14 | 1.750 | 1.750 | 1.750 |
| d16 | 3.858 | 3.858 | 3.858 |
| d20 | 3.206 | 1.695 | 0.500 |
| d27 | 0.623 | 0.890 | 1.130 |
| d30 | 14.590 | 19.430 | 24.101 |
| close distance | | | |
| dOB | 160.769 | 165.416 | 168.0119 |
| d10 | 22.329 | 8.022 | 1.000 |
| d13 | 2.143 | 1.571 | 1.523 |
| d14 | 1.498 | 1.177 | 0.646 |
| d16 | 4.111 | 4.4310 | 4.963 |
| d20 | 3.206 | 1.6950 | 0.500 |
| d27 | 0.623 | 0.890 | 1.130 |

-continued

| Unit mm |
|---|
| Unit focal length | f1 = −11.76214  f2 = 35.12776  f3 = −54.14121  f4 = 11.94382
f5 = −28.38881
$f_{Rw}$ = 24.5811

Example 17

| Unit mm | | | | |
|---|---|---|---|---|
| Surface data | | | | |
| Surface no. | r | d | nd | vd |
| Object plane | ∞ | ∞ | | |
| 1 | 39.821 | 1.750 | 1.81600 | 46.62 |
| 2 | 23.000 | 10.201 | | |
| 3* | 24.848 | 2.000 | 1.49700 | 81.54 |
| 4* | 8.532 | 9.584 | | |
| 5 | 113.233 | 1.400 | 1.49700 | 81.54 |
| 6* | 26.615 | 6.852 | | |
| 7 | −54.245 | 1.150 | 1.91082 | 35.25 |
| 8 | 49.559 | 2.580 | | |
| 9 | 46.316 | 3.072 | 2.00069 | 25.46 |
| 10 | −164.939 | Variable | | |
| 11 | 23.814 | 0.500 | 1.92286 | 18.90 |
| 12 | 11.718 | 3.136 | 1.78472 | 25.68 |
| 13 | −534.088 | 1.900 | | |
| 14(Stop) | ∞ | 1.750 | | |
| 15 | 29.472 | 1.851 | 1.43875 | 94.93 |
| 16 | −50.433 | 3.858 | | |
| 17 | 116.067 | 2.500 | 1.49700 | 81.54 |
| 18 | −13.561 | 0.344 | | |
| 19 | −12.586 | 0.500 | 1.83481 | 42.71 |
| 20 | 31.332 | Variable | | |
| 21 | 42.650 | 1.098 | 1.84666 | 23.78 |
| 22 | 34.310 | 0.100 | | |
| 23 | 13.565 | 0.650 | 1.74000 | 28.30 |
| 24 | 9.557 | 3.598 | 1.43875 | 94.93 |
| 25 | −182.982 | 0.100 | | |
| 26 | 24.499 | 2.893 | 1.80518 | 25.42 |
| 27 | −20.831 | Variable | | |
| 28 | −26.280 | 0.500 | 1.85026 | 32.27 |
| 29 | 10.500 | 3.934 | 1.55332 | 71.68 |
| 30* | −25.080 | Variable | | |
| Image plane | ∞ | | | |

| Aspherical surface data |
|---|
| 3rd surface | k = 0.0000
A4 = 8.1667e−006, A6 = −2.0226e−007, A8 = 6.5181e−010,
A10 = −6.7600e−013

4th surface k = −0.7827
A4 = 3.4137e−006, A6 = 1.1615e−007, A8 = −1.0435e−008,
A10 = 4.6445e−011, A12 = −6.5411e−014

6th surface k = −27.7162
A4 = 2.2285e−004, A6 = −2.5634e−006, A8 = 4.3176e−008,
A10 = −3.2839e−010, A12 = 1.2321e−012

30th surface k = 6.3450
A4 = 1.4825e−004, A6 = 2.8156e−007, A8 = 1.2370e−008,
A10 = −3.2638e−011

| | WE | ST | TE |
|---|---|---|---|

-continued

| Unit mm | | | |
|---|---|---|---|
| Zoom data | | | |
| Zoom ratio 1.93 | | | |
| f | 6.106 | 8.863 | 11.760 |
| FNO. | 2.881 | 2.879 | 2.879 |
| 2ω | 122.6 | 103.4 | 85.9 |
| IH | 10.30 | 11.15 | 11.15 |
| FB (in air) | 14.614 | 19.422 | 24.101 |
| LTL (in air) | 108.57374 | 97.83159 | 94.53314 |
| $f_{LU1}$ | 42.1735 | 42.1735 | 42.1735 |
| d10 | 22.329 | 8.022 | 1.000 |
| d14 | 1.750 | 1.750 | 1.750 |
| d16 | 3.858 | 3.858 | 3.858 |
| d20 | 3.206 | 1.695 | 0.500 |
| d27 | 0.623 | 0.890 | 1.130 |
| d30 | 14.614 | 19.422 | 24.101 |
| close distance | | | |
| dOB | 160.76909 | 165.41606 | 168.01188 |
| d10 | 22.329 | 8.022 | 1.000 |
| d14 | 1.499 | 1.176 | 0.646 |
| d16 | 4.110 | 4.432 | 4.962 |
| d20 | 3.206 | 1.695 | 0.500 |
| d27 | 0.623 | 0.890 | 1.130 |

| Unit focal length |
|---| f1 = −11.76214  f2 = 42.1735  f3 = 11.94382  f4 = −28.38881
$f_{Rw}$ = 24.457

Example 18

| Unit mm | | | | |
|---|---|---|---|---|
| Surface data | | | | |
| Surface no. | r | d | nd | vd |
| Object plane | ∞ | ∞ | | |
| 1 | 39.821 | 1.750 | 1.81600 | 46.62 |
| 2 | 23.000 | 11.062 | | |
| 3* | 24.731 | 2.000 | 1.49700 | 81.54 |
| 4* | 8.505 | 8.879 | | |
| 5 | 65.085 | 1.400 | 1.49700 | 81.54 |
| 6* | 22.582 | 7.715 | | |
| 7 | −43.136 | 1.150 | 1.91082 | 35.25 |
| 8 | 66.088 | 2.392 | | |
| 9 | 57.694 | 3.036 | 2.00069 | 25.46 |
| 10 | −107.399 | Variable | | |
| 11 | 25.107 | 0.500 | 1.92286 | 18.90 |
| 12 | 11.990 | 3.529 | 1.78472 | 25.68 |
| 13 | −194.983 | Variable | | |
| 14(Stop) | ∞ | 0.750 | | |
| 15 | 29.226 | 1.855 | 1.43875 | 94.93 |
| 16 | −43.198 | Variable | | |
| 17 | 229.273 | 4.102 | 1.49700 | 81.54 |
| 18 | −14.418 | 0.384 | | |
| 19 | −13.567 | 0.500 | 1.81600 | 46.62 |
| 20 | 29.367 | Variable | | |
| 21 | 35.890 | 1.158 | 1.88300 | 40.76 |
| 22 | 33.343 | 0.100 | | |
| 23 | 13.255 | 0.650 | 1.74000 | 28.30 |
| 24 | 9.293 | 3.495 | 1.43875 | 94.93 |
| 25 | 342.739 | 1.258 | | |
| 26 | 21.049 | 3.265 | 1.75520 | 27.51 |
| 27 | −20.772 | Variable | | |
| 28 | −27.320 | 0.500 | 1.85026 | 32.27 |
| 29 | 10.500 | 4.002 | 1.55332 | 71.68 |
| 30* | −29.453 | Variable | | |
| Image plane | ∞ | | | |

| Aspherical surface data |
|---|

-continued

| Unit mm |
|---|
| 3rd surface | k = 0.0000
A4 = 8.4097e−006, A6 = −1.9631e−007, A8 = 6.3357e−010,
A10 = −6.5913e−013

4th surface k = −0.7811
A4 = 2.7118e−006, A6 = 1.0738e−007, A8 = −1.0365e−008,
A10 = 4.6926e−011, A12 = −6.7420e−014

6th surface k = −19.5525
A4 = 2.4572e−004, A6 = −2.7189e−006, A8 = 4.3613e−008,
A10 = −3.2682e−010, A12 = 1.2321e−012

30th surface k = 7.3642
A4 = 1.3827e−004, A6 = 8.1235e−008, A8 = 1.1953e−008,
A10 = −6.2630e−011

|  | WE | ST | TE |
|---|---|---|---|
| Zoom data Zoom ratio 1.92 | | | |
| f | 6.120 | 8.850 | 11.760 |
| FNO. | 2.880 | 2.878 | 2.880 |
| 2ω | 121.1 | 103.5 | 85.4 |
| IH | 10.04 | 11.15 | 11.15 |
| FB (in air) | 14.388 | 19.237 | 23.780 |
| LTL (in air) | 112.45452 | 100.95076 | 97.07926 |
| $f_{LU1}$ | 20.7495 | 20.7120 | 20.0531 |
| d10 | 21.855 | 7.899 | 1.000 |
| d13 | 4.801 | 4.681 | 2.500 |
| d14 | 0.750 | 0.750 | 0.750 |
| d16 | 1.500 | 1.731 | 3.000 |
| d20 | 4.249 | 1.500 | 0.900 |
| d27 | 0.228 | 0.469 | 0.465 |
| d30 | 14.388 | 19.237 | 23.780 |
| close distance | | | |
| dOB | 160.76909 | 165.41606 | 300.00000 |
| d10 | 21.85549 | 7.89946 | 1.00000 |
| d13 | 4.80055 | 4.68083 | 2.50000 |
| d14 | 0.52468 | 0.25830 | 0.22417 |
| d16 | 1.72532 | 2.22229 | 3.52583 |
| d20 | 4.24879 | 1.50000 | 0.90000 |
| d27 | 0.22826 | 0.46885 | 0.46492 |

Unit focal length f1 = −11.41193  f2 = 34.32751  f3 = 40.04388  f4 = −20.03396
f5 = 12.28707  f6 = −26.44901
$f_{Rw}$ = 25.8682

Example 19

| Unit mm |
|---|
| Surface data |

| Surface no. | r | d | nd | vd |
|---|---|---|---|---|
| Object plane | ∞ | ∞ | | |
| 1 | 38.770 | 3.000 | 1.69680 | 55.53 |
| 2 | 28.115 | 7.500 | | |
| 3* | 17.448 | 2.849 | 1.49700 | 81.61 |
| 4* | 7.561 | 13.699 | | |
| 5* | 21.729 | 1.500 | 1.49700 | 81.61 |
| 6* | 12.893 | 5.572 | | |
| 7 | −51.538 | 1.150 | 1.80400 | 46.57 |
| 8 | 20.865 | 1.699 | | |
| 9 | 27.197 | 3.688 | 1.90366 | 31.32 |
| 10 | −733.544 | Variable | | |
| 11 | 253.308 | 2.067 | 1.61772 | 49.81 |
| 12* | −42.589 | 1.000 | | |
| 13 | 44.082 | 0.783 | 1.75520 | 27.51 |
| 14 | 12.857 | 4.036 | 1.63980 | 34.46 |
| 15 | 378.385 | Variable | | |
| 16(Stop) | ∞ | 1.100 | | |
| 17 | −58.439 | 1.815 | 1.49700 | 81.54 |
| 18 | −16.206 | 1.444 | | |
| 19 | −21.309 | 0.700 | 1.91082 | 35.25 |
| 20 | 78.965 | 0.010 | | |
| 21 | 31.783 | 2.986 | 1.84666 | 23.78 |
| 22 | −19.176 | 0.120 | | |
| 23 | −17.598 | 0.700 | 1.90366 | 31.32 |
| 24 | 195.353 | Variable | | |
| 25* | 16.026 | 2.899 | 1.49700 | 81.54 |
| 26* | −139.738 | 0.103 | | |
| 27 | 71.053 | 0.715 | 1.83481 | 42.71 |
| 28 | 15.246 | 4.421 | 1.49700 | 81.61 |
| 29 | −36.260 | 0.100 | | |
| 30 | 36.717 | 5.500 | 1.43875 | 94.93 |
| 31 | −13.883 | 0.101 | | |
| 32 | −28.774 | 0.705 | 1.51823 | 58.90 |
| 33 | 13.805 | 5.165 | 1.49700 | 81.54 |
| 34 | −31.841 | 0.302 | | |
| 35 | −39.432 | 1.008 | 1.69350 | 53.18 |
| 36* | 111.173 | Variable | | |
| Image plane | ∞ | | | |

Aspherical surface data

3rd surface k = −0.9550
A4 = −3.7910e−005, A6 = −3.2444e−008, A8 = 2.9294e−010,
A10 = −4.8218e−013, A12 = 3.0243e−016

4th surface k = −0.8942
A4 = 3.5590e−005, A6 = −1.7644e−007, A8 = −2.1108e−009,
A10 = 2.6824e−012, A12 = 7.6334e−015

5th surface k = −1.5569
A4 = −1.7970e−004, A6 = 2.9229e−007, A8 = 2.3557e−009,
A10 = −1.0363e−011, A12 = 1.2577e−014

6th surface k = −6.6194
A4 = 8.0499e−005, A6 = −3.1928e−006, A8 = 4.4037e−008,
A10 = −2.6017e−010, A12 = 6.6298e−013

12th surface k = 0.0000
A4 = 8.2619e−007, A6 = 2.2008e−008, A8 = 1.7452e−011,
A10 = 2.8868e−013

25th surface k = 0.0000
A4 = −3.7091e−005, A6 = 7.5554e−007, A8 = 1.2814e−009,
A10 = 9.4273e−011

26th surface k = 0.0000
A4 = 6.1147e−005, A6 = 1.0320e−006, A8 = 3.7517e−009,
A10 = 1.5257e−010

36th surface k = 0.0000
A4 = 8.8665e−005, A6 = 3.1956e−007, A8 = −2.1537e−009,
A10 = 7.2527e−011, A12 = −4.1852e−013

|  | WE | ST | TE |
|---|---|---|---|

-continued

| Unit mm | | | |
|---|---|---|---|
| Zoom data Zoom ratio 1.93 | | | |
| f | 5.915 | 8.463 | 11.389 |
| FNO. | 2.881 | 2.883 | 2.888 |
| 2ω | 125.1 | 109.1 | 89.7 |
| IH | 9.88 | 11.15 | 11.15 |
| FB (in air) | 14.638 | 19.678 | 24.987 |
| LTL (in air) | 120.76494 | 110.99409 | 107.71306 |
| $f_{LU1}$ | 72.3413 | 75.2201 | 78.6740 |
| d10 | 15.553 | 5.726 | 1.000 |
| d15 | 5.761 | 4.347 | 2.787 |
| d16 | 1.100 | 1.100 | 1.100 |
| d24 | 6.373 | 2.805 | 0.500 |
| d36 | 14.638 | 19.678 | 24.987 |
| close distance | | | |
| dOB | 279.23506 | 289.00591 | 292.28694 |
| d10 | 15.553 | 5.726 | 1.000 |
| d15 | 5.761 | 4.347 | 2.787 |
| d16 | 0.268 | 0.483 | 0.516 |
| d24 | 7.205 | 3.421 | 1.084 |
| Unit focal length | | | |
| f1 = −10.80494 | f2 = 42.55654 | f3 = −62.80989 | f4 = 19.29794 |
| $f_{Rw}$ = 25.3249 | | | |

Example 20

| Unit mm | | | |
|---|---|---|---|
| Surface data | | | |
| Surface no. | r | d | nd | vd |
|---|---|---|---|---|
| Object plane | ∞ | ∞ | | |
| 1 | 42.379 | 2.50 | 1.73000 | 51.37 |
| 2 | 26.000 | 4.95 | | |
| 3* | 21.383 | 2.80 | 1.49700 | 81.61 |
| 4* | 7.778 | 11.67 | | |
| 5* | 16.453 | 1.50 | 1.49700 | 81.61 |
| 6* | 11.672 | 5.94 | | |
| 7 | −651.990 | 1.15 | 1.49700 | 81.61 |
| 8 | 17.319 | 3.38 | | |
| 9 | 19.538 | 2.48 | 1.91082 | 35.25 |
| 10 | 30.349 | Variable | | |
| 11 | 46.648 | 0.70 | 1.90366 | 31.32 |
| 12 | 15.189 | 3.83 | 1.65412 | 39.68 |
| 13 | −34.871 | Variable | | |
| 14(Stop) | ∞ | 1.10 | | |
| 15 | −582.288 | 2.07 | 1.51742 | 52.43 |
| 16 | −18.513 | 0.10 | | |
| 17 | −28.291 | 0.70 | 1.91082 | 35.25 |
| 18 | 61.296 | 0.10 | | |
| 19 | 21.509 | 2.50 | 1.80810 | 22.76 |
| 20 | −68.495 | 0.33 | | |
| 21 | −34.588 | 0.74 | 1.91082 | 35.25 |
| 22 | 35.798 | Variable | | |
| 23* | 14.272 | 3.85 | 1.49700 | 81.54 |
| 24* | −74.069 | 0.10 | | |
| 25 | 34.532 | 0.70 | 1.88300 | 40.76 |
| 26 | 11.398 | 3.66 | 1.49700 | 81.61 |
| 27 | 279.489 | 0.19 | | |
| 28 | 24.986 | 5.08 | 1.49700 | 81.61 |
| 29 | −14.208 | 0.10 | | |
| 30 | −24.581 | 0.70 | 1.51633 | 64.14 |
| 31 | 11.928 | 7.00 | 1.49700 | 81.54 |
| 32 | −13.997 | 0.30 | | |
| 33 | −14.780 | 1.33 | 1.69350 | 53.18 |
| 34* | −198.144 | Variable | | |
| Image plane | ∞ | | | |

-continued

| Unit mm |
|---|
| Aspherical surface data |

3rd surface k = −0.650
A4 = −2.80409e−05, A6 = −3.07351e−08, A8 = 2.93806e−10,
A10 = −5.58279e−13, A12 = 4.46930e−16

4th surface k = −0.917
A4 = 1.72731e−05, A6 = −2.75487e−07, A8 = −1.41900e−09,
A10 = 4.76038e−12, A12 = 5.37084e−15

5th surface k = −1.754
A4 = −1.77069e−04, A6 = 3.04854e−07, A8 = 2.39607e−09,
A10 = −1.03995e−11, A12 = 1.23846e−14

6th surface k = −5.053
A4 = 1.15629e−04, A6 = −2.98533e−06, A8 = 4.33574e−08,
A10 = −2.72864e−10, A12 = 7.78197e−13

23th surface k = 0.000
A4 = −3.36547e−05, A6 = 5.89797e−07, A8 = −1.10876e−09,
A10 = 8.89272e−11

24th surface k = 0.000
A4 = 6.05585e−05, A6 = 1.10310e−06, A8 = −2.14934e−09,
A10 = 1.61473e−10

34th surface k = 0.000
A4 = 8.67321e−05, A6 = 1.90690e−07, A8 = −1.63483e−09,
A10 = 6.73794e−11, A12 = −4.61220e−13

| | WE | ST | TE |
|---|---|---|---|
| Zoom data Zoom ratio 1.92 | | | |
| f | 6.12 | 8.75 | 11.76 |
| FNO. | 2.88 | 2.88 | 2.88 |
| 2ω | 122.44 | 104.79 | 86.22 |
| IH | 10.19 | 11.15 | 11.15 |
| FB (in air) | 14.66 | 19.64 | 25.02 |
| LTL (in air) | 112.87 | 104.67 | 102.19 |
| d10 | 14.83 | 5.65 | 1.27 |
| d13 | 5.88 | 4.28 | 2.68 |
| d22 | 5.94 | 3.54 | 1.66 |
| d34 | 14.66 | 19.64 | 25.02 |
| close distance | | | |
| d10 | 16.59 | 7.22 | 2.71 |
| d13 | 5.12 | 3.44 | 1.80 |
| d22 | 4.94 | 2.80 | 1.10 |
| d34 | 14.66 | 19.64 | 25.02 |
| Unit focal length | | | |
| f1 = −11.17 | f2 = 46.40 | f3 = −48.06 | f4 = 18.30 |
| $f_{Rw}$ = 23.0317 | | | |

Example 21

| Unit mm | | | |
|---|---|---|---|
| Surface data | | | |
| Surface no. | r | d | nd | vd |

-continued

Unit mm

| Object plane | ∞ | ∞ | | |
|---|---|---|---|---|
| 1 | 36.700 | 2.70 | 1.72916 | 54.68 |
| 2 | 20.150 | 4.10 | | |
| 3* | 16.721 | 3.00 | 1.80610 | 40.88 |
| 4* | 8.739 | 10.92 | | |
| 5 | −131.574 | 1.15 | 1.43700 | 95.10 |
| 6 | 15.649 | 4.33 | | |
| 7 | 22.220 | 2.50 | 1.90366 | 31.32 |
| 8 | 35.809 | Variable | | |
| 9* | 32.791 | 4.10 | 1.59201 | 67.02 |
| 10* | −366.151 | Variable | | |
| 11(Stop) | ∞ | Variable | | |
| 12 | −36.447 | 0.70 | 2.00069 | 25.46 |
| 13 | −527.825 | 0.99 | | |
| 14 | 73.690 | 2.62 | 1.84666 | 23.78 |
| 15 | −27.614 | Variable | | |
| 16 | −31.077 | 0.70 | 1.91082 | 35.25 |
| 17 | −2248.959 | Variable | | |
| 18* | 15.466 | 4.35 | 1.49700 | 81.61 |
| 19* | −181.581 | 0.15 | | |
| 20 | 30.932 | 1.66 | 1.80400 | 46.58 |
| 21 | 11.354 | 4.07 | 1.43700 | 95.10 |
| 22 | 45.401 | 0.21 | | |
| 23 | 17.951 | 6.09 | 1.43700 | 95.10 |
| 24 | −17.826 | 0.19 | | |
| 25 | −276.478 | 0.85 | 1.76200 | 40.10 |
| 26 | 24.976 | 4.68 | 1.43700 | 95.10 |
| 27 | −16.698 | 3.10 | 1.69350 | 53.18 |
| 28* | −60.410 | Variable | | |
| Image plane | ∞ | | | |

Aspherical surface data

3rd surface k = −0.738
A4 = −3.32210e−05, A6 = 2.01738e−09, A8 = 8.98035e−11,
A10 = −1.06672e−13, A12 = −1.20757e−16

4th surface k = −0.961
A4 = −3.29474e−06, A6 = −1.68777e−07, A8 = 1.62251e−10,
A10 = 3.45269e−12, A12 = −1.59091e−14

9th surface k = 0.000
A4 = 5.97024e−05, A6 = 3.25057e−07, A8 = 1.47629e−09,
A10 = 3.18914e−11

10th surface k = 0.000
A4 = 7.11384e−05, A6 = 3.32785e−07, A8 = 3.20108e−09,
A10 = 5.87491e−11

18th surface k = 0.000
A4 = −1.10028e−05, A6 = 2.57400e−07, A8 = −3.86307e−09,
A10 = 4.42730e−11

19th surface k = 0.000
A4 = 4.63599e−05, A6 = 4.66308e−07, A8 = −6.13407e−09,
A10 = 6.79383e−11

28th surface k = 0.000
A4 = 6.97818e−05, A6 = 3.62133e−07, A8 = −3.09710e−09,
A10 = 4.99556e−11, A12 = −1.77046e−13

| | WE | ST | TE |
|---|---|---|---|
| Zoom data | | | |
| Zoom ratio 1.92 | | | |
| f | 7.14 | 9.90 | 13.72 |
| FNO. | 2.44 | 2.43 | 2.44 |
| 2ω | 110.75 | 98.37 | 77.73 |

-continued

Unit mm

| IH | 9.48 | 11.15 | 11.15 |
|---|---|---|---|
| FB (in air) | 14.64 | 19.10 | 24.73 |
| LTL (in air) | 112.36 | 101.95 | 97.72 |
| d8 | 17.23 | 7.41 | 1.92 |
| d10 | 3.84 | 3.25 | 4.51 |
| d11 | 6.03 | 4.60 | 1.30 |
| d15 | 0.36 | 0.74 | 1.60 |
| d17 | 7.11 | 3.68 | 0.50 |
| d28 | 14.64 | 19.10 | 24.73 |
| close distance | | | |
| d8 | 18.26 | 8.75 | 3.27 |
| d10 | 2.81 | 1.91 | 3.15 |
| d11 | 6.03 | 4.60 | 1.30 |
| d15 | 0.94 | 1.22 | 1.75 |
| d17 | 6.52 | 3.20 | 0.35 |
| d28 | 14.64 | 19.10 | 24.73 |

Unit focal length

| f1 = −13.42 | f2 = 51.03 | f3 = 53.54 | f4 = −34.60 |
|---|---|---|---|
| f5 = 22.26 | | | |
| $f_{Rw}$ = 25.7928 | | | |

Example 22

Unit mm

Surface data

| Surface no. | r | d | nd | νd |
|---|---|---|---|---|
| Object plane | ∞ | ∞ | | |
| 1 | 37.000 | 2.70 | 1.72916 | 54.68 |
| 2 | 23.000 | 5.82 | | |
| 3* | 18.616 | 3.00 | 1.69350 | 53.18 |
| 4* | 8.735 | 7.34 | | |
| 5 | 25.165 | 1.50 | 1.83481 | 42.73 |
| 6 | 13.500 | 8.18 | | |
| 7 | −33.282 | 1.15 | 1.43700 | 95.10 |
| 8 | 38.702 | 0.15 | | |
| 9 | 28.445 | 4.13 | 1.88300 | 40.76 |
| 10 | −197.232 | Variable | | |
| 11 | 31.568 | 0.70 | 1.91082 | 35.25 |
| 12 | 12.768 | 3.60 | 1.64769 | 33.79 |
| 13 | −158.303 | Variable | | |
| 14(Stop) | ∞ | Variable | | |
| 15 | 76.820 | 2.23 | 1.60300 | 65.44 |
| 16 | −24.516 | 0.15 | | |
| 17 | −51.221 | 0.70 | 1.90366 | 31.32 |
| 18 | 31.308 | 0.10 | | |
| 19 | 25.736 | 2.00 | 1.80810 | 22.76 |
| 20 | 276.287 | Variable | | |
| 21 | −113.365 | 0.75 | 1.91082 | 35.25 |
| 22 | 38.040 | Variable | | |
| 23* | 15.068 | 2.89 | 1.55332 | 71.68 |
| 24* | 83.964 | 0.16 | | |
| 25 | 17.947 | 0.70 | 1.78800 | 47.37 |
| 26 | 10.300 | 4.80 | 1.49700 | 81.61 |
| 27 | 89.426 | 0.15 | | |
| 28 | 27.065 | 4.78 | 1.43700 | 95.10 |
| 29 | −16.156 | 0.48 | | |
| 30 | −42.801 | 1.14 | 1.69350 | 53.21 |
| 31 | 21.308 | 4.46 | 1.43700 | 95.10 |
| 32 | −16.301 | 0.00 | | |
| 33 | −16.301 | 1.02 | 1.58313 | 59.38 |
| 34* | −71.361 | Variable | | |
| Image plane | ∞ | | | |

-continued

Unit mm

Aspherical surface data

3rd surface k = −0.750
A4 = −2.98949e−05, A6 = 1.35148e−07, A8 = −5.04561e−10,
A10 = 1.03660e−12, A12 = −9.63544e−16

4th surface k = −0.872
A4 = −1.42375e−05, A6 = 2.22844e−07, A8 = −1.43145e−09,
A10 = 5.15792e−12, A12 = −2.08995e−14

23th surface k = 0.000
A4 = −1.46372e−06, A6 = 2.01907e−07, A8 = 1.08339e−09,
A10 = 3.63691e−11, A12 = −4.40410e−14

24th surface k = 0.000
A4 = 5.63308e−05, A6 = 3.80425e−07, A8 = 2.67981e−09,
A10 = 3.93847e−11

34th surface k = 0.000
A4 = 1.20535e−04, A6 = 6.00850e−07, A8 = −4.19104e−09,
A10 = 1.12503e−10, A12 = −7.93015e−13

|  | WE | ST | TE |
|---|---|---|---|
| Zoom data Zoom ratio 1.92 | | | |
| f | 7.14 | 9.90 | 13.72 |
| FNO. | 2.88 | 2.88 | 2.88 |
| 2ω | 114.73 | 96.49 | 76.59 |
| IH | 10.40 | 11.15 | 11.15 |
| FB (in air) | 15.73 | 19.89 | 25.27 |
| LTL (in air) | 114.08 | 102.87 | 98.03 |
| d10 | 22.61 | 9.07 | 1.00 |
| d13 | 1.50 | 1.97 | 1.50 |
| d14 | 4.67 | 3.70 | 2.56 |
| d20 | 1.80 | 1.20 | 1.71 |
| d22 | 2.99 | 2.25 | 1.20 |
| d34 | 15.73 | 19.89 | 25.27 |
| close distance | | | |
| d10 | 22.61 | 9.07 | 1.00 |
| d13 | 1.50 | 1.97 | 1.50 |
| d14 | 4.37 | 2.77 | 1.20 |
| d20 | 0.82 | 1.08 | 1.88 |
| d22 | 4.26 | 3.30 | 2.39 |
| d34 | 15.73 | 19.89 | 25.27 |

Unit focal length f1 = −15.91    f2 = 80.42    f3 = 68.84    f4 = −31.20
f5 = 18.53
f$_{Rw}$ = 23.7992

Example 23

Unit mm

Surface data

| Surface no. | r | d | nd | vd |
|---|---|---|---|---|
| Object plane | ∞ | ∞ | | |
| 1 | 32.119 | 2.00 | 1.72916 | 54.68 |
| 2 | 21.473 | 5.55 | | |
| 3 | 27.000 | 2.00 | 1.72916 | 54.68 |
| 4 | 16.000 | 5.05 | | |
| 5* | 19.158 | 2.00 | 1.49700 | 81.54 |
| 6* | 8.094 | 9.29 | | |
| 7* | −209.030 | 1.20 | 1.49700 | 81.61 |
| 8 | 14.558 | 1.25 | | |
| 9 | 17.547 | 2.90 | 2.00069 | 25.46 |
| 10 | 30.000 | Variable | | |
| 11 | 27.294 | 1.69 | 1.83481 | 42.71 |
| 12 | 205.914 | Variable | | |
| 13(Stop) | ∞ | 2.00 | | |
| 14 | 18.621 | 1.60 | 1.74000 | 28.30 |
| 15 | 35.746 | 0.80 | 1.88300 | 40.80 |
| 16 | 10.775 | 2.74 | 1.49700 | 81.54 |
| 17 | −33.141 | 1.28 | | |
| 18 | −12.171 | 0.80 | 1.88300 | 40.76 |
| 19 | 47.647 | 2.39 | 1.49700 | 81.54 |
| 20 | −19.480 | 0.20 | | |
| 21 | 134.532 | 4.44 | 1.49700 | 81.54 |
| 22 | −13.417 | 0.20 | | |
| 23 | 57.986 | 3.43 | 1.43875 | 94.93 |
| 24 | −38.090 | Variable | | |
| 25 | −58.774 | 1.00 | 1.72903 | 54.04 |
| 26* | −340.638 | Variable | | |
| 27 | 64.337 | 3.81 | 1.59201 | 67.02 |
| 28 | −47.521 | Variable | | |
| Image plane | ∞ | | | |

Aspherical surface data

5th surface k = 0.000
A4 = −6.46916e−06, A6 = −7.86901e−08

6th surface k = −0.892
A4 = −1.54378e−05, A6 = −2.33394e−07, A8 = −2.23616e−09

7th surface k = 0.000
A4 = −1.97928e−05, A6 = 1.28669e−07, A8 = −1.04555e−09

26th surface k = 0.000
A4 = 3.83890e−05

|  | WE | ST | TE |
|---|---|---|---|
| Zoom data Zoom ratio 1.91 | | | |
| f | 6.15 | 8.50 | 11.77 |
| FNO. | 4.00 | 4.00 | 4.00 |
| 2ω | 124.23 | 108.32 | 87.15 |
| IH | 10.26 | 11.15 | 11.15 |
| FB (in air) | 14.29 | 14.29 | 14.29 |
| LTL (in air) | 99.63 | 97.53 | 99.63 |
| d10 | 17.09 | 7.98 | 1.28 |
| d12 | 4.96 | 5.49 | 5.58 |
| d24 | 3.50 | 6.58 | 10.84 |
| d26 | 2.15 | 5.56 | 10.00 |
| d28 | 14.29 | 14.29 | 14.29 |
| close distance | | | |
| d10 | 19.25 | 10.43 | 3.96 |
| d12 | 2.81 | 3.03 | 2.90 |
| d24 | 2.34 | 4.21 | 7.09 |
| d26 | 3.31 | 7.93 | 13.76 |
| d28 | 14.29 | 14.29 | 14.29 |

Unit focal length f1 = −11.09    f2 = 37.53    f3 = 25.90    f4 = −97.58
f5 = 46.76
f$_{Rw}$ = 22.9166

Example 24

Unit mm
Surface data

| Surface no. | r | d | nd | vd |
|---|---|---|---|---|
| Object plane | ∞ | ∞ | | |
| 1 | 32.119 | 2.00 | 1.72916 | 54.68 |
| 2 | 21.473 | 5.55 | | |
| 3 | 27.000 | 2.00 | 1.72916 | 54.68 |
| 4 | 16.000 | 5.05 | | |
| 5* | 19.158 | 2.00 | 1.49700 | 81.54 |
| 6* | 8.094 | 9.29 | | |
| 7* | −209.030 | 1.20 | 1.49700 | 81.61 |
| 8 | 14.558 | 1.25 | | |
| 9 | 17.547 | 2.90 | 2.00069 | 25.46 |
| 10 | 30.000 | Variable | | |
| 11 | 27.294 | 1.69 | 1.83481 | 42.71 |
| 12 | 205.914 | 5.00 | | |
| 13(Stop) | ∞ | 2.00 | | |
| 14 | 18.621 | 1.60 | 1.74000 | 28.30 |
| 15 | 35.746 | 0.80 | 1.88300 | 40.80 |
| 16 | 10.775 | 2.74 | 1.49700 | 81.54 |
| 17 | −33.141 | 1.28 | | |
| 18 | −12.171 | 0.80 | 1.88300 | 40.76 |
| 19 | 47.647 | 2.39 | 1.49700 | 81.54 |
| 20 | −19.480 | 0.20 | | |
| 21 | 134.532 | 4.44 | 1.49700 | 81.54 |
| 22 | −13.417 | 0.20 | | |
| 23 | 57.986 | 3.43 | 1.43875 | 94.93 |
| 24 | −38.090 | Variable | | |
| 25 | −58.774 | 1.00 | 1.72903 | 54.04 |
| 26* | −340.638 | Variable | | |
| 27 | 64.337 | 3.81 | 1.59201 | 67.02 |
| 28 | −47.521 | Variable | | |
| Image plane | ∞ | | | |

Aspherical surface data

5th surface k = 0.000
A4 = −6.46916e−06, A6 = −7.86901e−08
6th surface k = −0.892
A4 = −1.54378e−05, A6 = −2.33394e−07, A8 = −2.23616e−09
7th surface k = 0.000
A4 = −1.97928e−05, A6 = 1.28669e−07, A8 = −1.04555e−09
26th surface k = 0.000
A4 = 3.83890e−05

| | WE | ST | TE |
|---|---|---|---|
| Zoom data | | | |
| Zoom ratio 1.93 | | | |
| f | 6.15 | 8.53 | 11.86 |
| FNO. | 4.00 | 4.00 | 4.00 |
| 2ω | 124.21 | 108.39 | 86.86 |
| IH | 10.26 | 11.15 | 11.15 |
| FB (in air) | 14.29 | 14.30 | 14.34 |
| LTL (in air) | 99.67 | 97.05 | 99.11 |
| d10 | 17.09 | 7.98 | 1.28 |
| d12 | 5.00 | 5.00 | 5.00 |
| d24 | 3.50 | 6.58 | 10.92 |
| d26 | 2.15 | 5.56 | 9.92 |
| d28 | 14.29 | 14.30 | 14.34 |
| close distance | | | |
| d10 | 19.18 | 10.34 | 3.87 |
| d12 | 2.91 | 2.63 | 2.41 |
| d24 | 2.40 | 4.34 | 7.31 |
| d26 | 3.25 | 7.80 | 13.54 |
| d28 | 14.29 | 14.30 | 14.34 |

Unit focal length

| | | | |
|---|---|---|---|
| f1 = −11.09 | f2 = 22.67 | f3 = −97.58 | f4 = 46.76 |
| $f_{Rw}$ = 22.9437 | | | |

Example 25

Unit mm
Surface data

| Surface no. | r | d | nd | vd |
|---|---|---|---|---|
| Object plane | ∞ | ∞ | | |
| 1 | 33.241 | 2.90 | 1.72916 | 54.68 |
| 2 | 26.000 | 7.50 | | |
| 3* | 17.155 | 2.80 | 1.49700 | 81.61 |
| 4* | 7.510 | 13.77 | | |
| 5* | 20.853 | 1.50 | 1.49700 | 81.61 |
| 6* | 12.391 | 5.87 | | |
| 7 | −44.673 | 1.15 | 1.80400 | 46.57 |
| 8 | 20.635 | 1.53 | | |
| 9 | 27.042 | 3.90 | 1.90366 | 31.32 |
| 10 | −210.877 | Variable | | |
| 11 | 90.190 | 2.22 | 1.61772 | 49.81 |
| 12* | −71.803 | 1.13 | | |
| 13 | 39.213 | 0.76 | 1.75520 | 27.51 |
| 14 | 12.162 | 3.47 | 1.63980 | 34.46 |
| 15 | 351.293 | Variable | | |
| 16(Stop) | ∞ | 1.23 | | |
| 17 | −108.349 | 1.77 | 1.49700 | 81.54 |
| 18 | −19.724 | 0.50 | | |
| 19 | −22.779 | 0.70 | 1.91082 | 35.25 |
| 20 | 87.789 | 0.03 | | |
| 21 | 35.091 | 2.96 | 1.84666 | 23.78 |
| 22 | −18.968 | 0.11 | | |
| 23 | −18.568 | 0.70 | 1.90366 | 31.32 |
| 24 | 133.287 | Variable | | |
| 25* | 15.936 | 3.02 | 1.49700 | 81.54 |
| 26* | −102.980 | 0.15 | | |
| 27 | 88.806 | 0.71 | 1.83481 | 42.71 |
| 28 | 15.238 | 4.52 | 1.49700 | 81.61 |
| 29 | −34.512 | 0.10 | | |
| 30 | 39.392 | 5.36 | 1.43875 | 94.93 |
| 31 | −13.791 | 0.10 | | |
| 32 | −27.724 | 0.70 | 1.51823 | 58.90 |
| 33 | 20.901 | 4.60 | 1.49700 | 81.54 |
| 34 | −22.763 | 0.30 | | |
| 35 | −25.930 | 1.00 | 1.69350 | 53.18 |
| 36* | 166.590 | Variable | | |
| Image plane | ∞ | | | |

Aspherical surface data

3rd surface k = −0.941
A4 = −3.74147e−05, A6 = −3.37982e−08, A8 = 2.91531e−10,
A10 = −4.80009e−13, A12 = 3.03435e−16
4th surface k = −0.894
A4 = 3.68214e−05, A6 = −1.92590e−07, A8 = −2.10875e−09,
A10 = 2.77193e−12, A12 = 7.89439e−15
5th surface k = −1.490
A4 = −1.79309e−04, A6 = 2.92455e−07, A8 = 2.35867e−09,
A10 = −1.03471e−11, A12 = 1.26343e−14

-continued

Unit mm

6th surface k = −6.014
A4 = 8.11374e−05, A6 = −3.19735e−06, A8 = 4.37848e−08,
A10 = −2.60010e−10, A12 = 6.69506e−13
12th surface k = 0.000
A4 = −3.52582e−06, A6 = −1.35083e−08, A8 = 1.59153e−11,
A10 = 1.02882e−13
25th surface k = 0.000
A4 = −3.66163e−05, A6 = 7.44649e−07, A8 = 1.12731e−09,
A10 = 9.37459e−11
26th surface k = 0.000
A4 = 6.02042e−05, A6 = 1.04226e−06, A8 = 3.77046e−09,
A10 = 1.51335e−10
36th surface k = 0.000
A4 = 8.16580e−05, A6 = 2.85490e−07, A8 = −2.35708e−09,
A10 = 6.53440e−11, A12 = −4.18521e−13

|  | WE | ST | TE |
|---|---|---|---|
| Zoom data | | | |
| Zoom ratio 1.92 | | | |
| f | 6.12 | 8.75 | 11.76 |
| FNO. | 2.88 | 2.88 | 2.88 |
| $2\omega$ | 122.44 | 105.54 | 86.79 |
| IH | 10.07 | 11.15 | 11.15 |
| FB (in air) | 15.59 | 20.61 | 26.03 |
| LTL (in air) | 119.08 | 110.90 | 108.00 |
| d10 | 16.05 | 6.09 | 1.00 |
| d12 | 1.13 | 1.13 | 1.13 |
| d15 | 4.31 | 4.47 | 3.40 |
| d16 | 1.23 | 1.23 | 1.23 |
| d18 | 0.50 | 0.50 | 0.50 |
| d24 | 6.06 | 2.66 | 0.50 |
| d36 | 15.59 | 20.61 | 26.03 |
| close distance | | | |
| d10 | 16.22 | 6.69 | 1.81 |
| d12 | 0.97 | 0.53 | 0.32 |
| d15 | 4.31 | 4.47 | 3.40 |
| d16 | 0.71 | 0.82 | 0.86 |
| d18 | 1.03 | 0.92 | 0.88 |
| d24 | 6.06 | 2.66 | 0.50 |

Unit focal length f1 = −11.20   f2 = 42.79   f3 = −62.71   f4 = 19.86
$f_{Rw}$ = 23.9716

In the examples described above, the front unit includes a plurality of lens units, and distances between lens units included in the front lens unit may change at the time of zooming from a wide angle end to a telephoto end.

For instance, when the numerical data of the example 18 is changed to following numerical data of modification example, action and effect of the examples described above can be obtained.

Unit mm

Surface data

| Surface no. | r | d | nd | vd |
|---|---|---|---|---|
| Object plane | ∞ | ∞ | | |
| 1 | 39.821 | 1.750 | 1.81600 | 46.62 |
| 2 | 23.000 | 11.062 | | |
| 3* | 24.731 | 2.000 | 1.49700 | 81.54 |
| 4* | 8.505 | 8.879 | | |
| 5 | 65.085 | 1.400 | 1.49700 | 81.54 |
| 6* | 22.582 | 7.715 | | |
| 7 | −43.136 | 1.150 | 1.91082 | 35.25 |
| 8 | 66.088 | Variable | | |
| 9 | 57.694 | 3.036 | 2.00069 | 25.46 |
| 10 | −107.399 | Variable | | |
| 11 | 25.107 | 0.500 | 1.92286 | 18.90 |
| 12 | 11.990 | 3.529 | 1.78472 | 25.68 |
| 13 | −194.983 | Variable | | |
| 14(Stop) | ∞ | 0.750 | | |
| 15 | 29.226 | 1.855 | 1.43875 | 94.93 |
| 16 | −43.198 | Variable | | |
| 17 | 229.273 | 4.102 | 1.49700 | 81.54 |
| 18 | −14.418 | 0.384 | | |
| 19 | −13.567 | 0.500 | 1.81600 | 46.62 |
| 20 | 29.367 | Variable | | |
| 21 | 35.890 | 1.158 | 1.88300 | 40.76 |
| 22 | 33.343 | 0.100 | | |
| 23 | 13.255 | 0.650 | 1.74000 | 28.30 |
| 24 | 9.293 | 3.495 | 1.43875 | 94.93 |
| 25 | 342.739 | 1.258 | | |
| 26 | 21.049 | 3.265 | 1.75520 | 27.51 |
| 27 | −20.772 | Variable | | |
| 28 | −27.320 | 0.500 | 1.85026 | 32.27 |
| 29 | 10.500 | 4.002 | 1.55332 | 71.68 |
| 30* | −29.453 | Variable | | |
| Image plane | ∞ | | | |

Aspherical surface data

3rd surface k = 0.0000
A4 = 8.4097e−006, A6 = −1.9631e−007, A8 = 6.3357e−010,
A10 = −6.5913e−013
4th surface k = −0.7811
A4 = 2.7118e−006, A6 = 1.0738e−007, A8 = −1.0365e−008,
A10 = 4.6926e−011, A12 = −6.7420e−014
6th surface k = −19.5525
A4 = 2.4572e−004, A6 = −2.7189e−006, A8 = 4.3613e−008,
A10 = −3.2682e−010, A12 = 1.2321e−012
30th surface k = 7.3642
A4 = 1.3827e−004, A6 = 8.1235e−008, A8 = 1.1953e−008,
A10 = −6.2630e−011

|  | WE | ST | TE |
|---|---|---|---|
| Zoom data | | | |
| Zoom ratio 1.92 | | | |
| f | 6.122 | 8.878 | 11.760 |
| $f_F$ | −11.3007 | −11.3560 | −11.41193 |
| FNO. | 2.887 | 2.887 | 2.880 |
| $2\omega$ | 121.1 | 103.3 | 85.4 |
| IH | 10.04 | 11.15 | 11.15 |
| FB (in air) | 14.529 | 19.386 | 23.780 |
| LTL (in air) | 112.59619 | 100.09960 | 97.07926 |
| d8 | 2.192 | 2.292 | 2.392 |
| d10 | 22.055 | 7.999 | 1.000 |
| d13 | 4.801 | 4.681 | 2.500 |
| d14 | 0.750 | 0.750 | 0.750 |
| d16 | 1.500 | 1.731 | 3.000 |
| d20 | 4.249 | 1.500 | 0.900 |

-continued

Unit mm

| | | | |
|---|---|---|---|
| d27 | 0.228 | 0.469 | 0.465 |
| d30 | 14.529 | 19.386 | 23.780 |
| close distance | | | |
| dOB | 160.76909 | 165.41606 | 300.00000 |
| d8 | 2.192 | 2.292 | 2.392 |
| d10 | 22.055 | 7.999 | 1.00000 |
| d13 | 4.801 | 4.681 | 2.50000 |
| d14 | 0.52468 | 0.25830 | 0.22417 |
| d16 | 1.72532 | 2.22229 | 3.52583 |
| d20 | 4.24879 | 1.50000 | 0.90000 |
| d27 | 0.22826 | 0.46885 | 0.46492 |

Unit focal length

| | | | |
|---|---|---|---|
| f1 = −6.13 | f2 = 37.85 | f3 = 34.32751 | f4 = 40.04388 |
| f5 = −20.03396 | f6 = 12.28707 | f7 = −26.44901 | |
| $f_{Rw}$ = 25.8682 | | | |

In the examples described above, at least one lens unit may be disposed between at least any two lens units or in other words, between the second lens unit and the third lens unit, between the third lens unit and the fourth lens unit, between the fourth lens unit and the fifth lens unit, and between the fifth lens unit and the sixth lens unit.

Aberration diagrams of the examples 1 to 25 will be described below. For each example, there are two aberration diagrams which are shown in order of an aberration diagram at the time of focusing to an object at infinity and an aberration diagram at the time of focusing to an object at a close distance. In each aberration diagram, FIY denotes the maximum image height.

FIG. 26A, FIG. 28A, FIG. 30A, FIG. 32A, FIG. 34A, FIG. 36A, FIG. 38A, FIG. 40A, FIG. 42A, FIG. 44A, FIG. 46A, FIG. 48A, FIG. 50A, FIG. 52A, FIG. 54A, FIG. 56A, FIG. 58A, FIG. 60A, FIG. 62A, FIG. 64A, FIG. 66A, FIG. 68A, FIG. 70A, FIG. 72A, and FIG. 74A are aberration diagrams of spherical aberration (SA) at the wide angle end at the time of focusing to an object at infinity.

FIG. 26B, FIG. 28B, FIG. 30B, FIG. 32B, FIG. 34B, FIG. 36B, FIG. 38B, FIG. 40B, FIG. 42B, FIG. 44B, FIG. 46B, FIG. 48B, FIG. 50B, FIG. 52B, FIG. 54B, FIG. 56B, FIG. 58B, FIG. 60B, FIG. 62B, FIG. 64B, FIG. 66B, FIG. 68B, FIG. 70B, FIG. 72B, and FIG. 74B are aberration diagrams of astigmatism (AS) at the wide angle end at the time of focusing to an object at infinity.

FIG. 26C, FIG. 28C, FIG. 30C, FIG. 32C, FIG. 34C, FIG. 36C, FIG. 38C, FIG. 40C, FIG. 42C, FIG. 44C, FIG. 46C, FIG. 48C, FIG. 50C, FIG. 52C, FIG. 54C, FIG. 56C, FIG. 58C, FIG. 60C, FIG. 62C, FIG. 64C, FIG. 66C, FIG. 68C, FIG. 70C, FIG. 72C, and FIG. 74C are aberration diagrams of distortion (DT) at the wide angle end at the time of focusing to an object at infinity.

FIG. 26D, FIG. 28D, FIG. 30D, FIG. 32D, FIG. 34D, FIG. 36D, FIG. 38D, FIG. 40D, FIG. 42D, FIG. 44D, FIG. 46D, FIG. 48D, FIG. 50D, FIG. 52D, FIG. 54D, FIG. 56D, FIG. 58D, FIG. 60D, FIG. 62D, FIG. 64D, FIG. 66D, FIG. 68D, FIG. 70D, FIG. 72D, and FIG. 74D are aberration diagrams of chromatic aberration of magnification (CC) at the wide angle end at the time of focusing to an object at infinity.

FIG. 27A, FIG. 29A, FIG. 31A, FIG. 33A, FIG. 35A, FIG. 37A, FIG. 39A, FIG. 41A, FIG. 43A, FIG. 45A, FIG. 47A, FIG. 49A, FIG. 51A, FIG. 53A, FIG. 55A, FIG. 57A, FIG. 59A, FIG. 61A, FIG. 63A, FIG. 65A, FIG. 67A, FIG. 69A, FIG. 71A, FIG. 73A, and FIG. 75A are aberration diagrams of spherical aberration (SA) at the wide angle end at the time of focusing to an object at a close distance.

FIG. 27B, FIG. 29B, FIG. 31B, FIG. 33B, FIG. 35B, FIG. 37B, FIG. 39B, FIG. 41B, FIG. 43B, FIG. 45B, FIG. 47B, FIG. 49B, FIG. 51B, FIG. 53B, FIG. 55B, FIG. 57B, FIG. 59B, FIG. 61B, FIG. 63B, FIG. 65B, FIG. 67B, FIG. 69B, FIG. 71B, FIG. 73B, and FIG. 75B are aberration diagrams of astigmatism (AS) at the wide angle end at the time of focusing to an object at a close distance.

FIG. 27C, FIG. 29C, FIG. 31C, FIG. 33C, FIG. 35C, FIG. 37C, FIG. 39C, FIG. 41C, FIG. 43C, FIG. 45C, FIG. 47C, FIG. 49C, FIG. 51C, FIG. 53C, FIG. 55C, FIG. 57C, FIG. 59C, FIG. 61C, FIG. 63C, FIG. 65C, FIG. 67C, FIG. 69C, FIG. 71C, FIG. 73C, and FIG. 75C are aberration diagrams of distortion (DT) at the wide angle end at the time of focusing to an object at a close distance.

FIG. 27D, FIG. 29D, FIG. 31D, FIG. 33D, FIG. 35D, FIG. 37D, FIG. 39D, FIG. 41D, FIG. 43D, FIG. 45D, FIG. 47D, FIG. 49D, FIG. 51D, FIG. 53D, FIG. 55D, FIG. 57D, FIG. 59D, FIG. 61D, and FIG. 63D, FIG. 65D, FIG. 67D, FIG. 69D, FIG. 71D, FIG. 73D, and FIG. 75D are aberration diagrams of a chromatic aberration of magnification (CC) at the wide angle end at the time of focusing to an object at a close distance.

FIG. 26E, FIG. 28E, FIG. 30E, FIG. 32E, FIG. 34E, FIG. 36E, FIG. 38E, FIG. 40E, FIG. 42E, FIG. 44E, FIG. 46E, FIG. 48E, FIG. 50E, FIG. 52E, FIG. 54E, FIG. 56E, FIG. 58E, FIG. 60E, FIG. 62E, FIG. 64E, FIG. 66E, FIG. 68E, FIG. 70E, FIG. 72E, and FIG. 74E are aberration diagrams of spherical aberration (SA) in the intermediate focal length state at the time of focusing to an object at infinity.

FIG. 26F, FIG. 28F, FIG. 30F, FIG. 32F, FIG. 34F, FIG. 36F, FIG. 38F, FIG. 40F, FIG. 42F, FIG. 44F, FIG. 46F, FIG. 48F, FIG. 50F, FIG. 52F, FIG. 54F, FIG. 56F, FIG. 58F, FIG. 60F, FIG. 62F, FIG. 64F, FIG. 66F, FIG. 68F, FIG. 70F, FIG. 72F, and FIG. 74F are aberration diagrams showing astigmatism (AS) in the intermediate focal length state at the time of focusing to an object at infinity.

FIG. 26G, FIG. 28G, FIG. 30G, FIG. 32G, FIG. 34G, FIG. 36G, FIG. 38G, FIG. 40G, FIG. 42G, FIG. 44G, FIG. 46G, FIG. 48G, FIG. 50G, FIG. 52G, FIG. 54G, FIG. 56G, FIG. 58G, FIG. 60G, FIG. 62G, FIG. 64G, FIG. 66G, FIG. 68G, FIG. 70G, FIG. 72G, and FIG. 74G are aberration diagrams showing distortion (DT) in the intermediate focal length state at the time of focusing to an object at infinity.

FIG. 26H, FIG. 28H, FIG. 30H, FIG. 32H, FIG. 34H, FIG. 36H, FIG. 38H, FIG. 40H, FIG. 42H, FIG. 44H, FIG. 46H, FIG. 48H, FIG. 50H, FIG. 52H, FIG. 54H, FIG. 56H, FIG. 58H, FIG. 60H, FIG. 62H, FIG. 64H, FIG. 66H, FIG. 68H, FIG. 70H, FIG. 72H, and FIG. 74H are aberration diagrams showing a chromatic aberration of magnification (CC) in the intermediate focal length state at the time of focusing to an object at infinity.

FIG. 27E, FIG. 29E, FIG. 31E, FIG. 33E, FIG. 35E, FIG. 37E, FIG. 39E, FIG. 41E, FIG. 43E, FIG. 45E, FIG. 47E, FIG. 49E, FIG. 51E, FIG. 53E, FIG. 55E, FIG. 57E, FIG. 59E, FIG. 61E, FIG. 63E, FIG. 65E, FIG. 67E, FIG. 69E, FIG. 71E, FIG. 73E, and FIG. 75E are aberration diagrams of spherical aberration (SA) in the intermediate focal length state at the time of focusing to an object at a close distance.

FIG. 27F, FIG. 29F, FIG. 31F, FIG. 33F, FIG. 35F, FIG. 37F, FIG. 39F, FIG. 41F, FIG. 43F, FIG. 45F, FIG. 47F, FIG. 49F, FIG. 51F, FIG. 53F, FIG. 55F, FIG. 57F, FIG. 59F, FIG. 61F, FIG. 63F, FIG. 65F, FIG. 67F, FIG. 69F, FIG. 71F, and FIG. 75F are aberration diagrams of astigmatism (AS) in the intermediate focal length state at the time of focusing to an object at a close distance.

FIG. 27G, FIG. 29G, FIG. 31G, FIG. 33G, FIG. 35G, FIG. 37G, FIG. 39G, FIG. 41G, FIG. 43G, FIG. 45G, FIG. 47G, FIG. 49G, FIG. 51G, FIG. 53G, FIG. 55G, FIG. 57G, FIG. 59G, FIG. 61G, FIG. 63G, FIG. 65G, FIG. 67G, FIG. 69G, FIG. 71G, FIG. 73G, and FIG. 75G are aberration diagrams of distortion (DT) in the intermediate focal length state at the time of focusing to an object at a close distance.

FIG. 27H, FIG. 29H, FIG. 31H, FIG. 33H, FIG. 35H, FIG. 37H, FIG. 39H, FIG. 41H, FIG. 43H, FIG. 45H, FIG. 47H, FIG. 49H, FIG. 51H, FIG. 53H, FIG. 55H, FIG. 57H, FIG. 59H, FIG. 61H, FIG. 63H, FIG. 65H, FIG. 67H, FIG. 69H, FIG. 71H, FIG. 73H, and FIG. 75H are aberration diagrams showing a chromatic aberration of magnification (CC) in the intermediate focal length state at the time of focusing to an object at a close distance.

FIG. 26I, FIG. 28I, FIG. 30I, FIG. 32I, FIG. 34I, FIG. 36I, FIG. 38I, FIG. 40I, FIG. 42I, FIG. 44I, FIG. 46I, FIG. 48I, FIG. 50I, FIG. 52I, FIG. 54I, FIG. 56I, FIG. 58I, FIG. 60I, FIG. 62I, FIG. 64I, FIG. 66I, FIG. 68I, FIG. 70I, FIG. 72I, and FIG. 74I are aberration diagrams of spherical aberration (SA) at the telephoto end at the time of focusing to an object at infinity.

FIG. 26J, FIG. 28J, FIG. 30J, FIG. 32J, FIG. 34J, FIG. 36J, FIG. 38J, FIG. 40J, FIG. 42J, FIG. 44J, FIG. 46J, FIG. 48J, FIG. 50J, FIG. 52J, FIG. 54J, FIG. 56J, FIG. 58J, FIG. 60J, FIG. 62J, FIG. 64J, FIG. 66J, FIG. 68J, FIG. 70J, FIG. 72J, and FIG. 74J are aberration diagrams of astigmatism (AS) at the telephoto end at the time of focusing to an object at infinity.

FIG. 26K, FIG. 28K, FIG. 30K, FIG. 32K, FIG. 34K, FIG. 36K, FIG. 38K, FIG. 40K, FIG. 42K, FIG. 44K, FIG. 46K, FIG. 48K, FIG. 50K, FIG. 52K, FIG. 54K, FIG. 56K, FIG. 58K, FIG. 60K, FIG. 62K, FIG. 64K, FIG. 66K, FIG. 68K, FIG. 70K, FIG. 72K, and FIG. 74K are aberration diagrams of distortion (DT) at the telephoto end at the time of focusing to an object at infinity.

FIG. 26L, FIG. 28L, FIG. 30L, FIG. 32L, FIG. 34L, FIG. 36L, FIG. 38L, FIG. 40L, FIG. 42L, FIG. 44L, FIG. 46L, FIG. 48L, FIG. 50L, FIG. 52L, FIG. 54L, FIG. 56L, FIG. 58L, FIG. 60L, FIG. 62L, FIG. 64L, FIG. 66L, FIG. 68L, FIG. 70L, FIG. 72L, and FIG. 74L are aberration diagrams of chromatic aberration of magnification (CC) at the telephoto end at the time of focusing to an object at infinity.

FIG. 27I, FIG. 29I, FIG. 31I, FIG. 33I, FIG. 35I, FIG. 37I, FIG. 39I, FIG. 41I, FIG. 43I, FIG. 45I, FIG. 47I, FIG. 49I, FIG. 51I, FIG. 53I, FIG. 55I, FIG. 57I, FIG. 59I, FIG. 61I, FIG. 63I, FIG. 65I, FIG. 67I, FIG. 69I, FIG. 71I, FIG. 73I, and FIG. 75I are aberration diagrams of spherical aberration (SA) at the telephoto end at the time of focusing to an object at a close distance.

FIG. 27J, FIG. 29J, FIG. 31J, FIG. 33J, FIG. 35J, FIG. 37J, FIG. 39J, FIG. 41J, FIG. 43J, FIG. 45J, FIG. 47J, FIG. 49J, FIG. 51J, FIG. 53J, FIG. 55J, FIG. 57J, FIG. 59J, FIG. 61J, FIG. 63J, FIG. 65J, FIG. 67J, FIG. 69J, FIG. 71J, FIG. 73J, and FIG. 75J are aberration diagrams of astigmatism (AS) at the telephoto end at the time of focusing to an object at a close distance.

FIG. 27K, FIG. 29K, FIG. 31K, FIG. 33K, FIG. 35K, FIG. 37K, FIG. 39K, FIG. 41K, FIG. 43K, FIG. 45K, FIG. 47K, FIG. 49K, FIG. 51K, FIG. 53K, FIG. 55K, FIG. 57K, FIG. 59K, FIG. 61K, FIG. 63K, FIG. 65K, FIG. 67K, FIG. 69K, FIG. 71K, FIG. 73K, and FIG. 75K are aberration diagrams of distortion (DT) at the telephoto end at the time of focusing to an object at a close distance.

FIG. 27L, FIG. 29L, FIG. 31L, FIG. 33L, FIG. 35L, FIG. 37L, FIG. 39L, FIG. 41L, FIG. 43L, FIG. 45L, FIG. 47L, FIG. 49L, FIG. 51L, FIG. 53L, FIG. 55L, FIG. 57L, FIG. 59L, FIG. 61L, FIG. 63L, FIG. 65L, FIG. 67L, FIG. 69L, FIG. 71L, FIG. 73L, and FIG. 75L are aberration diagrams of chromatic aberration of magnification (CC) at the telephoto end at the time of focusing to an object at a close distance.

Next, values of conditional expressions (1) to (17) in each example are given below. In conditional expression (12), values at the wide angle end are shown upper side and values at the telephoto end are shown lower side

|  | Example1 | Example2 | Example3 | Example4 |
|---|---|---|---|---|
| (1) $vd_{Fnmax}$ | 94.93 | 81.54 | 95.1 | 81.61 |
| (2) $FB_w/f_F$ | −1.06 | −1.28 | −0.93 | −1.25 |
| (3) $f_w \times Fno_{wmin}/f_F$ | −1.73 | −1.52 | −1.30 | −1.67 |
| (4) $f_{Rw}/FB_w$ | 1.56 | 1.77 | 1.70 | 1.58 |
| (5) $|r_{F1i}/f_F|$ | 1.59 | 2.12 | 1.44 | 1.89 |
| (6) $\theta gF_{Fn}$ | 0.5340 | 0.5375 | 0.5334 | 0.5388 |
| (7) $\theta gF_{Fn} + 0.0016 \times vd − 0.6415$ | 0.0444 | 0.0265 | 0.0441 | 0.0279 |
| (8) $FB_w/LTL_w$ | 0.13 | 0.12 | 0.13 | 0.14 |
| (9) $SP_{F1}$ | 3.15 | 4.04 | 3.44 | 4.40 |
| (10) $ASP_{R\theta}$ | 49 | 53 | 50.0 | 53.4 |
| (11) $DTL_w$ | −10.92 | −9.45 | −8.86 | −8.35 |
| (12) $|MG_{fob}^2 \times (MG_{fo}^2 − 1)|$ | 0.15 | 0.22 | 0.20 | 0.30 |
|  | 0.38 | 1.03 | 0.55 | 0.93 |
| (13) $f_F/(f_w \times f_t)^{1/2}$ | −1.70 | −1.36 | −1.60 | −1.24 |
| (14) $SP_{F2}$ | 2.43 | 2.21 | 5.06 | 2.70 |
| (15) $SP_{F4}$ | 1.13 | 3.12 | 3.49 | 2.66 |
| (16) $f_3/f_F$ | — | 3.75 | — | 7.22 |
| (17) $f_3/f_W$ | — | −7.08 | — | −12.43 |

|  | Example5 | Example6 | Example7 | Example8 |
|---|---|---|---|---|
| (1) $vd_{Fnmax}$ | 95.1 | 81.61 | 81.54 | 95.1 |
| (2) $FB_w/f_F$ | −1.14 | −1.11 | −1.26 | −1.10 |
| (3) $f_w \times Fno_{wmin}/f_F$ | −1.60 | −1.38 | −1.54 | −1.52 |
| (4) $f_{Rw}/FB_w$ | 1.82 | 1.76 | 1.80 | 1.80 |
| (5) $|r_{F1i}/f_F|$ | 1.56 | 1.61 | 2.02 | 1.51 |
| (6) $\theta gF_{Fn}$ | 0.5334 | 0.5388 | 0.5375 | 0.5334 |
| (7) $\theta gF_{Fn} + 0.0016 \times vd − 0.6415$ | 0.0441 | 0.0279 | 0.0265 | 0.0441 |
| (8) $FB_w/LTL_w$ | 0.13 | 0.14 | 0.13 | 0.13 |
| (9) $SP_{F1}$ | 3.44 | 3.68 | 3.73 | 3.17 |
| (10) $ASP_{R\theta}$ | 51.1 | 54.4 | 56.7 | 51 |

-continued

|  |  |  |  |  |
|---|---|---|---|---|
| (11)$DTL_w$ | −9.18 | −10.02 | −7.43 | −8.42 |
| (12)$|MG_{fob}^2 \times (MG_{fo}^2 - 1)|$ | 0.28 | 0.21 | 0.18 | 0.28 |
|  | 0.64 | 0.53 | 1.06 | 0.87 |
| (13)$f_F/(f_w \times f_t)^{1/2}$ | −1.41 | −1.50 | −1.35 | −1.35 |
| (14)$SP_{F2}$ | 3.43 | 2.55 | 2.05 | 3.13 |
| (15)$SP_{F4}$ | 0.87 | 0.80 | 2.06 | 0.66 |
| (16)$f_3/f_F$ | 8.55 | — | — | — |
| (17)$f_3/f_W$ | −15.43 | — | — | — |

|  | Example9 | Example10 | Example11 | Example12 |
|---|---|---|---|---|
| (1)$vd_{Fnmax}$ | 81.61 | 81.61 | 94.93 | 95.1 |
| (2)$FB_w/f_F$ | −1.11 | −1.30 | −1.10 | −0.92 |
| (3)$f_w \times Fno_{wmin}/f_F$ | −1.38 | −1.57 | v1.51 | −1.31 |
| (4)$f_{Rw}/FB_w$ | 1.76 | 1.73 | 1.73 | 1.70 |
| (5)$|r_{F1i}/f_F|$ | 1.61 | 2.35 | 2.10 | 1.52 |
| (6)$\theta gF_{Fn}$ | 0.5388 | 0.5388 | 0.5340 | 0.5334 |
| (7)$\theta gF_{Fn} + 0.0016 \times vd - 0.6415$ | 0.0279 | 0.0279 | 0.0444 | 0.0441 |
| (8)$FB_w/LTL_w$ | 0.14 | 0.12 | 0.13 | 0.13 |
| (9)$SP_{F1}$ | 3.68 | 8.39 | 3.91 | 3.89 |
| (10)$ASP_{R\theta}$ | 54.4 | 53.9 | 36.8 | 52.30 |
| (11)$DTL_w$ | −10.03 | −8.65 | −7.83 | −10.31 |
| (12) $|MG_{fob}^2 \times (MG_{fo}^2 - 1)|$ | 0.21 | 0.28 | 0.16 | 0.20 |
|  | 0.55 | 0.80 | 1.00 | 0.55 |
| (13)$f_F/(f_w \times f_t)^{1/2}$ | −1.49 | −1.32 | −1.38 | −1.59 |
| (14)$SP_{F2}$ | 2.55 | 2.53 | 2.28 | 4.98 |
| (15)$SP_{F4}$ | 0.80 | 3.92 | 1.06 | 3.56 |
| (16)$f_3/f_F$ | — | 5.61 | — | — |
| (17)$f_3/f_W$ | — | −10.28 | — | — |

|  | Example13 |
|---|---|
| (1)$vd_{Fnmax}$ | 81.54 |
| (2)$FB_w/f_F$ | −0.99 |
| (3)$f_w \times Fno_{wmin}/f_F$ | −1.28 |
| (4)$f_{Rw}/FB_w$ | 1.58 |
| (5)$|r_{F1i}/f_F|$ | 1.44 |
| (6)$\theta gF_{Fn}$ | 0.5375 |
| (7)$\theta gF_{Fn} + 0.0016 \times vd - 0.6415$ | 0.0265 |
| (8)$FB_w/LTL_w$ | 0.14 |
| (9)$SP_{F1}$ | 3.58 |
| (10)$ASP_{R\theta}$ | 51.00 |
| (11)$DTL_w$ | −9.26 |
| (12)$|MG_{fob}^2 \times (MG_{fo}^2 - 1)|$ | −0.20 |
|  | −0.57 |
| (13)$f_F/(f_w \times f_t)^{1/2}$ | −1.58 |
| (14)$SP_{F2}$ | 5.00 |
| (15)$SP_{F4}$ | 3.61 |

|  | Example14 | Example15 | Example16 | Example17 |
|---|---|---|---|---|
| (1-1)$vd_{Fnmax}$ | 95.1 | 95.1 | 81.54 | 81.54 |
| (2-2)$FB_w/f_F$ | −1.00 | −1.00 | −1.24 | −1.24 |
| (3-2)$f_w \times Fno_{wmin}/f_F$ | −1.28 | −1.28 | −1.50 | −1.50 |
| (4)$f_{Rw}/FB_w$ | 1.48 | 1.48 | 1.68 | 1.67 |
| (5)$|r_{F1i}/f_F|$ | 1.44 | 1.44 | 1.96 | 1.96 |
| (6)$\theta gF_{Fn}$ | 0.5334 | 0.5334 | 0.5375 | 0.5375 |
| (7)$\theta gF_{Fn} + 0.0016 \times vd - 0.6415$ | 0.04406 | 0.04406 | 0.026512 | 0.026464 |
| (8)$FB_w/LTL_w$ | 0.14 | 0.14 | 0.13 | 0.13 |
| (9)$SP_{F1}$ | 4.20 | 4.20 | 3.73 | 3.73 |
| (11)$DTL_w$ | 7.91 | 7.92 | 7.88 | 7.48 |
| (13)$f_F/(f_w \times f_t)^{1/2}$ | −1.62 | −1.62 | −1.39 | −1.39 |
| (14-1)$SP_{F2}$ | 2.77 | 2.77 | 2.05 | 2.05 |
| (15)$SP_{F4}$ | 3.33 | 3.33 | 1.61 | 1.61 |
| (16)$f_3/f_F$ | — | 3.75 | 4.60 | — |
| (17)$f_3/f_W$ | — | −8.41 | −8.85 | — |

|  | Example18 | Example19 |
|---|---|---|
| (1-1)$vd_{Fnmax}$ | 81.54 | 81.61 |
| (2-2)$FB_w/f_F$ | −1.26 | −1.35 |
| (3-2)$f_w \times Fno_{wmin}/f_F$ | −1.54 | −1.58 |
| (4)$f_{Rw}/FB_w$ | 1.80 | 1.73 |
| (5)$|r_{F1i}/f_F|$ | 2.02 | 2.60 |
| (6)$\theta gF_{Fn}$ | 0.5375 | 0.5375 |
| (7)$\theta gF_{Fn} + 0.0016 \times vd - 0.6415$ | 0.026464 | 0.026576 |
| (8)$FB_w/LTL_w$ | 0.13 | 0.12 |
| (9)$SP_{F1}$ | 3.73 | 6.28 |
| (11)$DTL_w$ | 7.35 | 13.2 |

-continued

| | | | | |
|---|---|---|---|---|
| (13)$f_F/(f_w \times f_t)^{1/2}$ | | −1.35 | | −1.32 |
| (14)$SP_{F2}$ | | 2.05 | | 2.53 |
| (15)$SP_{F4}$ | | 2.06 | | 3.92 |

| | Example20 | Example21 | Example22 | Example23 |
|---|---|---|---|---|
| (1-2)$vd_{Fnmax}$ | 81.61 | 95.1 | 95.1 | 81.61 |
| (2-2)$FB_w/f_F$ | −1.31 | −1.09 | −0.99 | −1.29 |
| (3-2)$f_w \times Fno_{wmin}/f_F$ | −1.58 | −1.30 | −1.29 | −2.22 |
| (4)$f_{Rw}/FB_w$ | 1.57 | 1.76 | 1.51 | 1.60 |
| (5)$|r_{F1}/f_F|$ | 2.33 | 1.50 | 1.45 | 1.94 |
| (6)$\theta gF_{Fn}$ | 0.5375 | 0.5334 | 0.5334 | 0.5388 |
| (7)$\theta gF_{Fn} + 0.0016 \times vd − 0.6415$ | 0.026576 | 0.04406 | 0.04406 | 0.04946 |
| (8)$FB_w/LTL_w$ | 0.13 | 0.13 | 0.14 | 0.14 |
| (9)$SP_{F1}$ | 4.17 | 3.44 | 4.29 | 5.03 |
| (11)$DTL_w$ | −8.56 | −9.60 | −6.71 | −11.69 |
| (13)$f_F/(f_w \times f_t)^{1/2}$ | −1.32 | −1.36 | −1.61 | −1.30 |
| (14-1)$SP_{F2}$ | 2.14 | 3.19 | 2.77 | 3.91 |
| (15)$SP_{F4}$ | 5.88 | 0.79 | 3.31 | 2.46 |

| | Example24 | Example25 |
|---|---|---|
| (1-2)$vd_{Fnmax}$ | 81.61 | 81.61 |
| (2-2)$FB_w/f_F$ | −1.29 | −1.39 |
| (3-2)$f_w \times Fno_{wmin}/f_F$ | −2.22 | −1.57 |
| (4)$f_{Rw}/FB_w$ | 1.61 | 1.54 |
| (5)$|r_{F1}/f_F|$ | 1.94 | 2.32 |
| (6)$\theta gF_{Fn}$ | 0.5388 | 0.5375 |
| (7)$\theta gF_{Fn} + 0.0016 \times vd − 0.6415$ | 0.04946 | 0.026576 |
| (8)$FB_w/LTL_w$ | 0.14 | 0.13 |
| (9)$SP_{F1}$ | 5.03 | 8.18 |
| (11)$DTL_w$ | −11.64 | −9.63 |
| (13)$f_F/(f_w \times f_t)^{1/2}$ | −1.30 | −1.32 |
| (14-1)$SP_{F2}$ | 3.91 | 2.56 |
| (15)$SP_{F4}$ | 2.46 | 3.93 |

Figure 76:
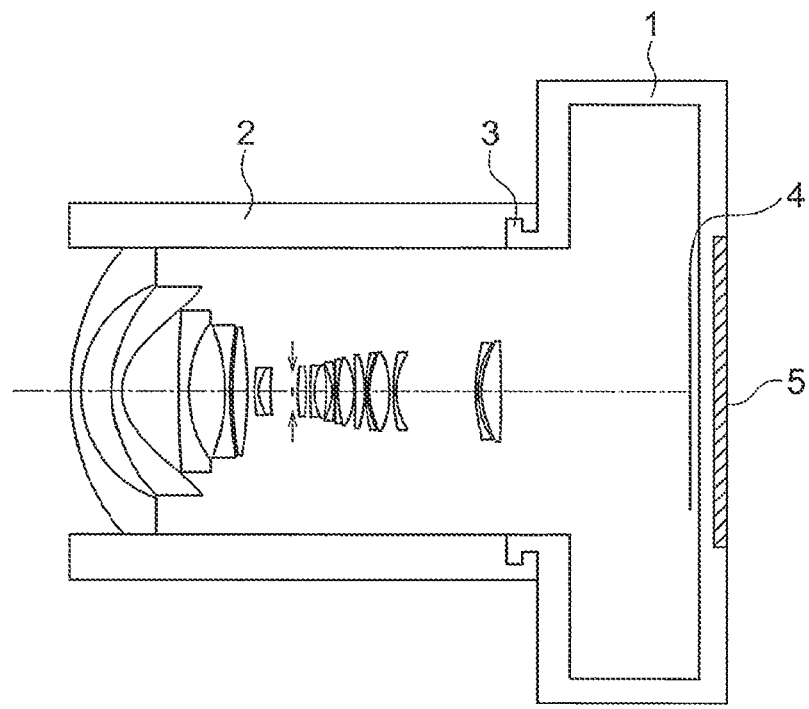
FIG. 76 is a cross-sectional view of an image pickup apparatus.

FIG. 76 is a cross-sectional view of a single-lens mirrorless camera as an electronic image pickup apparatus. In FIG. 76, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom lens described in any one of the examples from the example 1 to the example 25 is to be used.

Figure 77:
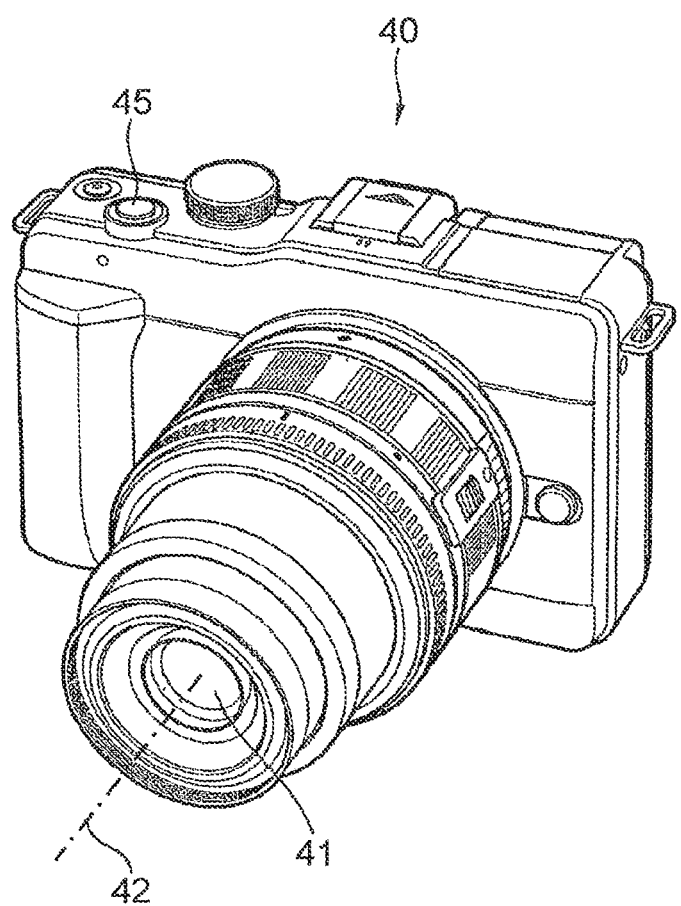
FIG. 77 is a front perspective view showing the image pickup apparatus schematically.
Figure 78:
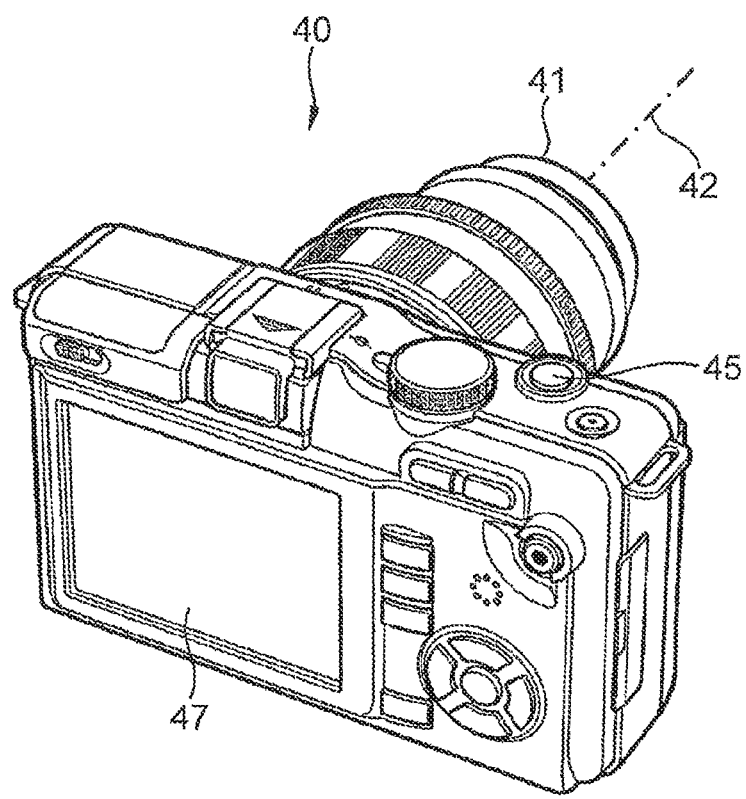
FIG. 78 is a rear perspective view of the image pickup apparatus.

FIG. 77 and FIG. 78 are conceptual diagrams of an arrangement of the image pickup apparatus using the zoom lens shown in the examples from the example 1 to the example 25. FIG. 77 is a front perspective view of a digital camera 40 as the image pickup apparatus, and FIG. 78 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 79:
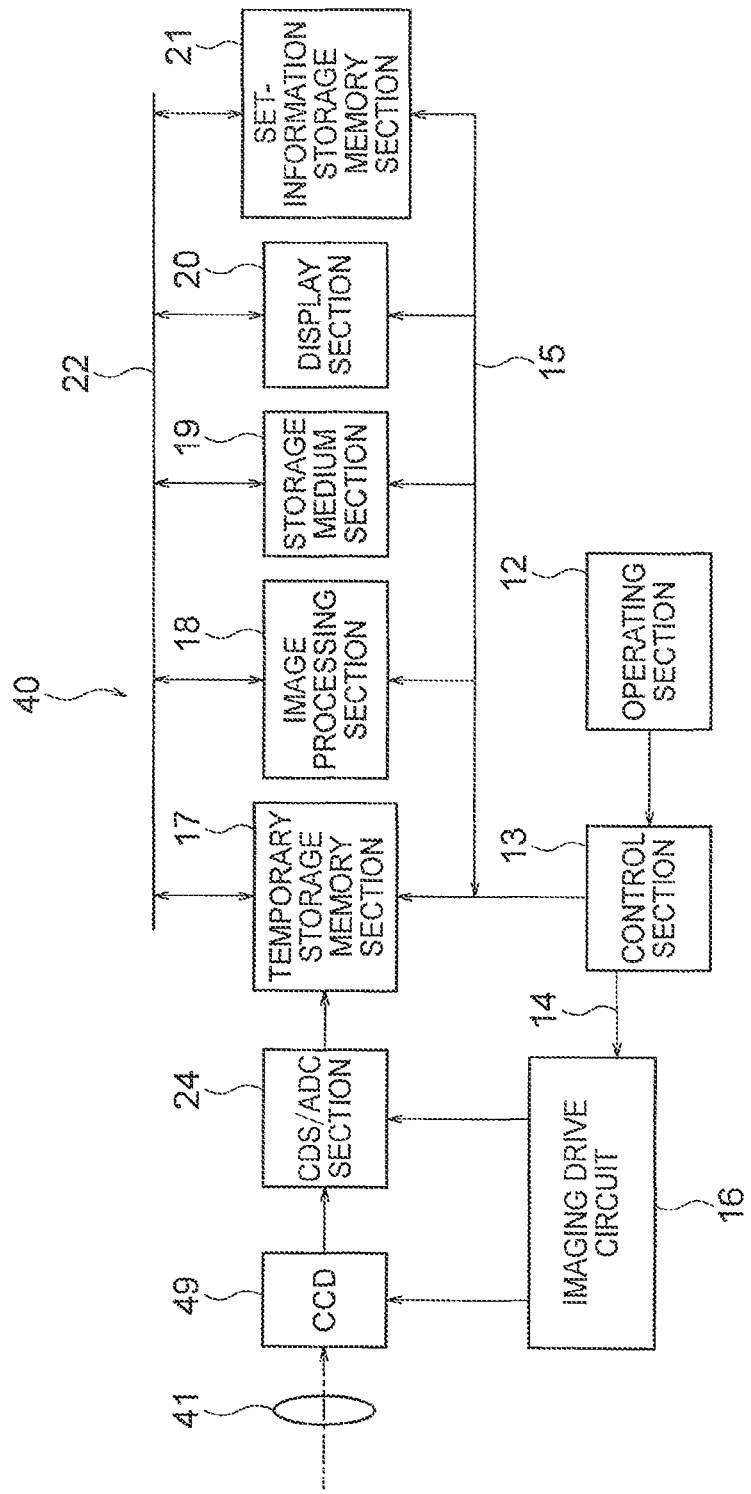
FIG. 79 is a structural block diagram showing an internal circuit of main components of the image pickup apparatus.

FIG. 79 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 79, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the zoom lens according to the example as the photographic optical system 41, it is possible to let the digital camera 40 configured to be an image pickup apparatus which is advantageous for achieving a high-resolution image without deteriorating an image quality, while being small-sized and having a super-wide angle of view.

According to the present invention, it is possible to provide a zoom lens in which an optical system is made adequately small-sized and light-weight, and various aberrations are reduced adequately while having a sufficiently wide angle of view as compared to an F-number, and an image pickup apparatus using such zoom lens.

As described heretofore, the present invention is suitable for a zoom lens in which an optical system is made adequately small-sized and light-weight, and various aberrations are reduced adequately while having a sufficiently wide angle of view as compared to an F-number, and an image pickup apparatus using such zoom lens.

What is claimed is:

1. A zoom lens comprising, in order from an object side to an image side:
   a front unit having a negative refractive power; and
   a rear unit having a positive refractive power, which includes an aperture stop,
   wherein:
   the front unit includes a first lens having a negative refractive power, a second lens having a negative refractive power, and a third lens having a positive refractive power,
   the first lens is disposed nearest to an object, and has a meniscus shape of which a convex surface is directed toward the object side,
   the second lens is disposed on the image side of the first lens, and has a meniscus shape of which a convex surface is directed toward the object side,
   the rear unit includes, in order from the object side to the image side, a first lens unit A and a second lens unit B,
   at a time of zooming from a wide angle end to a telephoto end, a distance between the front unit and the rear unit narrows, and a distance between the first lens unit A and the second lens unit B changes,
   the first lens unit A includes, in order from the object side to the image side, a first sub-lens unit having a positive refractive power, the aperture stop, and a second sub-lens unit,
   the second sub-lens unit includes a focusing lens unit,
   at a time of focusing, only the focusing lens unit moves along an optical axis,
   at the time of zooming, a distance between the first sub-lens unit and the second sub-lens unit changes, and
   the following conditional expression is satisfied:
   $65 < vd_{Fnmax} < 110$,
   where,
   $vd_{Fnmax}$ denotes a maximum of Abbe number from among Abbe numbers for lenses having a negative refractive power in the front unit.

2. The zoom lens according to claim 1, wherein the following conditional expression is satisfied:

$$1.9 < SP_{F1} < 9.0,$$

where, $$SP_{F1} = (r_{F1o} + r_{F1i})/(r_{F1o} - r_{F1i}), \text{ and here}$$

$r_{F1o}$ denotes a paraxial radius of curvature of an object-side surface of the first lens, and
$r_{F1i}$ denotes a paraxial radius of curvature of the image-side surface of the first lens.

3. The zoom lens according to claim 1, wherein the following conditional expression is satisfied:

$$-2.5 < FB_w/f_F < -0.3,$$

where,
$FB_w$ denotes a back focus at the wide angle end, and
$f_F$ denotes a focal length of the front unit.

4. The zoom lens according claim 1, wherein the following conditional expression is satisfied:

$$-2.3 < f_w \times Fno_{wmin}/f_F < -0.5,$$

where,
$f_F$ denotes a focal length of the front unit,
$f_w$ denotes a focal length of the overall zoom lens system at the wide angle end, and
$Fno_{wmin}$ denotes a minimum of F-number from among F-numbers at the wide angle end.

5. A zoom lens comprising, in order from an object side to an image side:
a front unit having a negative refractive power; and
a rear unit having a positive refractive power, which includes an aperture stop,
wherein:
the front unit includes a first lens having a negative refractive power, a second lens having a negative refractive power, and a third lens having a positive refractive power,
the first lens is disposed nearest to an object, and has a meniscus shape of which a convex surface is directed toward the object side,
the second lens is disposed on the image side of the first lens, and has a meniscus shape of which a convex surface is directed toward the object side,
the rear unit includes, in order from the object side to the image side, a first lens unit A and a second lens unit B,
at a time of zooming from a wide angle end to a telephoto end, a distance between the front unit and the rear unit narrows, and a distance between the first lens unit A and the second lens unit B changes,
the first lens unit A includes, in order from the object side to the image side, a first sub-lens unit having a positive refractive power, the aperture stop, and a second sub-lens unit,
the second sub-lens unit includes a focusing lens unit,
at a time of focusing, only the focusing lens unit moves along an optical axis,
at the time of zooming, a distance between the first sub-lens unit and the second sub-lens unit changes, and
the following conditional expression is satisfied:

$$1.25 < f_{Rw}/FB_w < 5,$$

where,
$f_{Rw}$ denotes a focal length of the rear unit at the wide angle end, and
$FB_w$ denotes a back focus at the wide angle end.

6. A zoom lens comprising, in order from an object side to an image side:
a front unit having a negative refractive power; and
a rear unit having a positive refractive power, which includes an aperture stop,
wherein:
the front unit includes a first lens having a negative refractive power, a second lens having a negative refractive power, and a third lens having a positive refractive power,
the first lens is disposed nearest to an object, and has a meniscus shape of which a convex surface is directed toward the object side,
the second lens is disposed on the image side of the first lens, and has a meniscus shape of which a convex surface is directed toward the object side,
the rear unit includes, in order from the object side to the image side, a first lens unit A and a second lens unit B,
at a time of zooming from a wide angle end to a telephoto end, a distance between the front unit and the rear unit narrows, and a distance between the first lens unit A and the second lens unit B changes,
the first lens unit A includes, in order from the object side to the image side, a first sub-lens unit having a positive refractive power, the aperture stop, and a second sub-lens unit,
the second sub-lens unit includes a focusing lens unit,
at a time of focusing, only the focusing lens unit moves along an optical axis,
at the time of zooming, a distance between the first sub-lens unit and the second sub-lens unit changes, and
the following conditional expression is satisfied:

$$-25 < DTL_w < 7,$$

where,
$DTL_w$ denotes a distortion at a maximum angle of view at the wide angle end, and is expressed by $DTL_w = (IH_{w1} - IH_{w2})/IH_{w2} \times 100(\%)$, and here
$IH_{w1}$ denotes an actual image height of an image formed on an image plane by the maximum angle of view at the wide angle end from an infinite object point, and
$IH_{w2}$ denotes a paraxial image height of an image formed on the image plane by the maximum angle of view at the wide angle end from the infinite object point.

7. The zoom lens according to claim 1, wherein the front unit further includes a fourth lens having a negative refractive power.

8. The zoom lens according to claim 1, wherein the front unit further includes a fourth lens having a negative refractive power, and the fourth lens has a meniscus shape.

9. The zoom lens according to claim 1, wherein the front unit further includes a fourth lens having a negative refractive power, and the fourth lens has a meniscus shape of which a convex surface is directed toward the object side.

10. The zoom lens according to claim 7, wherein the fourth lens is disposed on the image side of the second lens.

11. The zoom lens according to claim 1, wherein the following conditional expression is satisfied:

$$1.1 < |r_{F1i}/f_F| < 3,$$

where,
$r_{F1i}$ denotes a paraxial radius of curvature of an image-side surface of the first lens, and
$f_F$ denotes a focal length of the front unit.

12. The zoom lens according to claim 1, wherein the following conditional expression is satisfied:

$$0.53 < \theta gF_{Fn} < 0.55,$$

where,
$\theta gF_{Fn}$ denotes a partial dispersion ratio of a lens for which a value of Abbe number is maximum from among lenses having a negative refractive power in the front unit, and is expressed by $\theta gF_{Fn} = (ng-nF)/(nF-nc)$, and here
ng, nF, and nc denote refractive indices for a g-line, an F-line, and a C-line respectively of the lens for which the value of Abbe number is the maximum.

13. The zoom lens according to claim 1, wherein the following conditional expression is satisfied:

$$0.01 < \theta gF_{Fn} + 0.0016 \times vd - 0.6415 < 0.054,$$

where,
$\theta gF_{Fn}$ denotes a partial dispersion ratio of a lens for which a value of Abbe number is maximum from among lenses having a negative refractive power in the front unit, and is expressed by $\theta gF_{Fn} = (ng-nF)/(nF-nc)$, and here
ng, nF, and nc denote refractive indices for a g-line, an F-line, and a C-line respectively of the lens for which the value of Abbe number is the maximum, and
vd denotes Abbe number for the lens for which the value of Abbe number is the maximum.

14. The zoom lens according to claim 1, wherein the following conditional expression is satisfied:

$$0.06 < FB_w/LTL_w < 0.20,$$

where, $FB_w$ denotes a back focus at the wide angle end, and $LTL_w$ denotes a distance on the optical axis from a surface nearest to object of the zoom lens up to an image plane, at the wide angle end.

15. The zoom lens according to claim 1, wherein the following conditional expression is satisfied:

$$-2.0 < f_F/(f_w \times f_t)^{1/2} < -1.0,$$

where, $f_F$ denotes a focal length of the front unit, $f_w$ denotes a focal length of the overall zoom lens system at the wide angle end, and $f_t$ denotes a focal length of the overall zoom lens system at the telephoto end.

16. The zoom lens according to claim 1, wherein the following conditional expression is satisfied:

$$1.5 < SP_{F2} < 7,$$

where, $SP_{F2} = (r_{F2o} + r_{F2i})/(r_{F2o} - r_{F2i})$, and here $r_{F2o}$ denotes a paraxial radius of curvature of an object-side surface of the second lens, and $r_{F2i}$ denotes a paraxial radius of curvature of an image-side surface of the second lens.

17. The zoom lens according to claim 7, wherein the following conditional expression is satisfied:

$$0.5 < SP_{F4} < 6.0,$$

where, $SP_{F4} = (r_{F4o} + r_{F4i})/(r_{F4o} - r_{F4i})$, and here $r_{F4o}$ denotes a paraxial radius of curvature of an object-side surface of the fourth lens, and $r_{F4i}$ denotes a paraxial radius of curvature of an image-side surface of the fourth lens.

18. The zoom lens according to claim 1, wherein at the time of zooming, the front unit moves.

19. The zoom lens according to claim 1, wherein at the time of zooming, a distance between the first sub-lens unit and the second sub-lens unit is constant.

20. The zoom lens according to claim 1, wherein a part of the second sub-lens unit is the focusing lens unit, and at the time of zooming, the focusing lens unit moves integrally with the second sub-lens unit.

21. The zoom lens according to claim 1, wherein the entire second sub-lens unit is the focusing lens unit.

22. The zoom lens according to claim 1, wherein:
the first lens unit A includes a front lens unit having a positive refractive power and a rear lens unit,
at the time of zooming, a distance between the front lens unit and the rear lens unit changes, and
the front lens unit includes the first sub-lens unit.

23. The zoom lens according to claim 22, wherein the rear lens unit has a negative refractive power.

24. The zoom lens according to claim 22, wherein a part of the rear lens unit is the focusing lens unit, and at the time of focusing, the focusing lens unit moves integrally with the rear lens unit.

25. The zoom lens according to claim 22, wherein the entire rear lens unit is the focusing lens unit.

26. The zoom lens according to claim 1, wherein the first lens unit A includes a motion-blur reducing lens unit, and an image motion due to camera shake is reduced by moving the motion-blur reducing lens unit in a direction perpendicular to the optical axis.

27. The zoom lens according to claim 26, wherein the motion-blur reducing lens unit is disposed on the image side of the focusing lens unit.

28. The zoom lens according to claim 26, wherein the motion-blur reducing lens unit is disposed in the first sub-lens unit.

29. The zoom lens according to claim 28, wherein the entire first sub-lens unit is the motion-blur reducing lens unit.

30. The zoom lens according to claim 1, wherein a lens unit nearest to an image has a positive refractive power.

31. An image pickup apparatus, comprising:
the zoom lens according to claim 1; and
an image pickup element which has an image pickup surface, and which converts an image formed on the image pickup surface by the zoom lens to an electric signal.

* * * * *